US008838659B2

(12) United States Patent
Tunstall-Pedoe

(10) Patent No.: US 8,838,659 B2
(45) Date of Patent: Sep. 16, 2014

(54) ENHANCED KNOWLEDGE REPOSITORY

(75) Inventor: William Tunstall-Pedoe, Cambridge (GB)

(73) Assignee: Amazon Technologies, Inc., Reno, NV (US)

( * ) Notice: Subject to any disclaimer, the term of this patent is extended or adjusted under 35 U.S.C. 154(b) by 784 days.

(21) Appl. No.: 12/240,699

(22) Filed: Sep. 29, 2008

(65) Prior Publication Data

US 2009/0192968 A1    Jul. 30, 2009

Related U.S. Application Data

(60) Provisional application No. 60/977,463, filed on Oct. 4, 2007.

(51) Int. Cl.
*G06F 17/30* (2006.01)
*G06F 7/00* (2006.01)
*G06N 5/02* (2006.01)

(52) U.S. Cl.
CPC ........................................ *G06N 5/02* (2013.01)
USPC .............................. 707/899; 706/47; 706/61

(58) Field of Classification Search
USPC .............................. 706/12, 45–46, 55, 59, 61
See application file for complete search history.

(56) References Cited

U.S. PATENT DOCUMENTS

| 5,197,005 A | 3/1993 | Shwartz et al. |
| 5,282,265 A * | 1/1994 | Rohra Suda et al. ........... 706/11 |
| 5,404,506 A | 4/1995 | Fujisawa et al. |
| 5,412,756 A | 5/1995 | Bauman et al. |
| 5,555,408 A | 9/1996 | Fujisawa et al. |
| 5,594,837 A | 1/1997 | Noyes |
| 5,649,190 A | 7/1997 | Sharif-Askary et al. |
| 5,675,819 A | 10/1997 | Schuetze |
| 5,715,468 A | 2/1998 | Budzinski |
| 5,778,157 A | 7/1998 | Oatman et al. |
| 5,794,050 A | 8/1998 | Dahlgren et al. |
| 5,809,493 A | 9/1998 | Ahamed et al. |
| 5,878,406 A | 3/1999 | Noyes |
| 6,138,085 A * | 10/2000 | Richardson et al. .............. 704/1 |
| 6,263,335 B1 | 7/2001 | Paik et al. |
| 6,289,513 B1 | 9/2001 | Bentwich |
| 6,377,944 B1 | 4/2002 | Busey et al. |
| 6,438,533 B1 | 8/2002 | Spackman et al. |
| 6,446,081 B1 | 9/2002 | Preston |
| 6,498,921 B1 | 12/2002 | Ho et al. |
| 6,560,590 B1 | 5/2003 | Shwe et al. |

(Continued)

FOREIGN PATENT DOCUMENTS

| FR | 2865055 | 7/2005 |
| WO | WO 00/41090 A1 | 7/2000 |

(Continued)

OTHER PUBLICATIONS

Nick Siegel et al., The Cyc System: Notes on Architecture, published Nov. 2004.*

(Continued)

*Primary Examiner* — Jeffrey A Burke

(74) *Attorney, Agent, or Firm* — Weaver Austin Villeneuve & Sampson LLP

(57) ABSTRACT

Embodiments of the present invention relate to knowledge representation systems which include a knowledge base in which knowledge is represented in a structured, machine-readable format that encodes meaning.

20 Claims, 47 Drawing Sheets

(56) References Cited

U.S. PATENT DOCUMENTS

| | | | |
|---|---|---|---|
| 6,578,022 B1 | 6/2003 | Foulger et al. | |
| 6,584,464 B1 | 6/2003 | Warthen | |
| 6,604,094 B1 | 8/2003 | Harris | |
| 6,665,640 B1 | 12/2003 | Bennett et al. | |
| 6,704,747 B1 | 3/2004 | Fong | |
| 6,735,592 B1 | 5/2004 | Neumann et al. | |
| 6,766,320 B1 | 7/2004 | Wang et al. | |
| 6,779,060 B1 | 8/2004 | Azvine et al. | |
| 6,823,325 B1 | 11/2004 | Davies et al. | |
| 6,910,003 B1* | 6/2005 | Arnold et al. | 704/4 |
| 6,952,666 B1 | 10/2005 | Weise | |
| 6,986,104 B2 | 1/2006 | Green et al. | |
| 6,996,570 B2 | 2/2006 | Noble et al. | |
| 7,013,308 B1* | 3/2006 | Tunstall-Pedoe | 707/709 |
| 7,039,875 B2 | 5/2006 | Khalfay et al. | |
| 7,050,977 B1 | 5/2006 | Bennett | |
| 7,069,254 B2 | 6/2006 | Foulger et al. | |
| 7,092,928 B1 | 8/2006 | Elad et al. | |
| 7,415,044 B2 | 8/2008 | Kallstenius | |
| 7,418,434 B2* | 8/2008 | Barry | 706/47 |
| 7,447,667 B2* | 11/2008 | Gong et al. | 706/47 |
| 7,454,430 B1* | 11/2008 | Komissarchik et al. | 1/1 |
| 7,526,425 B2 | 4/2009 | Marchisio et al. | |
| 7,536,368 B2 | 5/2009 | Todhunter | |
| 7,539,656 B2 | 5/2009 | Fratkina et al. | |
| 7,707,023 B2* | 4/2010 | Ejerhed | 704/1 |
| 7,707,160 B2 | 4/2010 | Tunstall-Pedoe | |
| 7,734,623 B2* | 6/2010 | Witbrock et al. | 707/723 |
| 7,739,104 B2* | 6/2010 | Berkan et al. | 704/9 |
| 7,752,154 B2* | 7/2010 | Friedlander et al. | 706/47 |
| 7,844,562 B2* | 11/2010 | Gong et al. | 706/47 |
| 7,962,326 B2* | 6/2011 | Tsourikov et al. | 704/9 |
| 7,974,714 B2 | 7/2011 | Hoffberg | |
| 8,024,177 B2* | 9/2011 | Lenat et al. | 704/9 |
| 8,126,890 B2* | 2/2012 | Bobick et al. | 707/736 |
| 8,219,599 B2 | 7/2012 | Tunstall-Pedoe | |
| 8,468,122 B2 | 6/2013 | Tunstall-Pedoe | |
| 8,666,928 B2 | 3/2014 | Tunstall-Pedoe | |
| 2001/0047290 A1 | 11/2001 | Petras et al. | |
| 2001/0053968 A1 | 12/2001 | Galitsky et al. | |
| 2002/0010714 A1 | 1/2002 | Hetherington | |
| 2002/0059069 A1 | 5/2002 | Hsu et al. | |
| 2002/0059157 A1 | 5/2002 | Spooner et al. | |
| 2002/0107844 A1 | 8/2002 | Cha et al. | |
| 2002/0116176 A1 | 8/2002 | Tsourikov et al. | |
| 2002/0147631 A1 | 10/2002 | Smith et al. | |
| 2002/0156763 A1 | 10/2002 | Marchisio et al. | |
| 2002/0198697 A1 | 12/2002 | Datig | |
| 2003/0014421 A1 | 1/2003 | Jung | |
| 2003/0126136 A1* | 7/2003 | Omoigui | 707/10 |
| 2003/0130976 A1 | 7/2003 | Au | |
| 2003/0172075 A1 | 9/2003 | Reisman | |
| 2004/0030556 A1 | 2/2004 | Bennett | |
| 2004/0064456 A1 | 4/2004 | Fong et al. | |
| 2004/0088158 A1 | 5/2004 | Sheu et al. | |
| 2004/0107088 A1 | 6/2004 | Budzinski | |
| 2004/0117395 A1 | 6/2004 | Gong et al. | |
| 2004/0122656 A1 | 6/2004 | Abir | |
| 2004/0122661 A1* | 6/2004 | Hawkinson et al. | 704/10 |
| 2004/0162852 A1 | 8/2004 | Qu et al. | |
| 2004/0167875 A1 | 8/2004 | Sneiders | |
| 2004/0167909 A1 | 8/2004 | Wakefield et al. | |
| 2004/0172237 A1 | 9/2004 | Saldanha et al. | |
| 2004/0205065 A1 | 10/2004 | Petras et al. | |
| 2004/0220969 A1 | 11/2004 | Cho | |
| 2004/0249635 A1 | 12/2004 | Bennett | |
| 2004/0260604 A1 | 12/2004 | Bedingfield | |
| 2005/0021517 A1 | 1/2005 | Marchisio et al. | |
| 2005/0027512 A1 | 2/2005 | Waise | |
| 2005/0041692 A1 | 2/2005 | Kallstenius | |
| 2005/0043940 A1 | 2/2005 | Elder | |
| 2005/0065777 A1 | 3/2005 | Dolan et al. | |
| 2005/0076037 A1 | 4/2005 | Shen | |
| 2005/0108256 A1 | 5/2005 | Wakefield | |
| 2005/0114282 A1 | 5/2005 | Todhunter | |
| 2005/0144000 A1 | 6/2005 | Yamasaki et al. | |
| 2005/0149558 A1* | 7/2005 | Zhuk | 707/104.1 |
| 2005/0171746 A1 | 8/2005 | Thalhammer-Reyero | |
| 2005/0240546 A1* | 10/2005 | Barry | 706/47 |
| 2005/0256888 A1 | 11/2005 | McConnell | |
| 2005/0273771 A1 | 12/2005 | Chang et al. | |
| 2005/0278309 A1 | 12/2005 | Evans et al. | |
| 2005/0289124 A1 | 12/2005 | Kaiser et al. | |
| 2006/0004742 A1 | 1/2006 | Datla et al. | |
| 2006/0053000 A1* | 3/2006 | Moldovan et al. | 704/9 |
| 2006/0112029 A1 | 5/2006 | Estes | |
| 2006/0136375 A1 | 6/2006 | Cox et al. | |
| 2006/0161544 A1* | 7/2006 | Lee et al. | 707/6 |
| 2006/0167931 A1* | 7/2006 | Bobick et al. | 707/102 |
| 2006/0184491 A1* | 8/2006 | Gupta et al. | 706/47 |
| 2006/0217818 A1* | 9/2006 | Fujiwara | 700/16 |
| 2006/0224569 A1* | 10/2006 | DeSanto et al. | 707/3 |
| 2006/0253431 A1* | 11/2006 | Bobick et al. | 707/3 |
| 2007/0005566 A1* | 1/2007 | Bobick et al. | 707/2 |
| 2007/0011125 A1* | 1/2007 | Angele | 706/46 |
| 2007/0033221 A1 | 2/2007 | Copperman et al. | |
| 2007/0043708 A1 | 2/2007 | Tunstall-Pedoe | |
| 2007/0055656 A1 | 3/2007 | Tunstall-Pedoe | |
| 2007/0067293 A1* | 3/2007 | Yu | 707/7 |
| 2007/0299799 A1* | 12/2007 | Meehan et al. | 706/46 |
| 2008/0109212 A1* | 5/2008 | Witbrock et al. | 704/9 |
| 2008/0140387 A1* | 6/2008 | Linker | 704/9 |
| 2008/0221983 A1 | 9/2008 | Ausiannik et al. | |
| 2008/0250347 A1 | 10/2008 | Gray et al. | |
| 2008/0270378 A1 | 10/2008 | Setlur et al. | |
| 2008/0301095 A1* | 12/2008 | Zhu et al. | 707/3 |
| 2008/0301120 A1* | 12/2008 | Zhu et al. | 707/5 |
| 2009/0012865 A1 | 1/2009 | Celik | |
| 2009/0070284 A1 | 3/2009 | Tunstall-Pedoe | |
| 2009/0070322 A1 | 3/2009 | Salvetti et al. | |
| 2009/0192968 A1* | 7/2009 | Tunstall-Pedoe | 706/47 |
| 2010/0205167 A1 | 8/2010 | Tunstall-Pedoe | |
| 2010/0332338 A1 | 12/2010 | Burnett | |
| 2011/0173094 A1 | 7/2011 | Krueger | |
| 2011/0307435 A1 | 12/2011 | Overell | |
| 2012/0036145 A1 | 2/2012 | Tunstall-Pedoe | |
| 2013/0041921 A1 | 2/2013 | Cooper et al. | |
| 2013/0253913 A1 | 9/2013 | Tunstall-Pedoe | |
| 2013/0254182 A1 | 9/2013 | Tunstall-Pedoe | |
| 2013/0254221 A1 | 9/2013 | Tunstall-Pedoe | |
| 2013/0262125 A1 | 10/2013 | Tunstall-Pedoe | |
| 2013/0275121 A1 | 10/2013 | Tunstall-Pedoe | |

FOREIGN PATENT DOCUMENTS

| | | |
|---|---|---|
| WO | WO 00/57302 | 9/2000 |
| WO | WO 2005/073908 | 8/2005 |
| WO | WO2007/083079 | 7/2007 |
| WO | WO2007/101973 | 9/2007 |
| WO | WO 2009/065029 A1 | 5/2009 |
| WO | WO 2010/092375 | 8/2010 |

OTHER PUBLICATIONS

Office Action dated Jun. 10, 2009 from U.S. Appl. No. 11/318,316.
Notice of Allowance dated Nov. 4, 2009 from U.S. Appl. No. 11/318,316.
Office Action dated Dec. 23, 2010, U.S. Appl. No. 12/269,707.
Final Office Action dated Jul. 13, 2011, U.S. Appl. No. 12/269,707.
Office Action dated Oct. 21, 2011, U.S. Appl. No. 12/269,707.
U.S. Appl. No. 13/106,562, May 2011, Overell.
U.S. Appl. No. 13/275,155, filed Oct. 2011, Tunstall-Pedoe.
Office Action dated Jun. 10, 2009 from U.S. Appl. No. 11/459,202.
Final Office Action dated Dec. 31, 2009, U.S. Appl. No. 11/459,202.
International Search Report and Written Opinion dated May 4, 2010, PCT Application No. PCT/GB2010/050198.
Ahn, Chapter 6: Verbosity:, Human Computation: Ph.D. Thesis Manuscript: Carnegie Mellon University (online), Dec. 7, 2005, pp. 61-68, Retrieved from the Internet: URL:http://reports-archive.adm.cs.cmu.edu/anon/2005/CMU-CS-05-193.pdf>m.
Anonymous: "Question Answering", Wikipedia, the Free Encyclopedia, Feb. 20, 2006, Retrieved from the Internet: URL:http://en.

(56) References Cited

OTHER PUBLICATIONS wikipedia.org/w/index.php?title=Question_answering&Oldid=40350205>.
Anonymous: "Commonsense knowledge bases", Wikipedia, The Free Encyclopedia, Jan. 12, 2006, Retrieved from the Internet: URL:http://en.wikipedia.org/w/index.php?title=Commonsense_knowledge_bases&oldid=34905257>.
J. Curtis, et al. "On the Effective Use of Cyc in a Question Answering System", Proceedings of the Workshop on Knowledge and Reasoning for Answering Questions, (KRAQ'05): Jul. 30-Aug. 5, 2005, pp. 61-70, Retrieved from Internet: URL:http://www.irit.fr/recherches/ILPL/kraq05V1.pdf.
Liu et al., "Goose: A Goal-Oriented Search Engine with Commonsense" Proceedings of the 2nd International Conference on Adaptive Hypermedia and Adaptive Web-Based Systems (AH'02); In Lecture Notes in Computer Science, vol. 2347, May 29, 2002, pp. 253-263, Retrieved from the Internet: URL:http://dx.doi.org/10.1007/3-540-47952-X_27.
H. Lieberman, et al. "Beating Commensense Into Interactive Applications", AI Magazine, vol. 25, No. 4, 2004, pp. 63-76, Retrieved from Internet: URL:https://www.aaai.org/ojs/index.php/aimagazine/article/viewFile/1785/1683.
KBMS-Prototype KRISYS, User Manual Overview "KBMS-Prototype KRISYS User Manual", Dec. 1, 1992, pp. 1-94.
P. Singh, et al. "Teaching machines about everday life" BT Technology, vol. 22, No. 4, Oct. 2004, pp. 227-240, Retrieved from Internet: URL:http://dx.doi.org/10.1023/B:BTTJ.0000047601.53388.74.
P. Singh, et al. "The Public Acquisition of Commonsense Knowledge", Report on the AAAI 2002 Spring Symposium on Acquiring (And Using) Linguistic (And World) Knowledge for Information Access, Mar. 2002, retrieved from Internet: URL:http://web.media.mit.edu/{push/AAAI200 2-Spring.pdf.
P. Singh, et al., "Open Mind Common Sense: Knowledge Acquisition from the General Publiction", Proceedings of the Confederated International Conferences on the Move to Meaningful Internet Systems (Coopis, DOA & ODBASE 2002); in Lecture Notes in Computer Science, vol. 2519, Oct. 28-Nov. 1, 2002, pp. 1223-1237, Retrieved from Internet: URL:http://dx.doi.org/10.1007/3-540-36124.
M. Witbrock, et al., "Knowledge Begets Knowledge: Steps Towards Assisted Acquisition in Cyc", On Knowledge Collection from Volunteer Contributors, Mar. 21-23, 2005, Retrieved from Internet: URL:http://www.cyc.com/doc/white_papers/AA.
M. Witbrock, et al., "An Interactive Dialogue System for Knowledge in Cyc", Proceedings of the Workshop on Mixed-Initiative Intelligent Systems (MIIS'03); 18th International Joint Conference on Artificial Intelligence, Aug. 9-15, 2003, Retrieved from Internet: URL:http://lalab.gmu.edu/miis/papers/witbrock.pdf.
Office Action dated Jun. 8, 2004 from U.S. Appl. No. 09/990,188.
Final Office Action dated Jan. 5, 2005 from U.S. Appl. No. 09/990,188.
Notice of Allowance dated May 20, 2005 from U.S. Appl. No. 09/990,188.
Notice of Allowance dated Sep. 29, 2005 from U.S. Appl. No. 09/990,188.
Office Action dated Sep. 23, 2008 from U.S. Appl. No. 11/318,316.
Cycorp, Features of CycL, Sep. 27, 2001, http://www.cyc.com/cycl.html, pp. 1-59.
American National Standard, Knowledge Interchange Format, Apr. 10, 2001, http://www.logic.standord.edu/kif/dpans.html, pp. 1-31.
Douglas B. Lenat, "CYC: A Large-Scale Investment in Knowledge Infrastructure", Communications of the ACM, Nov. 1995, vol. 38, No. 11, pp. 33-38.
George A. Miller, "WordNet: A Lexical Database for English", Communications of the ACM, Nov. 1995, vol. 38, No. 11, pp. 39-41.
Toshio Yokoi, "The EDR Electronic Dictionary", Communications of the ACM, Nov. 1995, vol. 38, No. 11, pp. 42-44.
Lenat et al., "CYC, WordNet, and EDR: Critiques and Responses", Communications of the ACM, Nov. 1995, vol. 38, No. 11, pp. 45-48.
Miller et al., "Introduction to WordNet: An On-line Lexical Database", Revised Aug. 1993, pp. 1-9.
Miller, "Nouns in WordNet: A Lexical Inheritance System", Revised Aug. 1993, pp. 10-25.
Fellbaum et al., "Adjectives in WordNet", Revised Aug. 1993, pp. 26-39.
Fellbaum et al., "English Verbs as a Semantic Net", no date, pp. 40-61.
Beckwith et al, "Design and Implementation of the WordNet Lexical Database and Searching Software", no date, pp. 62-82.
Berners-Lee, "Semantic Web Road Map", http://www.w3.org/DesignIssues/Semantic.html, Sep. 1998, pp. 1-9.
Berners-Lee, "What the Semantic Web can represent", http://www.w3.org/DesignIssues/RDFnot.html, Sep. 1998, pp. 1-6.
Resource Description Framework (RDF) Model and Syntax Specification, http://www.w3.org/TP/PR-rdf-syntax/, Jan. 5, 1999, pp. 1-40.
Brachman et al. "Living with CLASSIC: When and How to Use a KL-ONE-Like Language", Principles of Semantic Networks: Explorations in the Representation of Knowledge, 1991, pp. 401-456.
Liu et al., "ConceptNet—a practical commonsense reasoning toolkit," BT Technology Journal, vol. 22, No. 4, Oct. 2004, pp. 211-226.
Liu et al., "Commonsense Reasoning in and over Natural Language," Media Laboratory, Massachusetts Institute of Technology, no date, pp. 1-14.
Stork, D., "An architecture supporting the collection and monitoring of data openly contributed over the World Wide Web," Workshop on Enabling Technologies: Infrastructure for Collaborative Enterprises, MIT, Jun. 2001, pp. 1-6.
"Mindpixel," Wikipedia, the free encyclopedia, Jul. 15, 2006.
Stork, D., Open data collection for training intelligent software in the Open Mind Initiative, Proceedings of the Engineering Intelligent Systems Symposium (EIS2000), Paisley Scotland, Jun. 2000, pp. 1-7.
Hearst, M., "Building intelligent systems one e-citizen at a time," Trends & Controversies, IEEE Intelligent Systems, May/Jun. 1999, pp. 16-20.
International Search Report and Written Opinion dated Sep. 18, 2006 for related PCT Application Serial No. PCT/GB2006/050014.
Li et al., "NaLIX: an Interactive Natural Language Interface for Querying XML", *SIGMOD* 2005, Jun. 14-16, 2005, XP002397059, 3 pages.
Baxter et al., "Interactive Natural Language Explanations of Cyc Inferences", AAAI 2005: International Symposium on Explanation-Aware Computing, Nov. 30, 2005, XP002397060, 11 pages.
Israel Office Action dated May 22, 2012, Israel Patent Application No. 193913.
US Final Office Action mailed Jun. 28, 2012, issued in U.S. Appl. No. 12/269,707.
Aslandogan, Y.A., et al. "Techniques and Systems for Image and Video Retrieval," *IEEE Transactions on Knowledge and Data Engineering*, 11:1, 1999, pp. 56-63 (8 Pages).
Clark, Peter, et al. "A Knowledge-Based Approach to Question-Answering," *AAAI '99 Fall Symposium on Question-Answring Systems*, Mar. 1999 (16 Pages).
Cox, R.V., et al. "On the Applications of Multimedia Processing to Communications," *Proceedings of the IEEE*, 86:5, pp. 755-825 (70 Pages).
Cuppens, F., et al. "Cooperative Answering: A Methodology to Provide Intelligent Access to Databases," *Onera-Cert* (21 Pages).
De Roeck, a., et al. "YPA-An Intelligent Directory Enquiry Assistant," *Technology Journal* 16:3, pp. 144-155 (11 Pages).
Fensel, Dieter, et al. "On2Broker: Semantic-Based Access to Information Sources at the WWW," *Webnet 99 World Conference on the WWW and Internet Proceedings* (6 Pages).
Heflin, Jeff, et al. "Reading Between the Lines: Using SHOE to Discover Implicit Knowledge from the Web, " *AI and Information Integration*, 1998 (7 Pages).
Hendrix, G.G., et al. "Transportable Natural-Language Interfaces to Databases," *NTIS*, 1981 (8 Pages).
Krause, J., et al. "Multimodality and Object Orientation in an Intelligent Materials Information System," *Journal of Document and Text Management*, 2:1, pp. 48-66, 1994 (20 Pages).

(56) References Cited

OTHER PUBLICATIONS

Liu, Mengchi. "Design and Implementation of ROL Deductive Object-Orientated Database System," *Intelligent Information Systems*, 15:2, 2000, pp. 121-146 (26 Pages).
MacKinnon, LM., et al. "A Model for Query Decomposition and Answer Construction in Heterogeneous Distributed Database Systems," *Journal of Intelligent Informaiton Systems: Integrating Artificial Intelligence and Database Technologies*, 11:1, 1998, pp. 69-87 (19 Pages).
Marin, Philippe et al. "Knowledge Retrieval and the World Wide Web," *IEEE Intelligent Systems*, 2000 (8 Page).
Miikkulainen, R. "DISCERN: A Distributed Artificial Neural Network Model of Script Processing Memory," *Neural Networks Research Group*, 1990 (2 Pages).
Office Action dated Nov. 23, 2011, U.S. Appl. No. 13/275,155.
Final Office Action dated Feb. 16, 2012, U.S. Appl. No. 13/275,155.
Notice of Allowance dated Apr. 6, 2012, U.S. Appl. No. 13/275,155.
Office Action dated Mar. 19, 2012, U.S. Appl. No. 11/459,202.
Office Action dated Mar. 5, 2012, U.S. Appl. No. 12/702,153.
International Preliminary Report on Patentability dated Jul. 31, 2008, PCT/GB2006/050014.
Israel Office Action, IL Patent Application No. 192833, National phase of PCT/GB2006/050014, dated Jan. 18, 2012.
EP Examination Report, EP Application No. 06 765 371.7-1225, dated Nov. 12, 2009.
Sun, G. "XML-based Agent Scripts and Inference Mechanisms", Thesis, University of North Texas, Aug. 2003, 55 pages.
Trehub, A. "The Cognitive Brain—Chapter 6: Building a Semantic Network", MIT Press, 1991, pp. 99-115.
Wallace, R. S., "The Elements of AIML Style", Alice A.I. Foundation, Inc. Mar. 28, 2003, 86 pages.
U.S. Appl. No. 13/89,144, filed May 16, 2013, Tunstall-Pedoe.
U.S. Appl. No. 13/896,857, filed May 17, 2013, Tunstall-Pedoe.
U.S. Appl. No. 13/896,078, filed May 16, 2013, Tunstall-Pedoe.
U.S. Appl. No. 13/896,878, filed May 17, 2013, Tunstall-Pedoe.
U.S. Appl. No. 13/896,611, filed May 17, 2013, Tunstall-Pedoe.
U.S. Appl. No. 13/899,171, filed May 21, 2013, Tunstall-Pedoe et al.
U.S. Pre-Brief Appeal Conference Decision dated Jan. 4, 2013 issued in U.S. Appl. No. 12/269,707.
U.S. Allowed Claims dated Feb. 25, 2013 for U.S. Appl. No. 12/269,707.
U.S. Notice of Allowance dated Feb. 25, 2013 issued in U.S. Appl. No. 12/269,707.
U.S. Office Action dated Jul. 12, 2013 issued in U.S. Appl. No. 13/896,144.
U.S. Office Action dated Jul. 15, 2013 issued in U.S. Appl. No. 13/896,857.
U.S. Final Office Action dated Mar. 27, 2013 issued in U.S. Appl. No. 11/459,202.
U.S. Office Action dated Jul. 9, 2013 issued in U.S. Appl. No. 11/459,202.
U.S. Final Office Action dated Oct. 30, 2012 issued in U.S. Appl. No. 12/702,153.
PCT International Search Report and Written Opinion dated Dec. 23, 2008 issued in PCT Application No. PCT/GB2006/050222.
PCT International Preliminary Report on Patentability and Written Opinion dated Jun. 30, 2009 issued in PCT Application No. PCT/GB2006/050222.
Israel Office Action dated Oct. 23, 2012 issued in Israel Patent Application No. 193913.
PCT International Preliminary Report on Patentability and Written Opinion dated Aug. 25, 2011 issued in PCT/GB2010/050198.
Israel Office Action dated Sep. 23, 2012 issued in IL Patent Application No. 192833.
Maedche, A. et al. (Mar./Apr. 2001) "Ontology Learning for the Semantic Web," *IEEE Intelligent Systems*, pp. 72-79.
Matuszek, C. et al. (Jul. 1999) "Searching for Common Sense: Populating Cyc™ from the Web," *AAAI*, pp. 1430-1435.
McKinstry, Chris, "Mind as Space", Preprint for "The Turing Test Sourcebook", [Online] May 2005, XP007906221 Retrieved from the Internet: URL: http://web.Archive.org/web/20050501011659/http://www.mindpixel.com/PDF/mindasspace.pdf, 26 pp.
Pieters, W., "Case-based Techniques for Conversational Agents in Virtual Environments", Master of Science, Jun. 2002,Thesis, University of Twente, 118 pages.
Siegel, N. et al. (Nov. 2004) "The Cyc® System: Notes on Architecture," *Cycorp, Inc.*,9 pages.
U.S. Final Office Action dated Dec. 11, 2013 issued in U.S. Appl. No. 13/896,144.
U.S. Notice of Allowance dated Jan. 8, 2014 issued in U.S. Appl. No. 13/896,857.
U.S. Office Action dated Dec. 18, 2013 issued in U.S. Appl. No. 13/896,878.
U.S. Office Action dated Dec. 17, 2013 issued in U.S. Appl. No. 13/896,078.
U.S. Office Action dated Dec. 26, 2013 issued in U.S. Appl. No. 13/896,611.
U.S. Office Action dated Jan. 27, 2014 issued in U.S. Appl. No. 12/702,153.
U.S. Final Office Action dated Feb. 27, 2014 issued in U.S. Appl. No. 13/106,562.
Agichtein, E. et al., (Apr. 2001) "Learning Search Engine Specific Query Transformations for Question Answering", Proceedings of the 10th International Conference on World Wide Web, ACM, pp. 169-178. DOI:10.1145/371920.371976.
De Pietro, O. et al., (Aug. 2005) "Automatic update of AIML Knowledge Base in e-Learning environment", Proceedings of Computers and Advanced Technology in Education, pp. 29-31.
Enembreck F. et al., (2002) "Personal assistant to improve CSCW", The 7th International Conference on Computer Supported Cooperative Work in Design, IEEE, pp. 329-335. DOI:10.1109/CSCWD.2002.1047710.
Georges, M.T. (2000) "The Problem of Storing Common Sense in Artificial Intelligence", Context in CYC, Doctoral Dissertation directed by Dr. Jaime Nubiola, University of Navarra, Ecclesiastial Faculty of Philosophy, 153 pages.
Goh, O.S. et al., (2003) "Intelligent Agent Technology in E-commerce", Intelligent Data Engineering and Automated Learning (IDEAL 2003), Lecture Notes in Computer Science, 2690:10-17.
Goh, O.S. et al., (Aug. 27-29, 2005) "Automated Knowledge Extraction from Internet for a Crisis Communication Portal", Fuzzy Systems and Knowledge Discovery (FSKD 2005), Lecture Notes in Computer Science, 3614:1226-1235.
Guha, R. et al. (2003) "Varieties of contexts", Modeling and Using Context. Lecture Notes in Computer Science, 2680:14 pages.
Jijkoun, et al., (Oct. 31-Nov. 5, 2005) "Retrieving Answers from Frequently Asked Questions Pages on the Web", Informatics Institute, University of Amsterdam, 8 pages.
Katz, B. et al., (2002) "Natural Language Annotations for the Semantic Web", On the Move to Meaningful Internet Systems 2002:CoopIS, DOA, and ODBASE. Springer Berlin Heidelberg, 1317-1331. DOI: 10.1007/3540-36124-3_83SIG.
Lenat, D. (Oct. 28, 1998) "The dimensions of context-space", CYCORP Report, CYCORP, 3721 Executive Center Drive, Suite 100, Austin, TX 78731, 1-78 pages.
Lieberman, H. et al. (1996) "Instructible agents: Software that just keeps getting better", IBM Systems Journal, 35(3.4):539-556. DOI: 10.1147/sj.353.0539.
McCarthy, J. (1993) "Notes on formalizing context", Computer Science Department, Stanford University, Stanford, CA 94305 U.S.A., 1-13 pages.
Radev, D. et al. (2000) "Ranking suspected answers to natural language questions using predictive annotation", In Proceedings of the sixth conference on Applied natural language processing, pp. 150-157. Association for Computational Linguistics. DOI: 10.3115/974147.974168.
Radev, D. et al. (2002) "Getting Answers to Natural Language Questions on the Web", Journal of the American Society for Information Science and Technology, 53(5):359-364. DOI: 10.1002/asi.10053.
Saquete, E. et al. (2004) "Splitting Complex Temporal Questions for Question Answering systems", Proceedings of the 42nd Annual Meeting on Association for Computational Linguistics. Association for Computational Linguistics, 7 pages.

(56) References Cited

OTHER PUBLICATIONS

Shah, U. et al. (Nov. 2002) "Information Retrieval on the Semantic Web", Proceedings of the eleventh international conference on Information and knowledge management. ACM, pp. 461-468. DOI: 10.1145/584792.584868.

Shawar, B.A. (2005) "FAQchat as in Information Retrieval System", Human Language Technologies as a Challenge for Computer Science and Linguistics: Proceedings of the 2nd Language and Technology Conference. Poznan•: Wydawnictwo Poznanskie: with co-operation of Fundacja Uniwersytetu im. A. Mickiewicza, 5 pages.

U.S. Notice of Allowance dated Oct. 29, 2013 issued in U.S. Appl. No. 11/459,202.

U.S. Office Action dated Aug. 9, 2013 issued in U.S. Appl. No. 13/106,562.

European Examination Report dated Sep. 16, 2013 issued in EP 06 700 771.6-1951.

"YAGO: A Core of Semantic Knowledge Unifying WordNet and Wikipedia," by Suchanek et al., published May 8-12, 2007, WWW 2007 / Track: Semantic Web, Session: Ontologies, 10 pages.

* cited by examiner 201      202

Web    How can I help?
Search  | Is Madonna single? |   | go |

No ── 204

I used the following facts to provide this answer.

- unmarried is the opposite of married   ── 206
- married is the left coincident attribute of "is married to"
- Madonna has been married to Guy Ritchie since the 22nd of ── 207
  December 2000 (endorse) (contradict)

208

(I understood your questions to mean: Determine whether not joined by marriage (monogamous) to another person is an attribute which applies to Madonna Louise Ciccone, the famous singer of popular music at the current time. explain)

Click here for a more detailed explanation of the answer ── 212

The following documents may also be relevant:

Madonna
Official Madonna site with galleries, news, music, media, and fan club. ── 210
http://www.madonna.com/ - 18k - Similar pages BBC News | ENTERTAINMENT | Madonna single "leaked" online
Madonna joins the fight against MP3 internet firm Napster after her
new single is made available for downloading months early.  ── 210
http://news.bbc.co.uk/1/hi/entertainment/774438.stm - 30k - Similar pages Unreleased Madonna single slips onto Net | CNET News.com
Unreleased Madonna single slips onto Net | The pop singer weighs in on the   ── 210
Net music piracy wars after a copy of an unreleased single finds its way onto...
http://news.com.com/2100-1023-241341.html?legacy=cnet - 37k - Similar pages

*FIG. 2*

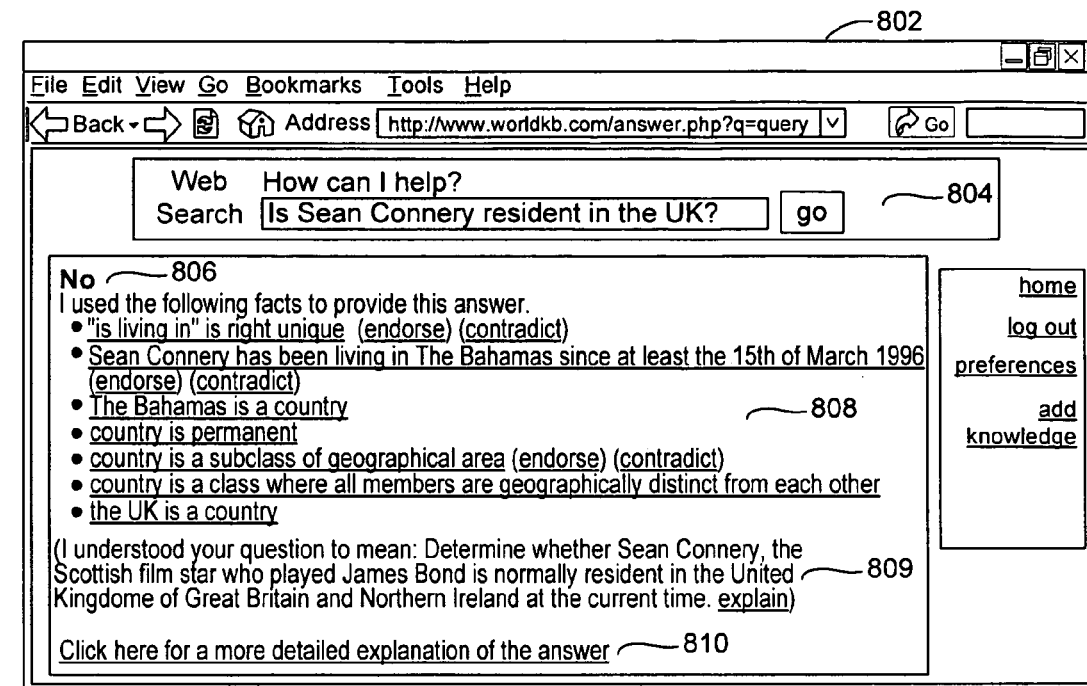
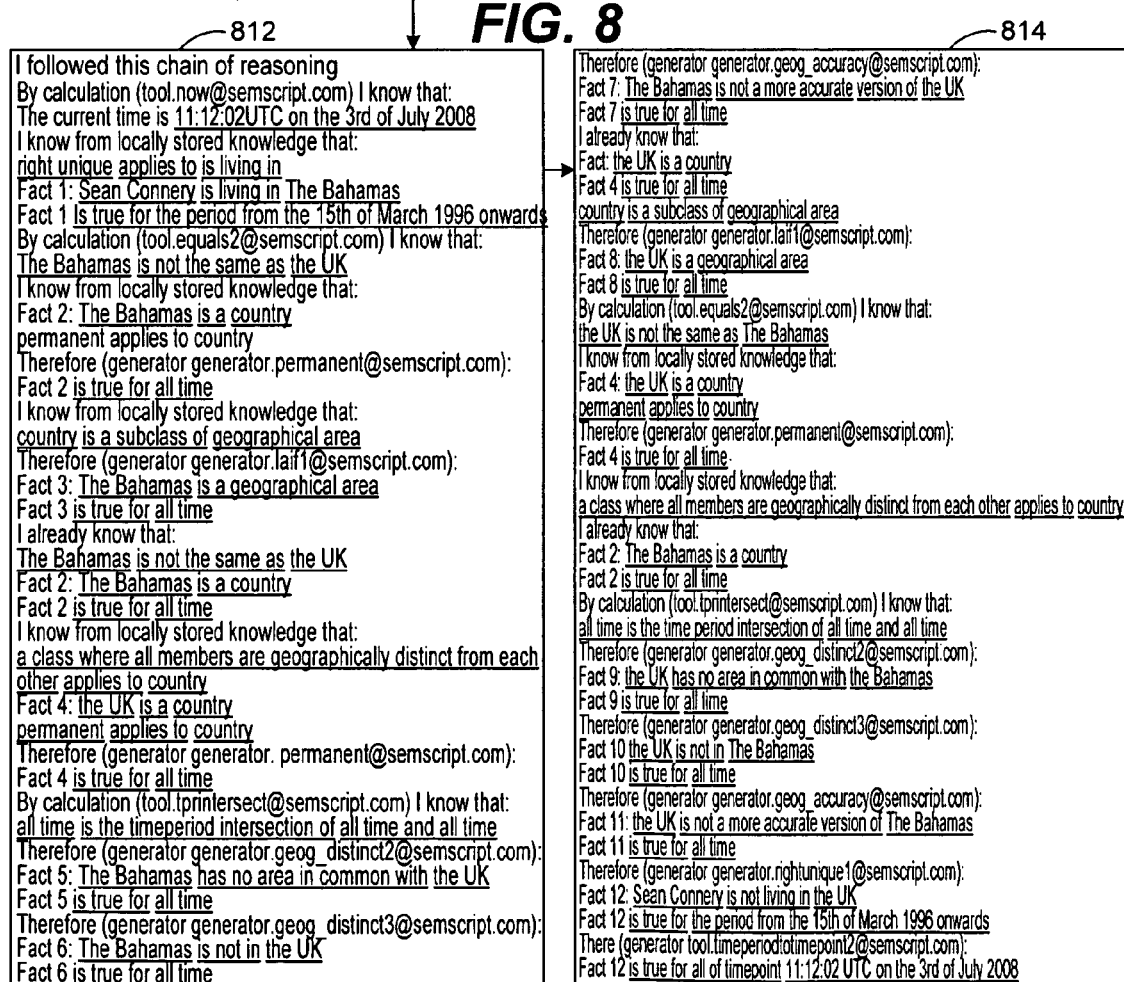
FIG. 8

*1202*

File Edit View Go Bookmarks Tools Help

Address http://www.worldkb.com/query/choosequery.php

WorldKB — answer a question (step 1)

I found the following interpretations of your question. Please select the one you meant
- Find objects to which the 1997 movie Paris has the relationship was published at timepoint
- Find objects to which the 1951 documentary short movie Paris has the relationship was published at timepoint
- Find objects to which the 1936 movie Paris has the relationship was published at timepoint
- Find objects to which the 1929 musical movie Paris has the relationship was published at timepoint
- Find objects to which the 1926 drama movie Paris has the relationship was published at timepoint
- Find objects to which the 1994 television series Paris has the relationship was published at timepoint
- Find objects to which the 1979-1980 drama television series Paris has the relationship was published at timepoint home

*1204*

File Edit View Go Bookmarks Tools Help

Address http://www.worldkb.com/answer.php?q=query

Web Search — How can I help?
When was Paris released?  [go]

Here is the answer that I found.
- the year 1936

This conclusion is based on a single fact in the knowledge base:
Paris is having the relationship "was published at timepoint" with 1936 (endorsed) (contradict)

(I understood your question to mean: The 1936 movie Paris has the relationship was published at timepoint. explain)

Click here for a more detailed explanation of the answer home
log out
preferences
add knowledge

*1206*

File Edit View Go Bookmarks Tools Help

Address http://www.worldkb.com/answer.php?q=query

Web Search — How can I help?
Is Paris the capital of France?  [go]

Yes
This conclusion is based on a single fact in the knowledge base:
Paris has always been the capital of France (endorse) (contradict)

(I understood your question to mean: Determine whether the French city of Paris the the capital city of the Republic of France at the current time.. explain)

Click here for a more detailed explanation of the answer home
log out
preferences
add knowledge

Panel 1302:
```
          How can I help?
WorldKB  [President Lincoln]   [Go]
```
[us president ▼] [default ▼] [Submit]

Abraham Lincoln
[abraham lincoln]

*Abraham Lincoln, 16th President of the USA*

Term of office:   the 4th of March 1861 to the
                  15th of April 1865 (explain)
Predecessor:      James Buchanan (explain)
Successor:        Andrew Johnson (explain)
Date of birth:    the 12th of February 1809 (explain)
Wikipedia page:   www.en.wikipedia.orp/Wiki/Abraham_lincoln
                  (explain)
Place of birth:   Hardin County, Kentucky (explain)
Marital Status:   Married to Mary Todd Lincoln (explain)

Panel 1304 / 1306:
```
          How can I help?
WorldKB  [President Lincoln]   [Go]
```
[human being ▼] [default ▼] [Submit]
  human being
  object        incoln
  physical object
  us president

[abraham lincoln]

*Abraham Lincoln, 16th President of the USA*

Date of birth:    the 12th of February 1809 (explain)
Wikipedia page:   www.en.wikipedia.orp/Wiki/
                  Abraham_lincoln (explain)
Place of birth:   Hardin County, Kentucky (explain)
Marital Status:   Married to Mary Todd Lincoln (explain)

Panel 1310:
```
          How can I help?
WorldKB  [                ]   [Go]
```
[human being ▼] [family ▼] [Submit]
                 default
Abraham Li       family
[abraham linc    worldkb user]  1308

*Abraham Lincoln, 16th President of the USA*

Parents:
  • Nancy Hanks
  • Thomas Lincoln
Children:
  • Edward Baker Lincoln
  • Robert Todd Lincoln
  • Tad Lincoln
  • William Wallace Lincoln Panel 1312:
```
          How can I help?
WorldKB  [                ]   [Go]
```
[physical object ▼] [default ▼] [Submit]

Abraham Lincoln
[abraham lincoln]

*Abraham Lincoln, 16th President of the USA*

Creation date:    the 12th of February 1809
Principal class:  person (explain)
Mask:             Unknown (specify)

How can I help?
WorldKB [ ] [Go]

[fact.1146329@semscript.com] — 1402

[software developer] [is the main occupation of] [william tunstall-pedoe]

This fact asserts that the relationship "is the main occupation of" exists between software developer and — 1403
William Tunstall-Pedoe at some point in time. The additional fact [fact.1146330@semscript.com] asserts that this fact applies for the period from 1991 onwards.

[endorse] — 1404
[contradict] — 1406

This fact was originally reported by at 2008-06-02 16:20:44.

Fact properties:
True (the system currently considers the fact to be correct)
Uninfluenced (this fact is not contradicted by other facts, nor is it rendered superfluous by other facts)

These properties were last updated at 2008-06-02 16:20:48
[Reassess this fact's properties] — 1409

This fact has had the following assessments: — 1410

| Reporter | Source | Document | Time | Notes | Endorsement |
|---|---|---|---|---|---|
| [william tunstall-pedoe] | [william tunstall-pedoe] | | 2008-06-02 16:20:44 | | Endorsed |

— 1408

How can I help?
WorldKB [ ] [Go] — 1414

[human being ▾] [default ▾] [Submit]

William Tunstall-Pedoe
[william tunstall-pedoe]
*William Tunstall-Pedoe of Cambridge UK, Semscript employee*

Facts added: 1138945
Verified facts added 1138934
Fact assessments made: 152
Fact assessments made correctly: 152
Reliability 100%

Recent fact assertions
| Time | Fact | Source | Document |
|---|---|---|---|
| 2008-06-23 16:22:34 | [fact.1148430@semscript.com] | [william tunstall-pedoe] | |
| 2008-06-23 16:22:30 | [fact.1148429@semscript.com] | [william tunstall-pedoe] | |
| 2008-06-23 13:09:55 | [fact.1147316@semscript.com] | [william tunstall-pedoe] | |
| 2008-06-23 12:57:38 | [fact.1148312@semscript.com] | [william tunstall-pedoe] | |
| 2008-06-23 12:57:35 | [fact.1148311@semscript.com] | [william tunstall-pedoe] | |
| 2008-06-23 12:50:25 | [fact.1148310@semscript.com] | [william tunstall-pedoe] | |
| 2008-06-23 12:50:25 | [fact.1148309@semscript.com] | [william tunstall-pedoe] | |
| 2008-06-23 12:50:15 | [fact.1148308@semscript.com] | [william tunstall-pedoe] | |
| 2008-06-23 12:50:10 | [fact.1148307@semscript.com] | [william tunstall-pedoe] | |
| 2008-06-23 12:48:21 | [fact.1148306@semscript.com] | [william tunstall-pedoe] | |

Recent fact assertions
| Time | Fact | Source | Document |
|---|---|---|---|
| 2008-08-26 13:14:00 | [fact.1148458@semscript.com] | [william tunstall-pedoe] | Endorsed |
| 2008-08-23 17:43:20 | [fact.1131698@semscript.com] | [william tunstall-pedoe] | Endorsed |
| 2008-08-23 12:57:35 | [fact.1148306@semscript.com] | [william tunstall-pedoe] | Endorsed |
| 2008-08-23 12:53:38 | [fact.1148305@semscript.com] | [william tunstall-pedoe] | Endorsed |
| 2008-08-23 12:51:13 | [fact.1132404@semscript.com] | [william tunstall-pedoe] | Endorsed |
| 2008-08-23 12:30:10 | [fact.11359320@semscript.com] | [william tunstall-pedoe] | Endorsed |
| 2008-08-21 23:36:19 | [fact.1134955@semscript.com] | [william tunstall-pedoe] | Endorsed |
| 2008-08-21 23:38:18 | [fact.1134954@semscript.com] | [william tunstall-pedoe] | Endorsed |
| 2008-08-21 23:34:17 | [fact.1134955@semscript.com] | [william tunstall-pedoe] | Endorsed |
| 2008-08-21 23:34:13 | [fact.1134854@semscript.com] | [william tunstall-pedoe] | Endorsed |

How can I help?
WorldKB [ ] [Go]

[human being ▾] [default ▾] [Submit]

William Tunstall-Pedoe
[william tunstall-pedoe]
*William Tunstall-Pedoe of Cambridge UK, Semscript employee*

Date of birth: the 29th of January 1969 (explain)
Place of birth: London (explain)
Place of residence: Cambridge (explain)
Marital Status: Single (explain)
Primary Occupation: software developer (explain)

FIG. 31

ENHANCED KNOWLEDGE REPOSITORY

1 RELATED APPLICATION DATA

The present application claims priority under 35 U.S.C. 119(e) to U.S. Provisional Patent Application No. 60/977,463 for ENHANCED KNOWLEDGE REPOSITORY filed on Oct. 4, 2007, the entire disclosure of which is incorporated herein by reference for all purposes.

2 BACKGROUND OF THE INVENTION

Currently almost all the real world information that is stored on the internet is stored within documents: web pages or other files containing natural language. These documents are held on millions of computers and if linked with hypertext links are done so according to the whims of the individual authors. The documents are in a large variety of different formats and written in thousands of different natural languages. This information is unstructured.

This information is also designed for human eyes. Although natural language understanding has always been a major research area in Artificial Intelligence, computers are not capable of understanding natural language to any great extent. As a consequence, a human user wanting to find something out using the internet has to first locate a document that might have the answer and then read it. To locate the document, the only practical current technique is keyword searching.

In order to find information using keyword searching the human user first hopes that a page/document exists which answers the question, hopes again that it has been indexed by a search engine and then tries to imagine what distinctive words will appear in it. If any of the words guessed are wrong or the page has not been indexed by the search engine they will not find the page. If the combination of words requested is contained on too many other pages the page may be listed but the human user will then have to manually read through hundreds or thousands of similar documents before finding the knowledge required.

In addition there is a certain arbitrariness about the words being used. Searching for general information on a person or product with a unique, distinctive name has a high probability of success, but if the search is for someone with a common name, or for information on something where the name also means something else (searching in English for the Japanese board-game "Go" is a very good example) the search will fail, or an extraordinary amount of extra human effort will be needed to locate the information. Furthermore, different ways of describing the same thing mean that several different queries often need to be made or the search may fail. For example, a search for information on "Abraham Lincoln" is likely to produce a differing list of documents to a search based on "President Lincoln" or "Abe Lincoln".

Certain other types of queries are also extremely hard to answer with keyword searching. Examples are searching for any type of information which is dynamic. An extreme example would be the local time in a specific international city. This changes every second, so no web page indexing technique is going to be able to tell you this information at the moment of the query. Another example of a dynamic query would be to ask what the market capitalization of a company is at the current time. The answer to this depends on the precise share price of the company involved. A further example would be trying to discover the current age or marital status of a celebrity. Pages containing this information, if they were ever true, are only true at the time they were written.

Search engines collect all the documents on the web and have little understanding of which contain out-of-date information. Some of these issues can be addressed with custom programming for the specific type of query at issue (e.g. adding stock quote programming to the search engine and checking for ticker symbols) but keyword indexing documents can provide no general solution.

Another problem may be that the knowledge is conceptualised in a way that is different from the way that it is described on the web page. For example, if one is trying to locate bimonthly magazines with a search engine, one is unlikely to turn up any examples where they are described as being published "every two months". Another example would be trying to find all hotels within two kilometers of a specific geographical location. It is extremely unlikely that any description of the hotel will be expressed in exactly that form so any keyword searching for this will fail. i.e. Because search engines don't generally understand the knowledge within a document, they cannot infer new knowledge from what is said.

Another problem with natural language is that keyword searching is language specific. Automatic translation between languages is essentially an unsolved problem in Artificial Intelligence and the state of the art produces very poor results. As a consequence the web is largely partitioned by the languages used to write the pages. Someone searching in (say) Hungarian only truly has access to the knowledge stored in that part of the web which is written in the same language.

Even if a document is found that appears to answer the question, the user may not know how much faith to place in the veracity of what is asserted. The facts asserted within this document may be incorrect or out of date. No general scheme exists on the web for assessing how much confidence can be placed in the veracity of any information contained in a web page. The page could contain errors and even the authorship of the document may not be clear.

An example of a prior art search-engine interaction illustrating some of these problems is shown in FIG. 1. The user has typed a very simple question about a popular musician in the search box (102) and the search engine has responded with a list of documents (104). The web contains a very strong bias towards contemporary people, especially celebrities, and there is no shortage of information on the web which would allow a perfect system to answer this question. In fact there are many thousands of web pages with information in them suitable for answering it. However, the list of documents bears very little similarity to what is being asked and the user would have to experiment further and read through a number of documents to get an answer.

The disadvantages of keyword searching are even more extreme when the user is not human but rather an automated system such as another computer. The software within a website or other automated system needs the knowledge it requires for its processing in a form it can process. In almost all cases, documents found with keyword searching are not sufficiently processable to provide what is needed. As a consequence almost all the world's computer systems have all the knowledge they need stored in a local database in a local format. For example, automated scheduling systems wanting to know whether a particular date is a national holiday access a custom written routine to provide this information, they do not simply consult the internet to find out the answer.

Knowledge in structured form is knowledge stored in a form designed to be directly processable to a computer. It is designed to be read and processed automatically. Structured form means that it is not stored as natural language. It is knowledge stored in a pre-determined format readable and processable by the computer. Knowledge in structured form will include identifiers which denote objects in the real world and examples will include assertions of information about these identified objects. An example of such an assertion would be the assertion that an identified relationship exists between two or more identified objects or that a named attribute applies to an identified object. (Individual instances of structured knowledge are referred to herein as "facts" or "assertions".)

To fully understand the potential advantages of embodiments of the present invention it is also important to understand some issues relating to the broadness or narrowness of the domain of knowledge being represented. Knowledge stored in (say) a company's employee relational database may be in structured form but is in an extremely narrow domain. The representation is entirely local and only meets the needs of the narrow computer application which accesses it. Typically data stored in a computer system is designed to be used by, and can only be fully exploited by, the software within that system. In contrast, general knowledge is knowledge falling within an extremely wide domain. General knowledge stored in structured form represents general knowledge in such a way that it combines at least some of the universal meaningfulness advantages of natural language with the machine-processing advantages of other computer data. However, there are very significant difficulties to overcome to achieve this.

General knowledge in structured form has a variety of uses by a computer, including direct answering of natural language questions, and assistance with other forms of natural language processing (such as mining data from documents). It can even assist with keyword searching. For example, with the example above, if the structural knowledge exists that the strings "Abe Lincoln" and "President Abraham Lincoln" both denote the same unique entity a search engine using such a knowledge base could return documents containing either term when only one was entered by the user.

Building a large database of general structured knowledge presents serious difficulties. There are considerable difficulties in designing a knowledge representation method that is sufficiently expressive to represent a wide range of knowledge yet also sufficiently elementary in form to allow effective automated processing (such as inference and query responses). Building a knowledge base by hand (i.e. using direct human interaction as the source of the knowledge) is slow, so to build the largest possible knowledge base in a reasonable time requires a large number of people contributing.

One way to enable people to contribute is to select, hire and train salaried staff and then pay them to add this knowledge. Training them would typically require educating them about the underlying knowledge representation syntax and teaching them about what is already in the knowledge base.

However, to open up the process to the largest number of people (such as general users of the internet) requires enabling access to at least some of the knowledge addition process to untrained users.

Enabling untrained users to add general knowledge in structured form to a knowledge base presents a number of very significant problems.

First, these users are unlikely to know anything of the underlying knowledge representation technology so if untrained users are genuinely to be used, they will ideally need to be able to assert facts in a way that is natural to them and distinct from the knowledge representation format.

Secondly, these users are untrusted and potentially malicious. For this reason it isn't desirable to simply permanently add all knowledge asserted by such users to the published knowledge base. Desirably methods are needed to distinguish between true and untrue facts and to retain true facts while removing (or never publishing) untrue facts.

Thirdly, adding knowledge should desirably not require any previous knowledge of what is already in the knowledge base. If prior familiarity with the ontology or other facts that are already in the knowledge base is required, untrained users will find it more difficult to add knowledge.

All of the above issues both with knowledge representation generally and with the knowledge addition process are directly addressed in various embodiments of the present invention.

3 SUMMARY OF THE INVENTION

Embodiments of the present invention may be considered as internet-based knowledge repositories of general knowledge, stored in structured form. Various embodiments include a static knowledge base of general knowledge stored in structured form in one or more persistent computer-accessible stores. The knowledge is represented within the static knowledge base using a structured knowledge representation method.

According to one class of embodiments, a knowledge representation system is provided which includes a data store having a knowledge base stored therein comprising first knowledge represented in a structured, machine-readable format which encodes meaning. The system also includes at least one computing device configured to generate second knowledge for inclusion in the knowledge base by inferring the second knowledge from the first knowledge. The second knowledge is stored in the knowledge base in association with related knowledge information identifying the first knowledge from which the second knowledge was inferred. The at least one computing device is further configured to dynamically generate third knowledge not represented in the knowledge base in response to queries by inferring the third knowledge from one or both of the first and second knowledge, and to respond to queries using one or more of the first knowledge, the second knowledge, or the third knowledge.

According to another class of embodiments, a knowledge representation system is provided which includes a data store having a knowledge base stored therein comprising knowledge represented in a structured, machine-readable format which encodes meaning. The system also includes at least one computing device configured to translate a natural language question to one or more queries. The natural language question is associated with a knowledge domain within the first knowledge. The at least one computing device is further configured to determine whether any of the one or more queries relate to the knowledge domain, and to respond to the query using a portion of the knowledge within the knowledge domain where at least one of the one or more queries relates to the knowledge domain.

According to yet another class of embodiments, a knowledge representation system is provided which includes a data store having a knowledge base stored therein comprising knowledge represented in a structured, machine-readable format which encodes meaning. The knowledge includes a plurality of facts each of which is represented in the machine-readable format, and a plurality of explanations each of which is identified as corresponding to one or more of the facts. The explanations include human-readable explanatory text relating to the corresponding facts. The system also includes at least one computing device configured to identify a first one of the facts corresponding to a query, identify a first one of the explanations corresponding to the first fact, and respond to the query using the explanatory text corresponding to the first explanation.

According to still another class of embodiments, a knowledge representation system is provided which includes a data store having a knowledge base stored therein comprising first knowledge represented in a structured, machine-readable format which encodes meaning. The system also includes at least one computing device configured to generate second knowledge for inclusion in the knowledge base by inferring the second knowledge from the first knowledge, and to store the second knowledge in the knowledge base. The at least one computing device is also configured to dynamically generate third knowledge not represented in the knowledge base in response to queries by inferring the third knowledge from one or both of the first and second knowledge. The at least one computing device is further configured to translate natural language questions to queries, and to respond to the queries using one or more of the first knowledge, the second knowledge, or the third knowledge.

A further understanding of the nature and advantages of embodiments of the present invention may be realized by reference to the remaining portions of the specification and the drawings.

4 BRIEF DESCRIPTION OF THE DRAWINGS

FIG. 1 gives an example of a prior art search with a search-engine. A question has been turned into a list of documents based on them containing similar words.

FIG. 2 shows an embodiment of the present invention "plugged into" the same search engine and responding to the same question using structured knowledge. A perfect answer is provided to the user and the list of documents is relegated to serving as supplementary information.

FIG. 8 shows a question answered with both a concise and a detailed explanation.

FIG. 12 shows two example questions with ambiguity being dealt with.

FIG. 13 illustrates the profile system with four different profiles being given for the same entity.

FIG. 14 illustrates the profile showing system specific data.

FIG. 31 is a continuation of FIG. 30.

5 DETAILED DESCRIPTION OF SPECIFIC EMBODIMENTS

Figure 1:
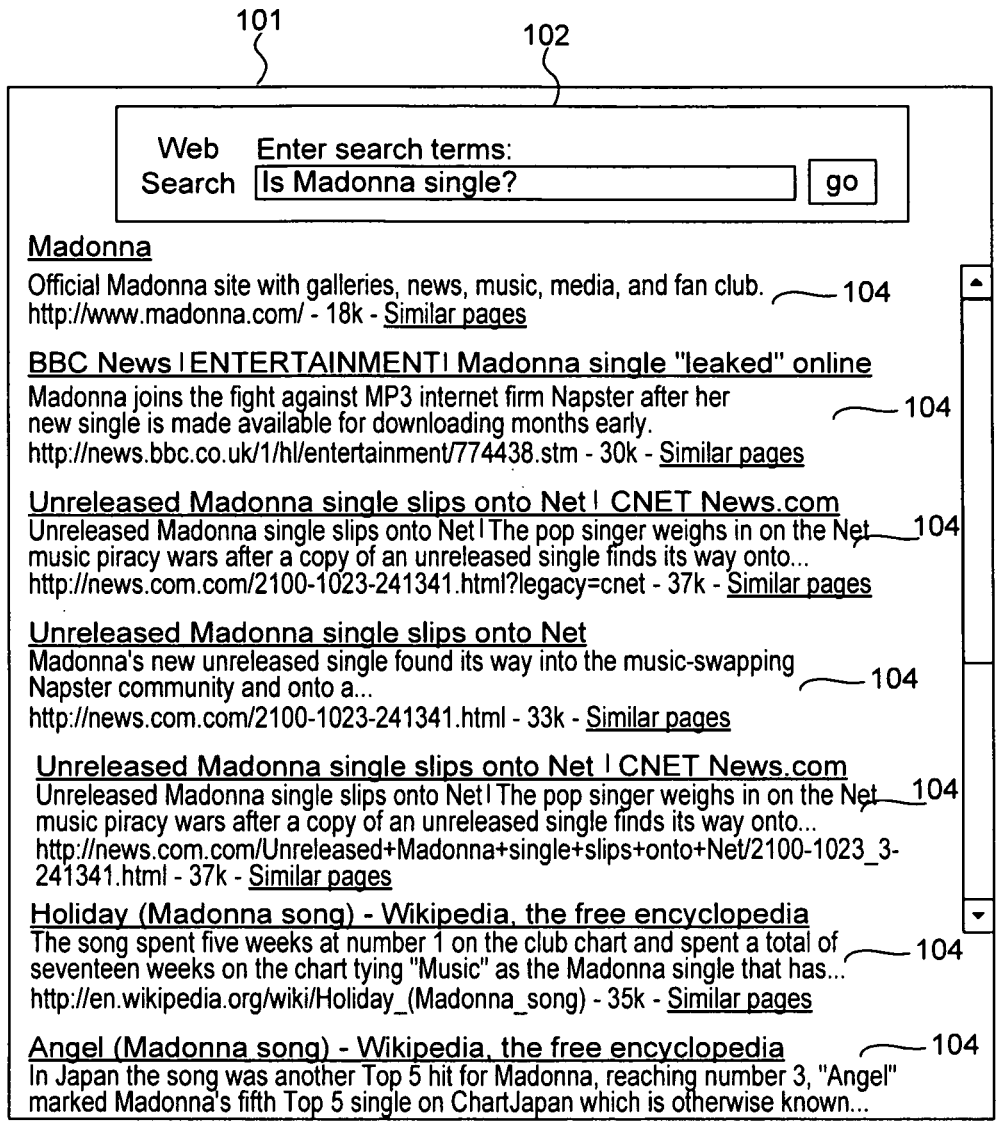

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The structured knowledge representation employed by specific embodiments of the invention uses primarily a collection of assertions of named relationships between pairs of named entities. Each assertion (also referred to herein as a "fact") is also a named entity and temporal data about when a fact is true can be asserted using similar assertions. The preferred embodiment supports "negative facts": assertions of a relationship not being true and "parametered objects" where entities are identified by a combination of a class with one or more other named entities. There is also a strong emphasis on natural language facts associating strings with each object via a relationship whose semantics corresponds to a natural language concept. These facts facilitate human interaction with an embodiment of the invention.

The structured knowledge representation described herein is advantageous in that it allows representation of knowledge of an extremely broad class. That is, it is operable to represent any entity (including binary relationship and attributes) which can be denoted in natural language, i.e., if you can give it a name you can add it to the knowledge base with a unique recognition string which gives that entity meaning to humans. The structured knowledge representation is also operable to represent the presence or absence of any relationship between two or more such entities, and whether or not a particular attribute applies to a specific entity. The structured knowledge representation is also operable to represent points in time when these relationships are valid.

By contrast, in the typical hard-coded, database-driven application, the information represented and manipulated is of an extremely narrow domain. For such applications the developer typically creates a schema of database tables to store the entities and the relationships between entities that the application needs. The developer then hard-codes a program that manipulates the data in these tables, e.g., using SQL.

The knowledge domain associated with such applications is extremely narrow because nothing that happens after the application is launched ever extends this schema beyond the scope for which it was originally designed. Users may add data to the tables, but they can never extend what can be represented or what kinds of queries can be made.

By contrast, and as will be described, knowledge representation systems enabled by the present invention can enable users to almost arbitrarily extend the scope of the knowledge being represented. In fact, the scope of knowledge represented may be extended every time a new class, attribute or relationship is added.

According to specific embodiments of the invention, queries and query answering are also supported. Queries are a machine-readable analogue to a question or knowledge request designed to elicit knowledge from the system. In the preferred embodiment, the query answering system can answer queries with a list of objects that match the query and can answer "truth queries" (the query analogue to a yes/no question) with "yes", "no" and "unknown" responses. In some cases "completeness information" (whether the list of responses contains all the possible responses) can be provided when the query requests a list of entities.

As there are far more facts than can be stored statically, the preferred embodiment also supports knowledge generation. Knowledge generation enables facts to be generated by the system which are not present in the static knowledge base. This can be achieved by inference from the facts in the static knowledge base. The knowledge generation system can also generate facts sourced from a third-party database or dynamic source such as (for example) financial information.

Knowledge generation is implemented in the preferred embodiment via a collection of "generators" which comprise a pattern of the facts which they can generate in combination with one or more mechanisms to generate facts which match this pattern. Some generators achieve this by providing a query linked to the pattern which if answered provides values for unknowns in the pattern thus enabling the generation of the facts ("dumb generators"). Other generators use some executable code possibly in combination with a query to generate facts matching the pattern ("smart generators"). Smart generators can be used to generate facts sourced from an external source or database by accessing this external source and converting the knowledge so retrieved into facts matching its pattern. Smart generators can also be used to do inference where at least one calculation step is needed to generate the new facts.

Some embodiments additionally support a form of knowledge generation that takes place prior to a query being executed and results in additional facts being stored in the knowledge base.

Various embodiments also support the creation of detailed natural language explanations of how a query was answered. The preferred embodiment additionally supports a summarised concise explanation showing only the facts in the static knowledge base (or an essential subset thereof) that were used to respond to the query.

The preferred embodiment also supports question translation. This is the capability to translate natural language questions or knowledge requests provided by a user into a query. In combination with the query answering system this enables internet users to type a natural language question directly into the system and obtain an answer directly. Various embodiments also support ambiguity resolution by elimination of improbable interpretations of the question.

Various embodiments also support the retranslation of a query back into unambiguous natural language. In combination with the question translation system, this enables the user to have confidence that their question has been correctly understood. If the question translation system determines that the user's question is ambiguous it also enables it to present the list of interpretations of their question for selection of the user's intended query.

In addition to use by human users, various embodiments also support use by remote automated systems. In the preferred embodiment a number of services are provided including responding to queries. As the queries and response are in structured form, this service can be of genuine use by a remote non-human user in a way that a traditional document-returning search-engine cannot.

Knowledge addition in the preferred embodiment is achieved by a number of "processes" which interact with general internet users via a sequence of web pages containing prompts, text input boxes and buttons. These processes receive, check and refine the answers provided by users and include confirmation pages. Processes can also call other processes as sub-processes (which can in turn call additional processes etc.) creating intervening additional sequences of pages within the parent process. For example, when a user adds a new entity to the knowledge base and asserts that this entity belong to a class which is also not in the knowledge base, the process for adding the class can be immediately implemented returning the user to the initial process (with the class so added) when it is finished. The calling parent process receives the class name exactly as if it was an existing class which had been selected by the user.

In the preferred embodiment the knowledge addition system comprises processes for adding new classes, new relations and new entities of other types.

Users can also assert new facts which in the preferred embodiment are assertions of a named relationship between two entities and any associated temporal information.

The preferred embodiment also has support for natural language translation of facts asserted by users whereby a natural language sentence can be translated into a combination of one or more facts using a method similar to the translation of questions and, after confirmation, this knowledge added to the static knowledge base. Prompting for the two objects and the named relationship individually is used as a fall-back if the entire assertion cannot be understood.

Various embodiments also support "user assessment" where users can endorse or contradict facts in the static knowledge base and these assessments are used to remove or hide untrue facts. In the preferred embodiment links to endorse or contradict a fact are provided next to facts in the static knowledge base displayed to the user. For example, this occurs when presenting the summary explanation generated in response to a question or knowledge request provided by a user. When a great deal of confidence has been gained in the veracity of a fact the preferred embodiment ceases to accept user assessment on it.

In the preferred embodiment users can authenticate themselves with the id of class [human being] that corresponds to their real identity. The preferred embodiment additionally contains mechanisms for users to establish that they have not appropriated the identity of someone other than themselves. In the preferred embodiment, knowledge addition and user assessment are associated with the user's true identity as the reporter, thereby giving a clear record of the provenance of the knowledge.

Various embodiments also contain a "system assessment" component operable to assess the veracity of facts based at least on their semantic interaction with other facts in the knowledge base. In the preferred embodiment facts can be labelled as "contradicted" (in semantic conflict with other facts in the static knowledge base) and "superfluous" (believed true but which can already be generated by the system). System assessment is done on all newly added facts to the static knowledge base and the user who has added a fact that is contradicted by other facts in the static knowledge base is given an opportunity to use user assessment to draw attention to and potentially change the status of any of those facts which they believe to be untrue. In the preferred embodiment, system assessment can be used to resuscitate facts previously thought to be untrue when for example, one or all of the facts in conflict with the newly added fact is later reassessed (via user assessment or otherwise) as untrue. Other embodiments may use system assessment to prevent untrue facts from being added to the system at all.

Various embodiments also support additional mechanisms for preventing the addition of untrue facts by mistaken or abusive users including the ability to block certain patterns of facts from being added and ranking of users based on their track record of adding highly quality knowledge. More trust is associated with the users of higher rank, more weight given to the facts they assert and more weight to their user assessments resulting in a higher probability of publication.

Various embodiments also support the generation of "profiles" giving general information about a particular entity based on its class and the knowledge about that entity in the system. This is implemented in the preferred embodiment via a collection of profile templates which define the contents of an information screen and what queries need to be run to populate it. The preferred embodiment supports one or more different profiles being supported for a particular class giving a different emphasis to the object being profiled. It is also possible to navigate through the classes that an object is a member of, giving a profile tailored to that class for the same entity. In the preferred embodiment, where information is missing on a profile, links can be provided enabling a user to add the missing knowledge with only the missing knowledge being prompted for.

As the underlying representation of knowledge is in a form separate from natural language, various embodiments support user interactions with the system via multiple natural languages and with the users using different natural languages sharing access to at least some of the structured knowledge.

Various embodiments additionally support the representation of named vertical areas to which facts and queries can be classified. These embodiments enable more effective understanding of the user's intent in certain circumstances and also allows the creation of vertical websites which are focussed on a particular area of knowledge. In certain embodiments users can automatically create their own vertical version of a question answering website.

Various embodiments also comprise a search-engine component operable to produce a list of documents (e.g. web pages) ordered by relevance to a query entered by a user. This component can be used to produce results in addition to the normal response to a user's question or as a fall-back when the question has not been successfully translated or the system cannot respond to the query.

In a related embodiment the present invention is implemented as a "plug-in" to a pre-existing search engine. The search-engine query entered by the user is processed by both the search-engine to produce a list of documents and by this embodiment to possibly produce a result originating from the structured-knowledge source. A successful response from the plug-in is presented above the search-engine results. If unsuccessful, the standard search-engine output is presented to the user and the user is no worse off than they would have been without the plug-in.

A user interaction with this plug-in embodiment is illustrated in FIG. 2. The user question or knowledge request (202) has been passed both through the search-engine search to produce a list of documents and additionally through an embodiment of this invention. The question translation component has received the user question and produced a query. The query answering system has then processed this query using knowledge generation and references to structured knowledge facts in the static knowledge base, producing an answer which is translated back into natural language for presentation to the user (204). The query answering system has also produced a concise explanation for the answer by presenting the facts in the static knowledge base which were used to answer this query (206). (The needed generated facts are not shown.) One of the facts used to answer the question can be confirmed or contradicted by the user (207) via the user assessment system. A detailed explanation including the generated facts and the steps taken to generate them was also produced, accessible to the user via a link (212). This embodiment has also retranslated the query back into unambiguous natural language to demonstrate that the user's question has been understood (208). The prior art list of web pages is still produced but has now been relegated to supplementary information (210).

The following sections describe in detail how embodiments of the present invention work. It should be noted that many of the choices made in describing the preferred embodiment are fairly arbitrary, including, for example, the choice of ontology, the syntax, and the names given to the classes and objects used as examples. A variety of different choices will be obvious from the principles described herein.

Moreover, much of the description of the processing of the English language is adaptable to other specific languages and thus the description should not be taken as limiting the choice of natural language to English. Indeed, as the underlying knowledge is represented in a form separate from natural language, supporting multiple natural languages on the same system is a desirable feature of various embodiments. (See section 5.6.5 for more on this.)

Another rich source of additional embodiments is the precise way that the various processes and components have been subdivided. The subdivision of a complex system is sound engineering practice and enables reuse of the components and clearer thinking about the high level method. However, different ways of dividing what is described will be obvious.

As the internet is where the primary commercial opportunities for the present invention are currently believed to lie, all the examples contained herein assume an internet-based embodiment. However, what is described is readily adaptable to operate on other computer networks and example internet-based embodiments should not be read as precluding other forms of network. For example, an embodiment based on a mobile phone network where the client machines are user handsets should be readily apparent to anyone reading this description.

Similarly, all the examples contained herein show a web-based interaction with users. Again, what is described is readily adaptable to other forms of user-interface/user interaction. For example, the interaction with users could be implemented using a largely text-based exchange of commands and responses.

Many further choices for implementing much of the technology are available, and many different embodiments will be obvious to anyone of ordinary skill in the art who has read what follows. Any specifics described should not be interpreted as limiting the generality of what is claimed.

5.1 Components

Figure 3:
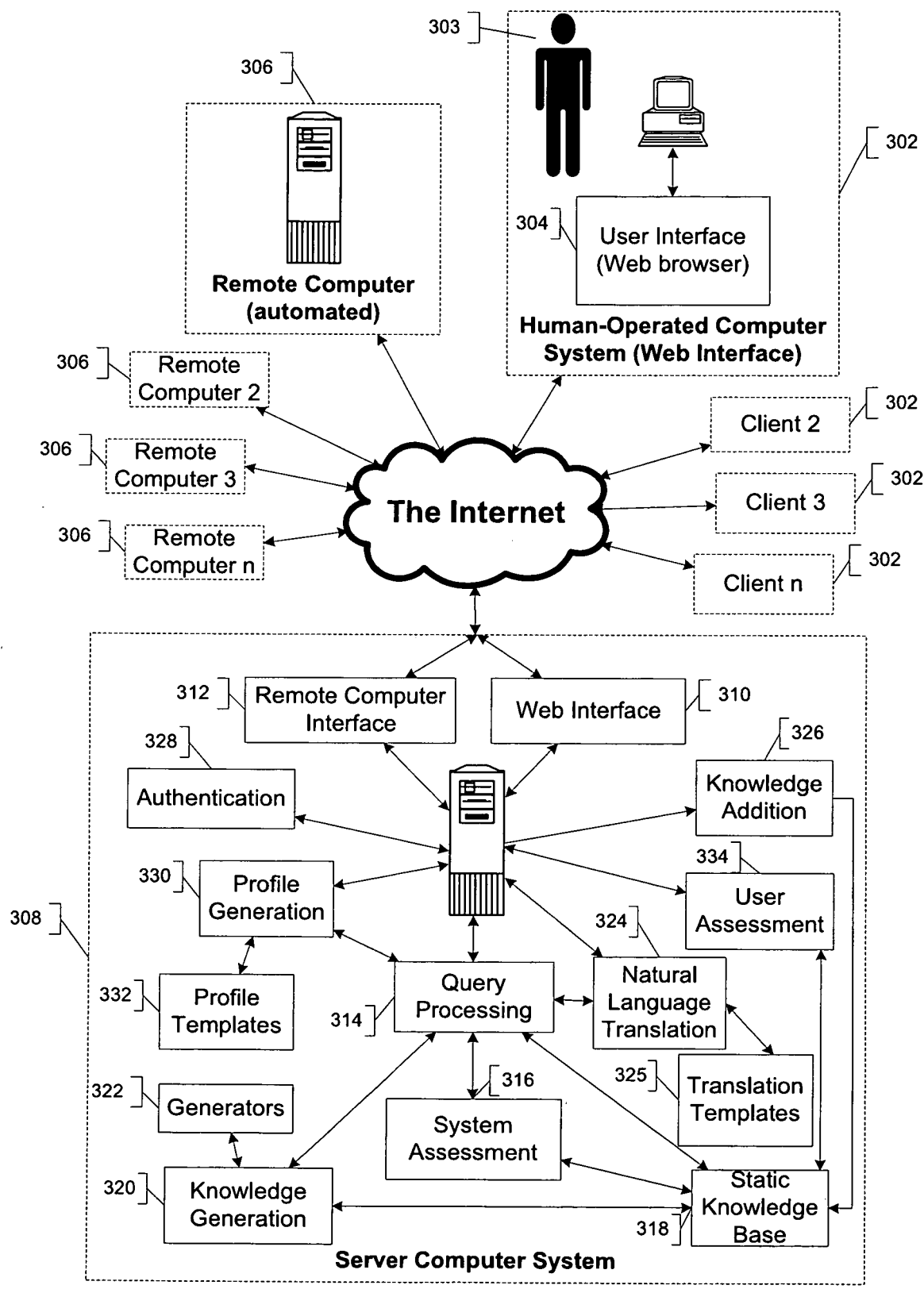
FIG. 3 illustrates components in the preferred embodiment of the invention.

FIG. 3 shows some of the components in the preferred embodiment. (Many of these components are optional and simply add to the overall functionality/utility of the system. They may not be present in other embodiments.)

One or more client computers (302) with a human user (303) can access the system via a web-interface (310) on at least one server (308).

Additionally, one or more remote computers making automated queries (306) can access the system via a remote computer interface (312). The remote computer interface is described in section 5.17.

The underlying knowledge is stored in one or more static knowledge bases (318). The static knowledge base is described in section 5.2 and the preferred embodiment knowledge representation method used to represent the knowledge stored in the static knowledge is described in section 5.3

Knowledge can be added to the static knowledge base by users using the knowledge addition subsystem (326). This component and its subcomponents are described in section 5.10.

Users are also able to correct and endorse added knowledge via the user assessment component (334). This is described in section 5.10.17

The system is also able to analyse and label facts using system assessment (316). This is described in section 5.11

Natural language translation (324) enables translation between natural language and internal representations. e.g. It can translate a natural language question into a query and natural language assertions of knowledge into one or more corresponding facts. Translation of questions is described in section 5.6.6, translation of factual assertions is described in section 5.6.10). Both these components are implemented in the preferred embodiment by referring to a store of translation templates (325). These provide a pre-determined pattern for matching against natural language strings and further data enabling natural language strings matching the pattern to be converted to the internal representation.

Query processing (314) enables the retrieval of knowledge from the system. Queries may be the output of the natural language translation system (324) or provided by remote computers (306). Query processing is described in section 5.5

The knowledge generation subsystem (320) provides facts which are not present in the static knowledge base often by inferring new knowledge from the facts that are present in the static knowledge base. The preferred embodiment uses a store of generators (322) which describe patterns of fact which they are capable of generating along with one or more mechanisms to generate these facts. Such a mechanism can be just a query (a dumb generator), or some program code optionally in combination with a query (a smart generator). Knowledge generation is described in section 5.4

The profile generation system (330) enables the creation of a collection of information about a particular object. In the preferred embodiment this is a web page. In the preferred embodiment profile generation is achieved by use of a store of profile templates (332) which specify the knowledge to be displayed, its format and how to obtain it.

User authentication is achieved via the authentication subsystem (328). In the preferred embodiment users can authenticate themselves using their real-world identity. This is discussed in section 5.9.

5.2 The Static Knowledge Base

As used herein, a "static knowledge base" is the term for a computer-accessible persistent store comprising knowledge represented in structured form. A persistent store could be a memory or memories of any type capable of holding the knowledge long term. For speed, various embodiments may hold the data in a long term store but temporarily cache it in a fast non-persistent memory such as RAM for access by other components of the system.

In the preferred embodiment the static knowledge base is a collection of facts represented using the knowledge representation method of the preferred embodiment described below, stored in one or more relational databases on one or more server computers.

5.3 Knowledge Representation

Knowledge representation is the methodology by which knowledge in structured form is represented within at least the static knowledge base.

Methods of representing knowledge in structured form include:
(a) Semantic nets (graph-like representations where the nodes correspond to objects and the edges to relationships);
(b) Logic, a machine-readable mathematical language of pre-determined syntax used to represent the knowledge. Logics are substantially simpler and more rigorously defined than natural language. Types of logic include predicate logic and propositional logic.
(c) Frames. Frames represent objects as a set of slots (attributes) and associated values.

Embodiments of the current invention can contain a static knowledge base containing facts using at least one alternative structured knowledge representation. However, the preferred embodiment uses primarily a combination of simple assertions asserting a named relationship between two objects to represent knowledge. The relation can be negative and certain objects can comprise one or more further objects ("parametered objects"). Each fact is also an object allowing facts to make assertions about other facts.

A detailed description of the knowledge representation used in the preferred embodiment is now disclosed:

5.3.1 Objects

Objects are individual entities. They can include physical objects in the real world (individual people, places, buildings etc.), conceptual objects (numbers, organisations etc.), attributes, quantities, classes etc.

All identified objects have a unique id within the system. This name must be unique to identify the object and in the preferred embodiment should correspond to a common, yet fairly specific natural language noun or noun phrase for the same object (for relations, see section 5.3.3, a present tense central form is used). Instances are usually given the proper name for the object if there is one. If the proper name is not unique then a noun phrase is used including the proper name. In the preferred embodiment these names can include spaces making them very close to natural language.

As a last resort, in some embodiments, one can distinguish between objects that would otherwise have been assigned the same name, by adding an integer at the end (after a space). If the integer is missed off it is assumed to be 1 so new objects which clash with existing objects start their numbering with 2. For example:
e.g. [california] is the object name for the US state of California. [william jefferson clinton] is the object name for the former US president.

Note how the names are written in square brackets in the preferred embodiment. This identifies the thing as an id and also means that such names are recognizable as being part of the preferred embodiment of the present invention, even when written out in some context where what it is would not otherwise be obvious. For example, a person could print their id in square brackets on business cards and their name would be readable both as a natural language name and recognisable as an id for the embodiments of present invention. People with the business card could then use the id to find out more information about the holder.

5.3.1.1 String Objects

Generally the above syntax is unrelated to the ontology used or the class of the object. One exception in the preferred embodiment is the class of strings (sequences of characters). Instances of this class are simply the string itself put in quotes, e.g. ["William"] is the name for the sequence of characters 'W' ... 'i' ... 'l' ... 'l' ... 'i' ... 'a' ... 'm'—it means nothing more than that. Such objects are useful for stating information used for translation and for parametered objects.

One common use of strings is to indicate denotational strings. As used herein denotational strings are strings which are used in natural language to denote an object in the system. For example, the strings "Abe Lincoln", "Abraham Lincoln" and "President Lincoln" are denotational strings for former US president Abraham Lincoln; "green" is a denotational string for the attribute green, etc. Denotational strings can also denote objects of all types including relations, classes etc.

5.3.1.2 Parametered Objects

Some classes contain an infinite (or extremely large) number of objects that can be consistently understood in some way. We can choose to denote such objects by a combination of the class name and data. The syntax of a parametered object in the preferred embodiment is:

[<class name>: [object 1]; [object 2]; ... ; [object n]]

Parametered objects have at least one object within the name as a parameter. The number of parameters can be fixed for a particular class, e.g. timepoint (a moment in time), or vary, e.g. group (a collection of objects regarded as a single object).

For some objects, strings containing the important information are used as the parameter or parameters. This is especially useful where there is already a well-established "real-world" syntax for members of the class. A simple example is the class of integers, e.g. [integer: ["8128"]]. Integers already have a universal syntax and meaning using the digits 0-9 in sequence and the decimal system. It is thus desirable to denote them using a single string object as the parameter. A more complicated but equally valid example is a chess position where a standard way of denoting it as strings (and including all the other information such as the side to move and castling rights) has already been established, e.g. [chess position: ["R7/5p1p/5KP1/8/k6P/p1r5/2P5/8b - - - "]].

Another common class of parametered objects used in the preferred embodiment is the timepoint class. Here a single string object is used with a format that is not widely used. It is a sequence of integers separated by "/" characters, denoting (in order), the year, the month, the day, the hour in 24-hour clock, the minute, and the second. Any further integers are tenths, hundredths, thousandths of seconds, etc., e.g.

[timepoint: ["1999/6/3/15/0"]] is 3 pm on the 3 Jun. 1999 UTC. The accuracy of this timepoint is within one minute. [timepoint: ["1999"]] specifies a "moment" of time but the accuracy is one year.

Parametered objects are compared by comparing each parameter in turn. If the nature of the class means that order is unimportant (e.g. group) the parameters need to be considered in a pre-determined order (e.g. alphabetical) so that the same objects will be compared as equal.

In the preferred embodiment, parametered objects can also have other parametered objects as parameters. This nested nature of parametered objects can be extended indefinitely deeply. For example, we could define a class "pair" specifically for objects consisting of exactly two things, e.g. [pair: [integer: ["5"]; [integer: ["7"]] and having done so there is no reason why we could not create a name for the object consisting of the group of this object and other things, e.g. [group: [pair: [integer: ["5"]; [integer: ["7"]]; [abraham lincoln]] is the object which involves considering the pair (5, 7) and Abraham Lincoln as a single thing.

5.3.2 Unique Recognition Data

As used herein unique recognition data is data associated with an object which has the following properties:

It should be perceivable by human users of the system.

It should uniquely distinguish the object from others which might be mistaken for it by the users of the system (e.g. other objects with similar names).

It should be generally appreciable. i.e. enough of the data should have meaning to uniquely distinguish the object to all users (or almost all users) who may wish to communicate with the embodiment about the object.

For example, someone's name plus their passport number would be perceivable (people can read names and passport numbers). It would also uniquely distinguish that person from all other people (passport numbers are unique). However, it would not be generally appreciable in most circumstances if that person's name was common as most people do not know other people's passport numbers. As it is not generally appreciable, it would not count as unique recognition data. However, the name of a person, a collection of common details about them and a photograph probably would count, as most people wishing to identify that person are likely to be able to pick out enough detail from the data to uniquely identify that person from anyone else it might be, even if some of the data was not known to them.

5.3.2.1 Unique Recognition Strings

A unique recognition string is unique recognition data coded as a sequence of printable characters, readable and understandable by a human user.

In the preferred embodiment, objects are associated with a unique recognition string. This association is done with a simple fact using the relation [uniquely translates as] (see section 5.3.6 for how facts are asserted). This fact might be generated (see section 5.4).

The purpose of this string is to both uniquely distinguish the object from all other objects which may have similar names and to do so in a manner which allows this to happen in the minds of all (or almost all) the human users who may see this string and who have some familiarity with the object.

For a person who is very famous for one thing, such a string can often be formed by simply saying their name and this famous thing. For example, for [william jefferson clinton], "Bill Clinton, the 43rd President of the United States" would be sufficient as it is extremely unlikely that anyone trying to reference that individual would fail to know that he was once US president. However, for an individual who is less famous several pieces of information may need to be combined so that different groups of people have enough information to be sure that they are the person being referred to (the "generally appreciated" requirement). For example, "James R. MacDonald, software developer, date of birth 3 Apr. 1975, resident in Cambridge England and employed by Fiction Engineering Ltd" may be sufficient for a non-famous person as even people who not very familiar with that individual will probably see enough of what they know to make an identification.

5.3.2.2 Images

In some embodiments, an identifying image may be part of the unique recognition data. In cases where everyone who wishes to communicate about the object has seen it (or knows what it looks like), it may be the only unique recognition data.

5.3.2.3 Collection of Stored Facts

Other embodiments may use a collection of stored knowledge about the object together as unique recognition data. Embodiments can offer this via a profile of the object (see section 5.7). For example, an embodiment could display the id for the object linked to a profile for the object. If the user didn't recognise the id, they could click on the link to see the profile and use this information collected together to recognise the object.

5.3.3 Relations

Relations are things which link together objects. The preferred embodiment uses relationships between two objects. Relationships can exist between physical objects and also between physical objects and non-physical objects (concepts), e.g. "John is married to Sarah" is a natural language assertion about a relationship between two physical objects (in this case people). "The apple is green" asserts a relationship between the attribute "green" with the instance of apple being talked about. "The book is about Albert Einstein's career" asserts a relationship between a book and the concept of Albert Einstein's work history. "The soup tastes salty" asserts a relationship between the attribute "salty" with the soup. All of these natural language assertions also contain information about time (tense): this will be dealt with below.

In the preferred embodiment, relationships are also objects. For example:

[is married to] is the object (relation) that corresponds to the Western concept of marriage between a man and woman, i.e. a formalised monogamous marriage.

[is an instance of] relates an instance object to a class object, e.g. the relationship between Albert Einstein and the class [human being].

[applies to] relates an attribute object to another object, i.e. it says that a certain property applies to something. This second object can be anything: an instance, a class, a relation or even another attribute.

[is a subclass of] relates one class to another and says that the first class is a more specific class than the second and that all objects that are members of the first class are also members of the second. For example, this relationship applies between the class [apple] and the class [fruit].

In the preferred embodiment, relations are typically named by finding a present tense verb phrase that unambiguously describes the relationship.

5.3.4 Classes

In the preferred embodiment all objects are members of at least one class. Classes define objects with similar characteristics. Class information is thus useful for generation and profile screens (see section 5.7). An object is related to a class of which it is a member by the [is an instance of] relation.

5.3.4.1 Class Structure

Classes are related by the relation [is a subclass of], so if B is a subclass of A then all objects which are members of B are also members of A. For example all members of [human being] are members of [living thing] because [human being] is a subclass of [living thing].

According to various embodiments, classes can also partially overlap. For example, a class could be defined of male living things which would be a subclass of [living thing] with the attribute [male]. However, members would include male human beings as well as male animals while female human beings would be excluded. Another example would be the class of (say) [blonde person] and [woman]. Classes with no member in common have the relation [is a district class from]

As there is a class of [object] in the preferred embodiment which includes everything, the classes in the knowledge base can be considered a tree with the [object] class as the root.

5.3.4.2 Permanent Classes

A permanent class is one where membership by an object cannot change as time goes by. The object is a member of that class for the entire timeline, i.e. the properties of the class are so core to objects within it, that is reasonable to say that the object would cease to be that object (i.e. a different identifier would be needed) if those properties were ever to change. An example of a permanent class would be [tree]. Any object which is a tree is always a tree and if something radical were to be done to it to make it not a tree, such as cutting it down and turning it into a table, it is reasonable to think of the new object as a different object with a different identifier. In this example, the table would be the successor object to the tree but it would be represented as a different object in a different permanent class.

An example of a non-permanent class would be [lawyer]. A particular lawyer can only be an instance of this class for part of the time. Prior to qualifying (e.g. during his or her childhood) and perhaps after leaving the profession they would not be a member of the class. However he or she is a member of the class [human being] for the entire timeline as [human being] is a permanent class.

It is also helpful to understand the difference between a permanent class and the presence of a physical object in the universe for only part of the timeline. In the preferred embodiment an object is considered a member of a permanent class for the entire timeline even for parts of the timeline where that object isn't alive or doesn't exist. However, an object is considered a member of a non-permanent class only for the time period when the relevant attributes/class membership applied.

5.3.4.3 Principal Class

The principal class (PC) is a concept that exists in the preferred embodiment and various other embodiments.

A PC is a class which is considered the most useful in instantly identifying what sort of object something is. In general it should be sufficiently specific a class as to give most of the common properties of an object, yet not so specific as to represent an obscure concept. Examples might include the class of human beings, nation states, trees, cities.

The PC is useful for quickly stating what an object is in a way that a human user will understand. In some embodiments it can be used by the system for identification purposes too. For example, if several objects have the same name the system may use the principal class in combination with the name to uniquely identify the object to the user.

In some embodiments all objects must have a PC or having one is strongly encouraged. A class cannot be a PC for some objects and not others which are members of it (i.e. it is a property of the class). For this reason when an object is added to the knowledge base and an assertion is made about a class of which the object is a member, there must normally be a PC on the way up the tree (if the asserted class itself is not principal). The PC of the object is the lowest (most specific) principal class of which the object is a member.

One method for finding the principal class of an object is first to identify the classes of which the object is a member, i.e. a query is done looking for objects to which the entity has the relation [is an instance of]. The resulting class objects are then ordered using the [is a subclass of] relation and the most specific class labelled as a principal class is then considered the PC for the object.

Principal classes are organised so that they are distinct from any other principal class at the same level in the ontology so there are no complications with overlapping (non-distinct) classes which would prevent identifying a single principal class for the object.

A similar check is done while adding a new object when prompting the user entity for a class of which the object is a member. After prompting the user entity for a class, both this class and the classes to which this class is on the right in the relation [is a subclass of] are retrieved from the knowledge base and again they are ordered. The most specific class labelled as a PC is taken as the object's PC. If one is not found using this method the user entity is prompted for a more specific class, e.g. the string "policeman" will find [human being] as the principal class (the class of policemen is a subclass of the PC [human being]) but "living thing" will result in the user being prompted to be more specific.

5.3.4.4 Relationship Between Attributes and Classes

In the preferred embodiment classes can also be represented in terms of attributes. For example, being a member of the class [human being] can also be thought of as having the attribute [human]. In this example a single attribute is equivalent to class membership. For some classes more than one attribute may be equivalent. For others a Boolean equation of attributes may define class membership.

5.3.5 Data/Document Objects

Some useful objects are essentially data. Examples include pictures, HTML pages, longer blocks of text or other documents. It is impractical to name these objects using the data itself so in the preferred embodiment we give the data an object name. Having done that the internet already has a well-established way of retrieving the contents of such a file: URLs. URLs are named within the invention by using a parametered class [url] with a single-string object parameter, e.g. [url: ["http://www.semscipt.com/"]]. The relation [is a url of] relates the object name for a document to a URL which contains the document's data.

5.3.6 Facts

Core to the preferred embodiment knowledge representation method is the four object fact. The basic syntax is:
[name of fact]: [object 1] [object 2] [object 3]

i.e. four objects listed in order on one line, with a colon after the first one. A great deal can be achieved without the [name of fact] object and an alternative embodiment could omit this extra identifier completely, make it optional or infer it (say) from an identifier in the database. However, in the preferred embodiment it is compulsory.

Object 1 and Object 3 can be of any type. Object 2 has to be a relation. This fact itself is an object with the name [name of fact]. When asserting knowledge all four objects have to be names.

In the preferred embodiment, the names of facts are of the form
[fact.<unique string>@network.machine.name]

The network machine name (e.g. an internet host name) "owns" the fact and is responsible for its truthfulness and maintaining it. This has utility for embodiments using a distributed model of multiple servers, each holding different facts, other machines would refer to this machine to get information about this fact if necessary. An alternative embodiment would associate the machine with the fact but include the name of the machine separately from the fact name.

Here are some simple examples of facts:

---

[fact.2143@semscript.com]: [alejandro toledo] [is the president of] [peru]
[fact.1147758@semscript.com]: [male] [applies to] [abraham lincoln]
[fact.10@semscript.com]: [paris] [is the capital of] [france]

---

Note how facts are essentially strings of text and are thus easily stored on a computer and communicated over a network between computers.

The other advantage of the fact concept is its lack of complexity. A sequence of four objects with an extremely straightforward syntax can be regarded as a permanent atom of knowledge. An unordered collection of such atoms can communicate and permanently store real knowledge without any of the problems of natural language. Yet another advantage of the representation is that facts such as the above can easily be stored in a standard relational database consisting of four columns with each field being text. Use of indexes means that combinations of known and unknown objects can rapidly be looked up. A further advantage is that as each atom of knowledge has a name, it is very easy to represent facts about facts. This is typically how time is represented (see section 5.3.7 below) but could also include knowledge about when the fact was added to the knowledge base, what person or entity added it or any of a large number of other possible assertions. The naming also gives a source that "owns" the fact enabling all sorts of possibilities relating to maintaining and verifying the fact over a network.

Note also that by placing the relation object in the middle of the two other objects, the facts "read" like natural language making it very easily understood by humans.

Knowledge stored in this manner can also be used to supplement knowledge stored using other strategies.

5.3.7 Time

Natural language generally asserts or implies tense relative to the present. However, in the preferred embodiment static knowledge can be stored long term and we express time in absolute terms, i.e. we assert that things are true for periods or moments of time expressed as a date/time-of-day and not relative to the moment when they are expressed. i.e. Temporal data is associated with facts which in the preferred embodiment assert when the facts are true. Alternative methods are possible but doing this avoids the complexity of having to adjust the meaning of facts from moment to moment as time goes by.

In the preferred embodiment most simple facts have no information about time implied or represented with it. For example:

[fact.113204@semscript.com]: [london] [is the capital of] [united kingdom]

simply asserts that the relation [is the capital of] was/is/will be true for at least one moment in the time line. It may be true for all of it, it may have been true only for an instant in 1658.

To get around this problem each fact expressing a relationship that can change can be accompanied by one or more temporal partners. Temporal partners are facts that reference other facts and make assertions about when another fact is valid, i.e. we represent the temporal data about when a fact is true with one or more further facts. e.g.

---

[fact.2143@semscript.com]: [alejandro toledo] [is the president of] [peru]
[fact.2144@semscript.com]: [fact.2143@semscript.com]
[applies for timeperiod] [timeperiod:
[timepoint: ["2001/7/28"]]; [iafter]]

---

[fact.2144@semscript.com] makes an assertion about [fact.2143@semscript.com] namely that Alejandro Toledo has been the president of Peru from the 28 Jul. 2001 to the indefinite future. Note that these two facts by themselves say nothing about whether or not he was president before that. (To do that requires a similar pair of facts using the negative version of the fact for the period before 28 Jul. 2001. See section 5.3.8)

Many facts are true for all time and it is often possible to infer this from attributes of the relation in the fact, e.g. the relation [is the biological father of] is a permanent relationship: it does not make sense for someone to cease to be someone's genetic father or to begin to be one when one was previously not. This practice of making an assertion without temporal partners is usually reserved for facts that absolutely cannot change from moment to moment—if they were true once they are always true. Generators (see section 5.4) can then infer the temporal partners (if needed) asserting that they are true for the whole time line.

In addition to permanent relationships there are also permanent attributes. For example, the attributes [young] and [asleep] are examples of transient attributes. [blood group o] and [sagittarian] are examples of permanent attributes. Attributes which apply to a relationship and which are a consequence of their semantics, such as [symmetric], are permanent.

A third way of dealing with time is to not bother and for the knowledge base only to attempt to represent information about the present (and not store information about things that were true in the past and not true now). Such an approach would require updates to the knowledge base when things change, replacing, removing or suppressing the facts that are no longer true. "True-now methodology" is the term used herein for this approach. Such a fact simply asserts something about the moment in time when the access of the knowledge base was made and it is not necessarily true at any other time. In other words the ability to assert knowledge about the past is sacrificed in exchange for benefits of convenience and efficiency. In the preferred embodiment the attribute [relation is true-now] labels relations where this methodology is used. Typically when such relations appear in queries (see section 5.3.13), the queries have no corresponding temporal partner so no inference is needed. Use of such relations in a query is equivalent to asking about whether the relationship is true now without this having to be explicitly stated.

In the preferred embodiment, this method is used for facts used for translating to and from natural language. The reason being partly that their use is in translating questions and statements that happen in the present and thus old versions of these facts are not very useful, partly because they would almost never be used and partly because they change very infrequently. Temporal partners could be included but it would needlessly complicate the translation process. Another common situation where this method is (has to be) used is when querying the system for the current time. A temporal partner for such a fact would be pointless. (An alternative approach for translation knowledge is to make such relations permanent. Although not strictly true, in practice words don't change their meaning very frequently and this approach is practical in a similar way.)

A third situation where true now methodology is used is when the semantics of the fact are based partly or entirely on what is in the knowledge base. For example, the relation [is a direct subclass of] (whether one class is immediately below another in the ontology) has the attribute [relation is true-now] as its meaning is affected by whether an intervening class is present in the knowledge base. This relation could exist between two classes and then cease to exist when someone inserted a new class between them. As it is impractical to keep track of the dates and times of such events it is simpler just to use true now methodology in this case.

Another situation is temporal partners asserting a time period terminating with the [iafter] object. As this can be closed at any time such an assertion uses true now methodology. For example a temporal partner using the object [timeperiod: [timepoint: ["1987"]]; [iafter]] asserts the time period from 1987 until the indefinite future. At some point after the fact was added to the knowledge base, the fact may cease to be true. At this point the fact ceases to be true and a new assertion needs to be made with the closing time period being an absolute time point. (Other embodiments could simply update the fact rather than asserting a new fact and labelling the old one as false.)

The [timeperiod] class is a class of parametered objects where the two descriptive objects are the point in time when the period of time commenced and the point in time when it finished. However, to cover infinite or indefinite periods of time there are three special time point objects in the preferred embodiment. The first is [iafter] which indicates an unknown point in the future. It is used for things that are true at the time they were asserted but which are not guaranteed to remain true. The second and third are [time zero] and [forever] which indicate respectively a point in time infinitely long ago and a point in time in the infinite future. They are used to indicate infinite periods of time, for example the object [timeperiod: [time zero]; [forever]] indicates the entire time line and would be used, for example, in a temporal partner for facts that are true by definition.

In addition to [time zero] the preferred embodiment has a special timepoint called [earliest meaningful point]. This is useful for situation where the user may not know or care about the timepoint when the relationship started but knows it was always true for as long as the fact could have been meaningful. In these situations [time zero] may be inaccurate and the alternative would be to just assert a recent time point when the user was sure the relation was true without saying it wasn't true before. An example would be asserting that the English city of Cambridge is geographically located within the English county of Cambridgeshire. Neither Cambridge nor Cambridgeshire have existed for all time but for as long as they both existed one has been located within the other. [earliest meaningful point] thus saves the user from investigating what this earliest meaningful date might be.

In summary, within the preferred embodiment, facts are categorised as either permanent, true-now or transient. Permanent facts have one of the forms:

```
<anything> [is an instance of] <permanent class>
<anything><permanent relation><anything>
<permanent attribute> [applies to] <anything>
<anything> [applies for timeperiod] [timeperiod: <fixed start>;
<fixed end>]
```

True-now facts have one of the forms:

```
<anything><true-now relation><anything>
<true now attribute> [applies to] <anything>
<anything> [applies for timeperiod] [timeperiod: <anything>; [iafter]]
```

Anything not matching one of the above patterns is considered transient.

5.3.7.1 Other Temporal Classes

The permanent, transient and true now temporal classes are believed sufficient for a useful and practical model of the real world. However, other temporal classes which may be used in various embodiments are dynamic which means that the knowledge changes very quickly. Examples, would include financial data like stock prices. By identifying facts as dynamic, users can be prevented from entering them in the static knowledge base.

Another class is unrevertable which is for facts which can become true but once they do become true they continue to be true forever. One implementation of this is for a generator to generate an associated timeperiod which ends with the [forever] timepoint instead of the [iafter] timepoint. An example, would be the [dead] attribute which does not apply to living things when they are alive but then applies forever.

For an embodiment to make use of these additional temporal classes one method is to create attributes for the attribute or relation in a similar way to how permanence and true-now is implemented in above. e.g. with the attributes [relation is dynamic] or [attribute is unrevertable]

5.3.8 Negative Facts

In the preferred embodiment, it is also possible to assert that a relationship is not true. In the preferred embodiment this is done by putting the tilde ("~") character before the relation object, e.g.

```
[fact.3@semscript.com]: [london] ~[is the capital of] [england]
[fact.4@semscript.com]: [fact.3@semscript.com]
[applies for timeperiod] [timeperiod: [time zero];
[timepoint: "1066"]]
```

These two facts together assert that London was not the capital of England before some point in 1066.

When storing facts in a relational database, representing negative facts can be achieved by the addition of a Boolean field to the table storing the facts—when set true the fact is negative.

5.3.9 The Golden Rule

The Golden Rule is that a relationship cannot both exist and not exist between the same pair of objects at the same moment in time. Contradictions or inconsistencies in knowledge represented by facts are produced by finding or logically generating breaches of this rule.

Note that the representation of a timepoint is imprecise no matter how accurately it is specified. In order to create a contradiction we have to show that a relationship between the same pair of objects both existed and did not exist for two overlapping periods of time implied by the accuracy of the timepoint. For example the British queen Victoria was both alive and dead (not alive) in 1901: she was alive in the part of 1901 before her death and dead in the rest of it. If someone remarries an hour after their divorce goes through they are married to two different people on the same day but without being married bigamously. If, however, you can show that someone was alive for one timeperiod and dead for another and show that the two time periods overlap, only then have you found a contradiction.

In the preferred embodiment, this golden rule is used to answer "no" to yes/no queries. See section 5.5 for details.

5.3.10 Categories of Knowledge

Various embodiments of the system classify knowledge into certain categories in order to determine appropriate policies and actions for facts within these categories. Various embodiments can analyse a fact to determine (in at least some cases) which of these categories it falls into and act accordingly (e.g. when assessing the reliability of a fact or the penalties for it later being contradicted). For example, the [uniquely translates as] relation is always associated with true by choice facts.

5.3.10.1 True by Definition

Some facts stem logically from the semantics of the entity and relationships involved and don't need any external evidence to support them. For example, saying that the class of children is a subclass of the class of human beings stems from the definition of the two classes and the semantics of the [is a subclass of] relation. Similarly, saying that [symmetric] [applies to] [is married to] is a true by definition fact (the fact that A is married to B implies that B is married to A is a consequence of the meaning of the relation).

5.3.10.2 True by Declaration

These are facts that are defined by the fact that a source of authority says so (and being generally accepted). Example includes the capital city of a country.

5.3.10.3 True by Choice

These are facts within the knowledge base where different people could plausibly produce different answers and yet all be right. However, only one version can be used. A good example is the unique recognition and common translation strings for an object. This is similar to true by declaration except that the source is the user asserting the knowledge rather than any kind of accepted external authority.

5.3.10.4 True from Evidence

These are facts that don't stem from definition or declaration but come from observations made by people. The geographical location of an object and whether a human being is male or female are examples of this class of knowledge.

5.3.10.5 Unprovable Knowledge

Some knowledge is widely believed and may be asserted by users of the system but there is no evidence or way of proving the fact either way. Some facts associated with a particular religion fall into this category. Legend, mythology and historical facts with very poor evidence to support them may also produce facts that have similar issues. This can be dealt with by use of a context (see section 5.3.10.7 below for discussion of fictional knowledge). Users can choose to add contexts including their belief system into knowledge considered when their queries are answered. For example, members of a particular religion could have the id for that context in the list of contexts to be used when they are interacting with the system. Once they had authenticated themselves (see section 5.9) this list would be considered by the engine. The default list of contexts would just include one, though—the "base" context. Having a context distinct from "base" does not imply that the contents are not part of reality (though this is true with fictional contexts). It implies that they are unprovable using the standards of evidence embodied in the policies of the system and additionally disputed by significant numbers of people. It thus makes sense to store these facts separately from facts that are likely to be universally accepted.

5.3.10.6 False Yet Believed Facts

Another category is things that are widely believed, yet also untrue according to the strong preponderance of evidence. Some urban myths would fall into this category. In the preferred embodiment these are essentially untrue facts that would be dealt with like other factual knowledge with strict policies for what is needed before they can be asserted and removed using the same methods by which other knowledge is removed. In other embodiments special policies may be needed for knowledge that appeared in this class.

5.3.10.7 Fictional Knowledge

These are "facts" that are true only in the context of a fictional work. An example would be an assertion of the address or birth date of Sherlock Holmes.

5.3.11 Contexts

Various embodiments can store and process fictional knowledge in the knowledge base by clearly labelling all "true by declaration" and "true from evidence" facts as belonging to a specific context (e.g. a fictional movie or novel). This way inappropriate facts can be ignored by the query processing system unless the query is specifically about the context requested. When a specific context is part of the query, all "true by declaration" and "true from evidence" facts not belonging to that context can be ignored and correct answers returned. "True by definition" knowledge can be used across contexts, even fictional ones. This method can also be used to extend the knowledge base to include facts belonging to contexts which are not strictly fiction but would otherwise fail to be considered as fact.

In the preferred embodiment the unique recognition string (see section 5.3.2.1) of a fictional object must make this clear to avoid any confusion. Thus the unique recognition string for [sherlock holmes] might be ["The fictional detective Sherlock Holms"].

Contexts can also sometimes be inferred directly from a reference in a query to an object or relationship that only belongs to one particular context. For example, the question "What is the address of Sherlock Holmes?" would infer the context from the reference to the fictional character. "True from evidence" facts include the assertion of the class membership of an entity (e.g. of its principal class) so the fact [sherlock holmes] [is a member of] [human being] would be associated with a fictional context and not the base context.

Some embodiments also use contexts to store conflicting "true by declaration" and "true by choice" facts. For example, when two different authorities disagree. Users can then resolve these conflicts by selecting contexts which they wish to be used when queries are answered. These selections can be permanently associated with a user and used until the user changes them. Knowledge associated with a particular religion can be modelled this way by associating it with a context pertaining to that religion.

5.3.12 Summary of Knowledge Representation

In the preferred embodiment of the invention the universe is modelled as a huge array of objects and relationships between pairs of objects. As the time clock ticks, named relationships between pairs of objects spring in and out of existence.

Some of those relationships are known to exist at a particular timepoint, some of those relationships are known not to exist at a particular timepoint (negative facts) and with others the embodiment does not know. The more knowledge that is in the static knowledge base and the more knowledge that can be generated, the more complete the knowledge is.

All possible objects "exist" in the knowledge base for all time. Existence of physical objects (and other objects such as legal entities which only have life for a given period of time) is expressed by the presence of a relationship with an attribute for the time they are around in the real world, e.g.

```
[fact.1356@semscript.com]: [alive] [applies to] [queen victoria]
[fact.1357@semscript.com]: [fact.1356@semscript.com]
[applies for timeperiod] [timeperiod:
[timepoint: ["1810"]]; [timepoint: ["1901"]]]
[fact.1358@semscript.com]: [alive] ~[applies to] [queen victoria]
[fact.1359@semscript.com]: [fact.1358@semscript.com]
[applies for timeperiod] [timeperiod:
[timepoint: ["1901"]]; [forever]]
```

It should be noted that relationships can exist between physical objects even when one is not present in the physical world any more, e.g. a modern-day book can be about Isaac Newton even though he died hundreds of years ago. The book and the person are both physical objects with a relationship between them existing in the present yet there is no shared moment in time when they both existed.

5.3.13 Queries

Queries are a machine-readable representation of a question. i.e. data which communicates to an embodiment what knowledge is desired. A number of representations are possible and the representation will often be at least partly determined by the chosen knowledge representation method. In the preferred embodiment, queries look very much like a series of facts but the purpose is to see whether they can be justified from knowledge found in, or inferred from, the knowledge base rather than to assert information. Variables can also replace objects in the facts (including objects within parametered objects). For example:

```
query
    f: [abraham lincoln] [is married to] [mary todd lincoln]
    f [applies at timepoint] [timepoint: ["1859/5/3"]]
``` asks the question "Was Abraham Lincoln married to Mary Todd Lincoln on the 3rd of May 1859?".

Notice how the name of the first fact is given a variable f rather than a name. In processing the query the engine will solve for f with the fact name (if any) that asserts that relationship between Abraham Lincoln and Mary Todd Lincoln, and then try to satisfy the second line using it. Provided both lines can be satisfied with at least one value of f the query will answer "Yes".

In queries the name of a fact can be dropped when the name is unimportant, i.e. when it is not needed for a later part of the query and when it is not wanted by the user. This is effectively the same as expressing the fact name as a variable and then not referencing the variable again. Such lines thus have only three objects listed.

Variables can also be used in place of other objects in the facts. For example:

```
query a
    f: a [is married to] [abraham lincoln]
    f [applies at timepoint] [timepoint: ["1859/5/3"]]
``` asks the question "Who was married to Abraham Lincoln on the 3rd of May 1859?".

If the query is requesting objects as the answer, one or more variables that represent the desired objects follow the "query" statement. If the query is just trying to determine the truth of the query it is termed herein as a truth query and it has no variables after the "query" statement. Queries whose purpose is to produce one or more named objects as answers are termed object queries. The above query with the a missing from the query statement would ask the question "Was anyone married to Abraham Lincoln on the 3 May 1859?".

Note that the query representation is extremely elementary in form and yet also extremely expressive in what questions can be represented. This simplicity in form has many advantages for automatic processing and the efficacy of additional techniques. Embodiments with more complicated or additional syntax in the query—e.g. with constructs taken from logic or programming languages—would fail to have these advantages. Note also that this simple representation means that the semantics of the query is unrelated to the order of the lines. Each line places a constraint on the value or values of each variable within the line. The collection of constraints define the information being sought and the query header specifies what variable values are the results of the query. Although the semantics of the query is unaltered by the line order, some lines may need to be processed prior to other lines in order to obtain results from the knowledge base. The query processing engine is thus free to reorder or chose to process lines in a different order should the query be presented in an order which cannot be processed.

A more complicated query is the following:

```
query a
    a [is an instance of] [nation state]
    t: a [is geographically located within] [the continent of Europe]
    t [applies at timepoint] [timepoint: ["1999"]]
    t1: f [is the capital of] a
    t1 [applies at timepoint] [timepoint: ["1999"]]
    f [commonly translates as] d
    c [is the first letter of] d
    c [equals] ["p"]
``` which translates as "Which continental European countries have capital cities whose names start with a 'p' in 1999?".

The first line will generate a list of several hundred possible values for a (current and former countries) which will be whittled down by the tests in the next few lines (for location within Europe, etc.). The capital cities are looked up, translated into strings which are their usual English names and the first letter is checked to be a "p". Any values of a remaining after the last line is checked are returned by the query.

Essentially lines in the query can be regarded as filters if they reference variables that have been mentioned in earlier lines. Such lines reduce the possible values for that variable by doing tests on it, substituting in all previously found values one by one and seeing if the resulting fact can be found (directly or after inference) in the knowledge base. If the line uses a variable for the first time it can be regarded as something that generates values—finding all possible values for the variable that are passed downwards. If any values (or combinations of values) survive the generating lines and filters to the end of the query they result in a "Yes" answer for a truth query, or a list of objects for object queries.

5.3.13.1 Parameters

The preferred embodiment also contains certain parameters that can be added to lines in a query for efficiency and other reasons. These include:

/s means that the current line should only be processed using static knowledge. There is no need to use knowledge generation to find this out (see section 5.4). A typical situation for this is to see whether a common attribute applies. If the attribute is a fundamental property that can be assumed to be always stored statically if it applies, then there is no point in doing anything more complicated to find it, e.g. a line in a query might be:

[symmetric] [applies to] r/s where r is a relation.

If a relation is used, its core properties are always stored so we can assume that [symmetric] either applies or not from a static search and do not need to waste time trying to use inference to see if it holds.

In the preferred embodiment this parameter also enables the query to "see" superfluous facts which have been labelled as invisible.

/1 means that only one answer need be found for this line (i.e. one substitution for the variables). Two possibilities for using this are either that the semantics of what is being asked implies there is only one answer, or that only one answer is needed. This increases the efficiency of the engine as the search can stop after the first object is found.

/e means that the query will only be matched on static true facts which are not superfluous. One use of this parameter is to easily implement a generator for the [is a direct subclass of] relation by checking for [is a subclass] between the classes with /e. As [is a subclass of] is transitive, a static assertion of [is a subclass of] between two classes that have an intervening class will be labelled as superfluous by the system assessment component (see section 5.11 for details of superfluous facts). As ignoring these is part of the semantic definition of [is a direct subclass of], this is the desired behaviour.

5.4 Knowledge Generation

Far more facts exist than can be stored statically. Various embodiments of the present invention can generate facts not asserted directly in the static knowledge base usually (but not exclusively) by referencing and inferring these new facts from facts in the static knowledge base (and possibly other generated facts).

One method of doing this is to hard code the generation rules using program code. The preferred embodiment takes a more flexible scheme by using generators.

As used herein, a "generator" is a stored entity used by the knowledge generation system to generate facts not present in the static knowledge base. In the preferred embodiment, a generator has one or more target lines which specify a pattern for the facts that can be generated by this generator (these are termed "target lines" herein) in combination with mechanisms for generating facts that match this pattern.

In a "dumb generator" such a mechanism may simply be a query. The query gives values to the unknowns in the target line or lines and the results of the query are substituted into the target line (or lines) to generate the facts, if the query is successful. In a "smart generator" there is some program code (termed a "tool" herein) optionally in combination with a query which is used to generate the facts.

Smart generators are like dumb generators but where the footer cannot be generated simply by rewriting the results of a query: some computer code needs to be executed (run directly, or interpreted) to produce the results.

To put it another way, the query format of the preferred embodiment, although very expressive, is not Turing powerful. This has many advantages in terms of efficient processing of the query but means that some inference steps cannot be achieved without additional processing. By adding a Turing powerful step to the header query, as described here, the full universe of possible inference steps can be achieved.

Many embodiments are possible in representing generators but in the preferred embodiment generators are specified in detail, in three parts:
a title line identifying it as a generator and listing variables;
(if present) a header query that must be run to see if the generator applies (and possibly to generate values in a dumb generator—the list of variables after the generator line);
and a footer which is a number of facts which can potentially be generated by the generator.

In the preferred embodiment lines starting with "!" are used for comments and are ignored by the engine.

A simple example of a dumb generator is the following:

```
generator a%,b%,tp
f: a% [is married to] b%
f [applies for timeperiod] tp
=>
t: b% [is married to] a% *
t [applies for timeperiod] tp
```

This asserts that if person a is married to person b for a given time period then person b is also married to person a for that same time period. This might be obvious for marriage but it would not be true for example with the relation [is a parent of].

This example is illustrative. In the preferred embodiment the above example is carried out by looking for the attribute [symmetric] to the relation and having a slightly more complicated generator that only switches the two objects around if the attribute applies. This saves having to have a similar generator for every relation with this property.
i.e.

```
generator a%,b%,tr
[symmetric] [applies to] r$ /s
f: a% r$ b%
f [applies for timeperiod] tr
=>
g: b% r$ a% *
g [applies for timeperiod] tr
```

(plus a similar one for the negative relation)

Dumb generators express inferences about how, for example, the existence of a relationship implies the existence of other relationships or how the existence of an attribute can be used to infer other facts.

For efficiency reasons it is clearly not practical to run every generator that exists at every opportunity so when answering a line of a query, the query answering system first checks information stored statically, and then goes on to look at generators later by matching the line of the query it is currently on with lines in the footer of the generator (i.e. it works backwards). Only the lines marked with an asterisk can be matched. If the line matches, the top of the generator is run as a query (perhaps with values substituted for variables) to see whether the bottom lines can be considered as facts. If they are, the footer facts are generated and the generated facts are added to a cache. Any objects that match variables are included in the answering of the query.

In the preferred embodiment, the character that ends a variable name indicates rules on what can be matched with it. Sometimes, when comparing the current line of a query with the asterisked footer line, a variable will match a variable, sometimes a named object will match a variable, and sometimes a variable will match a named object. Such matches can happen within parametered objects as well as at the top level.

The percent sign after the variables in the matched line says that the variable can be either left as a variable (i.e. matched with a variable in the query line and filled by the query in the top half of the generator) or textually substituted for a name. If substituted, the variable is removed from the query statement at the top, and the object name is substituted into the header query wherever the footer variable appears.

For example, if matching [mary todd lincoln] [is married to] [abraham lincoln], the above generator would be run and the top half would be a query getting all the timeperiods on file for when they were married. Facts would then be generated asserting that they were married the other way around for the same timeperiods.

A dollar sign following the variable says that the variable must be replaced and textually substituted for a real object name from the query line being looked at—matching with other variables is not permitted and the generator will not be used if that is the kind of match found. If the variable has no percent or dollar sign it must correspond to a variable in the query line. By 'must' we mean that we cannot use the generator if the correct match is not present.

The unique fact names for the results of a generator are created automatically by the inference engine and are assigned to variables if they are needed for temporal partners (as with the above example). Facts generated by generators are also inserted into a temporary cache by the engine so they can be quickly found for use in subsequent processing of the query. This cache is checked by the engine even before searching statically-stored local facts. The cache enables facts generated in earlier parts of the query to be accessed without running the generator a second time with the same objects. By keeping a record of what generators with what parameters generated items in the cache, the engine can avoid doing the same operation twice simply by using the cache items.

As an example of a smart generator, a very commonly executed generator is the following:

```
generator tr
  a$ [applies for timeperiod] tr
  => timeperiod_to_timepoint@local
  a$ [applies at timepoint] tp$*
``` which says that a relationship is true at a timepoint if the timepoint lies within a timeperiod when the relationship is true. This generator is vital as it simply is not practical to list, say, every instant when two people are married as there are an infinite number of instants in any time period. We instead statically store a period of time and if a query asks whether they are married at a given instant the above smart generator is put into action. First, all the timeperiods are gathered using the query at the top and the results passed to the timeperiod_to_timepoint tool (essentially an executable function) with the timepoint and timeperiod in question passed as parameters. If the tool determines that the time point lies within the timeperiod, it generates the footer with an appropriate name for the newly-generated fact, otherwise it does not. Note that it is not possible to do this directly using a dumb generator as calculation is needed to determine whether one point in time lies within a named time period.

Note also that the dollar character at the end of the tp$ variable implies that it must be matched with a named object—a named timepoint. There are an infinite number of timepoints in any timeperiod so it is only possible to check a given timepoint, not to generate all the possible answers.

Another commonly-used smart generator is the following:

```
generator
  => now@local
  [current time] [applies to] n *
``` which works out which time point is the current time. This smart generator does not need a query at the top (the query is null and can be thought of as always returning "yes"). The reason is that we can always be sure that there is a timepoint which is the current time. The generator just generates the footer with the system date and time as the time point whenever it is called. Naturally the current time cannot be looked up statically.

Smart generators can also be used to retrieve highly dynamic knowledge from a conventional database. For example, a smart generator could be written to return the current share price of a particular company by querying systems in the stock market. (This knowledge in turn may be used by another generator to calculate the company's market capitalization.) In this case, as with the example of the current time, the smart generator is retrieving knowledge from a third source rather than calculating from facts originating from the static knowledge base.

Far more sophisticated smart generators can be written and we can potentially incorporate all the algorithmic achievements of the planet into the knowledge base for use in a very wide variety of contexts.

The computer code ("tool") that provides the intelligence to the smart generator is named in the preferred embodiment by name@machine.on.internet The machine.on.internet is a named machine which owns the tool and where the code can possibly be executed remotely. The term "local" refers to the code that can be found on the local machine and/or is part of the local knowledge processing engine.

A wide variety of ways of implementing the tools and execution of the tools should be obvious to anyone skilled in the art. These include hard-coding of some of the more common tools within the engine; remote execution of code through network protocols (passing the parameters over the network and receiving the results); text scripting languages that can be downloaded from a remote machine and executed locally; other kinds of downloadable languages including those that are then executed directly on the local machine, etc.

In the preferred embodiment, the generator description is stored in a relational database which is accessed by the query answering system.

In the case of smart generators, the name of the tool identifies the computer code to run. Many tools are hard-coded within the system and not accessible externally. However, the preferred embodiment also allows for users to add generators including smart generator tools using an interpreted language and an approval step. This is described in more detail in section 5.10.14.

Most generators only have a single target line. One exception is the following:

```
generator
  => age@local
  f: a [is the age of] b$ *
  f [applies at timepoint] tp$ *
``` which has two target lines to match as the age of something varies from timepoint to timepoint so the timepoint object needs to be known as well.

An alternative embodiment could still implement this on a single line with a relation that included the timepoint in the definition of the relation. e.g.

```
generator
  => age@local
  a [is the age of] [group: b$; tp$]
```

This involves defining the right class of the relation as a combination of the object and the timepoint of interest. In this embodiment, [is the age of] is a permanent relation, in the one above it is transient.

5.5 Query Answering

The way queries are answered is determined in part by the knowledge representation and query representation method chosen.

Even within the preferred embodiment query representation and knowledge representation method, a number of choices are available. However, the following gives a detailed account of how queries are responded to in the preferred embodiment:

5.5.1 Query Modes

In the preferred embodiment, queries can be run in a number of modes. Establish mode simply checks whether values can be found in the knowledge base that confirm the facts: "no" and "unknown" are thus the same result for truth queries.

Full mode attempts to distinguish between "no" and "unknown" for truth queries by seeing whether it can establish a breach of the Golden Rule for any part of the query using facts in the knowledge base, by assuming that the lines in the query are true. This test is done if it fails to answer the query with its first attempt. If it can establish a contradiction the answer to the query is "no" as we can assume that the Golden Rule is true. If not, the answer is "unknown".

This is done in the above query-answering algorithm by adding a test after the first line of a query has failed to produce an answer. The test is designed to see whether the failure may simply be due to the knowledge base not containing the answer (an "I do not know" answer to the Yes/No question) or because it is wrong and contradicted by other knowledge in the knowledge base (a "no" answer to the Yes/No question).

Figure 4:
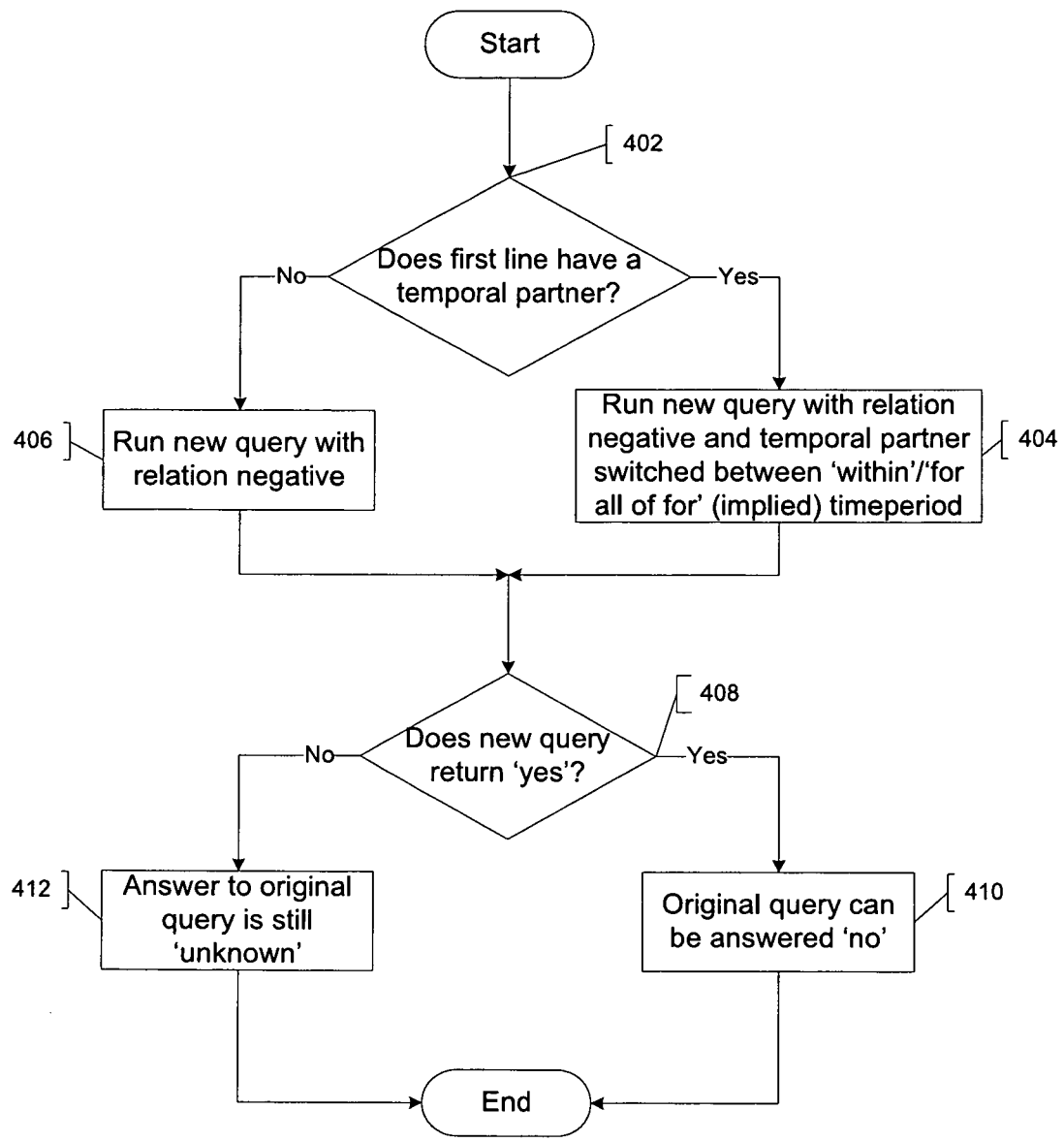
FIG. 4 shows a method for answering a query with "no" instead of "unknown"

The test is illustrated in FIG. 4. Step 402 involves searching for a temporal partner for the first line of the query. If there is one, step 404 is performed: creating a reverse query by making the relation negative (or positive if it is negative), and switching the semantics of the temporal partner between the concept of "within" and "for all of" for the corresponding timeperiod (or, in the case of a time point, the time period implied by the accuracy of the time point). So, the [applies at timepoint] relation is replaced by [apples for all of timepoint] relation and the [applies for timeperiod] relation is replaced by [applies for some of timeperiod] and vice versa.

In the case where there is no temporal partner (implying either a permanently true relation or one that is true at the present), step 406 is performed: the reverse query created is simply the query line with a positive relation made negative or a negative relation made positive.

The reverse query created in step 404 or 406 is then run, and the result examined (step 408). A "yes" answer to the reverse query means that the routine can answer the original query with a "no" (step 410). If the answer to the reverse query is "no", then the answer to the original query remains unknown (step 412).

For example, although it might be possible for both the facts "John is married to Sarah in 1999" and "John is not married to Sarah in 1999" to be true (if they divorced in that same year) it would not be possible for both to be true if the second statement was instead "John is not married to Sarah for all of 1999" and in this case one statement being true implies that the other is false.

The issue of completeness of results for object queries (i.e. have all objects been returned?) is dealt with in section 5.5.2 below (it is also tested for in full mode). To do this requires information in the knowledge base about the number of objects that have a particular relationship which can then be matched with the number of objects actually found.

5.5.2 Completeness

Completeness is the issue of knowing whether the answers that have been given by an object query are a complete list of all possible answers: there may or may not be answers which are not in the knowledge base. It is checked for when a query is run in full mode.

The way it is done is by storing data about how many objects exist for a template line in a query. If that number of objects is found and all subsequent filtering of them by successive lines in the query produces a definitive yes or no result we can be sure that the objects that emerge at the end of the query are a complete list.

In the preferred embodiment, we store the data about number by the use of queryline objects.

Queryline objects are parametered objects that represent a possible line in a query (excluding the fact name). Each queryline object, therefore, has exactly three parameters. These parameters are either the special object [queryline unknown] which represents a variable or they are the names of specific objects. For example, the possible line of a query:

n [is a child of] [president james monroe]

and all similar lines with another variable are represented by the single queryline object:

[queryline: [queryline unknown]; [is a child of]; [president james monroe]]

To say that President James Monroe has (has ever had) three children we then include the following fact in our knowledge base:

[fact.000269@semscript.com]: [queryline: [queryline unknown]; [is a child of]; [president james monroe]] [has order] [integer: ["3"]]

Figure 5:
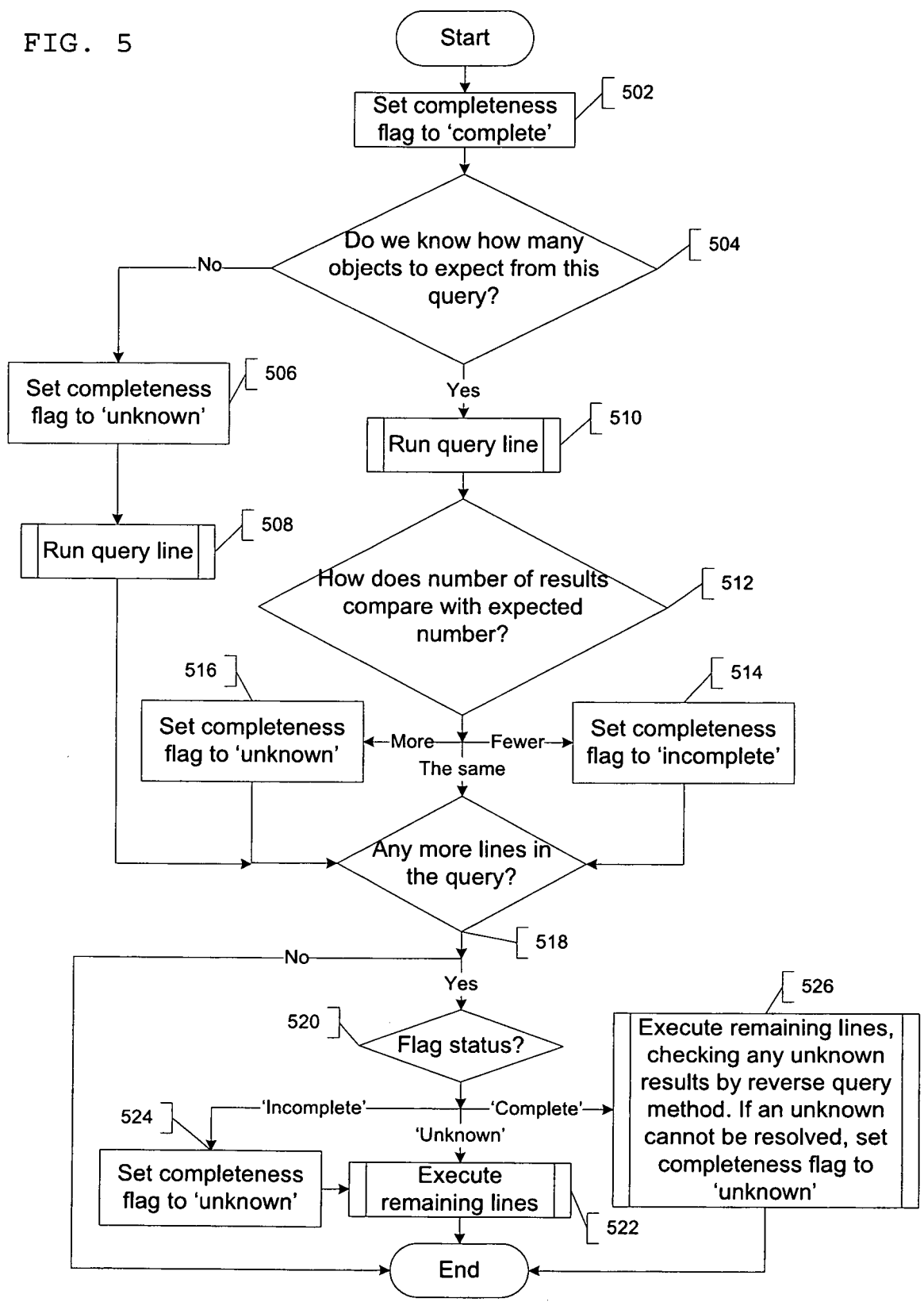
FIG. 5 shows how knowledge about the completeness of the results returned can be given in query processing.

When the engine comes across an object-generating line of a query (i.e. a line containing a variable that hasn't been used before), if it is asked to give completeness information to the query (i.e. if it is run in full mode), it does so by the process illustrated in FIG. 5. It starts by setting a flag indicating the completeness of the results to complete (step 502). This completeness flag can have three values meaning that the results are complete, incomplete or the completeness status is unknown.

Next, it looks up whether any information is available on the number of objects known to exist for the query (step 504). In the preferred embodiment, it does this by converting the query to a queryline object and running a second query to see whether there is a [has order] fact in the knowledge base. If there is no information on the number of objects, the completeness flag is set to unknown (step 506), and that line of the query is run (step 508); the flag will then stay unknown for the remainder of the query. If there is information on the number of objects, it compares the number of results found after executing the line (step 510) with the number of objects known to exist (step 512), as asserted by the queryline fact in the preferred embodiment. If they match, the completeness status is preserved as complete. If the number of objects found is smaller than the number indicated, the flag is set to incomplete (step 514). (If larger, there is an inconsistency in the knowledge base, so the completeness is unknown, and the flag is set accordingly—step 516.)

Step 518 checks whether there are further lines in the query. If there are no further lines, the process simply returns the objects found, and the status of the completeness flag. If there are further lines, then, for as long as the completeness flag remains complete, the engine does extra work to determine whether the results it has found so far continue to be complete.

Subsequent lines in the query may filter the objects found (i.e. the line may include only a variable used to generate the objects on a previous line so when reached it substitutes the previously found objects in and only ones which can be justified survive). Before proceeding to execute subsequent lines, the completeness status is checked (step 520).

If the completeness status going into a filtering line is unknown, the remaining lines of the query are executed (step 522), but no further checks on completeness will be undergone (the flag remains set to unknown).

If the status is incomplete, the completeness status changes to unknown afterwards no matter what the result (step 524): we do not know whether the missing objects would have passed through the filter or not without knowing what they are.

If the completeness flag is set to complete it then becomes important to do extra work if the object fails to pass through that line (step 526). If the answer can be shown as a "no" then the completeness status of the query so far is unchanged. If, however, it is unknown, then the completeness flag has to be changed to unknown as well. The method used to determine between "no" and "unknown" is exactly the same as the one used to answer a truth query with "no" described above (and illustrated in FIG. 4): essentially the relation in the query line is made negative and any temporal partner is added to cover all of the timeperiod specified—if this new query is found to be true we can answer "no" to the original mini-query and preserve the status so far as complete.

Figure 7:
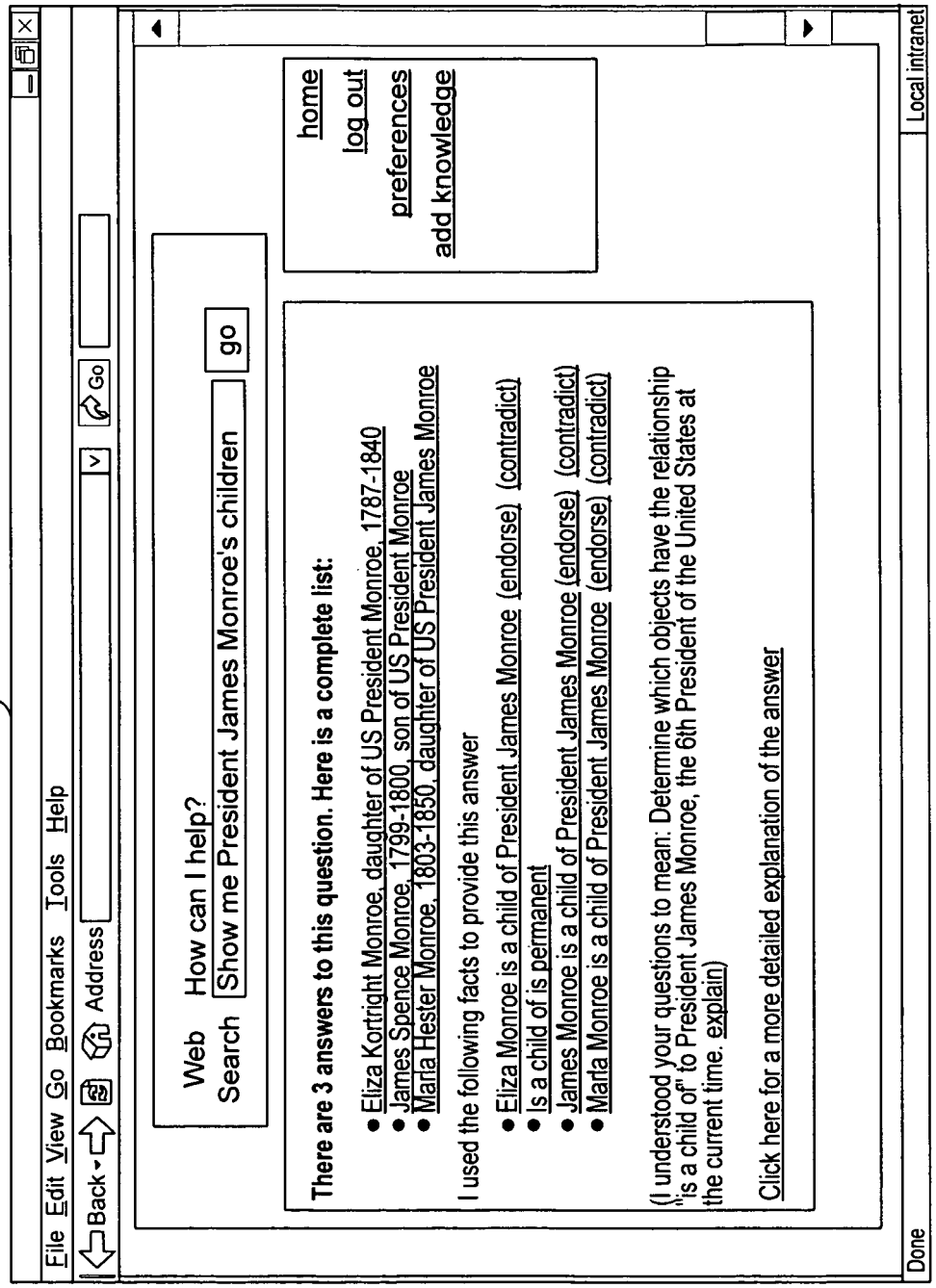
FIG. 7 shows a question answered with multiple answers and completeness information provided.

For an example of completeness information being used in an embodiment of the invention see FIG. 7. The answers in screen 702 are introduced with the text "There are 3 answers to this question. Here is a complete list." Without the completeness check it could only introduce the list with "Here are the answers I found."

5.5.3 Explanation of an Answer to a Query

One of the desirable (but optional) features of various embodiments (including the preferred embodiment) is the generation of a justification for its answer to a query.

Such explanations are a helpful feature because they demonstrate where the answer "magically" produced came from, thus greatly improving the confidence the user has in the result. Moreover, although the results may have come from a computer, a human being ultimately has to use that knowledge and take responsibility for its accuracy.

Another advantage in embodiments which include user assessment (see section 5.10.17) is that the user has a chance to see where an incorrect answer came from and do something about the incorrect fact or facts that resulted in that incorrect response.

The preferred embodiment is operable to produce two types of explanation: a detailed explanation which is essentially a step-by-step proof of the answer and a concise explanation designed to give the user a hint about where the result came from. Other embodiments may produce one or the other (or none).

FIG. 8 shows an example of both types of explanation in an embodiment. (This figure is described in more detail in section 5.5.6.)

5.5.3.1 Detailed Explanation

In the preferred embodiment, the detailed explanation is essentially all the facts and generators that it used to find the answers returned, turned into a natural language proof.

The way that this is implemented in the preferred embodiment is by use of a data structure which is a linked list of items where each item can either be a string containing a line of natural language (typically describing an event in the processing of a query), or a fact. This data structure can either hold the entire explanation, or the explanation for some part of the answering of the query.

During the processing of a query, many smaller queries are executed because many of the lines in the query involve the use or possible use of generators and the header queries in the generators need to be run. Some of these generator queries succeed and some fail—when they succeed, the explanation for those queries producing the used fact forms part of the parent explanation. To complicate matters further, some of these generator runs produce facts which go into the cache, and the fact is then subsequently found in the cache rather than from running the generator again. It is helpful that when this happens, the original explanation for how the fact was generated before being placed in the cache forms part of the final explanation, and if the fact has already been justified, it is not explained twice in the final explanation.

A full explanation is stored with every fact placed in the cache. When a successful search of the cache is made and the fact pulled out, a check is made to see whether this fact has been previously used (and therefore justified) in the explanation of the lines of the current query done so far. If so, we just add a line saying something like "We already know that:"; if not, we insert the entire explanation for the cached fact into the parent explanation.

This same process of adding the lines of an explanation into the parent explanation happens when we successfully generate facts from a generator. (The same query processing routine is called for the query header.) When it returns, we take that explanation for the set of results we are using and insert it into the explanation for the generated facts with text lines to help understand how the facts were created. For example, we can insert a line like "Therefore:" along with (optionally) the name of the generator between the explanation for the header query and the footer lines of a generator. As generators are also called during the processing of queries in the headers of other generators, lines from explanation can end up being generated several levels of query-processing deep.

The final step is to translate our data structure into the natural language explanation. Translation involves the following three steps:

(1) Eliminating certain repetitive sequences for clarity. For example, with the pattern:

---
I know from static knowledge that:
fact 1
I know from static knowledge that:
fact 2

---

The third line can be eliminated.

(2) Translating the fact ids into presentable names. In the preferred embodiment, the static fact ids are long and the generated ones are unique internal strings derived from the objects in the fact. Neither of these are very printable. To make this more palatable, these ids are translated into local fact names, "fact 1", "fact 2" etc. and a look up table maintained so these names can be propagated through the explanation.

(3) Translating the facts into natural language. This can be done with the translation string for the elements, e.g. substituting each object for the string which has the relationship [commonly translates as] with it. Fact id translation comes from the table created in step 2.

The explanations described above are not shown by default in the preferred embodiment and are only displayed when a user requests it.

5.5.3.2 Concise Explanation

Various embodiments including the preferred embodiment can also display a concise explanation. In the preferred embodiment this is just the statically stored facts that were referenced on the way to answering the query using a method similar to that described above but with all the inference steps and inferred facts not shown. In most cases the human user can intuitively understand any inference that was done and any incorrect knowledge used to answer the query is most likely to be in static form. (If the generator is incorrect in some way this can be seen with the detailed explanation which can be selected by the user if they cannot understand what has happened.)

Other embodiments may include purely calculated facts in the concise explanation. Purely calculated facts are generated facts which are not inferred from static facts. e.g. They are facts which the generator has sourced from somewhere external to the static knowledge base.

In embodiments which enable users to endorse and/or contradict facts and/or display the sources of the static fact (user assessment), this abbreviated explanation enables links to be placed next to the static facts referenced thereby allowing the user rapid access to this functionality. The concise explanation is also often short enough that it can be displayed under the answer to the question without occupying excessive screen space.

When a detailed explanation is generated, generating a concise explanation can be achieved by scanning the lines of the detailed explanation and extracting out the facts that came from the static knowledge base (avoiding duplication).

Alternative embodiments can generate a concise explanation from scratch without the need to generate a detailed explanation. In these embodiments the concise explanation is generated by keeping track of the essential facts which were referenced while the query was being processed.

Various embodiments may refine the concise explanation to include only an essential subset of the static facts referenced when answering the query in order to make the information presented to the user even more concise. Candidates for elimination are the more unintuitive facts such as properties of relationships which users may know intuitively anyway, e.g. [symmetric] [applies to] [is married to]. In embodiments which can rate the veracity of facts, facts whose veracity are not in dispute and which have these characteristics are an especially high priority for elimination.

5.5.4 The Process_Query Routine

The semantics and syntax of the preferred embodiment query are described in section 5.3.13, generators are described in section 5.4 and the format of knowledge in the static knowledge base is described in section 5.3. A number of ways of implementing a query processing system having these features and semantics is possible.

However, the implementation of query answering used in the preferred embodiment is now described.

Facts come from three sources: (1) the static knowledge base, (2) the knowledge generation system and (3) a cache of all facts previously discovered when processing this query (and in some embodiments possibly earlier than processing this query if the cache is not flushed between queries).

The routines that retrieve from these three sources are static_search, generator_search and cache_search.

The implementation of each of these in the preferred embodiment is now described.

5.5.4.1 Searching the Static Knowledge Base (Static_Search)

In the preferred embodiment the static facts are stored in a table in a standard relational database (the 'facts' table).

The table has the objects in the fact stored in fields id, left_object, relation and right_object. Each combination of these is indexed for speed.

Additionally the table has the following extra fields:
negative: a Boolean field which makes the relation negative (corresponding to the presence of the tilde '~' character when the fact is written out).
true: whether the system believes the fact is true (set by user assessment and system assessment—see below).
visible: whether the fact is being used to answer queries. All untrue facts are invisible and some superfluous ones are also invisible in certain embodiments.
superfluous: whether the fact can be generated by the system anyway.
contradicted: whether the fact is in semantic conflict with other believed-true facts
challengeable: Boolean: whether further user assessment is allowed for this fact.
last_update: the date and time of the last system assessment of this fact.

superfluous and contradicted are set by system assessment.

The true field is set by system assessment (sometimes using user assessment data). User assessment is described in section 5.10.17. System assessment is described in section 5.11.

The parameters passed to the static_search routine are:
The queryline currently being searched;
A pointer to a list of facts into which the routine will place the static facts that match the queryline (i.e. a place to put the returned facts);
A pointer to a list of explanations to explain each fact returned;
A pointer to the query that is being processed;
When the routine is called it builds a SQL SELECT statement to retrieve the static facts from the table that may match the queryline.

For objects in the queryline that are fully specified objects, this is a matter of adding an element to the WHERE part of the statement that specifies this. For example, "where left_object='abraham lincoln'".

When an element of the queryline is a parametered object and one or more of the parameters are variables, some embodiments that wish to (and where their version of SQL supports it) can build a wildcard component of the WHERE clause corresponding to the known and unknown elements. For example, if the left object in the query was [timepoint: a] the corresponding part of the where clause would be "(left_object like 'timepoint:%')". Other embodiments could just leave partially specified objects out and eliminate by matching the returned results against the queryline after the SELECT statement has received the candidates.

The WHERE clause also contains some conditions associated with the extra parameters. For most requests this will be "true=1 and visible=1". However, this will be adjusted by any parameter settings for the queryline (see section 5.3.13.1). For example, in the preferred embodiment when the "/s" parameter is used the "visible=1" isn't specified as some invisible facts are true and superfluous but as the parameter will stop any fact generation from being done it makes sense to use the fact anyway.

Another situation is when the queryline specifies the fact id. In this situation even the true field isn't constrained as the semantics of a queryline specifying a fact id are to enquire about the facts elements, not to ask whether the relationship is true.

The WHERE clause also needs to specify the negative field according to whether the relation in the queryline is positive or negative.

Once the SQL query has been assembled it is executed to retrieve a list of static facts. Each of these facts is then tested against the queryline if necessary to ensure it matches.

The facts that match are added to the fact list with a simple explanation added to the explanation list. The explanation consists of two lines: "I know from statically stored knowledge that" and the fact itself.

The facts and explanations are also added to the cache (if not already present). If already present, the explanation is substituted for the static one if the explanation in the cache is longer.

5.5.4.2 Searching Generated Facts (Generator_Search)

The generator_search routine receives as parameters the queryline and a pointer to a list of facts and explanations where the matching generated facts are to be placed. In combination with the generators themselves and tool implementations it forms part of the knowledge generation subsystem in the preferred embodiment.

If the queryline ends "/s" generator_search simply exits. If it ends "/1" it exits if or when there is one returned value.

The first thing it does is assemble a list of generators that are capable of producing facts which match the queryline provided. It does this by matching the queryline against the target lines of the generators and selecting the generators that have one that matches.

In embodiments where generators can have more than one line to match, the routine may need to scan later lines in the query to match against the other target lines once the first line has been matched. In these embodiments, a pointer to the query will need to be passed to enable this scanning.

For each matching generator it then does the following:
If there is a header query it:
  substitutes any values into the header query from the matches in the target line (if necessary).
  removes from the list of header query variables any variables in the target line which have been matched with a known object.
  calls process_query on this header collecting all the values returned.
If a smart generator it then:
  passes each set of values into the tool and collects the facts it generates.
If a dumb generator it:
  substitutes each set of values generated by the query and matches from the queryline into the footer lines to generate facts. (Any variables for the fact id in a generated fact are given values as this is being done.)
For each of the facts generated by either method it:
  creates an explanation. This explanation is the explanation for the set of values used, generated by the processing of the header query, plus an introduction line, plus the facts generated using this set of values. For dumb generators and smart generators with a header, the introduction line is "Therefore:" and the name of the generator. For smart generators without a header query it is "By calculation:" and the name of the smart generator.
  stores the fact and explanation in the cache if it isn't already there. If it is already there, it substitutes the explanation if the newly generated explanation is shorter than the one stored.
  if the fact matches the queryline, it adds the generated fact and explanation to the results list.

5.5.4.3 Searching the Cache (Cache_Search)

The cache is where facts previously found using the other two sources are stored.

The cache contains the facts and the best (shortest) explanation associated with each fact.

The routine receives a queryline and a pointer to fact list and explanation list as parameters. The facts in the cache that match the queryline are to be placed in the fact list and their corresponding explanations in the explanation list. As with the other two routines, the correspondence between the explanation and fact is established by the ordering. e.g. The 5th explanation in the list corresponds to the 5th fact in the list.

It also receives a pointer to the query being processed as a parameter. This enables the routine to keep the detailed explanation a little neater by avoiding explaining the same fact twice.

The process_query routine maintains a record of all the queries that are currently being recursively processed by maintaining a pointer in the query object that points to its parent query. Child queries are queries which are being processed to provide answers for another query. That is, a child query is the query that is formed from the remaining lines of a query when the first line is resolved (see below for how this is done) or a query in the header of a generator called when processing a queryline for a parent query.

The first thing this routine does is look up the matching facts in the cache.

If it finds a match it then scans to see whether this fact has been explained before.

The query object holds a 'pre-explanation' which contains the explanation for a set of values which is pending while the remainder of the lines using those values are evaluated. It also contains a standard explanation which is the partial explanation so far for the query.

By scanning up the linked list of queries defined by the parent query pointer and for each query scanning both the pre_explanation and standard explanation for matches, the cache_search routine can determine whether this fact has been explained previously.

If it has been explained previously it simply creates a two line explanation for the fact. "We already know that:" and the fact. If it hasn't been explained before, it copies the entire stored explanation from the cache into the returned results.

A fast cache lookup (avoiding an exhaustive search of the stored facts) can be achieved in various embodiments by hashing.

As the queryline contains both known and unknown objects, one implementation is to hash each fact several times to enable fast lookup even with the unknowns.

For example, one simple implementation designed to rapidly locate facts in the cache could create three open (externally-chained) hash tables for left_object, relation and right_object pointing at all facts with a named object in the hashed position. Possible cache matches for a queryline could then be located by looking up cache facts that match the known object(s)/positions(s) in the queryline. A full check needs to be done on the candidates but the hash tables would mean the number of candidates checked was substantially smaller than an exhaustive scan of the cache.

A faster implementation is to additionally create a hash table for each combination of two known objects, e.g. facts matching a queryline containing a known left object and known relation could be rapidly looked up if all facts were hashed on their objects in those positions.

5.5.4.4 Operation of Process_Query

The process_query routine receives the following parameters:
A pointer to the query to be processed.
A pointer to a list of strings used to return variable results.
A pointer to an explanation list used to return an explanation for each set of results.
The strings returned are in the form:
<variable>=[object]
The number of sets of results can be determined by dividing the number of strings in the string list by the number of header variables in the query. (For truth queries no variable values are returned.)

The process_query routine also returns a status value indicating the status of the query when processing has finished.
The possible return values for truth queries are:
Yes: the truth query can be satisfied.
No: It can be proven that the truth query cannot be satisfied.
Unknown: It wasn't possible to establish an answer to the truth query either way.
No/Unknown: For non-full mode this just means that it wasn't possible to satisfy the query and that no attempt was made to answer "no".

For queries with header variables the possible return values are:

complete: the list of values returned is all that exist.

incomplete: the list of values returned is shorter than what exists.

completeness_unknown: these are the values the system is aware of.

Both types of query can also return error—when something goes wrong.

Figure 6:
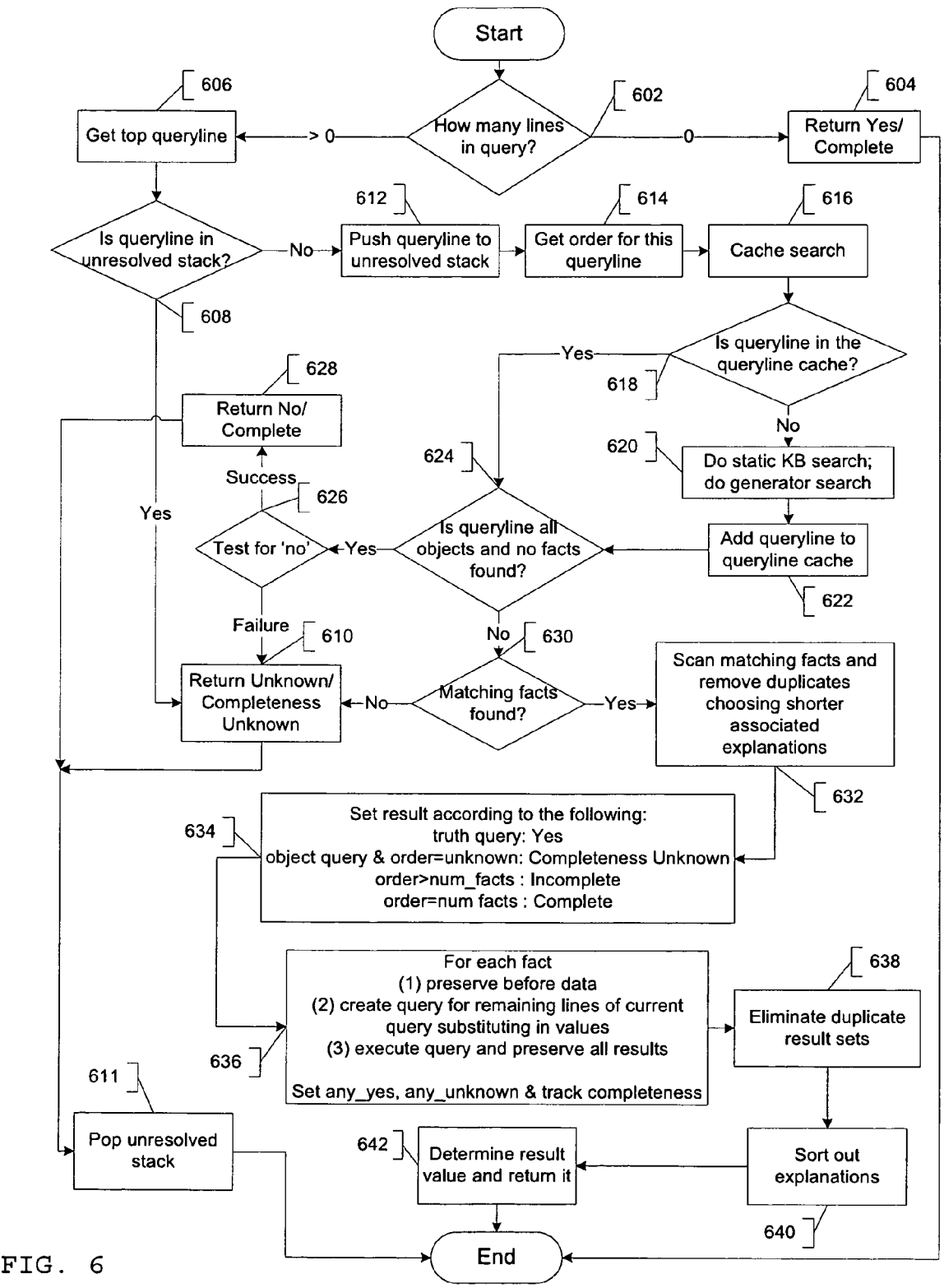
FIG. 6 shows how queries are processed in one embodiment.

FIG. 6 shows the process_query method of the preferred embodiment. This figure assumes the query is being run in full mode and that explanations are being generated. (If it isn't, the steps necessary for completeness, answering no and generating explanations can be skipped.)

First a check is done on the number of lines in the query (602).

If there are no lines in the query yes/complete is returned (604) and the routine ends.

Otherwise the top queryline is retrieved (606).

In order to avoid infinite loops a record of all querylines currently being recursively processed is maintained, the "unresolved stack". The first thing that is done with the queryline is to check whether it is anywhere in this stack (608).

If it is, unknown/completeness unknown is returned (610) and the routine ends.

Otherwise the queryline is added to the unresolved stack. (612).

An order is next obtained (if present) for this queryline (614). This is described in detail above.

Next a search of the cache is undertaken (616). The cache_search routine is described in detail above.

The "queryline cache" is a record of all querylines that have been successfully processed. By keeping a record of all processed querylines and storing every result matched to a queryline in a cache, the static search and generator search routines can be skipped when the queryline has been processed before, making the routine more efficient. (For this reason both the queryline cache and the fact cache must be flushed simultaneously or not at all.)

In step 618 the queryline cache is checked.

If the queryline has not been cached the static and generator searches are undertaken (step 620) and the queryline added to the queryline cache (step 622). (Either or both of these search routines may be skipped if the queryline ends "/1" and a fact has already been found.)

Control then passes to step 624 which sees whether the queryline contains any variables and whether any matching facts have been found.

If there are no variables and no results, we test for "no" as described above (step 626) and return no/complete if successful (step 628) or unknown/completeness unknown if not (step 610). In either case, the queryline is removed from the unresolved stack before completion (step 611)

If there are results or variables in the queryline, control goes to step 630 where a check is made to see whether there are any facts found which match the queryline.

If there are no matching facts the routine returns unknown/completeness unknown (step 610).

If there are matching facts control passes to step 632 where duplicate facts are removed. If there are duplicate facts the one with the shortest associated explanation is the one kept.

Control then proceeds to step 634 where a provisional return result is set. If it is a truth query the provisional result is yes; if an object query and the order isn't known, the result is completeness unknown, if an order query and the number of matching facts matches the order the result is set to complete, otherwise the result is set to incomplete What remains is to process the remaining lines of the query.

In the preferred embodiment, this is done by creating a child query for each matching fact consisting of the remaining lines with the values of the variables implied by the matching fact substituted into the remaining lines, executing each query and carefully preserving the results and explanations before and after (step 636).

Each query has an explanation called a 'preexplanation' that is used to retain a potential part of the query's explanation should the query be successful. It is the explanation for the fact which is being substituted into the remaining lines. It is also scanned by the cache_search routine to avoid explaining the same fact twice.

Each child query has its preexplanation explanation stored and set as the explanation for the fact being used generate it.

The header variables for each subquery are also reduced for each variable that is matched to the current fact. For example if the header query contains the variable "a" and the queryline contains an "a", the child query will no longer have "a" as a query variable as this is now satisfied in the child query.

The value sets for the header variables so far are also preserved. Once the query is processed the resulting value sets, explanations and result are also preserved.

Also within step 636 the results of each query are analysed and used to set the following values:

any_yes: true if any of the child queries returns yes any_unknown: true if any of the child queries return unknown Also for object queries the provisional return result is set to complete but if any of the child queries returns completeness_unknown, the return result is set to match.

At the end of step 626 we now have for each matching fact:

a preexplanation of the fact.

a set of results for the corresponding query and an explanation for each set.

a return value for the query a set of header variable values that were determined from the first line (possibly null)

Success of a child query is defined as follows:

an object query returning >0 results a truth query returning yes a truth query returning no when current query is a truth query and all other child queries have returned no as well.

In step 638 all duplicate sets of results are eliminated from those that succeeded. When duplicates are located, the result that is retained is the one with the shortest explanation.

Control then passes to step 640 where the explanations are taken care of. This is done by merging the preexplanation for the fact with the explanation returned by the query that returned the results. This combined explanation is appended to the explanation for the main query and associated with the returned result set by adding it and the result set to the lists passed as parameters to the process_query call.

The final step is step 642 where the return result is calculated and returned.

For a truth query the return result is no if all the child queries returned no, yes if any_yes is set and unknown otherwise.

For an object query the return result is completeness unknown if any_unknown is true otherwise it is the result set provisionally in step 634.

5.5.5 Process_Query Refinements

Various embodiments may contain the following refinements:

5.5.5.1 Line Reordering

As discussed above, the semantics of a query in the preferred embodiment is unrelated to the order of the lines. Each line places a constraint on the values returned and all returned objects must pass all these constraints.

However, the tractability of producing all the answers is affected by the line order in embodiments which apply the constraints in the order they appear in the query.

For example, consider a query where the [current time] [applies to] now line appears at the end of the query and earlier lines use now in temporal partners. The query still can be viewed as making sense but an embodiment processing the lines in order would be being asked to generate all the timepoints when a fact holds and then subsequently eliminate all the ones which [current time] does not apply to. As there are an infinite number of timepoints in any timeperiod this is problematic.

One approach in some embodiments is to simply leave it to the person writing the query (e.g. in the translation template) to put the lines into a sensible order.

Another approach is to add some line reordering code in the process_query routine where a flag is set if the current queryline is potentially producing too many results to store and instead of just failing, the line is reordered to the end of the query. Failure would only occur if the line failed a second time (when being processed in its new position).

5.5.6 Example of Query Answering and Explanation Generation

FIG. 8 illustrates query processing and explanation generation in an embodiment of the invention.

The question "Is Sean Connery resident in the UK?" has been entered into a web browser connected to an embodiment of the invention (802). The question has been entered into the embodiment's "general prompt" (804).

This is a fairly challenging question to answer because the static knowledge base contains no direct knowledge on this query. Furthermore, inferring the negative requires some difficulties because although one can only be primarily resident in one place at a time that place can be specified to different levels of accuracy. For example, if someone is primarily resident in London, they are also resident in England.

However, the embodiment is able to immediately answer the question in the negative (806) and produce a list of the static facts it used to provide that answer (808). The key one of importance to the human user is that he has been resident in the Bahamas since at least the 15 Mar. 1996. The static fact expressing this is:

[fact.1148017@semscript.com] [applies for timeperiod] [timeperiod: [timepoint: ["1996/3/15"]]; [iafter]]

and the subject fact is:
[fact.1148017@semscript.com]: [sean connery] [is living in] [the bahamas]

As the subject fact is referenced by its temporal partner, it is not listed separately and the system translates them both together.

A small refinement is that in the translation, the system tries to distinguish between whether this date is just the earliest known date that the fact was true or is the point when it began to be true. With the former case, the translation routine inserts "at least" into the translation (as it did in this case).

It does this by doing a query to see whether the reverse relationship was true at the start point of the time period (it actually communicates slightly more knowledge than is actually in the explanation):

query
f: [sean connery] ~[is living in] [the bahamas]
f [applies at timepoint] [timepoint: ["1996/3/15"]]

This query returns unknown so the "at least" is inserted. (The user who asserted this fact sourced the knowledge from an interview that he gave dated the 15 Mar. 1996 where he said he was currently resident in the Bahamas. As the date when he first started living there was unspecified this was all that could be asserted.)

In the illustrated embodiment all the static facts are shown in the concise explanation. Other embodiments choose not to display some of the more esoteric ones such as properties of relations, particularly if the system believes them to be definitely true and thus not suitable for presentation to the user for user assessment (see section 5.10.17).

Initially the user was just presented with the answer (806), the concise explanation (808) and an unambiguous retranslation of the query (809). This unambiguous explanation contains a link to some text which explains how the question was translated by reference to the translation template and which objects were substituted (see section 5.6) However, a link for the detailed explanation was also provided (810). By clicking on this link the user is presented with the detailed explanation: 812 and 814 (split into two for space reasons on the figure).

The detailed explanation shows every step of the solution giving all the static and generated facts as well as what generator was used to generate them. This detailed explanation can be used to see exactly what was done in order to answer the query. In most cases the static facts are sufficient for a user to appreciate how their question was answered. (In some embodiments the names of the generators would link to profiles describing the generator.)

To further illustrate the knowledge generation (section 5.4) and query answering system, it may be helpful to explain how this question was answered in more detail. The question "Is Sean Connery resident in the UK?" was translated without need for further enquiry into the following query by the translation system (see section 5.6.6):

query
[current time] [applies to] now
f: [sean connery] [is living in] [united kingdom]
f [applies at timepoint] now The process_query routine proceeds line by line as described above in section 5.5.4. The first line is readily solved by a smart generator which generated the single fact:
[current time] [applies to] [timepoint: ["2006/7/3/11/12/02"]]
satisfying the first line. The solution for the variable now was then substituted into the remaining lines to produce the following query:

query
f: [sean connery] [is living in] [United Kingdom]
f [applies at timepoint] [timepoint: ["2006/7/3/11/12/02"]]

This query (called in standard mode) produced "no/unknown"—i.e. there is nothing in the static knowledge base, cache or generator subsystem that could establish this, implying it is either false or unknown.

As the query was called in full mode, process_query then tries to answer "no" to the question by inverting the relationship and changing the relation in the temporal partner to the corresponding one as described above. The resulting query is:

```
query
    f: [sean connery] ~[is living in] [United Kingdom]
    f [applies for all of timepoint] [timepoint: ["2006/7/3/11/12/02"]]
```

This query is then passed recursively to the process_query routine which sets about trying to justify the first line.

There is no fact in the static knowledge base or cache that matches so the routine goes on to try generators.

One generator whose target line matches is [generator.rightunique1@semscript.com]

```
generator tp
    [right unique] [applies to] r$ /s
    t: a$ r$ b
    t [applies for timeperiod] tp
    b ~[equals] c$
    b ~[is a more accurate version of] c$
    c$ ~[is a more accurate version of] b
    =>
    g: a$ ~r$ c$ *
    g [applies for timeperiod] tp
```

This generator captures the meaning of the [right unique] attribute, essentially that if a relation is right unique and that another different object has this relationship with the left object, then all other objects cannot have the relationship with the left object at the same time.

The target line a$ ~r$ c$ is successfully matched with [Sean connery]~[is living in] [united kingdom] and the results substituted into the header query to get:

```
query tp
    [right unique] [applies to] [is living in] /s
    t: [sean connery] [is living in] b
    t [applies for timeperiod] tp
    b ~[equals] [united kingdom]
    b ~[is a more accurate version of] [united kingdom]
    [united kingdom] ~[is a more accurate version of] b
```

The first three lines are easily satisfied from the following facts in the static knowledge base. The first of which is:

[right unique] [applies to] [is living in]

This knowledge was collected from the user when [is living in] was added using the add_relation process (see section 5.10.7.5). As the [right unique] value is always asked for by the process, the /s qualifier can safely be used for efficiency as the system expects that if this property holds it will be in the static knowledge base.

The next two facts matching the next two lines of the query are:

```
[fact.1148017@semscript.com]: [sean connery]
    [is living in] [the bahamas]
[fact.1148017@semscript.com] [applies for timeperiod]
    [timeperiod: [timepoint:
    ["1996/3/15"]]; [iafter]]
```

The two lines were added by someone using the add_fact process (see section 5.10.10).

After substitution the remaining lines in the query are:

```
query
    [the bahamas] ~[equals] [united kingdom]
    [the bahamas] ~[is a more accurate version of] [united kingdom]
    [united kingdom] ~[is a more accurate version of] [the bahamas]
``` the value of [tp=period: [timepoint: ["1996/3/15"]]; [iafter]] is retained ready for returning if the above truth query can be established.

The first line of this query is readily satisfied by a smart generator called [tool.equals2@semscript.com]

```
generator
    => equals2@local
    a$ ~[equals] b$ *
```

([tool.equals1@semscript.com] is just the same but for positive [equals])

The tool [equals2@local] is passed the values of a$ and b$ ([the bahamas] and [united kingdom]) and simply checks that they are different objects. It then generates the fact:
[the bahamas]~[equals] [united kingdom]

The remaining two lines are satisfied with the dumb generator

```
[generator.geog_accuracy@semscript.com]:
    generator tp
    a$ [is an instance of] [geographical area]
    f: a$ ~[is geographically located within] b$
    f [applies for timeperiod] tp
    =>
    g: a$ ~[is a more accurate version of] b$ *
    g [applies for timeperiod] tp
``` a$ gets resolved to [the bahamas] and b$ [united kingdom] turning the header query into:

```
query tp
    [the bahamas] [is an instance of] [geographical area]
    f: [the bahamas] ~[is geographically located within] [united kingdom]
    f [applies for timeperiod] tp
```

The first line of this query is satisfied from the static knowledge that:

```
[the bahamas] [is an instance of] [nation state]
and
[nation state] [is a subclass of] [geographical area]
```

The generator [generator.iaif1@semscript.com] does this inference:

```
generator tp,c%
    t: a$ [is an instance of] b /s
    t [applies for timeperiod] tp
    b [is a subclass of] c%
    =>
    g: a$ [is an instance of] c% *
    g [applies for timeperiod] tp
```

To satisfy
[the bahamas]~[is geographically located within] [united kingdom]

the generator [geog_distinct2@semscript.com] is used:

```
generator t3
   a$ ~[equals] b$
   f1: a$ [is an instance of] c
   f1 [applies for timeperiod] t1
   [geographically distinct from each other] [applies to] c
   f2: b$ [is an instance of] c
   f2 [applies for timeperiod] t2
   t3 [is the timeperiod intersection of] [group: t1; t2]
   =>
   f: a$ [is geographically distinct from] b$ *
   f [applies for timeperiod] t3
``` which captures the [geographically distinct from each other] property of a class. As this property applies to the class [nation state] (i.e. no two nations have overlapping territory), and as both [the bahamas] and [united kingdom] are members, and as the class is permanent it is able to infer that they are geographically distinct for all time.

Generator [generator.geog_distinct3@semscript.com] gives meaning to the relation [is geographically distinct from]:

```
generator t
   v: a$ [is geographically distinct from] b$
   v [applies for timeperiod] t
   =>
   f: a$ ~[is geographically located within] b$ *
   f [applies for timeperiod] t
```

A similar sequence happens to satisfy the second query line:
[united kingdom]~[is a more accurate version of] [the bahamas]
so the [generator.rightunique1@semscript.com] can finally generate the facts:

```
[fact12]: [sean connery] ~[is living in] [united kingdom]
[fact12] [applies for timeperiod] [[timeperiod: [timepoint: ["1996/3/15"]];
[iafter]]
```

(In reality, in this embodiment, the generator will create an internal id for the generated fact that is unique. The "fact 12:" in the detailed explanation is a simplified version of this for display to the user.)

To satisfy the final line of the original (inverted query), generator [tool.timperiodtotimepoint2@semscript.com] is used:

```
generator tr
   a$ [applies for timeperiod] tr
   => timeperiod_to_timepoint2@local
   a$ [applies for all of timepoint] tp$ *
``` which retrieves all the timeperiods that the fact applies and gives them to the [timperiod_to_timepoint2@local] tool to see whether the provided timepoint ([timepoint: ["2006/7/3/ 11/12/02"]] in this case) lies completely within the timeperiod.

As the previous generators have provided the timeperiod [[timeperiod: [timepoint: ["1996/3/15"]]; [iafter]] the tool is able to generate the fact that it is true for all of this timepoint.

As this reverse query is satisfied, the process_query routine can finally return "no".

As discussed above the detailed explanation shown is generated as the query is being executed, carefully retaining explanation sequences for each fact and piecing them together to produce a single explanation of the answer or answers. The concise explanation is created by extracting and translating the static facts from this detailed explanation.

5.5.7 Questions about the Future

For transient facts which apply at a timeperiod ending [iafter] it is occasionally useful to represent whether it is reasonable to assume the fact applies in the future.

For example, it is reasonable to assume that one place continues to lie within the borders of another in the future even though this can change (change of boundaries) but it wouldn't be reasonable to say that a particular politician will continue in the political office he or she now enjoys in ten years time.

Whether it is reasonable to answer a query about the future with facts that apply now and are transient is a matter of representing whether this assumption is reasonable or not.

One way this can be represented is to have an attribute which applies to a [fact] which says that it is reasonable to assert that it is true in the future given a believed true [iafter] timeperiod. [fact is reasonable to assume in future] say.

The generator that determines whether a timepoint lies within a timeperiod will then behave as follows:

If (and only if), it is comparing with an [iafter] and the timepoint in question is in the future, it will do a query on the fact to see if the attribute applies and say it is in the timeperiod if the [fact is reasonable to assume in future] attribute is true. (In all other cases it won't.)

We can then add attributes from which this attribute can be inferred (using a generator). [relation is reasonable to assume in future] for example, can be applied to relations which change very slowly.

For [is geographically located within] we need special treatment as the assumption varies according to whether the object is mobile or not.

This can be represented with an attribute [immobile] for objects which can't move and smart generators which will apply [fact is reasonable to assume in the future] for [is geographically located within] facts where the left object is [immobile].

The fact:
[immobile] [is true of every] [geographical area]
will then mean that asking whether Paris will still be in France next year will return "yes" but it won't for objects like [human being] where the object in question can move around.

5.6 Translation

Translation is the art of converting the structured knowledge and associated entities in the system into and out of natural language.

5.6.1 Denotational Strings

A key concept to understanding various embodiments of the invention is the concept of a denotational string. Denotational strings are strings in a specific natural language that denote objects in the knowledge base.

Denotational strings are linked to their corresponding objects via facts. These facts can be stored statically or in some cases generated by the knowledge generation system. e.g. The facts:

```
["abe lincoln"] [can denote] [abraham lincoln]
["president lincoln"] [can denote] [abraham lincoln]
``` provide a link between two ways of identifying the famous former US president in natural language and the internal id.

Generators can also be used to generate denotational strings. For example, the following generator enables a user to be able to specify any object in the system by its identifier:

```
generator b%
b% [is the id corresponding to the string] a$
=>
a$ [can denote] b% *
```

[is the id corresponding to the string] can be implemented using the following generator:

```
generator
=> string_to_id@local
a% [is the id corresponding to the string] b%
```

The tool string to id simply converts a string in the form "[<id>]" to [<id>] and creates the fact in the event that the right object is specified and the left not; converts an id to its string form with square brackets around it in the event that only the left object is specified; does nothing if neither are specified; and checks that the two match and generates the fact if they do, if both are specified.

This generator thus generates all facts of the form:
["[abraham lincoln]"] [can denote] [abraham lincoln]
in response to any query line with the relation and at least one specified object. This generator enables users to use any internal id to communicate with an embodiment.

Another example, is this generator that enables timepoints to be parsed:

```
generator
=> timepoint_parser@local
s$ [can denote] [timepoint: a%] *
```

The tool timepoint parser receives the string s$ (and a % if specified) and sees whether s$ corresponds to any of the various formats that we use to specify points in time. If the string can denote one or more points in time the corresponding facts are generated (after comparing to see if they match a % in the unlikely event that a % is specified).

This generator can generate facts like:

```
["the 3rd of January 1992"] [can denote] [timepoint: ["1992/1/3"]]
["June 1732"] [can denote] [timepoint: ["1732/6"]]
```

Similar generators can be written for integers and various parametered classes.

5.6.2 Common Translation

The common translation string is a concept which exists is various embodiments. It is a natural short string that denotes the object in natural language. It need not be unique but needs to be fairly specific and suitable for communication about the object in context.

Common translation strings are asserted with the [commonly translates as] relation.

An example is:
[William Jefferson clinton] [commonly translates as] ["Bill Clinton"]

As with denotational strings, generators can be used to generate common translation strings for certain special objects such as integers, strings, timepoints etc.

5.6.3 Unique Translation

Unique recognition strings (see section 5.3.2.1) are used for unique translation in the preferred embodiment.

The relation [uniquely translates as] is used to assert these.
e.g.

```
[william jefferson clinton] [uniquely translates as] ["William Jefferson
Clinton, the 42nd President of the United States"]
```

As with denotational strings and common translation strings, generators can be used to generate unique recognition strings for certain classes of object such as strings, timepoints, parametered objects etc.
e.g.

```
[integer: ["8128"]] [commonly translates as] ["8128"]
["hello"] [uniquely translates as] ["The string 'hello'"]
[group: [abraham lincoln]; [florence nightingale]] [commonly translates
as] ["Abraham Lincoln and Florence Nightingale"]
``` are all examples of translation facts generated by generators. The third example uses a smart generator to query the knowledge base for the common translation strings for each object in the group and then ties them together in to a list.

5.6.4 Relations

Translation of relations is slightly different from that of objects in that relations are expressed using a different grammatical construction.

The preferred embodiment for the English language uses:
[is a present central form of]
to denote a string used to express the relation between two objects in a manner similar to [can denote]
e.g.
["is the spouse of"] [is a present central form of] [is married to]

Present central forms are also used for [commonly translates as] and [uniquely translates as] e.g.
[is married to] [commonly translates as] ["is married to"]
smart generators can then adapt this string with string manipulation e.g. by substituting the "is" for other words and phrases.

For example, the preferred embodiment contains the following smart generator:

```
[tool.centralpresentformconversion1@semscript.com]
generator
=>centralpresentformconversion@local
a [is a central present form conversion of: tense$; negative$; plural$;
adverb$] cpf$ *
``` which converts central present form strings to another string corresponding to the supplied tense (an instance of [english tense]), negative value (an instance of [boolean]), plural value (an instance of [boolean]) and adverb (an instance of [string], possibly null).
e.g.

```
["have always been geographically located within"] [is a central
present form conversion of: [present perfect continuous]; [false];
[true]; ["always"]] ["is geographically located within"]
```

Another string translation is
[is an attribute form of]
where the form in combination with the second object can be considered a kind of attribute of the first object. e.g.

["the capital of"] [is an attribute form of] [is the capital of]

That is "the capital of france" can be thought of as an attribute of Paris. This relation is useful for parsing certain types of statements or questions. It is readily generated with a smart generator.

Another translation relation used for describing relations is:

[is a left possessive form of]

which describes the relation in a way common in English where the left object is perceived as belonging to the right object with a class used to identify the relation. e.g. In English if you say:

"Paris is France's capital city"

"capital city" is a class and the possessive form of France is used to assert that the relation exists between Paris and France.

This concept is represented as:

["capital city"] [is a left possessive form of] [is the capital of]

Again this concept is useful in translation and is prompted for in the add_relation process (see section 5.10.7.5).

5.6.5 Other Languages

The example embodiments described give support for the English language. However the principles described herein can also be used to create embodiments which support other natural languages.

There are several thousand living languages used throughout the world and a desirable feature in various embodiments is to provide support to either an alternative language to English or to multiple languages either including or not including English. As the underlying knowledge representation method is distinct from natural language (unlike document based systems) this support can allow access to at least some of the same underlying facts to users communicating in multiple natural languages.

To create support for other languages one can first create analogous relations to those described herein for English, for each of the languages that one wishes to support.

For example, to support the concept of denotational strings in the French language one can add a relation analogous to the English language [can denote] relation.

e.g.

["pays"] [can denote in french] [nation state]

or to support many languages consistently, a parametered relation could be used. e.g.

| ["maa"] [can denote: [finnish]] [nation state] |
| ["pays"] [can denote: [french]] [nation state] |
| ["gwlad"] [can denote: [welsh]] [nation state] |
| ["país"] [can denote: [spanish]] [nation state] |

(Single language embodiments may choose to use that language for the id naming as well.)

Similar analogous relations are needed for [commonly translates as] and [uniquely translates as]

Support is also needed for grammatical data associated with the desired language and this grammatical data could desirably be prompted for at an appropriate time in the appropriate add knowledge process (see section 5.10).

For example, unlike English, many Indo-European and other languages associate a grammatical gender with at least some nouns and knowledge of this gender is necessary to produce grammatically correct productions of the language.

In each situation several ways of storing this knowledge should be obvious from the principles described herein.

For example:

[french masculine gender] [applies to] ["pays"]

or the gender could be associated with the denote relation, e.g.

[group: ["pays"]; [french masculine gender]] [can denote: [french]] [nation state]

In addition there are sometimes irregular properties of a language that cannot always be derived from rules. For example, in English, in the preferred embodiment, we prompt in the add_class process (section 5.10.7.3) for the plural forms of denotational strings and store this in the static knowledge base. (English contains many irregular plurals and pluralisation in phrases can be hard to do automatically.) In languages where the grammatical rules contain fewer exceptions this may be unnecessary or it may be necessary to prompt for this or additional information.

In summary, to support other languages requires following the principles described herein to represent any language-specific translation and grammatical knowledge and if necessary, to prompt for it during the appropriate add knowledge processes. This knowledge is then available for translation when the embodiment is interacting with a speaker of the target language. Translation routines and templates for the language also need creating, again following the principles described herein but adjusted according to the properties of the target language.

5.6.6 Question Translation

In the preferred embodiment translation of natural language questions into queries is achieved by the use of translation templates. Translation templates contain a pattern which natural language can be matched against in combination with a description of how to translate natural language that matches that pattern into the target entity.

This technique can translate questions into queries. The preferred embodiment can also translate natural language assertions of knowledge into facts (see section 5.6.10). Other techniques resolve some ambiguity issues.

As used herein, the term "question" refers to any sequence of words in natural language the purpose of which is to solicit knowledge from the system. It need not necessarily conform to the classic grammatical definition of a question. For example, it could be in imperative form such as "Tell me what the capital of France is" or the meaning could be implied. For example, in some embodiments entering just "Abraham Lincoln" could be an abbreviation for "Show me a profile screen for Abraham Lincoln". (Generation of profile screens is discussed in section 5.7.)

A translation template in the preferred embodiment contains:

the pattern: a sequence of known and unknown strings using variables for the unknown strings;

a header query which generates results for the translation and possibly does other consistency checks on the strings;

a footer which is the result of the translation of the natural language text after values have been substituted in. This is a query when translating questions;

in embodiments supporting multiple natural languages, it may also identify the language it supports (other embodiments may store the templates separately for each language making this identification implied).

An example translation template is:

```
"what is"/"what's" a b
--
query c,d
a [is an attribute form of] c
b [can denote] d
--
query e
```

-continued

```
[current time] [applies to] now
f: e c d
f [applies at timepoint] now
```

The top line is the template. Any sequence of three recognised strings where the first is "What is" or "what's" will be matched with this line and the query at the top run to see if it produces results.

The templates are indexed by facts in the form [<string>] [is part of the translation] [<template name>].

When analyzing the string, we therefore only need to look at a small number of templates which may match—we do not need to scan them all.

For example, if "What is the capital of France?" is asked as a question the engine will first attempt to recursively break this up into a sequence of recognized strings. This is achieved with a function which returns all sequences of recognised sequences of one or more words in the string passed to it. The function achieves this by scanning the string from left to right. When a word boundary is found the currently scanned sequence of words is examined to see whether it is a recognised word or phrase. This can be done by searching for the string in the knowledge base.

In the preferred embodiment this search for the string in the knowledge base is done with two checks. The first to see if it is labelled as being part of a translation template using the query:

```
query
   [<possible substring>] [is part of the translation] a
```

The second check is done with the query:

```
query
   [<possible substring>] [is a denotational string pertaining to] a
```

This is implemented with a generator which merges all the relations implementing denotational strings, [generator.denotational1@semscript.com]

```
generator y%
r [is an instance of] [english denotational relation]
x$ r y%
=>
x$ [is a denotational string pertaining to] y% *
```

All the relations for denotational strings are members of the class [english denotational relation] so this query will recognise any denotational string by answering yes.

If it is recognised, it recursively calls itself with the remainder of the string and adds the scanned string to the start of each sequence returned. Recognised strings can be hashed to save having to check whether they are recognised more than once.

For this example, one of the recognised sequences returned by this function will be:

"What is" "the capital of" "France"

"the capital of" will then be textually substituted into the header query for a and "France" will then be textually substituted into the query for b.

The top query will then read:

```
query c,d
["the capital of"] [is an attribute form of] c
["France"] [can denote] d
``` which when run will return the results t[is the capital city of] and d=[the nation state France].

[is an attribute form of] is a translation relation that describes how English phrases can express a relation in a function sort of way. For example, "the spouse of", "the mother of", "a child of", etc.

[can denote] is the translation relation that relates singular nouns (or noun phrases) to an object name within the knowledge representation system.

The query is then run and the results will then be substituted into the bottom query as the correct translation of the question:

```
query e
[current time] [applies to] now
f: e [is the capital city of] [the nation state france]
f [applies at timepoint] now
```

This query is the correct (and only) translation of the natural language question.

This query is then executed as follows:

The first line will result in a smart generator call to a tool which will give a single value to the variable now.

The second line will be found in the static database with e given the value [the french city of paris] and f given its fact name.

The final line will finally be verified by using the smart generator which infers the truth of [applies at timepoint] statements from [applies for timeperiod] statements found in the static database. The final line will be verified as true if the current time lies within it (or at least one of them if more than one time period is found).

The engine will then answer the natural language question with the answer "The French city of Paris"

Figure 9:
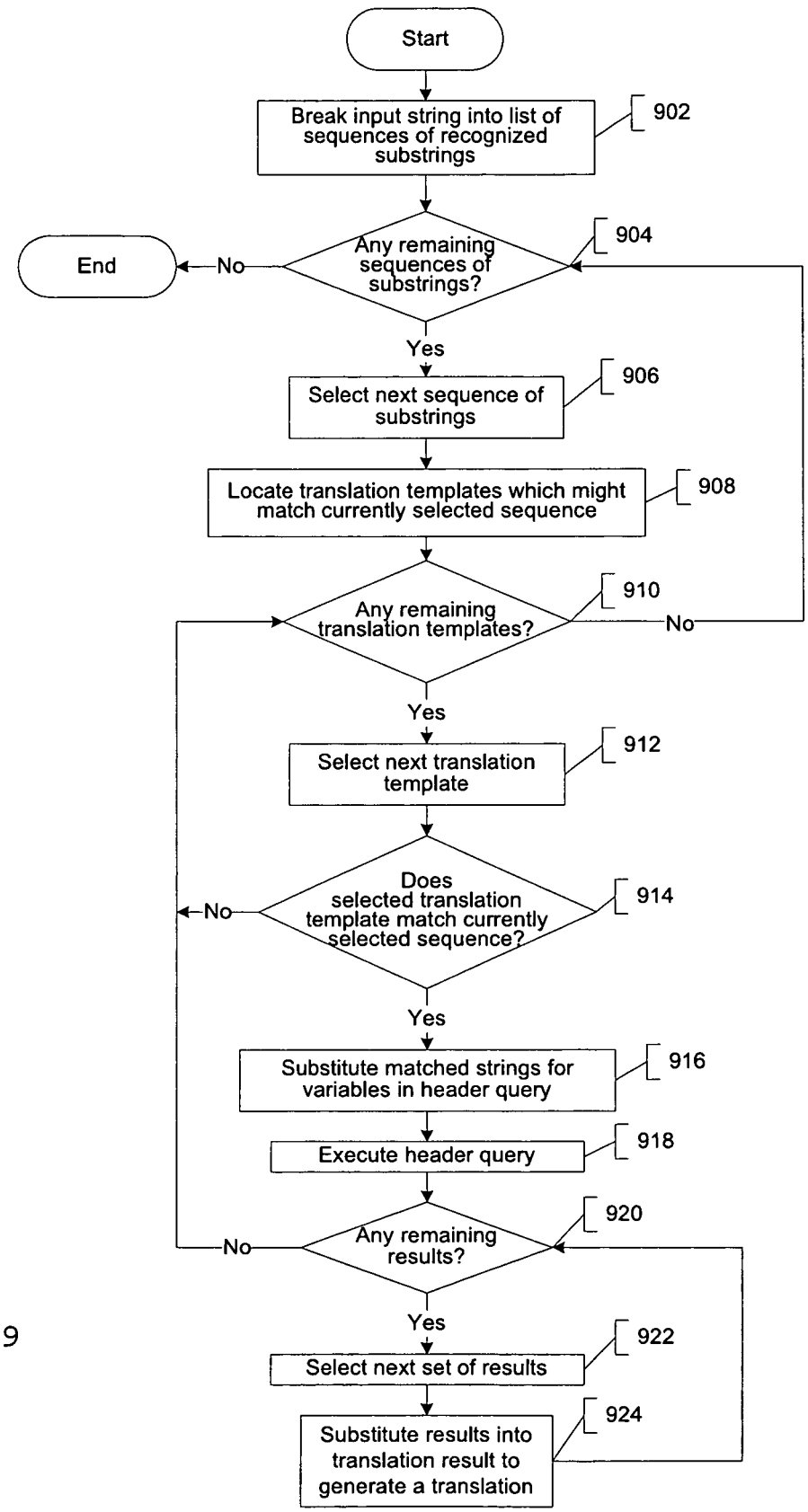
FIG. 9 shows a method for translating a question or fact assertion from natural language into internal form.

FIG. 9 shows the method of translating an item of natural language using translation templates.

Step 902 is to break the natural language question into sequences of recognised substrings. Step 904 checks to see whether there are any unprocessed sequences left, and ends the process if there are no more (or none to start with). If there are sequences still to be examined, the next one is selected (step 906) and all translation templates that might translate this sequence are then looked up (step 908).

Step 910 checks to see whether any of these possible translation templates remain and returns to step 904 if not, otherwise it proceeds to step 912 where the next unprocessed translation template is selected. Next, the current translation template is compared with the current sequence of strings (step 914), and if they do not match then control is passed back to step 910. (These steps ensure that every sequence is matched with every possible translation template that might match.) If they do match, step 916 is then done, and substitutions are created between the variables in the template representing unspecified strings and the strings that actually appear in the sequence. These string objects are substituted for those variables in the header query. Step 918 which executes the query is then done. Step 920 sees whether any results from this query are still to be processed and if so it selects the next set (step 922) and substitutes the results into the translation query to produce a possible translation (step 924). If not, it returns control to step 910.

In various embodiments, question templates can also contain fields which helps the system translate the question or fact assertion back into natural language. Translating back into natural language has value in demonstrating to the user that the system has correctly understood the question asked. In cases where the question is ambiguous, it also has value in enabling the system to list various alternative understandings of the question asked so that the user can select the one intended.

In the preferred embodiment the field is a sequence of natural language strings and variables resolved by the queries in the template. To translate the question back into natural language the system translates the objects into natural language and outputs the sequence of pre-determined strings and translations to generate a translation of the entire question. In the preferred embodiment, the variables are all generated by a further query (equery) which generates string objects from variables and objects resolved with the other queries in the translation. These string objects are the ones referenced in the translation sequence.

An example of a query with these further fields is the following:

```
"does" a "have a husband"
---
query x
a [can denote] x
x [is an instance of] [human being]
---
query
[current time] [applies to] now
t: x [is married to] y
t [applies at timepoint] now
[male] [applies to] y
---
query t
t [uniquely translates as] x
---
"Does" t "have a current husband?"
```

If the question asked was "Does Madonna have a husband", a match would be found with the first pattern with variable a set to the string "Madonna". The next query would be executed and as a consequence the variable x would be set to the object denoting Madonna the person. To translate the question back into English, the query in the fourth field would be executed giving a unique recognition string of Madonna, perhaps "Madonna Louise Ciccone, the famous singer of popular music" and the final re-translation of the question would be "Does Madonna Louise Ciccone the famous singer of popular music have a current husband?"

5.6.7 Resolving Ambiguity

Ambiguity is where the natural language has more than one potential translation. Ambiguity can sometimes be resolved from other information in the knowledge base. As used herein "semantic constraint knowledge" is knowledge about the meaning/use of objects in the knowledge base which limits how they are used by any entity that understands the object's meaning.

Semantic constraint knowledge can be used to distinguish between translations which are likely to have been intended and those which are unlikely.

Examples of semantic constraint knowledge now follow:

5.6.7.1 Left and Right Classes of a Relation

The left and right classes are properties of a relation present in some embodiments including the preferred embodiment. Left and right classes are a form of semantic constraint knowledge used in the preferred embodiment.

They are stored using facts of the form:

```
[<class>] [is the left class of] [<relation>]
[<class>] [is the right class of] [<relation>]
e.g.
[geographic area] [is the left class of] [is the birthplace of]
[human being] [is the right class of] [is the birthplace of]
```

This knowledge conveys the largest class of objects that can reasonably be used with this relation. To put it another way, any intelligent entity wanting to enquire about the existence or non-existence of a relation would not do so with objects outside these classes. (As this is the case, the issue of whether the relation can apply to objects outside these classes is believed to be moot in practical use.)

As an example of how this semantic constraint knowledge can be used, in the above "What is the capital of France?" example, the initial query only returned one pair of results and the question could not be made to match any other translation template.

However, if the initial query had produced several results: for example if "France" could be resolved to the name of a person, the translation would be rejected by using facts about the right class of [is the capital city of], e.g. the following fact (shown without a name) is in the knowledge base:
[geographical area] [is the right class of] [is the capital of]

All the queries generated by the translation process can be subjected to type checks using such knowledge. Any line with the relation [is the capital of] would then be subjected to checks on its right object. If it turned out that it was not an instance of [geographical area] the translation would be rejected.

If more than one translation remains then the engine can resolve ambiguity as a last resort by asking the user for more information. It does this by translating the queries back into English and listing them on the screen. The user then selects the query that he or she intended to ask. Although individual words and phrases translating into multiple objects are a common cause of ambiguity, different translations may also come from different translation templates.

[is the right class of] and [is the left class of] are permanent relations. Furthermore, in the preferred embodiment the classes they indicate are always permanent classes. This simplifies the ambiguity resolution as there is no need for temporal partners.

5.6.7.2 Semantic Scope of Attributes

Another related way that interpretations can be eliminated that is present in certain embodiments is to define a class which defines the scope of an attribute.

Attributes are shown to apply to objects with facts of the form:

```
[<attribute>] [applies to] [<object>]
e.g.
[unmarried] [applies to] [james buchanan]
```

Like left and right classes of a relation, attributes can also have a class associated with them.
[human being] [defines the scope of] [unmarried]
Facts of this form are an additional example of semantic constraint knowledge.

This class is prompted for in the add_object process (see section 5.10.7.1) when the object being added is an instance of the class [attribute].

Like left and right classes of a relation, the scope of an attribute is defined by the semantics of the concept the attribute represents and thus provides a sanity check on any interpretation where the object is outside this scope.

For example, when translating the question "Is Madonna single?" (see FIG. 2) the question translation routine finds that ["madonna"] can denote two objects in the knowledge base, the singer and [the 1990 movie madonna].

Both get translated into queries but the second translation contains the line:
f:[unmarried] [applies to] [the 1990 movie madonna]

As [human being] is the scope of the [unmarried] attribute and as the system can establish via a query that [the 1990 movie madonna] is not a human being, this interpretation can be eliminated as clearly not intended.

The word "single" can be automatically disambiguated here as well. The knowledge base contains:

---
["single"] [can denote] [unmarried]
["single"] [can denote] [single track music recording]

--- so queries can also be generated with lines starting:
[single track music recording] [applies to] . . .
which can be eliminated by the fact that the left class of [applies to] is [attribute] and [single track music recording] is a [class] and not an attribute.

Eliminations like this can also be efficiently done in the header query. For example, the template for this question could be:

---
"is" a b
-
query x,y
a [can denote] x
b [can denote] y
y [is an instance of] [attribute]
-
query
[current time] [applies to] now
t: y [applies to] x
t [applies at timepoint] now

---

With the y [is an instance of] [attribute] line, the header query will eliminate the [single track music recording] interpretation without semantic constraint knowledge even being needed.

5.6.7.3 Method for Resolving Ambiguity

Figure 10:
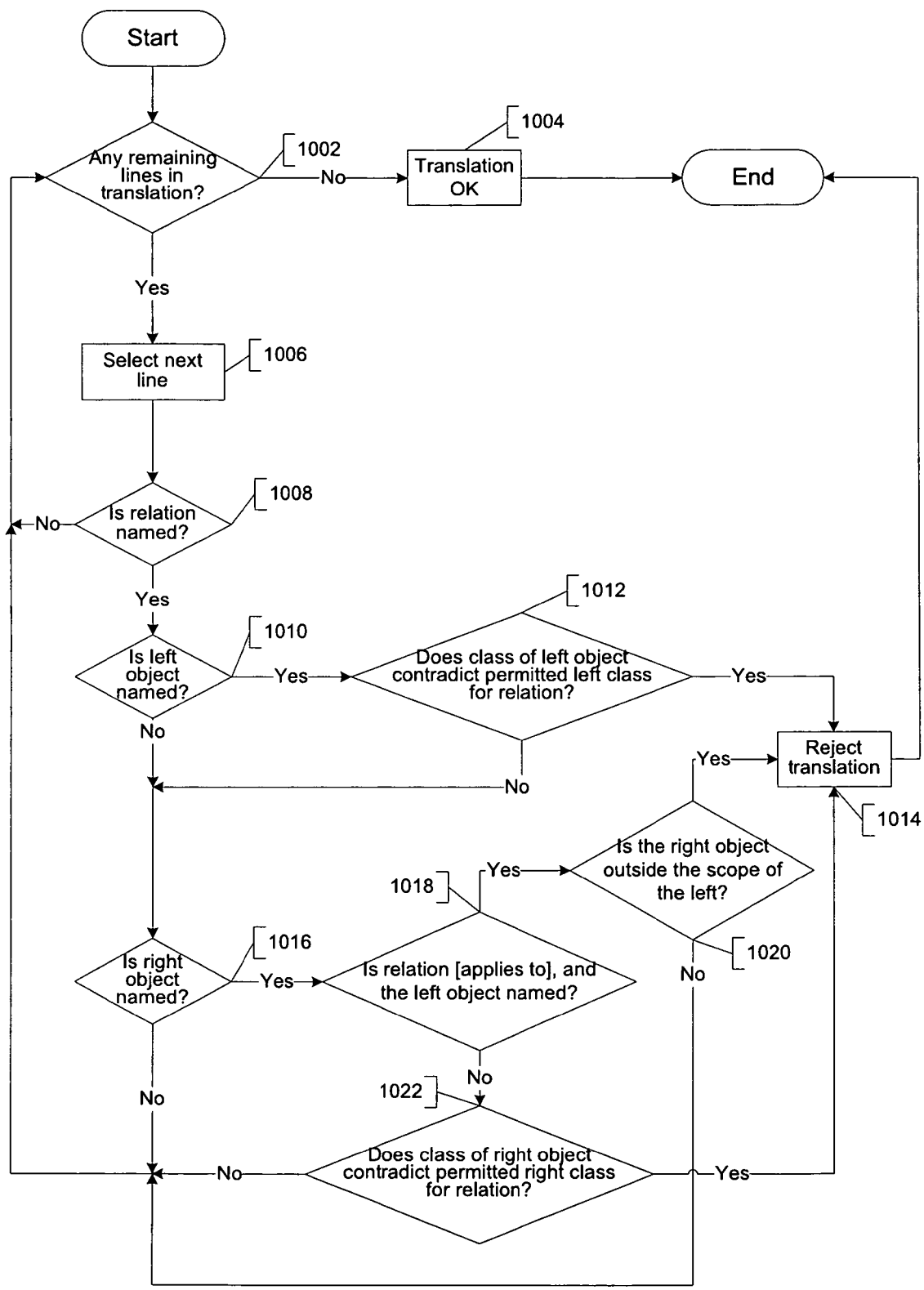
FIG. 10 shows a method for eliminating improbable candidate translations using semantic constraint knowledge.

FIG. 10 shows a process of testing a single translation to see whether it can be rejected. Step 1002 sees whether there are any remaining lines in the current translation that have not yet been tested. If not, the translation is declared OK (step 1004) and the process ends.

If there are remaining lines, the next unchecked line is selected (step 1006) and a check is made to see whether the relation in the line is a variable or a known object (step 1008). If it is a variable, control is passed back to step 1002, otherwise a check is made to see whether the left object is named (step 1010). If yes, the knowledge base is consulted to see whether the allowed classes of the relation determined by [is the left class of] facts contradict the actual class of the left object (step 1012). If they do the translation is rejected (step 1014) and the process ends. If the information is not there, or if the class is OK, control passes to step 1016 where a check is made to see if the right object is named. If the right object is named a check is made to see whether the query line is a test of an attribute against an object (step 1018). If it is, a check is made to see whether the object is outside the scope of the attribute (step 1020) and the query is rejected if so. If it isn't a check is made on the right object against the right class of the relation (step 1022) and again the query is rejected if it fails (1014). If all the checks are passed, control passes back to step 1002.

Figure 11:
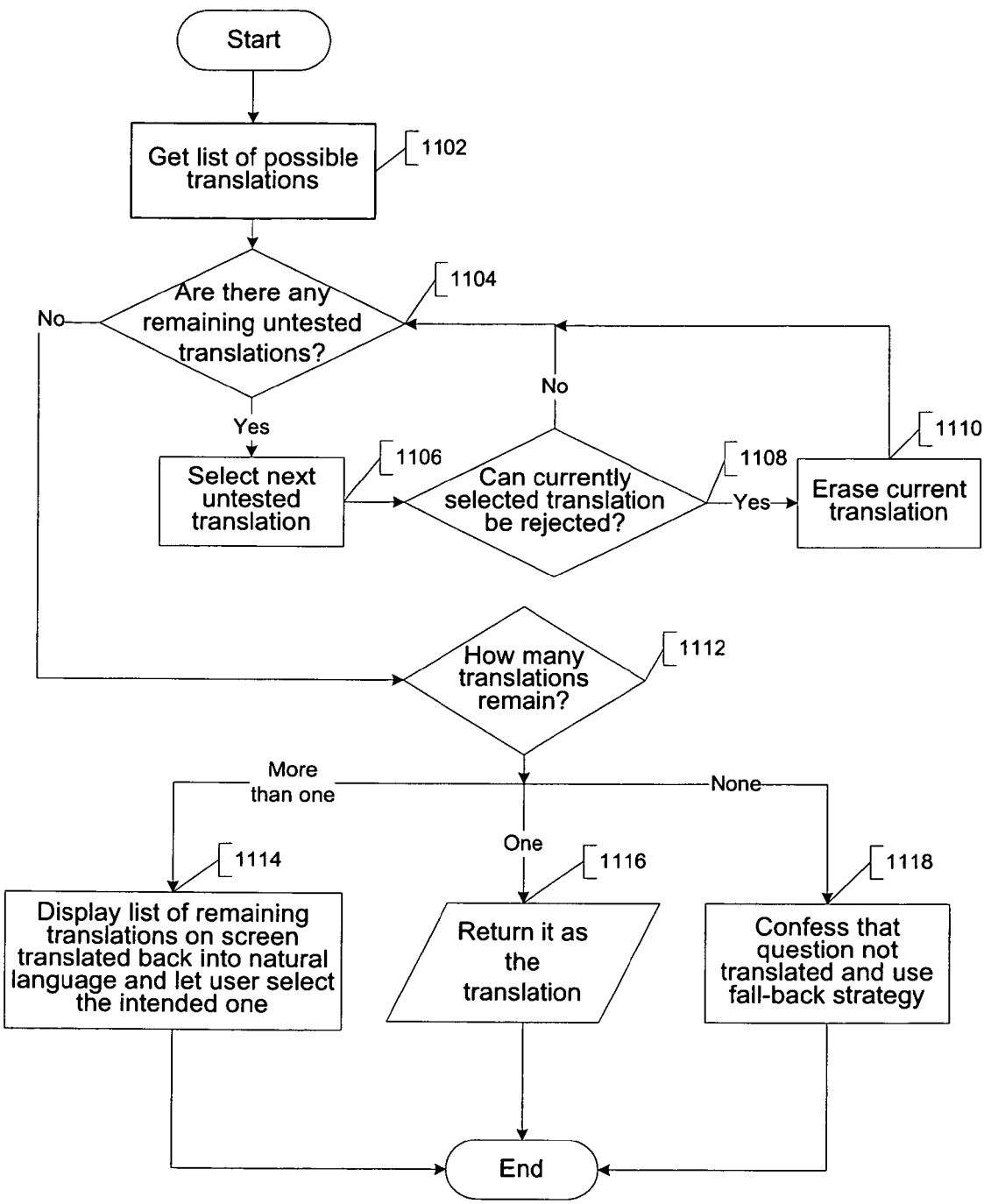
FIG. 11 shows how multiple translation candidates are dealt with more generally.

A process for dealing with the results of translation, including rejecting ones that can be rejected, presenting possibilities on the display, and using a fall-back strategy (see section 5.6.9 below) is illustrated in FIG. 11. Step 1102 obtains a list of possible translations (possibly using the process illustrated in FIG. 9 described above). Step 1104 tests to see whether there are any remaining translations and if there are not it advances to step 1112. If there are, the next one is selected (step 1106), and it is tested to see whether it can be rejected (step 1108). This step perhaps uses the process described in FIG. 10 as explained above. If it can be rejected it is deleted (step 1110) and control returns to step 1104.

Once all the translations have been examined it proceeds to step 1112 which tests to see how many translations remain. If more than one translation remains step 1114 is done and all the remaining translations are displayed on screen, and the user is asked to select the intended one (an example being illustrated in FIG. 12 and described in more detail below). If exactly one translation remains, it is assumed to be correct and presented as the answer (step 1116). If no translations remain, step 1118 is done, in which the system confesses that it was unable to translate the question and uses a fall-back strategy. This fall-back is described in more detail in section 5.6.9 below.

As an example, FIG. 12 illustrates how the question "When was Paris released?" would be dealt with by one embodiment of the present invention.

The system found eight translations for the string "paris" and created queries for seven of them. The one involving the city in France was rejected by the translation template because the initial query asked for the translation to be an [animated visual medium] (but it might also have been rejected later by checks using the semantic constrain knowledge that the left class for [was published at timepoint] has to be an [animated visual medium]). Because more than one possible translation remained, the possible results were translated back into English and presented to the user to select from (screen 1202). The user selected one of them by clicking on the link and the result of that selection is the corresponding query being executed and the result displayed (screen 1204). This is achieved by encoding the query as a string and passing it as a parameter in the URL using HTML GET protocol.

In contrast, with the question "Is Paris the capital of France?" (illustrated in 1206), things are different. Again, many interpretations of the string "paris" are tried and this time the translation template does not reject any of them because it is very general and works for all relations. However, this time all the non-geographical interpretations are rejected by analyzing the queries using the semantic constraint [is the right class] and [is the left class] facts associated with [is the capital of]. Here all queries containing lines similar to:
t: [the 1997 movie Paris] [is the capital of] [france]
are rejected because the engine finds that:
[geographical area] [is the left class of] [is the capital of]
and proves that:
[the 1997 movie Paris]~[is an instance of] [geographical area]

The one remaining query is the one asking whether Paris the city is the capital of France, and this one is not rejected, so the query can run instantly without prompting the user, as only one interpretation remains. As a result the system instantly answers the question and displays the result (screen 1206). This instant response to the question is also step 1116 in FIG. 11.

5.6.7.4 Rare Possibilities

A refinement found in some embodiments is to track the frequency of use of differing objects corresponding to a single denotational string and use this data to suppress very rare interpretations. For example, a contemporary non-famous person named "Abraham Lincoln" would be entitled to have a fact saying that his name can denote him. However, it is very likely that anyone using his name is trying to denote the former US President and being offered a choice every time in such circumstances could cause irritation to users. Avoiding this can be achieved by associating the denotational possibilities (string and object) with each translation used and logging the selection when a user selects from a list of possibilities. When one denotational possibility is noticed to be significantly less commonly used than the others (e.g. if it is the intended selection less than one in a hundred times) the embodiment can choose to suppress it completely or relegate it to a list behind a link (e.g. saying "click here for other less common interpretations").

5.6.7.5 Identical Answers

A further refinement extends this disambiguation strategy further by seeing whether the answers to the various questions are the same before prompting the user to choose between them. If the answers are all the same, the answer is then output instead of asking the user to choose the intended question. With only a relatively small number of possible interpretations a further embodiment may output the answer to each interpretation after each interpretation instead of letting the user select first.

Two questions having the same answer may happen by coincidence when (say) the objects being identified have the same answer. For example, a question asking the nationality of a person where the name entered denotes two different people, need not ask the user which of these two people is meant if they both have the same nationality. Another example is when the question is parsed in two distinct but nevertheless semantically similar ways. For example, the phrase "british city" within a question may be parsed as identifying a specific subclass of cities [british city] or it may be parsed as identifying members of the class [city] with the attribute [british]. Although distinct in terms of semantic representation both questions are the same and will always produce the same answer.

5.6.7.6 Removing Duplicates/Equality Testing

An additional refinement present in some embodiments is to eliminate duplicate queries. Multiple translation templates may produce identical queries from a different way of viewing the translation. To eliminate the duplicates when this happens involves a test for equality.

Testing queries for equality can be done with the following steps:

(1) Sorting the lines of the query into a pre-determined order (unaffected by variable names). This can be achieved by assigning all variable names a fixed value and sorting the lines into alphabetical order.
(2) Normalising variable names. This can simply be done by renaming the variables in the order they appear in the sorted lines taking variable names from a pre-determined list. e.g. v1, v2, v3 etc. A substitution table is maintained so that variables that have already been renamed can have their new name substituted in. The header variables also need looking up and substituting from this table.

Equality is then a matter of testing for:
An identical sequence of lines.
and
The same set of header variables.

Testing equality of FACTLISTs (see below) can also done by the above method but with no variables (i.e. just sorting the facts into order and testing for equality).

5.6.8 Questions with a Premise

Some questions have an implicit assumption in them. Examples include:

"How old was John Smith when he died?" (assumes John Smith is dead)

"How old is John Smith?" (assumes John Smith is alive)

If the assumption (or assumptions) are incorrect, methods can incorporated in some embodiments to produce an elegant answer to the question rather than attempting to answer it anyway.

In order to achieve this, the assumption needs to be represented and tested prior to attempting to answer the question. In some embodiments this can be achieved by including one or more optional "premises" queries in the question template (or elsewhere). If the question template successfully translates the question, the premises queries are executed first. If the query results show that the premise is false a message can be given to the user drawing their attention to this. The message can be a generic message asserting the assumptions are false, a specific message also present in the question template or a message derived from the query.

For example, a translation template may have the following match line:

"how old was" a "when he died"/"when she died"

The header query might be:

```
query p
a [can denote] p
p [is an instance of] [animal]
``` and in embodiments which don't support premises, the result of this query would normally be substituted directly into the translation query even if the entity being asked about was still alive. However, an embodiment that supports premises may have additional fields in the translation template enabling better behaviour. e.g.

```
Premise query:
query
[current time] [applies to] now
f: [dead] [applies to] p
f [applies at timepoint] now
premise message query:
query q
p [uniquely translates as] q
premise message:
q "is not dead"
```

The premise, premise query and premise message are additional components to the translation template and enable this functionality. After successfully completing the translation template header query, the premise query is run. If it succeeds, translation continues as normal. If it fails, the premise message query is run to generate values for the premise message and a premise message is returned enabling the system to respond with an appropriate message.

5.6.9 Natural Language Translation Fall-Back Strategy

If the engine fails to translate the natural language text entered by the user it can do better than simply say "Sorry". In an example embodiment, the program lists all the sub-strings of the question that it has recognised. This information gives feedback to the user about how close the system came to understanding the question and which bits were not understood.

Clicking on any of the strings that were recognised gives a profile screen (see section 5.7) for the string object. The string profile screen includes any objects that are denoted by the string. Clicking on those gives a profile screen for the object. It is possible that a standard profile for a recognised object will answer the question that the user asked even though the question was not fully understood.

Other embodiments, including the preferred embodiment, use web-searching as part of the fall-back strategy (as described in section 5.16).

Other embodiments may provide a link to the method for adding a new translation template (see section 5.10.16). By doing this the user has an opportunity to ensure that his or her question and questions of a similar format can be answered in the future.

5.6.10 Fact Translation to Natural Language

The preferred embodiment can often translate assertions of fact using a method almost identical to the question translation described above in section 5.5.

This is achieved by the creation of an entity called a FACTLIST which looks a lot like a query but with no variables. A FACTLIST is simply a list of assertions of fact.

To translate assertions from natural language the template simply has a FACTLIST as the result of the translation instead of a query.

If a fact generated by the template is transient and there are no temporal partners, the preferred embodiment will then also prompt for when the fact is true.

If the translation produces temporal partners or the fact is permanent or true-now, the system only has to prompt for the source and confirmation.

The use of translation templates to translate both questions and fact assertions means that in the preferred embodiment, facts can be asserted directly from the main prompt on the site.

The ambiguity resolution techniques described above can also apply to FACTLISTs as semantic constraint knowledge applies to facts as well as querylines. A FACTLIST can be looked at as structurally similar to a truth query.

An example translation template for fact assertions is:

```
                a "is" b
                -----
                query attribute, thing
                a [can denote] thing
                b [can denote] attribute
                attribute [is an instance of] [attribute]
                ----
                factlist
                attribute [applies to] thing
```

For more details of adding facts to the knowledge base see section 5.10.10.

5.6.11 Query Translation to Natural Language

The preferred embodiment provides the user with an unambiguous retranslation of their question back into natural language which is done without referencing the original question provided by the user.

As seen above this enables the user to have confidence that their question has been correctly understood. In the case that there are several interpretations of their question, it also enables the user to select the intended one.

As described above this can be achieved by having additional fields in the translation template that provides a query and a template into which the query results are inserted to produce an unambiguous retranslation.

Various other embodiments are also operable to translate a query into natural language if these fields are absent or if the query came from somewhere other than being the output of the translation system.

This can be achieved with a combination of special case queries which have a fixed format translation in combination with a fall-back translation which is used when the query does not match any of the special cases.

For example, many queries are of the form:

```
query
[current time] [applies to] t
f: [<known left object>] [<known relation>] [<known right object>]
f[applies at timepoint] t
``` which can be recognised and translated as:
"Determine whether <unique recognition string of known left object> <unique recognition string of relation> <unique recognition string of right object> at the current time?"

The unique recognition strings can be looked up with a query.

Similar special cases can be generated with either the left object or right object unknown or when the timepoint is specified. When the left and right objects are unknown various embodiments can refine the language by checking the [left unique] and [right unique] properties of the relation. Other common patterns of queries can be translated by similar matching.

The fall-back translation can be used when the query doesn't match any of the checked-for patterns. It may be less natural than a pre-determined translation but can still be understandable. It can be implemented in some embodiments by:

Determining the most specific likely class for each variable in the query. This can be achieved by using the semantic constraint knowledge to determine a class based on the variable's position within a query line and selecting the smaller class if more than one is generated (distinct classes would imply a query that cannot be answered). The class will start as [object] (the root class).

Giving a unique name for each variable based on the derived class, using numerical postfixes if the class name isn't unique ("human being 2" etc.).

Translating each line in turn using the unique recognition strings for each known object and the variable names for each variable. The first time the variable is referenced using language such as "generate values for human being 2 where . . . ". In subsequent lines the language can be of the form "Limit the values for human being 2 by selecting only those which . . . ".

Capturing the meaning of the presence of query variables in the header with additional text mentioning the variables in the query header or giving language corresponding to the meaning of a truth query if there are no header variables.

5.7 Profile Generation

As used herein a "profile" is a collection of user-perceivable information pertaining to a specific object represented within the system. "Profile generation" is the facility for an embodiment of the invention to generate profiles.

In the preferred embodiment the user perceivable information is an information screen delivered as a web page. It is commonly used when users wish to find out general information about an object rather than something specific (where they may choose to type a question instead).

The preferred embodiment also implements its profile generation system by the use of multiple profile templates. Profile templates are data which describe the general form of a profile and, in combination with knowledge extracted from the system, enable the profile generation system to generate a profile for a specific object.

In the preferred embodiment a translation template exists which will translate a single denotational string of an object to a specially formatted query starting "profile:". Queries matching this format are passed to the profile system for rendering instead of to the query answering system, thereby generating an information page. This enables users to see a profile for an object just by typing a denotational string which can denote that object.

So, for example, simply typing "Abraham Lincoln" as a question will result in the translation profile: [abraham lincoln] and the page can be immediately displayed.

The profile generation system of the preferred embodiment includes the ability to generate a profile of an object showing key information about the object in a standard form. Any object within the system can be the subject of a profile, including objects, classes, relations, facts etc.

The information shown about an object, and the format in which it is displayed, is a consequence of the profile template selected and the class the object belongs to: for example, a profile of a human being might include information about their date of birth and occupation, while a profile of a fact might include information about when the fact was asserted and by whom.

Profiles in the preferred embodiment can contain both knowledge from the knowledge base (e.g. Abraham Lincoln's date of birth) and information about the knowledge base (e.g. the history of people endorsing a fact). That is, even if the implementation of the embodiment stores certain system specific information outside the static knowledge base the embodiment can choose to display it in a profile.

The system also allows that the same class of object may have multiple types of profile available for different purposes. These different types of profile may be formatted in different ways, and may also contain different information. For example, the 'employment' profile of a human being might show their current and previous occupations, while the 'family' profile of the same human being may show their parents, spouse and children.

In an alternative embodiment there may be a limit of one profile type per class. This embodiment could still show emphasised profiles in a similar fashion by adding classes to accommodate multiple profiles. For example, the family profile described above could be attached to a [human being with family] class, essentially with the same members as [human being].

In the preferred embodiment, the data about what information is included in a particular profile and how it is formatted is encapsulated in the template.

In the preferred web-based embodiment, profiles are output as HTML for display to the user, but other embodiments may include output of profile information in any perceivable format, even including non-visual formats such as synthesised speech.

FIG. 13 shows an example of the profile system in operation in the preferred embodiment. The object [abraham lincoln] is being profiled through several different profiles.

Screen 1302 shows him being profiled through a special profile designed specifically for members of the class [us president] (current and former Presidents of the United States). This is the narrowest class of which [abraham lincoln] is a member and is the default if nothing else was specified. This screen gives information specific to this class such as the start and end dates of his term of office and his predecessor and successors in the job.

Each profile screen contains a drop-down list of classes of which the object is a member and which have one or more profiles attached to them (1304). In screen 1306 the user has switched the selection from "us president" to "human being" and is now being shown [abraham lincoln] through the default [human being] profile. In this screen US president related knowledge is absent but information common to all humans is shown, including date of birth, place of birth and marital status (the marital status fact is at death for deceased people and the current time for live ones in this embodiment).

Where there is more than one profile available for a particular class, a second drop-down list enables the user to navigate between profiles for a specific class (1308). In screen 1310, the user has selected the "family" profile for [human being] and the system has responded with a screen emphasising Abraham Lincoln's family members.

Finally in screen 1312 the user has selected the profile for the class [physical object] of which [abraham lincoln] is also a member. This screen contains knowledge pertaining to physical objects such as his date of creation (date of birth in his case) and mass. As [physical object] is too high up the class tree to be a principal class, this profile also identifies the principal class of the object being profiled (principal classes are discussed in section 5.3.4.3).

FIG. 14 illustrates how the profile system can also display knowledge stored outside the static knowledge base and how profile screens can be linked together.

Screen 1402 shows a profile screen of a single fact in the static knowledge base. It describes the fact (1403), giving details of any temporal partners (or subject facts) with links, gives access to user assessment (see section 5.10.17) by providing endorse (1404) and contradict (1406) buttons, gives the status of the fact (1408) and provides a button to immediately redo the system assessment (1409) (System assessment is described in section 5.11). It also provides an endorsement/contradiction history of the fact (1410).

Screen 1412 is a standard [human being] profile that could be obtained by clicking on any of the links under [william tunstall-pedoe] in screen 1402.

Screen 1414 is the [human being] profile with the emphasis on their contribution to adding knowledge to the illustrated embodiment. This subcategory of the [human being] template is labelled "worldkb user". It contains statistical information about the number of facts reported, as well as listing recent fact assertions and assessments by this user which can be browsed by clicking on the link to open the relevant corresponding profiles.

5.7.1 System Components

When a user requests a profile for an object, there are two stages to the process:

Determine which profile template to use, based on the object requested by the user together with optional parameters.

Figure 15:
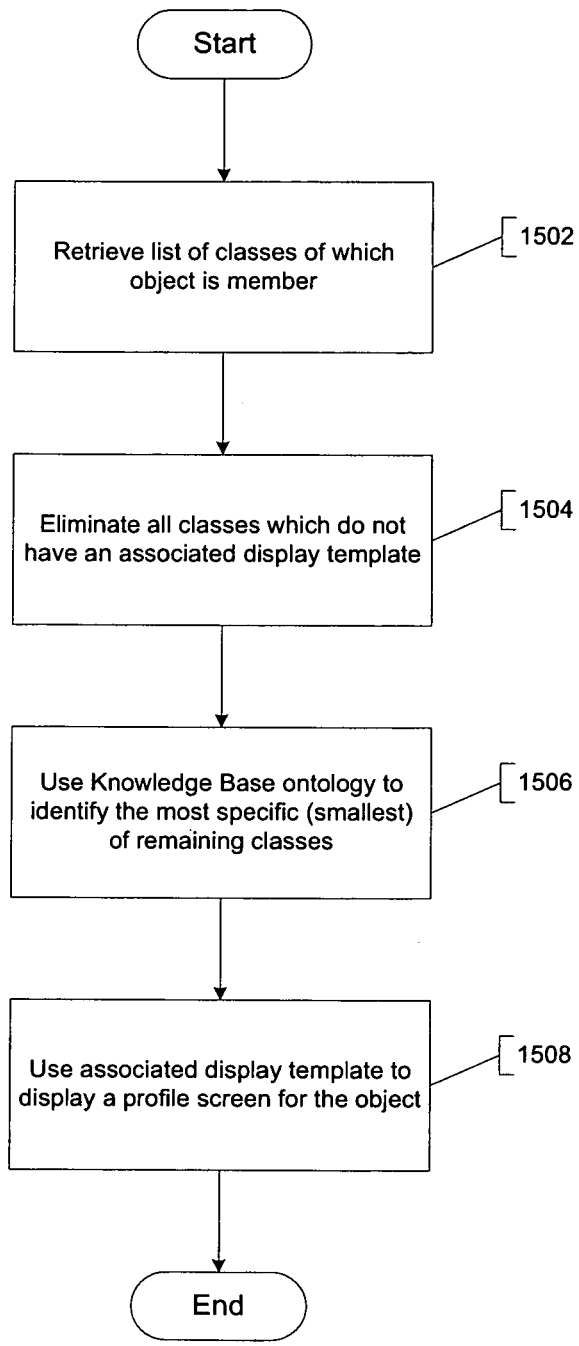
FIG. 15 shows a method for selecting a default profile template for a given object.

Expand the details of the template to produce output for display to the user 5.7.2 Determining which Profile Template to Use In the preferred embodiment, the choice of profile template is a function of a particular class that the object belongs to (called the "profile class") and a string (called the "profile type"), both of which are optionally specified by the user. If one or both of these parameters is unspecified, the behaviour is as follows:

If the profile class is not specified explicitly, the system finds the most specific class to which the object belongs which has a profile template. This is achieved (in the preferred embodiment) with the following steps shown in FIG. 15

Find a list of classes of which the object to be profiled is a member (1502)

Discard any of these classes that do not have a profile template associated with them (1504)

Find the narrowest (most specific) of this set of classes, i.e. a class that doesn't contain any other class in the set (1506)

Typically this process will yield only one result, but if there is more than one the system can prompt the user to choose between these possibilities, or the system can choose automatically based on some deterministic criteria (for example, choosing the most frequently used profile class). Other embodiments may attempt to determine which class has the smallest number of elements.

For example, if the user requests a profile of Abraham Lincoln, and there are profile templates available for the classes [us president], [human being], and [physical object], then the [us president] class will be used since this is the narrowest class in the set.

If the profile type parameter is unspecified, the string "default" is used.

Alternative embodiments may use a procedure for selecting a profile template that can be customised to suit a particular user.

Once a profile template has been selected, the template is expanded to generate a profile screen to display to the user (1508)

When a profile contains transient facts, it may be that the facts in question do not have meaningful values at the current time because the object in question no longer exists. The preferred embodiment deals with this by showing a profile for the last time at which the object existed (e.g. a dead person's date of death). Other embodiments may deal with this in various ways, including prompting the user for a different timepoint to generate data for, displaying a historical view of all values of data over the course of the object's lifetime, only displaying values which are applicable at the current time, or a combination of these techniques.

5.7.3 Expanding the Profile Template

In the preferred embodiment, profile templates are stored as XML documents. The template can intersperse XHTML nodes (which have their ordinary meanings regarding formatting content) with system-defined nodes (which have special behaviour associated with them).

These system-defined nodes can contain arbitrary XML data inside them (including XHTML nodes, other system-defined nodes or character data) and can carry out a variety of operations, including:

Displaying internal content verbatim

Performing processing on the internal content before displaying

Performing conditional execution of internal content

Repeating internal content a (variable) number of times

Querying the knowledge base for information

Querying other data sources (e.g. a SQL database) for information

These nodes can be combined with each other to carry out arbitrarily complex operations.

Figure 16:
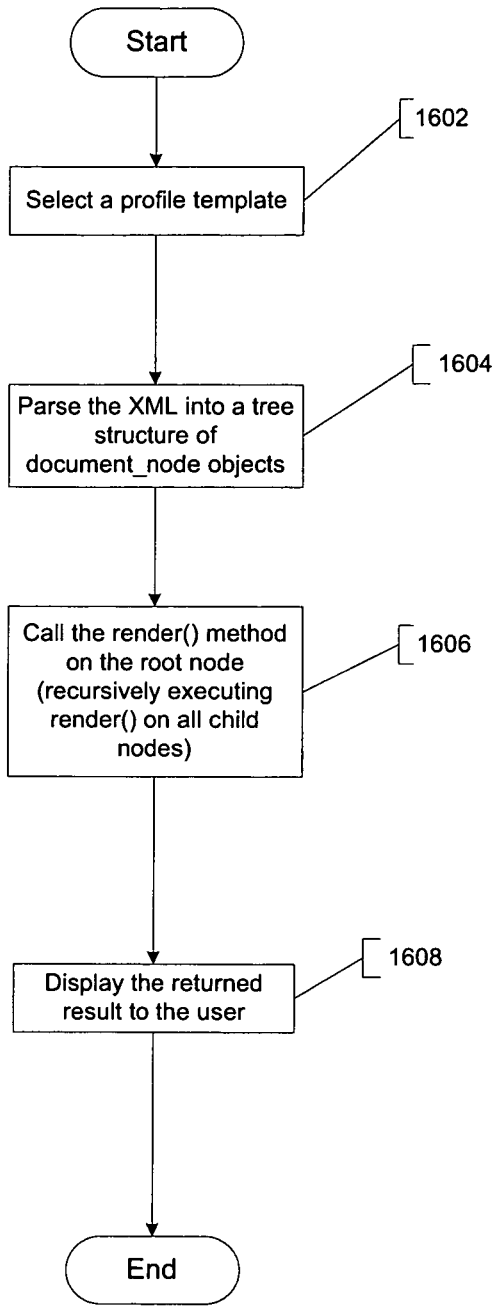
FIG. 16 shows a method for turning a profile template and object into a profile.

FIG. 16 shows the process of expanding the profile template. At the beginning of this process, the profile template is selected as described above (1602).

5.7.3.1 Stage 1: Parsing the Template

Since the template is well-formed XML, it can be parsed by a number of third-party libraries into an abstract syntax tree, which encapsulates the structure contained in the XML (1604). In the preferred embodiment, the output of this parse process is a tree structure where each node is represented by an object. Each node object has an (ordered) array of references to child node objects, and a single reference to a parent object. Each node object can have an arbitrary list of parameters, extracted from the node attributes in the original XML source, which can affect the output of the subsequent processing step.

The preferred embodiment uses an object-oriented model where each node object is an instance of a class document_node, or some subclass. The class document_node provides a method called render( ), which can be overridden by child classes to provide special behaviour for these nodes.

In order to distinguish between XHTML nodes (or other XML nodes with no special behaviour in the context of template expansion) and nodes that require special processing, a namespace prefix is used. For the purposes of this document, the prefix 'tmpl' will be used to identify nodes relevant to the templating system, although any prefix could be used so long as it is consistently applied.

5.7.3.2 Stage 2: Expanding the Template

At this stage processing proceeds through the tree structure in a depth-first recursive manner, at each point executing the render( ) method on the node object (1606). In general, node objects will perform the render( ) method on each of their children in turn, although particular types of node object may override this behaviour.

For a particular node, the results of each of these render functions are combined together (in a way that may depend on the type of the node in question) and returned to the caller. The value returned by the root node of the parse tree is the HTML document to be displayed to the user.

Therefore simply calling the render( ) method on the root node of the tree implicitly causes all the nodes to be rendered recursively, and the result of rendering the root node is the whole rendered document to display to the user (1608).

5.7.3.3 Example Template Expansion

Figure 17:
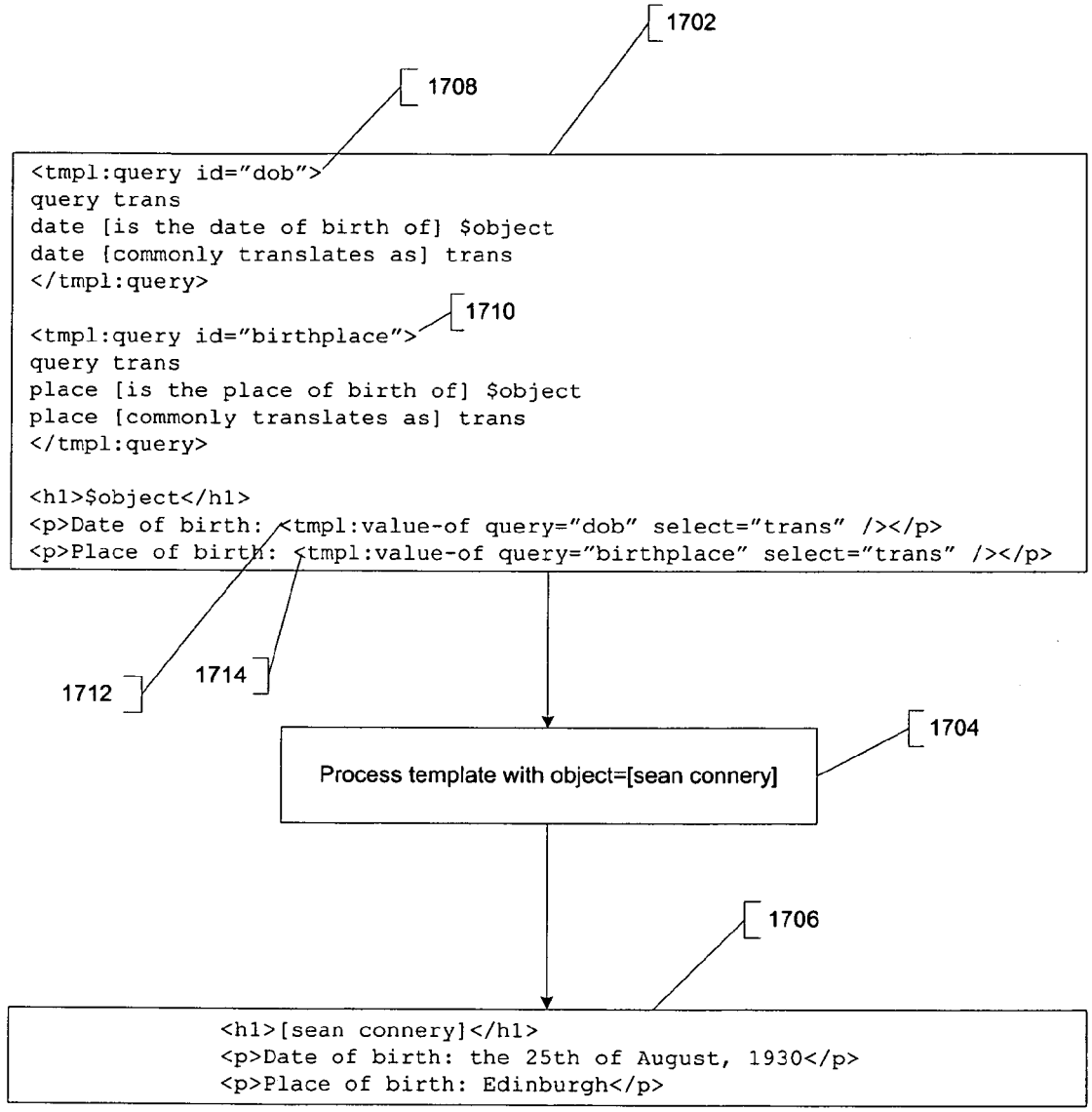
FIG. 17 shows part of a profile template being processed.

FIG. 17 shows an example template expansion. Consider the example template 1702. This includes two query objects (1708 and 1710), which fetch information from the knowledge base. It also includes two value—of nodes (1712 and 1714), which identify places within the mark-up where the results of these queries will be embedded.

If the user requests a profile of an object using this template, the template expansion process is carried out using the specified object (1704). The output will be HTML suitable for displaying to the user, with the corresponding values expanded (1706).

5.7.4 Template Node Class Hierarchy

5.7.4.1 Document_Node

All other document nodes inherit from the document_node class. When parsing the template, all nodes that don't have special behaviour associated with them (including all XHTML nodes) are created as instances of document_node.

On rendering, a document_node object concatenates and returns the following:

An opening XML tag, the name of which is the tag name of the corresponding node in the template Attributes on the XML tag, which are just the attributes taken from the XML node in the template The result of rendering any child nodes that are instances of attribute_node, added as attributes to the attribute list The result of rendering each of the child nodes that are not instances of attribute_node, in order, concatenated together A corresponding closing XML tag Note that if a template were processed that consisted entirely of XHTML nodes, they would all be instantiated as document_node objects, and the result of this rendering process would be isomorphic to the original template document.

5.7.4.2 Character_Data_Node (Extends Document_Node)

The character_data_node represents character data from the XML document. Identifying which parts of the template XML to treat as character data is the job of the XML parser.

Nodes of this type are forbidden to have any child nodes (attempting to add a child node throws an exception). During the parse phase, the character data is copied from the template document.

Within the character data, values prefixed with a '$' symbol indicate special variables, which may be expanded by the profile system to allow information about the environment to be passed in to the profile. In particular, the variable '$object' will be replaced with the ID of the object that is being profiled, which can be used both in knowledge base queries and in text to be displayed to the user. This is seen in FIG. 17 where '$object' is expanded to the string [sean connery] during profile expansion.

On rendering, the content of the character data node is returned to the caller.

5.7.4.3 Query_Node (Extends Document_Node)

A query_node can carry out a query to the knowledge base or to any other source of data (e.g. SQL database) accessible by the system on which the template expansion is executing. A query_node object is instantiated when a tmpl:query node is encountered in the source template.

In the preferred embodiment, this query is conceptually carried out when the query_node is first encountered (though execution can in fact be delayed for optimization purposes).

Alternative embodiments allow the parameters of the query to be varied based on the expansion of other nodes in the document.

5.7.4.4 Iterator_Controlled_Node (Extends Document_Node)

This is an abstract class that is used to provide common behaviour to several other node classes. An iterator is a pointer that runs through values in a result set and executes other nodes for each value. A class that inherits from iterator_controlled_node is one that will vary its behaviour depending on the presence or otherwise of an iterator that can control it.

The iterator_controlled_node class has an abstract method find_controlling_iterator, which implements the logic for searching through the page hierarchy for an iterator that controls the output of this node.

5.7.4.5 Value_of_Node (Extends Iterator_Controlled_Node)

An instance of the value_of node class is generated by a tmpl:value-of node in the source XML. It is forbidden to have any child elements.

When it is encountered, it selects a value from a result set and returns this value as output, without any enclosing XML tags. This node selects only one variable from a result set: this variable is specified by the select attribute. The query from which to select results is specified by the "query" attribute.

The value selected from the result set may be influenced by a controlling iterator. A value_of node will regard another node as a controlling iterator if it satisfies all of the following conditions:

The iterator is in the node hierarchy above the current node

The iterator is selecting from the same query as the current node

The iterator is selecting the same result variable to the current node

If a controlling iterator is found, then the node requests the current value of the select variable for the controlling iterator.

If no controlling iterator is found, the value_of node selects the value of the variable specified in the result set specified. If there is more than one result in the specified result set, then it will take the first result in this set (according to the default ordering of this result set).

5.7.4.6 For_Each_Node (Extends Iterator_Controlled_Node)

The for_each_node object is generated from a tmpl:for—each node in the source XML. It is an iterator that acts on a result set from a query_node object.

In isolation, it will iterate over every value in the result set of the specified query. A variable to select can also be specified, in which case the iterator ranges over distinct values of this variable.

An instance of for_each_node can also itself be controlled by an iterator, allowing for nested loops. A for_each_node will regard another iterator as a controlling iterator if it satisfies the following conditions:

The iterator is in the node hierarchy above the current node

The iterator is selecting from the same query as the current node

The iterator is selecting a different result variable to the current node.

Figure 18:
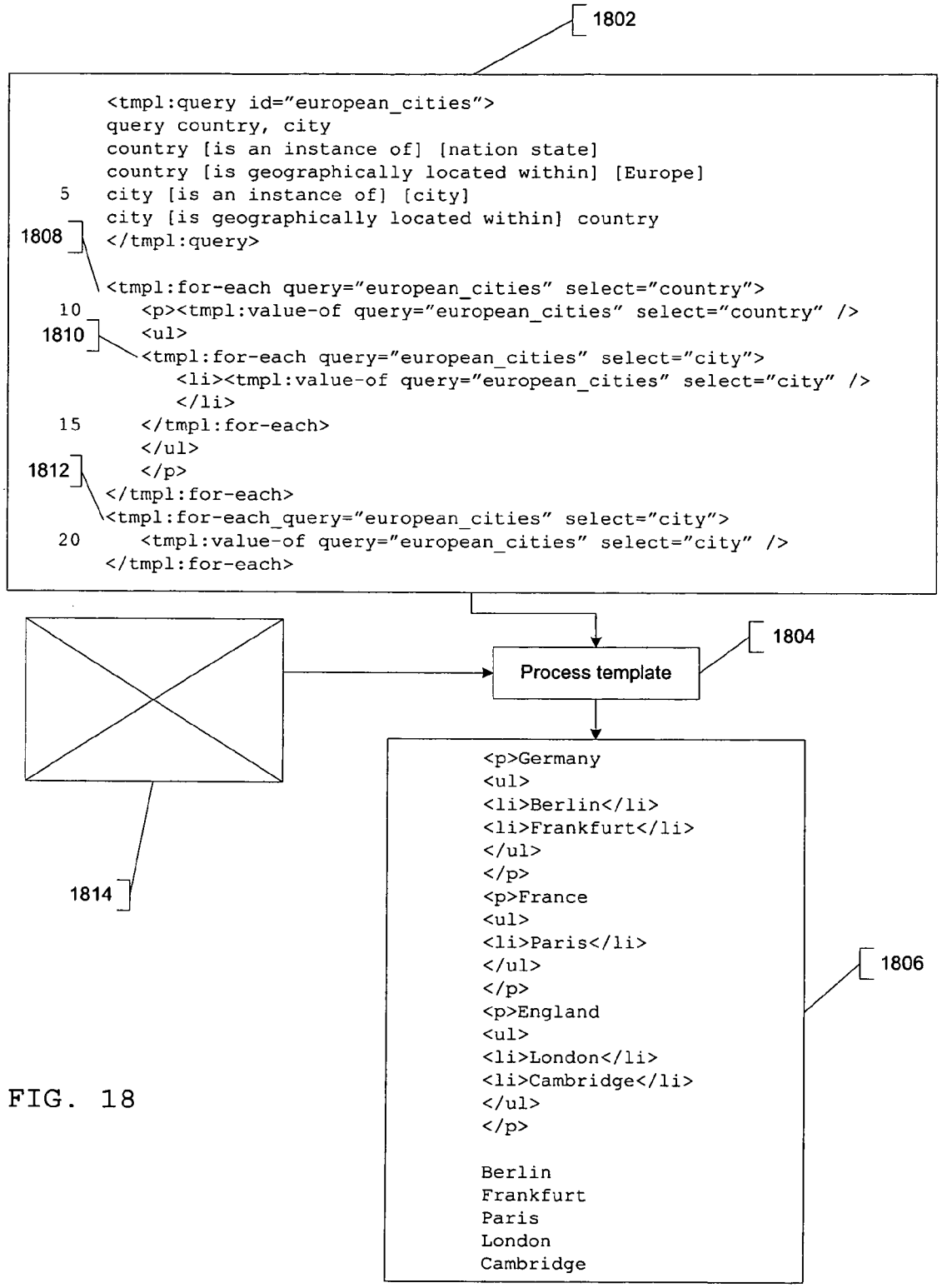
FIG. 18 shows part of a profile template containing iterator nodes being processed.

FIG. 18 shows part of an example template being transformed. Consider the example template 1802. This template is designed to produce a list of European countries and cities within them, formatted as HTML. When the template is processed, it draws from a data set (1804). A sample data set showing a possible result of the "european_cities" query (much reduced, for clarity) is shown at 1814.

For clarity, we shall refer to the for-each node on line 9 (1808) as iterator A, the one on line 12 (1810) as iterator B, and the one on line 19 (1812) as iterator C.

When iterator A is rendered, it searches for a controlling iterator and finds none. Therefore it uses the entire result set, and iterates over distinct values of the variable "country". It renders all its child nodes once for each of these three values.

During the first iteration of processing the children of iterator A, iterator B is encountered. This searches for a controlling iterator, and finds iterator A (note that iterator C is irrelevant, since it is not above it in the hierarchy). The current value of iterator A is 'Germany', so iterator B filters the result set to include only results where Country='Germany'. Iterator B then executes its child nodes for both of these values.

The value—of node on line 13 finds iterator B as its controlling iterator, and displays the current value of this iterator each time it is executed.

After these child nodes have been executed, iterator A then carries out the same process with each of the remaining elements in its result set.

Iterator C has no controlling iterator, so it simply iterates over all distinct values of the "City" variable. The value—of node on line 20 is controlled by iterator C, and displays the corresponding value each time it is executed.

Thus the overall effect of this template with the result set specified is to produce the HTML output shown at 1806.

5.7.4.7 Attribute_Node (Extends Document_Node)

An attribute_node modifies an attribute on the parent node it belongs to. It is generated by a tmpl:attribute node in the template XML.

For example:

```
<img>
  <tmpl:attribute name="src">
  http://
  <tmpl:value-of query="image_query" select="image_url" />
  </tmpl:attribute>
</img>
```

In this construction, the attribute_node first renders all its child nodes and concatenates the result. First, the character_data node corresponding to the string "http://" is rendered, and then the value_of node is rendered (fetching a result from the specified query). These two results are concatenated (to produce a valid URL) and returned to the <img> node. The <img> node sets the resultant URL string as an attribute (with the name "src") on the node when it produces the opening XML tag. Therefore, the output might look like this:
<img src="http://somehost.com/image.jpg"></img>

5.7.4.8 If_Node (Extends Document_Node)

An instance of if_node is created in response to a tmpl:if node in the template source. The if_node allows a condition to be specified. When the if_node is rendered the condition is evaluated, and if it evaluates to true the content of the child nodes is included, otherwise the child nodes are ignored.

5.7.4.9 Choose_Node (Extends Document_Node)

An instance of choose_node is created in response to a tmpl:choose node in the template source. It acts similarly to a switch statement in C, i.e. it conditionally executes one of several branches depending on which condition is satisfied. The choose_node expects its children to be of type when_node or otherwise_node, and will execute the first one in the list for which the corresponding condition is satisfied.

5.7.4.10 When_Node (Extends Document_Node)

A when_node has a condition attached to it, which has to evaluate to true in order for the parent choose_node to execute it. The condition attached to a when_node may be an arbitrarily complex Boolean expression, and may include the following types of operations (among others):
fetching results from query_node objects
fetching the number of results in a query_node object
checking whether a query_node object returned true or false
comparing strings or numbers for equality
combining expressions with Boolean AND, OR and NOT 5.7.4.11 Otherwise_Node (Extends Document_Node)

This node is equivalent to a when_node whose condition always evaluates to true. This has the effect that the branch below this node will be executed if and only if none of the previous when_node conditions evaluates to true.

5.7.4.12 Macro_Node (Extends Document_Node)

A macro node defines a section of node tree that can be repeated later on in the document with certain parameter values expanded. The "name" attribute defines a name that will be used to denote a call to the macro later on. The "params" attribute is a comma-separated list of parameters that will be made available when invoking the macro later on.

Once the macro has been defined, it can be invoked by a node <tmpl:macro-name param1="value1" param2="value2">, which will be replaced in the parse tree by a copy of the nodes within the original macro node, with all variables replaced by their specified values.

5.8 "Answerlets"

As we have seen above, methods are described which enable the answering of natural language questions with Yes, No or a list of one or more entities.

Although entities can be text, this section explains how those various systems and methods can be enhanced to extend the class of questions they can answer to longer answers including the answers to (for example) "how" and "why" questions. This capability is in the preferred embodiment.

As used herein, an "answerlet" is a bit of natural language text—generally (but not necessarily) intended to be small, that is designed to give a high quality response to human questions (e.g. questions typed into a web page in a web embodiment).

In various embodiments these answerlets can be created or edited by users of the system—e.g. internet users creating them via a web interface.

These items of text can be stored and knowledge about them can be used to decide when they should be displayed.

For example, the question:
Why does John Smith live in Cambridge?
can be answered by answering the query equivalent to the question:
Does John Smith live in Cambridge?
and if "yes", examining the static facts turned up by the concise explanation (see section 5.5.3.2). If one or more of these has an answerlet which is labelled as being an explanation for the fact, it is an appropriate thing to display in response to the original "why" question.

For example, in this case the answerlet could be
"[john smith 55] was a student at [cambridge university] from October 1988. After graduating he remained in [cambridge uk] as he liked the city and no work or other commitments forced him to move."
which is identified as [answerlet ["573"]] (the answerlet itself can be stored in a separate table or in the filesystem)

Additionally, a fact exists which is of the form:
[answerlet: ["573"]] [is an explanation for] [fact.1146324@knowledge.com]
which links the answerlet to the fact as an explanation.

[fact.1146324@trueknowledge.com] is the fact that asserts that John Smith is resident in Cambridge.

The example answerlet above uses IDs within the text. This is an optional enhancement present in some embodiments. These can be substituted for the common translations and linked to profiles.

With this embodiment, inference is fully exploited. For example, if the question was "Why does John Smith live in the UK?" this answerlet would be printed as well, as the fact would still be included in the concise explanation list.

5.8.1 Multiple Language Answerlets

Additionally multiple languages can be supported by associating a language with each answerlet and linking answerlets together as translations of each other.
e.g.
[written english] [is the language of] [answerlet: ["573"]]
[written french] [is the language of] [answerlet: ["1178"]]
[answerlet: ["573"]] [is an accurate translation of] [answerlet: ["1178"]]

In embodiments where the knowledge about the user's language skills was present, these can be incorporated into the process of selecting an appropriate answerlet for display.

For example, if a known bilingual French and English speaker were to ask a question for which only an answerlet was available in English, the English answerlet could be displayed as it was known that the user could understand it.

In this situation the user could be asked if they would like to write a translation of the answerlet which would then go in the knowledge base as well.

Other bilingual users could post endorsements that one answerlet is a sound translation of another.

Assertions that one answerlet is a sound translation of another are facts and can be handled using user assessment in a similar fashion to the methods described in section 5.10.17

5.8.2 Changes to Answerlets

In the preferred embodiment answerlets are fixed and changes are classed into at least two classes.

These classes are (a) minor—where the changes do not change the meaning or content of the answerlet (e.g. grammar and spelling improvements) and (b) changes where material has been added or meaning changed.

In case (a) the new version of the answerlet is associated with the old version with an appropriate relation and facts about the new version are inferred from the old version as still applying. Translations of the first version are still considered translations of the second.

In case (b), the modified answer is considered a new answerlet and facts about the old one need to be asserted anew if they still hold. Similarly, translations need to be created again (or modified from a translation of an earlier version).

Which of these two classes the change goes into may originally be asserted by the person making the change. Again the relationships between the two versions of the answerlet would be a fact which can be user-assessed using the methods described in section 5.10.17. Some automatic verification of this could also be done. For example, system assessment in combination with a smart generator would assert that the relationship between two answerlets was major if the number of edits required to transform one to the other exceeded a fixed threshold.

5.8.3 Answerlets as Word Definitions

Answerlets can also be used to answer questions which are not how or why questions. In fact any question where extended natural language in the answer is desirable can be supported with this concept. For example word definitions can be supported with support for answerlets and facts which relate words to them as being a definition.

Various embodiments can support both requests for definitions of words given as a string and as a concept.

For example, the relation [is the dictionary definition of] with right class [object] which will work on both strings, e.g., ["pendulous"], and other objects, e.g., [pendulous]. The relation could be true now (see section 5.3.7 for an explanation of this concept).

Questions like:
define pendulous
pendulous definition
definition of "pendulous"
what does "pendulous" mean
what is a paragraph
can then be supported with question template support as described in section 5.6.6.

5.9 User Authentication

Although querying the system can be done anonymously (e.g. profile screen and answering natural language questions), the preferred embodiment requires the system to know who is using the knowledge base when changes to the knowledge base are asserted (e.g. addition of knowledge or user assessment).

Many schemes already exist for authenticating a user of a computer system many of which should be readily applicable to various embodiments of the present invention.

In most systems where users authenticate themselves, they log on with a local identifier (i.e. a "username") and then type a secret password known only to that user.

One embodiment of the present invention uses a local identifier for users in similar fashion. However, in some embodiments, the real-world identifiers within the system are used. Other embodiments combine both schemes allowing authentication with local user entities and real entities and/or a subsequent step of linking the local entities to a real-world id. The preferred embodiment is to require a user name for knowledge addition but optionally to allow users to link their username with a real [human being] entity as described herein.

Figure 19:
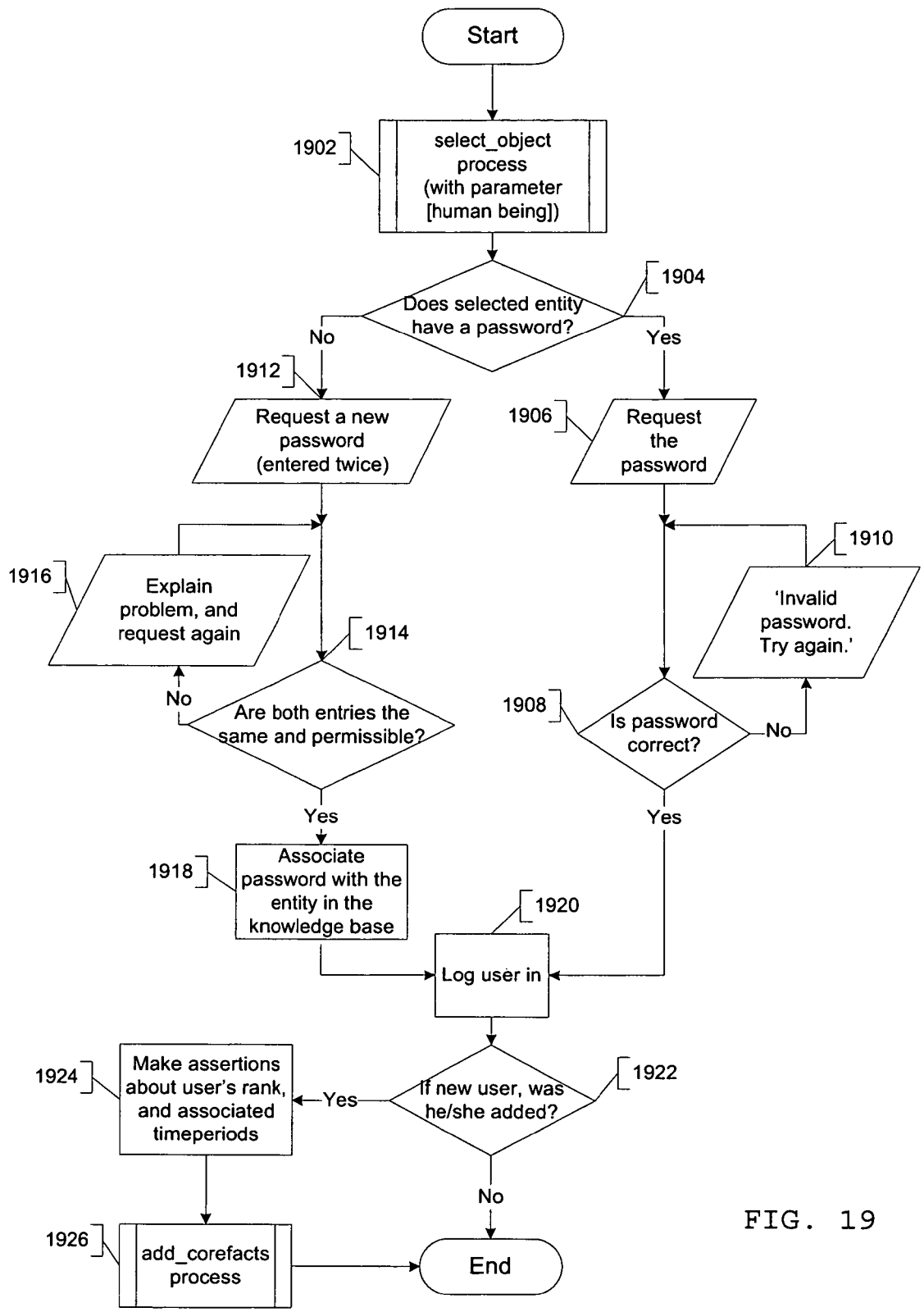
FIG. 19 shows a method of authenticating a user using their real world identity.

The process of authentication in a particular embodiment is illustrated in FIG. 19. In order to log on to the system the user must first assert his/her real name, identifying him/herself in the same way that that any other object is identified (step 1902—the "select_object" process with [human being] as a parameter, described in section 5.10.6). Once the system has identified which entity is meant, the process checks to see whether that entity has an associated password (step 1904). If a password exists, the user then authenticates him/herself with that password (step 1906). The system associates the user's real-world identifier with that session of interaction with the system. The real world identifier is the same one as identifies the person within the knowledge base.

In an example authentication interaction with the system, the system first prompts the user to say who he/she is (step 1902). The user responds by entering his/her name (e.g. "Michael Smith"). The system then looks up this natural language string in the knowledge base ["michael smith"] to see which entities it could denote. If it only denotes one entity, the system moves immediately on to prompting for a password (step 1906). If two or more entities in the system are denoted by this string, the system lists the unique recognition strings for these entities and asks the user to select which entity he/she is (e.g. "Are you (1) Michael James Smith, date of birth 29 Jan. 1969; (2) Michael R. S. Smith, the children's book author"). (See section 5.3.2.1 on unique recognition strings.) This screen also has a link to follow to add a new entity if none of the alternatives are correct (see section 5.10.7.1). In the preferred embodiment, the user can also short-cut any ambiguity by entering the internal object name in square brackets (e.g. [michael james smith 32]). The square brackets show that he/she is entering an internal name and not a natural language name. The password entered by the user is checked for validity (step 1908), and if invalid, another opportunity given to enter the correct password (step 1910).

If the entity trying to log on to the system is not present, he/she is first taken through the process of adding him/herself as an object to the system using the normal object addition sequence of screens/prompts (see section 5.10.7.1). In the preferred embodiment this is the one situation where an unauthenticated user entity is allowed to add knowledge. The knowledge asserted is labelled as coming from the entity added. After adding him/herself to the system, a password is prompted for (twice to guard against the possibility of mistyping) to be associated with this entity and used for authentication in the future (step 1912). The password entered by the user should be checked for suitability (step 1914), and if unsuitable an opportunity given to enter a better password (step 1916). The password created by the user is then associated with the entity in the knowledge base (step 1918).

Once the password has been entered, the user entity can be logged in (step 1920). A check is then performed to see whether or not the user is a new addition to the knowledge base (step 1922). If the entity had to be added as a new object, his/her user rank and the time when he/she became a user of the knowledge base are asserted (step 1924). (Embodiments without a system of user ranks would omit this last step.) It is useful to request core facts about a new user at this stage (step 1926—the "add_corefacts" process, described in section 5.10.11.1). In an alternative embodiment these core facts could be gathered during the process of adding the entity as a new object.

When the entity denoted exists but no authentication information is present we have a situation where the entity has perhaps been added by someone else. The user must then "claim" that entity as him/herself. After warnings about the consequences of fraud, the system will prompt for a password to be used in the future (step 1912). To limit the damage from an impostor impersonating an individual in the knowledge base, further checks would be undertaken in the preferred embodiment such as contacting that individual independently and/or using the true-identity establishment techniques described below.

5.9.1 True-Identity Establishment

As used herein "true-identity establishment" is the system/methods used to prove that the real-world identity being asserted by a user as corresponding to him or herself truly is him or herself.

True-identity establishment is used to limit the possibility of people impersonating people whom they are not and is used in various embodiments incorporating real identity user authentication.

In various embodiments users can be given a temporary id when they first interact with the system and that temporary id is linked to their claimed identity. In this way, more than one user could potentially be linked with a real identity until the methods described herein allow one of them to win out. This method also enables facts labelled with the temporary id of someone who is later established to not be who they are claiming, to be suppressed or to have a low weight associated with their user assessments.

The following methods are used individually or in various combinations of these or other techniques in various embodiments. Each of these methods provides evidence that the user is not impersonating someone whom they are not. Various ways of combining this evidence into an overall belief are possible. In the preferred embodiment each item of evidence is given a score corresponding to an estimate of the quality of the evidence and the user is labelled "true identity establishment proven" once a total score threshold has been reached. Other embodiments could use a probability based approach where each item of evidence is incorporated into a probability calculation giving an estimate of the chances they are truly who they say they are.

5.9.1.1 Linking to Documentary Id

The first method is to allow people to validate themselves using a real-world documentary id. The system can present the user with a form containing a unique code number which is proof that they have logged on and invite them to mail the form with a copy of a real-world id such a driver's license or passport belonging to the person they are asserting they are. The combination of the id document together with the code number would be evidence that the user possessed the document sent in and thus was who they asserted they were.

5.9.1.2 Witnessing of System Use by Trusted User

An alternative method is to allow users to assert that they have witnessed another user, whose real world identity they can vouch for, log in to the system as that user. This assertion would then tie the trust of the second user to the first. If the user validating the second user was trusted or verified with other methods this would be strong evidence that the second user was who they were asserting.

5.9.1.3 Linking to Email Address and Linking Email Address to Real-World Identity Another source of information which can be used to prevent individuals falsely claiming to be another person is by use of email addresses.

Proving that a user has access to an email address can be achieved by sending a coded link in response to a command by them when logged into the embodiment. The coded link is sent to the address asserted as belonging to the user entity and the email asks for it to be clicked if they did try to interact with the system and to ignore it otherwise. Once the website receives the click it knows the person interacting with it is likely to have access to the email address they specified. Such a process links the email address to the user. If the email address can also be linked to the real-world entity asserted, a link between the person claiming to be that entity and the entity itself can thus be proved.

This second link can be achieved in a variety of ways.

First, another user can authenticate themselves on the system and then make a representation that they have communicated with the real world entity using the named email address. Real people often have long-term email interactions with many other people. If one of them had established their true identity within the embodiment and established a level of trust, an assertion by them that this email address is linked to this real-world identity would be strong evidence that the user is who they say they are.

Secondly, the domain on which the email address is based may belong to the entity or another entity closely associated with the entity. For example, the domain may house a website which is recognised as the official website of the person or their employer. Representations by trusted users that this is the case can also be used to infer the link between the real world person and their email address.

5.9.2 Non-Human Real-World IDs

Most commonly, real-world identifiers linked to users will denote human beings—i.e. the actual person who is logging in. However, other entities which are considered capable of asserting knowledge can also be supported by various embodiments. For example, an identifier which denotes a business can also be used. The business would be responsible for limiting the authentication method (e.g. knowledge of the password) to people to whom it grants the right to represent the business in asserting knowledge. Within the invention, knowledge so asserted would be labelled as being asserted by the business. The methods described herein for true-identity establishment can be extended to non-human identities in similar fashion.

5.9.3 Tailoring the System to the User

By authenticating users, various aspects and behaviour of the embodiment can be tailored to the user's preferences. Examples include:

5.9.3.1 Local Denotational Strings

By knowing who the user is, certain denotational strings can be translated appropriately. One example of this is that the translation routines can parse words such as "my" and "I" and successfully infer denotational facts relating to the user entity as a result.

5.9.3.2 Privacy Management

A further advantage is in managing the privacy of users. Various embodiments can allow an authenticated user to configure various aspects of what personal knowledge is published for privacy and other reasons. This can be done if that user has authenticated themselves. For example, with instructions from an authenticated user, facts of the form, [email address: [joesmith571@hotmail.com] [is an email address of] [joe smith] could be suppressed or only published to authenticated friends of [joe smith] according to the policies and selections of the user.

5.9.4 Authentication for Third-Party Systems

Once a user has established their real-world identity various embodiments can provide an authentication service to third party systems to prove the real-world identity associated with the user to other systems.

One embodiment could use public key cryptography to allow the user to authenticate themselves and then sign a message with its private key, transmitted to the third party machine which proves this. The signed message can contain data provided by the third party machine relating to this session. The implementation details of various public key systems and methods are widely known and need not be repeated here.

In an alternative embodiment, Needham-Schroeder protocol is used with the embodiment acting as the authentication server. The details of Needham-Schroeder protocol have been widely published elsewhere and need not be repeated here.

5.10 Knowledge Addition

Knowledge addition refers to the techniques by which knowledge may be added to the system by users.

As the preferred embodiment is directed towards general internet users adding to the system, there is no guarantee that the knowledge being added is correct or not added maliciously. Furthermore, most of these general internet users will not be technical or familiar with the underlying technology.

The preferred embodiment is designed to enable almost everything needed to make the system produce and display knowledge to be added to by general users including the addition of individual objects, relations, classes and attributes; the assertion of facts; and the addition of profile templates, generators, tools and translation templates.

For object addition and fact assertion the preferred embodiment uses a natural-language based, interrogative approach, interacting with the user by asking natural language questions and obtaining input from the user in response, often in an extended sequence. i.e. The knowledge addition subsystem can be considered in various embodiments as a natural language interrogation system designed to collect real-world knowledge from human users for addition to the static knowledge base in structured form.

According to various embodiments the users are interacting with at least one remote server by feeding input into a local client computer. An interface is provided to the user at the user's computer which transmits data determined by the actions of the user (e.g. entering natural language text, clicking buttons) to the remote server. Prompts and other responses relating to activity at the server computer are presented to the user on the computer screen at the user's location. Despite the possible large geographic distance between the user and the remote server, knowledge addition and other valuable activities involving users are thus facilitated by actions such as providing interfaces and presenting responses which take place locally to the user.

In the preferred web-based embodiment, the interface comprises one or more web pages specified in HTML containing form elements. The web-browser on the local client computer displays the web page containing instructions and form elements and actions by the user result in data being transmitted using HTTP over the internet back to the remote web server.

5.10.1 Capturing Sources of Knowledge

According to various embodiments including the preferred embodiment, the source of all facts in the knowledge base should be published and thus obtained during knowledge addition. This allows other users to judge the veracity of a fact by examining these sources. At a minimum an identity for the user adding the knowledge can be recorded. In some embodiments this also enables automatic assessment to be done on the likely veracity of the fact.

In the preferred embodiment there are two types of source for a fact asserted by a user entity. The first category of source is the user entity him/her/itself. In this case, when interacting with the system, the user asserts that the knowledge asserted is known to be true directly by the user (from the user's own experience). An example of this would be something the user has seen. In this case the user is the direct source of the knowledge. Other valid reasons would be for facts which are true by definition. Various embodiments could also enable a user to label themselves as the source when there are numerous independent sources, they are certain and they are happy to take responsibility for the fact being true. The second category is where the user asserts that the knowledge comes from another named source. An example could be a fact asserted by a book or a website or something communicated to the user by another person. In this case the user is representing that the named source of the fact is the entity described and this entity is the direct source of the knowledge. Obtaining this information is a matter of prompting for it during the user's interaction with the system when the knowledge is being asserted. A second source can be identified (and if necessary added first) in the same way that any other real-world entity is identified. The preferred embodiment also prompts the user for an optional natural language statement of the source of the fact. This string is also stored with the fact and can be used for later assessing of the validity of the fact by editors and/or others.

Where the source is a named web page, the preferred embodiment takes and stores a local copy of the page. This is because a web page stored on an external server can be changed and the source may need to be referred to later. If that source is cited again in a future assertion a comparison can be made to see whether a second snapshot of the page should be stored. In the preferred embodiment it is also legitimate to cite the larger organisation as the source when a web page is used. For example, a fact taken from an online page of the CIA World Factbook could cite the Central Intelligence Agency as the source.

Where it is known that a single source is responsible for all pages below a certain web domain, this source in combination can be inferred automatically in the preferred embodiment. For example, the knowledge base can contain the fact [the cia] [is responsible for content at] [domain name: ["www.cigov"]] which would allow any document copied from that website to have [the cia] automatically assigned as the source. If there is no fact that asserts a source for all pages in the domain, the preferred embodiment asks the user to provide one, giving the user the option to say that there isn't one or that there is one but only for the page cited. If the user asserts a source for that page only, the source and document is associated with the fact. If the user asserts a source for that domain an [is responsible for content at] fact is asserted.

Other embodiments have other categories of source that are more indirect. For example, a user could assert that a book asserts that another document asserts a fact. However, in the preferred embodiment knowledge is limited to either knowledge directly known by the user or asserted by a source directly known to the user. Knowledge sources that are less direct than this are considered too unreliable.

One reason why some embodiments include indirect sources of knowledge is that it enables it to establish confidence at least partly on the number of independent sources of a fact that appear to exist. For example, an embodiment which labelled the source solely as the user asserting the fact could give an incorrectly high degree of confidence if a magazine made an assertion that was then repeated by a large number of independent users who had read that magazine. In this case the probability that the fact is incorrect is the probability that the magazine was incorrect, not the probability that each of the individual users was in error. With an indirect source listed, a high degree of confidence can be inferred from the number of users that the magazine did indeed assert this fact, but the confidence in the fact itself can be assessed on the basis that there was only a single source.

It is helpful to contrast this situation with a fact asserted directly by a large number of users, e.g. the existence of an event witnessed by ten people. In this case, the chance of the fact being correct is the chance that each of these ten people was mistaken or deliberately asserting false information. The chance that this fact is incorrect is therefore substantially less than the situation where each of these ten is reporting a fact asserted by a single unreliable source.

A detailed method for capturing reporter, source and possibly document information in some embodiments is described in section 5.10.13

5.10.2 Publication Protocols

The preferred embodiment uses a number of different protocols to determine when and if additions by users are used widely. Other protocols can be used in alternative embodiments.

These protocols include:

5.10.2.1 Immediate Publication

The "immediate publication" protocol can be used for the addition of new objects, classes and relations and permanent facts to the knowledge base, i.e. the creation of a new id and various core facts about the object added.

Immediate publication is also used for most assertions of facts (see section 5.10.10) though there are exceptions (see section 5.11.2.2)

Knowledge added using this protocol is immediately available to all users of the system. If it should prove to be wrong, user assessment (see section 5.12) enables the knowledge to be rapidly suppressed/removed.

System assessment (see section 5.13) and fact pattern suppression (see section 5.14) additionally help to prevent incorrect or abusive facts from appearing immediately (which would otherwise be dealt with using this protocol).

5.10.2.2 Deferred publication

Facts added using "deferred publication" protocol are not immediately published to any user other than the one who asserted them. i.e. They are not used in the answering of queries initiated by any user other than one labelled as the user who asserted them. However, they are visible to users who specifically request a list of such facts and these users can use user assessment (see section 5.13) to endorse the fact. Once a number of users have endorsed the fact it becomes visible to all users. As a fact asserted a second or more time counts as an endorsement of the original fact, it isn't a requirement that the fact can only be endorsed by users who specifically request such a list.

In various embodiments, this is implemented by endorsements and contradictions contributing to a total score for the fact. The difference between facts published using deferred publication and immediate publication is that with deferred publication, the threshold is high enough that the assertion of the fact by the original user is insufficient for the fact to immediately be made visible.

Deferred publication can be used for certain sensitive facts where an incorrect fact has a reasonable probability of being asserted incorrectly or maliciously and where relying on immediate publication and later suppression by user assessment is insufficient.

The preferred embodiment uses deferred publication in just a few special cases checked for in the system assessment system when summing the endorsements and contradictions generated by user assessment.

These cases include asserting a date of death for someone who has a date of birth within a hundred years of the current time and when the user is not related to the person whose date of death is being asserted (checked for with a query). Another example is the assertion of the end of a marriage (assertion of a timeperiod with an ending timepoint that isn't [iafter] when a timeperiod ending [iafter] is in the kb).

These examples are things which might be asserted maliciously and which, as they can become true at any time, cannot be dealt with easily using system assessment or fact pattern suppression. They are also examples that could cause distress if they were published incorrectly.

5.10.2.3 Editor Approval

Editor (or staff) approval is where a high ranking user must first explicitly approve the item added before it is widely used. In the preferred embodiment it is used for added generators, tools, translation and profile templates.

Facts published under the deferred publication protocol can also be essentially approved by high ranking users as they can also visit the list of such facts and use user assessment to make them appear. Being high ranking users, their user assessment can be configured to result in immediate publication as the contribution to the sum that their endorsement gives can be set to the total above the publication threshold in all cases. The difference between editor approval and deferred publication is that with the "editor approval" protocol, low ranked users cannot contribute in any way to the item being published.

5.10.2.4 Trusted Users

A protocol used in some embodiments is to immediately publish all facts asserted by trusted users.

In the preferred embodiment this will happen with facts otherwise falling under the deferred publication protocol. High ranking users have a lot to lose if they maliciously assert false facts.

5.10.2.5 Asserter Publication

Even if the knowledge is not immediately published, various embodiments can publish the suppressed knowledge to the user who asserted it.

In an embodiment where the underlying knowledge representation system is stored in a SQL database this can be achieved by including a Boolean condition in the WHERE clause where facts are retrieved if the original asserter of the knowledge matches the user making the query (e.g. "select . . . where asserting_user='[john smith 342]' . . . ) Embodiments with a separate user assessments table can do this by linking tables.

In the preferred embodiment this is used for deferred publication of facts and additions of unapproved translation templates, generators and profile templates. Using this technique in these latter cases allows users to upload and test the effects of what they are adding without immediately affecting others.

5.10.3 Documentor Strings

In the preferred embodiment a documentor string may be prompted for during the creation of an object. These are natural language descriptions of precisely what the object is, designed to clearly describe the object to a user so there can be no doubt as to its meaning and correct usage. Documentor strings are particularly useful in describing class, relation, and attribute objects, and consequently a documentor is always requested (though not necessarily required) during the creation of these types of object. Whether or not a documentor string is requested during the creation of other types of object depends on the complexity or abstract nature of the object concerned, and the information about whether or not to request one is held at the level of its principal class.

Unlike translation strings (see section 5.6.2 and 5.6.3 for more details) the purpose of a documentor string is to communicate instructions to a user in natural language, rather than to be used for translation purposes in automatic generations of natural language. Although most physical objects can normally be identified beyond doubt by their unique recognition string, some objects, particularly classes, relations, and attributes, are more abstract and sometimes may not correspond to a concept that the untrained user has come across before. For example, one possible class is that of [animated visual medium]—a class designed to cover all "movie-like" entities including television programs, television adverts, movies and web-based animations. As there is no English term for this class, it needs to be explained carefully in a documentor so that a user of the system can get a detailed description when necessary. For example, it could be:

"This class contains all objects which are pre-recorded displays of moving images, e.g. movies, television adverts, flash animations. Members are not physical objects, i.e. the sequence of images is identified, not the medium on which it may be recorded."

This documentor of a class would typically also be displayed on the profile screen (see section 5.7) describing the class object, i.e. the profile screen for objects of class [class]. It can also be used whenever a user is using the class to add knowledge as an extra check they are using it correctly.

5.10.4 Processes

As used herein the term "process" denotes an interactive, automated method for communication between an embodiment of the invention and a user. Most processes are designed to elicit knowledge from that user.

In the preferred embodiment, this interrogative interaction is achieved with a sequence of web pages containing form elements, natural language prompts and explanations and buttons. The user enters answers into the form elements and selects appropriate buttons based on the prompts. Information entered is then re-presented to the user ideally in a different form for confirmation. The user then has the chance to confirm what they said or to return and try again. Finally the knowledge obtained from the user is added to the static knowledge base increasing the knowledge that is known about.

Moreover, sometimes part of the process may involve another process which in turn may require another process etc. (termed herein as "sub-processes"). For example, when adding a new object to the knowledge base, the user may be prompted for the name of a class to which this object belongs. If the user tries to specify a class which does not yet appear in the system, they may choose to add the class, opening the "add class" process as a sub-process. Once they have finished adding the class, the process for adding the new object needs to continue on from where it left off.

5.10.5 Implementation of Processes

In one embodiment, processes can be implemented simply by coding the sequence of pages using a server-side scripting language and opening a new browser window for each sub-process. The user can then simply close the new browser window when the sub-process is finished and return to the original window, now able to continue.

In the preferred embodiment, the sub-process happens in a continuous sequence of pages, optionally with a single page introducing and terminating the sub-process with simple messages like "We will now begin the process of adding this class" and "thank you for adding this class, we will now return you to where you left off".

In the preferred embodiment all processes are coded using PHP but other server side scripting languages are also suitable. (A great deal of information on implementing web interactions in PHP and other server side scripting languages is described elsewhere and the details need not be repeated here.)

When a user visits the website, an array (the "user workspace") is created. This array is stored in the PHP session to make the data persistent. One of the elements of the user workspace array is another array—the "process stack". User interaction with the system is conceptualised as a series of processes ('select_object', 'add_object', etc.). Ongoing state information for the processes is stored in the process stack with the current process sitting at the top of the stack. Each process is modelled as an array (the "process workspace"), itself stored as an element in the process stack. Processes can be pushed onto the stack and popped from it as required.

In the preferred embodiment, each process has a single controller script. It also has a series of pages (for user interaction) associated with it also written in PHP. For convenience, the files (controller and pages) for each process are stored in a separate directory belonging exclusively to that process. The controller handles which pages are shown to the user and in what order, responds according to the user's inputs, and performs operations such as writing knowledge to the knowledge base. In the preferred embodiment pages do not make changes to process data directly, but may look at process data and do other operations solely for purposes such as determining appropriate wording for questions. This distinction between the relative roles of the controller and page scripts is not strictly necessary in terms of producing an implementation but was found to have some software engineering advantages.

5.10.5.1 Process Initialisation

A process is started by running its controller script. The controller resumes the current session, and stores references to certain elements of the user workspace, including the process stack, in an object (this is a matter of convenience—other embodiments might store a copy of the whole user workspace as an array variable, for example). The controller needs to know whether its process is already in existence as the current process (i.e. the process at the top of the process stack), or whether it needs to push its process onto the top of the stack as a new process. Each process has a name; the name of the current process is stored in the user workspace, and each process stores the name of its parent process (the one below it in the stack) in its own process workspace. If the current process name in the user workspace is the same as the name of the process associated with the controller, then the controller stores a reference to the current process workspace. If the process associated with the controller is different from the current process name stored in the user workspace, then a new process workspace is pushed onto the process stack with its parent process set to the current process name from the user workspace, and the current process name in the user workspace set to the new process name.

Any values to be passed to the controller are copied into the process workspace at this point. Parameters passed up from the parent process and return results from a sub-process are stored as arrays in the user workspace before being copied into the process workspace and unset. Values from the process's own pages are passed to the controller as POST or GET data.

5.10.5.2 Step Control

Navigation through the process is controlled by a series of steps in the controller. For the most part, a step can be thought of as a stage in the process at which the user is asked for an input via a page. Each step has a name, and the process workspace includes an array of the steps visited so far as one of its elements. This array of steps is treated as a stack, with the current step at the top. Advancing to a later step involves pushing a new step name onto the step stack, and running the controller until it finds the block of code corresponding to the step at the top of the stack.

Returning from a page can be made to trigger a step advancement automatically by including the new step value in the data POSTed from the page.

5.10.5.3 Back Button

In the preferred embodiment almost all pages have a back button, enabling the user to go back to the previous page. This is implemented by POSTing a value to the controller, which can be tested near the top of the controller script, and if found to be true, results in the step stack being popped. For this reason it is important that only steps at which the user is shown a page are left in the step stack. (Whenever a step is executed at which no page is shown, the step stack is popped before the next step is pushed onto it.)

If the back button is used on the first page shown by a process, the process itself is popped from the process stack, and the back button value is set as a return value for the parent process. This has the effect of returning the user to the last page shown in the parent process.

5.10.5.4 Sub-Processes

If a step requires that a sub-process be called, an HTTP location header is sent with the path to the sub-process's controller, and the controller script is exited. When the sub-process terminates, the current controller is reloaded, any return results from the sub-process are written into the process workspace, and the script advances to the step it was on when the sub-process was called. (It is necessary to have some way of avoiding an infinite loop in such a step—a flag set before calling the sub-process or a test for a value returned by the sub-process are possible solutions.)

5.10.5.5 Process Termination

When the current process is ready to terminate, any results to be returned are written to an array of return results in the user workspace. Then the name of the current process stored in the user workspace is replaced by the name of the parent process, and the process stack is popped. Finally a header redirect to the controller of the parent process is performed.

If there is no parent process (i.e. if the process being terminated is the only process in the process stack), then a default location should be specified. In the preferred embodiment process termination is handled by a method on the user workspace object, and this method has a return page argument which specifies the page to go to if there is no parent process.

5.10.6 Process for Identifying an Object (Select_Object)

A process that is frequently used by other processes is what is called the select_object process in the preferred embodiment. It enables a user to identify another object of any type. If the object is already in the knowledge base, its id is returned. If not, the user is given an opportunity to add it (using an appropriate sub-process) and then the id of the newly added object is returned.

In the preferred embodiment, all objects must have extensive natural language information recorded about them as they are registered in the knowledge base, including as many denotational strings as possible and a generally appreciated unique recognition string (see section 5.3.2.1). This enables other users to find the object (and thus the identifier); it greatly reduces the risk of a single object in the real world being given two identifiers within the knowledge base, as for this to happen two users would have to have no terms in common for what they were denoting. For example, one internal identifier might be [abraham lincoln]. If the following strings were registered within the knowledge base as denoting this object "abe lincoln", "abraham lincoln", "president lincoln", "president abraham lincoln", etc., for another person to miss this object they would have to list a set which had none of these strings in common. If done properly, this is extremely improbable.

As discussed in section 5.3.1, in the preferred embodiment, the internal identifiers are a natural language phrase and are distinguished from normal language by placing them in square brackets. This enables experienced users to short-cut the object selection process by simply typing the internal identifier in square brackets. The system will then know that the user is directly identifying an object, and (after checking that the identifier exists) can skip the screen where alternatives are listed or the unique recognition string of the object is displayed for confirmation purposes. Other embodiments use different syntax to distinguish between an internal identifier and a natural language string (e.g. the square brackets could be a different character). This also enables objects within the knowledge base to be identified and readily recognised in contexts very different from interactions with the preferred embodiment. For example, a name in square brackets included on a printed business card or paper advertisement can be instantly recognised as an identifier pertaining to the preferred embodiment and users can then enter it in the system for more information, perhaps to obtain a profile screen or within a natural language question. (In the preferred embodiment, such identifiers can appear and be parsed within a natural language question.) A third embodiment can do away with any natural language in the identifier and use an internal identifier for objects (e.g. a unique number). This embodiment would rely on natural language being used to identify the object.

Figure 20:
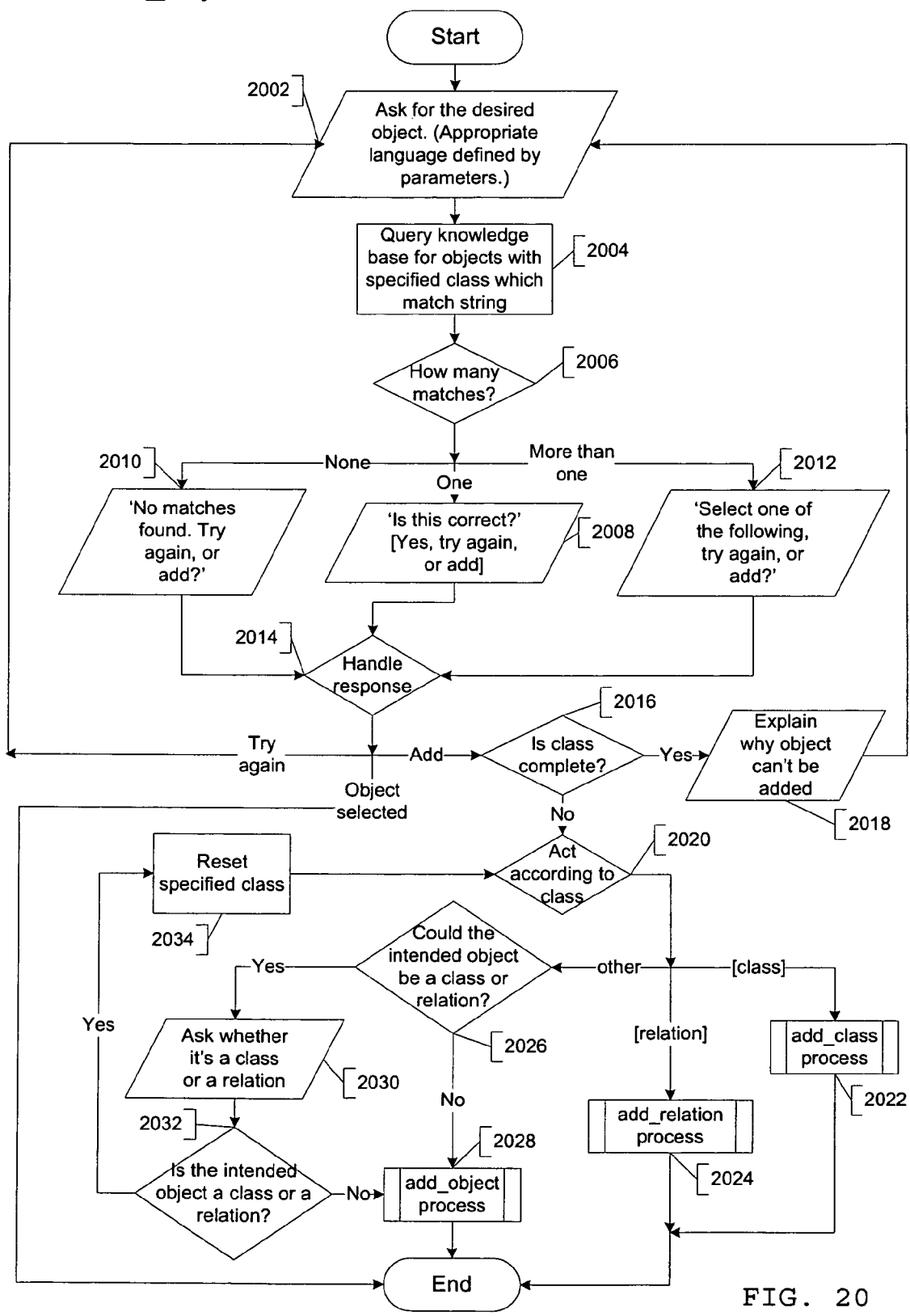
FIG. 20 shows a method of selecting an object.

FIG. 20 illustrates the process of identifying and selecting an object in the preferred embodiment. The process begins by asking the user for the object that he/she wishes to select (step 2002). The user may either enter a natural language string or the object's internal identifier if he/she knows it. A request is then sent to the knowledge base for objects matching the string (step 2004).

Often this process will be initiated at a point when the class of the object to be selected is already known (for instance, in the example of a user asserting that "Paris is the capital of France", the knowledge base would expect the string "France" to represent an object belonging to the class [geographical area]—see section 5.6.7). In such cases only objects with the expected class membership are sought.

Normally matches would be sought across the whole range of denotational strings associated with the set of objects (so that "abe lincoln" entered by the user would bring up a match with [abraham lincoln], as well as any other people known as "Abe Lincoln"). If the string entered by the user had the format of an internal identifier, however, the string would only be compared with internal identifiers within the knowledge base (so that "[abraham lincoln]" entered by the user would only bring up a match with [abraham lincoln], and not any other individual who might be referred to by the same name).

The number of matches found is examined (step 2006), and the user is given options accordingly. If only one match was found, the user is asked to confirm whether or not the matching object is the right one, and given alternative options, if the matching object is not what was sought, of trying again, or adding the desired object (step 2008). If the user entered an internal identifier, and a match was found, then the process omits step 2008, and continues as though confirmation had been given. If no matches were found, the user is given the options of trying again, or adding the desired object (step 2010). If more than one match was found, the user is presented with the unique recognition strings of a list of matches (each linked to their profile) and asked to select the one intended, but is also given the alternative of trying again, or adding the desired object (step 2012).

In one variant of the preferred embodiment an additional check on the number of matches, where more than one was found, would be carried out, and step 2012 would only be entered if the number of matches were below some number judged to be reasonable (otherwise the user would be returned to step 2002 with a notice asking him/her to enter a more specific string).

Step 2014 is a check on the user's response to the options given in step 2008, 2010, or 2012. If the user opted to try again, the process returns to step 2002. If an object was selected, the process terminates, returning that object. If, however, the user opted to add the desired object, a check is made to see whether the object's class is complete (i.e. labelled as having all members already fully identified in the knowledge base). If the class is complete, objects can't be added to it. This is explained to the user (step 2018), and the process returns to step 2002.

If the object can be added, the process must first examine the class of the object being requested (step 2020). If the object is a class, then the "add_class" process is initiated (step 2022—described in section 5.10.7.3). If the object is a relation, then the "add_relation" process is initiated (step 2024—see section 5.10.7.5). If, however, the object is of any other type, a check is made to see whether the object could be a class or a relation, i.e. whether class or relation are subclasses of the class of the object being requested (step 2026), and, if necessary, the user is asked to clarify (step 2030). If the user's response is that the object is a class or a relation (step 2032), then the class is reset accordingly (step 2034), and the process returns to step 2020. If the object is not a class or a relation, then the "add_object" process is initiated (step 2028—see section 5.10.7.1).

5.10.7 Processes for Adding New Objects

One type of knowledge that a user may wish to assert is the existence of an object not already present in the knowledge base. This task may be a goal in itself, or it will come up when the absence of an identifier for an object is discovered during the assertion of other knowledge.

The act of adding a new object includes the creation of an internal identifier for the new object, an assertion of at least one class the object is a member of, the storage of a unique recognition string (or other unique recognition data) for the object and the collection and storage of at least one denotational string for the object. To limit the possibility of adding the same object twice, checks can be made on at least the added denotational strings to see what other objects they denote and the user is asked to confirm (by presenting their unique recognition data) that these pre-existing objects are not the one the user intends to add. When the class of the added object is known, objects being denoted which are in distinct classes need not be presented in various embodiments. For example, when adding a human being, the discovery of a movie sharing a denotational string with the person need not be prompted for as movies and human beings are distinct classes.

Embodiments also seek to collect other useful knowledge about the new object in the process of interacting with the user. In the preferred embodiment, adding new class and relation objects is sufficiently different in terms of the knowledge collected that they are implemented in separate processes. All other objects are handled by the add_object process. The add_core_facts process (section 5.10.11.1) mitigates this somewhat by collecting additional knowledge from the user tailored to the specific class of the object added.

5.10.7.1 Default Process for Adding an Object (Add_Object)

This process is for adding a new object to the knowledge base. This process is used when the object is not a class or relation as these have sufficiently different needs to use different processes (see below). add_object is used for all individual objects, physical or conceptual including attributes.

Figure 21:
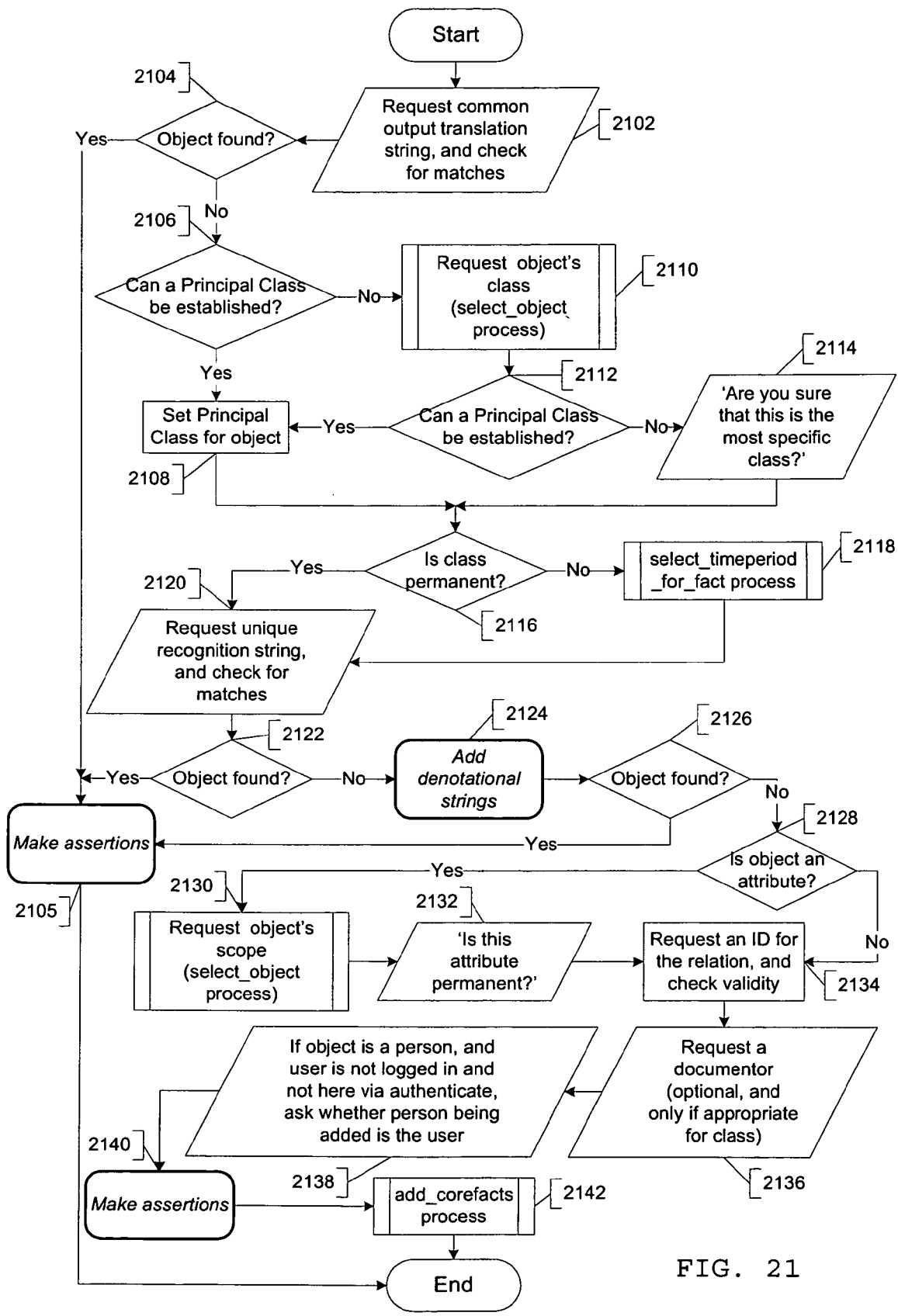
FIG. 21 shows a method of allowing a user to add a new (non class, non relation) object.

FIG. 21 shows the steps involved in adding a new object to the knowledge base. The class for the object is set first (to the root class [object] by default, but can also be set to another class by a calling process. e.g. during authentication, the class can be set to [human being]).

The process begins with the user being asked for the most common term for the object to be added (step 2102)—this will be assigned as the common output translation string. The knowledge base is queried for other instances of the same string within the same class, and if one (or more) is found, the user is presented with the unique recognition string of the corresponding object, and asked to confirm that it is not the one that he/she is in the process of adding. The user's response is tested (step 2104)—if one of the matching objects is the intended one, an assertion is made that the string is the common output translation of that object (step 2105), and the process terminates returning that object.

Next, the process attempts to identify the principal class of the object by consulting the ontology of the knowledge base (step 2106). Whether or not it is able to do this will depend on the circumstances in which the process was called (if the class is the default root class, no principal class will be found, but if the class has been set to [human being] then [human being] will be the principal class). If a principal class can be established, then it is assigned as the principal class for the object (step 2108). If the process cannot find a principal class, then the class of the object may not be specific enough, so the "select_object" process is initiated for the user to identify and select the most specific class for the object (step 2110—described in section 5.10.6). The class returned by "select_object" is then tested to see whether a principal class can be determined from it (step 2112). If a principal class can be determined, then it is assigned as the principal class for the object (2108). If not, then the user is asked to confirm that the selected class really is the most specific possible (step 2114). A change of mind at this point returns the user to the "select_object" process, but otherwise the user is permitted to continue adding the object with no principal class.

The object's class is then tested to see whether or not it is permanent (step 2116), and if it is not then the "select_time-period_for_fact" process is initiated for the user to state the period of time during which the object was a member of the class (step 2118—described in section 5.10.12).

The next step (2120) is to request a unique recognition string for the object. The knowledge base is queried for any other instance of the same string, and in the (unlikely) event that one is found, the user is presented with the corresponding object, and asked to confirm that it is the one that he/she is in the process of adding. The user's response is tested (step 2122)—if the matching object is the intended one, all the knowledge gathered so far is asserted to be true of that object (step 2105), and the process terminates returning that object. If the matching object is not the intended one, the user is returned to step 2120.

The process is now ready to gather a list of terms that could be used to refer to the object being added. These denotational strings are important in avoiding duplication within the knowledge base and to translate as effectively as possible, so as many should be added as the user can think of. The common output translation string and unique recognition string already added can themselves be regarded as denotational strings, and are set accordingly by default. The process then requests additional denotational strings (step 2124—illustrated in detail in FIG. 33 and described in section 5.10.9), which are checked for matches in turn. The addition of denotational strings may be terminated if a match is found and the user confirms that it is the object that he/she wanted to add (step 2126). In this case all the knowledge gathered so far is asserted to be true of that object (step 2105), and the process terminates returning it. Otherwise the user continues adding strings until he/she can think of no more.

If the object is an attribute (determined from its class), two additional pieces of knowledge will be required. First the user is asked to identify the attribute's scope (the most general class of objects to which it can apply) via the "select_object" process (step 2130). Next the user is asked whether or not the attribute is permanent in its application (step 2132). As these are the only two extra items of knowledge required by the preferred embodiment for attributes, there is no special add_attribute process. Other embodiments may have special handling for other classes here or may have additional special processes for objects of a certain type.

It is now desirable to choose an identifier for the object. The system creates a valid identifier from the common output translation string (to be valid an identifier must be unique, must only contain certain characters, and must be within a particular range of lengths). This identifier is presented to the user, who is given the choice of accepting it or creating a different one (step 2134). If the user chooses to create a different identifier, this is checked for validity before the process can continue.

Once a valid identifier has been chosen, if the principal class is one that takes a documentor string, then the user is given the option of adding such a string (step 2136).

If the object being added is a human being, and the user is not already logged in or adding him/herself via the authentication process, then it is necessary to know whether the person being added is, in fact, the user. The user is asked about this, if necessary, at step 2138.

During the course of the process, the assertions to be made are added to an array, either directly from the user's responses, or by inference from those responses. The process is now ready to make these assertions storing the collected knowledge in the knowledge base (step 2140—illustrated in detail in FIG. 32 and described in section 5.10.8).

Figure 36:
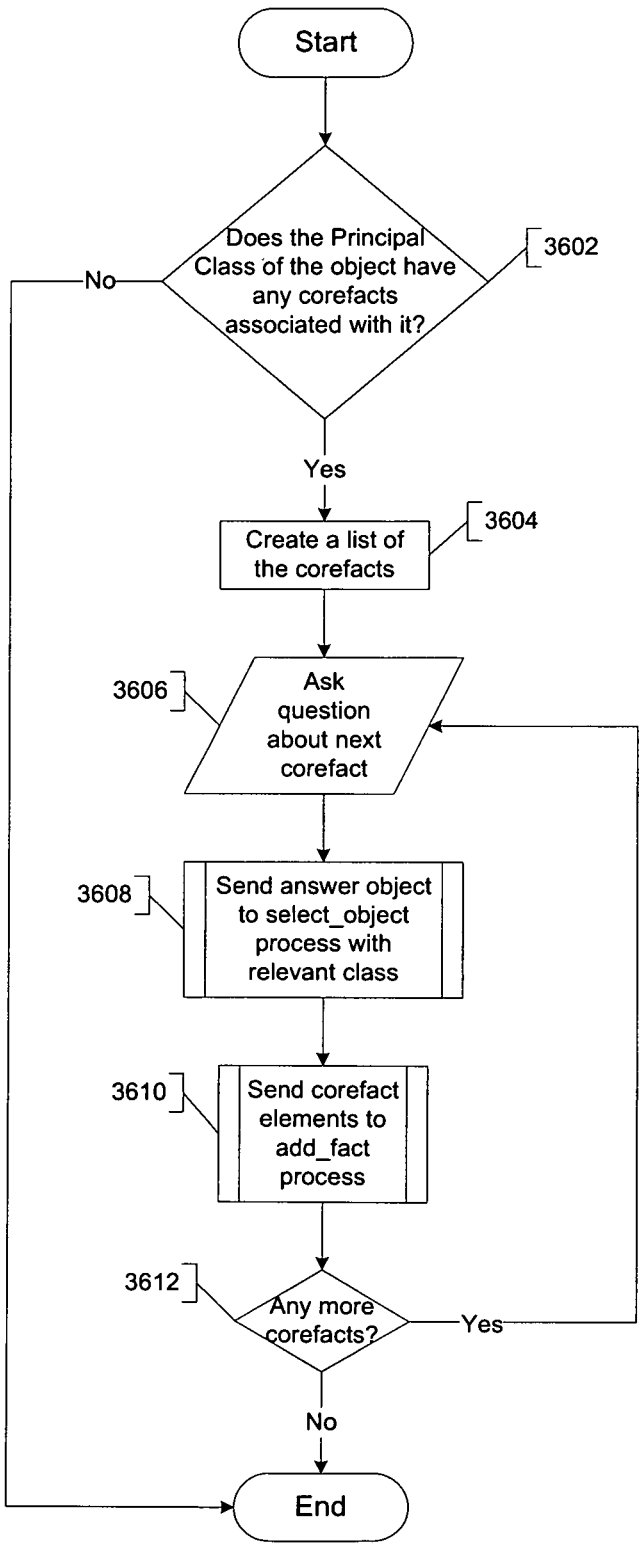
FIG. 36 shows a method for collecting essential facts from a user about a newly added object.

Finally, the "add_corefacts" process can be initiated (step 2142—illustrated in FIG. 36 and described in section 5.10.11.1). In the preferred embodiment step 2142 is omitted if the object added was the user him/herself (in such a case "add_corefacts" is called instead at the end of the authentication process). The process then terminates, returning the new object's identifier.

5.10.7.2 Add_Object Illustration

Figure 22:
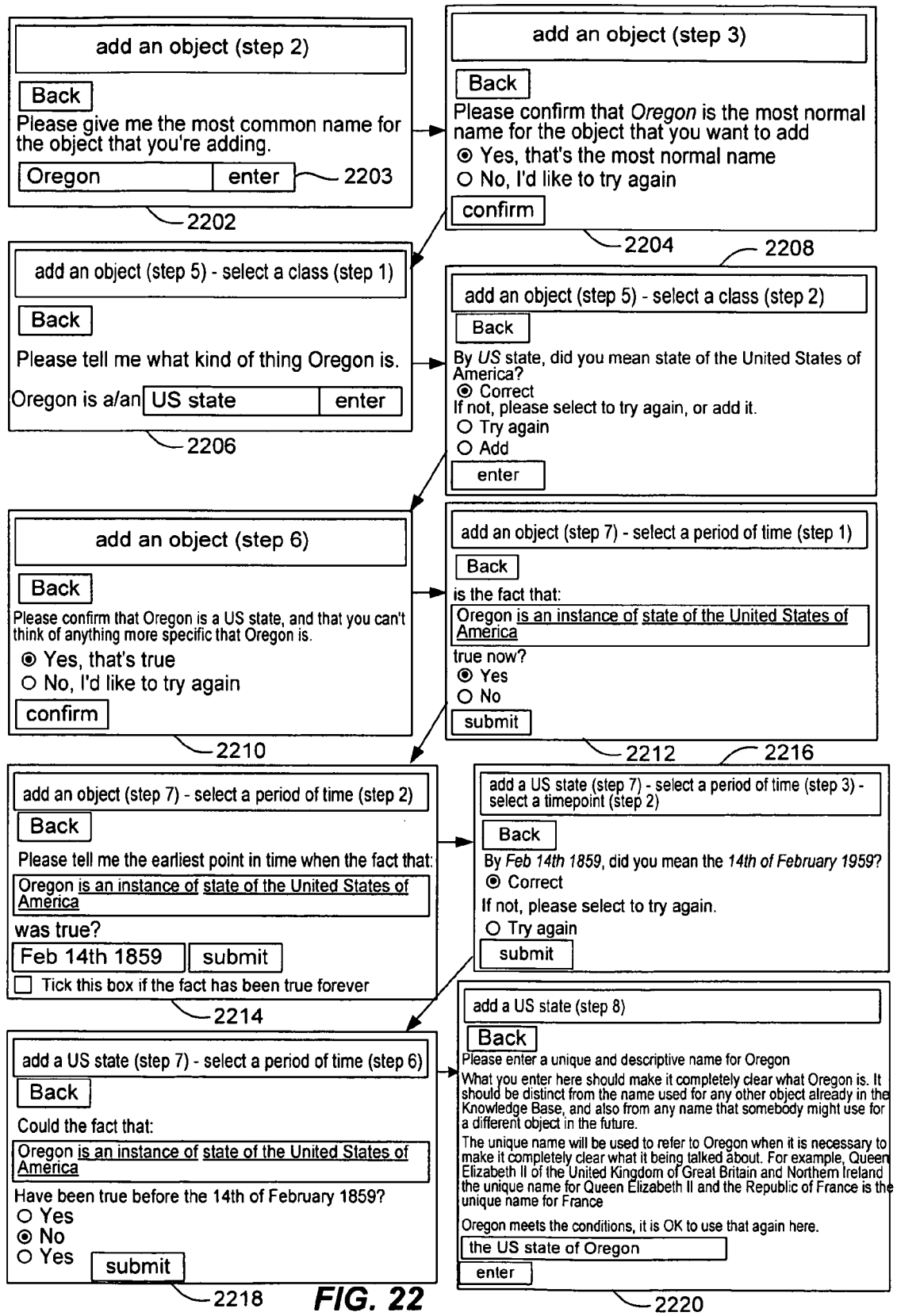
FIG. 22 illustrates an exemplary interaction with a user adding a new object.
Figure 23:
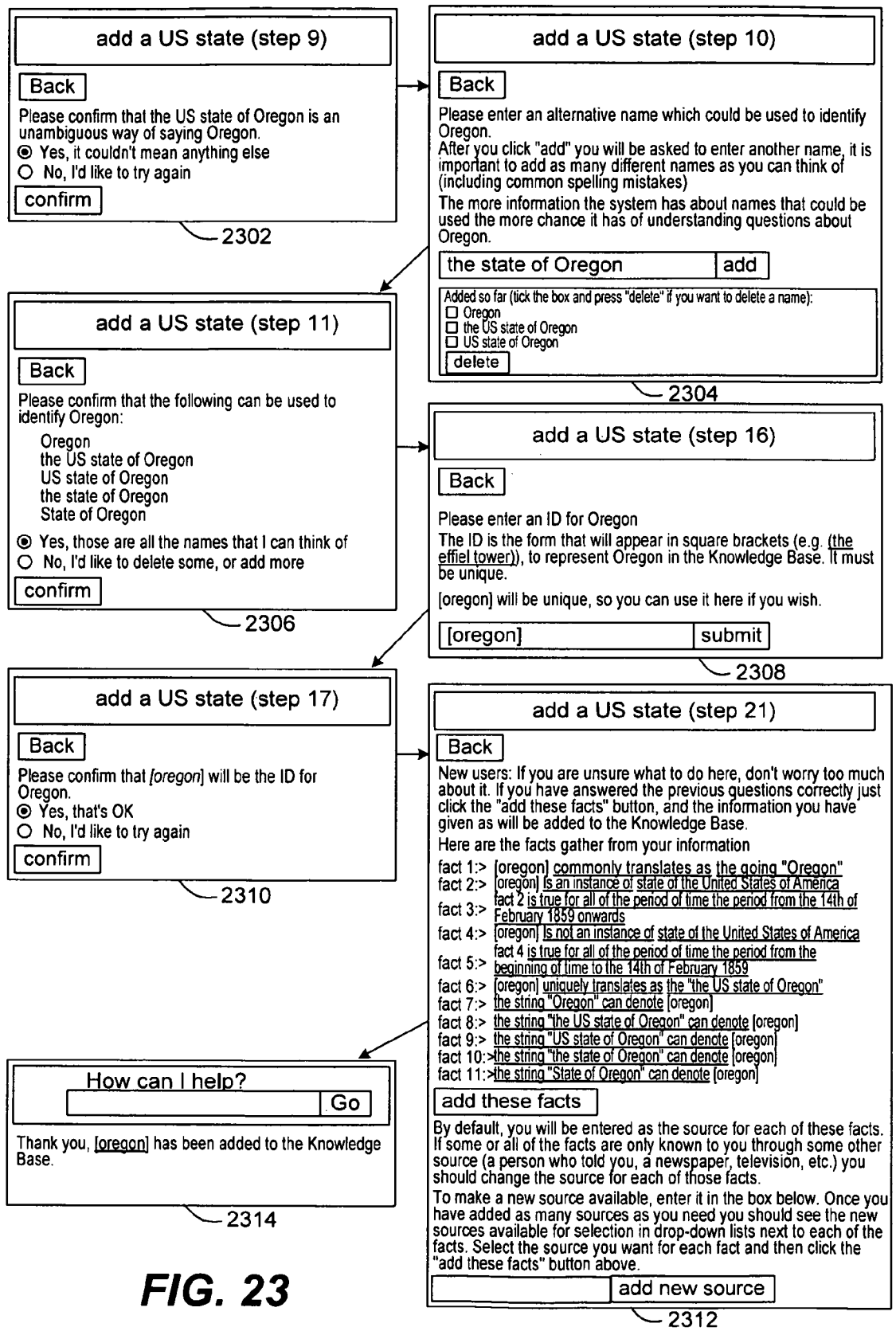
FIG. 23 is a continuation of FIG. 22.

An illustrative session of a user using an implementation of the add_object process to add the US state of Oregon to an embodiment is shown in FIG. 22 and FIG. 23. 2202 shows the initial screen of the add object process where the user is prompted for the most normal name of the object being added (additional instructions and examples are omitted for space reasons). The user enters "Oregon" and proceeds by clicking the "enter" button (2203).

2204 shows the confirmation screen for this step. Confirmation screens act as a double check against incorrectly entered information and allow the user to change their mind and replace what they have entered. A general philosophy of the preferred embodiment is that confirmation screens should ideally re-present the knowledge given by the user in as different way as possible from the way that the knowledge was initially prompted for, to ensure that the user fully understands the significance of the knowledge they are providing.

2206 shows the add_object process prompting for the class of the newly added object. (If a class had been provided when this process was called this step would have been skipped.) The common translation string of the object provided in the first step has now been incorporated into the prompt for the class. The user enters "US state" and clicks the "enter" button. The add_object process then calls the select_object process with the string entered and, as the object being selected is a class, it is also passed [class] as a parameter.

The knowledge base is then consulted with the query:

```
query a
["us state"] [can denote] a
a [is an instance of] [class]
``` which produces one result. select_object presents the one result and asks for confirmation that this is the one intended. If more than one result had been returned (an ambiguous denotational string) the user would have been given the option to select the one intended.

The option to try again or add a new class corresponding to this denotation string is also provided.

Note that if the string provided was an unknown denotational string for an existing class the add_class process would be called but this would probably not result in the addition of the class a second time as the add_class would prompt for as many different denotational strings as the user can think of for the "new" class. Any hits on previously existing classes would be asked about by displaying their unique recognition strings linked to profiles of the pre-existing objects and if the user discovered at this point that the class already existed, they would be given the opportunity to say so and add_class would exit returning the pre-existing class and adding the assertion of this string denoting the class to the knowledge base. In this example for the class of US states to be added twice both the user who initially added the class and the user attempting to add it a second time would have to provide no denotational strings in common for the second user to fail to realise it was already in the knowledge base.

In this exemplary interaction, the user is happy to confirm that the unique recognition string for the class, "state of the United States of America" corresponds to what they were intending to say and the process proceeds to the confirmation screen 2210

In the confirmation screen 2210, the user confirms that they are indeed trying to say that Oregon is a state and the process controller then checks to see whether the class is permanent or temporary with the query:

```
query
[class is permanent] [applies to] [us state]
```

A permanent class is one where its members cannot cease to be members without being considered something fundamentally different. As the current US states were in existence prior to joining the union and could conceivably someday leave the union and still continue to exist, the class [us state] was considered to be a temporary class when first added to the knowledge base. (An alternative ontology could make it permanent and consider the independent version of each state to be a different entity with a different id. In this case, this would also have been a practical approach.)

As the class is temporary the add_object process now calls the select_timeperiod_for_fact process (section 5.10.12) to obtain a period of time for Oregon's membership.

2212 shows the first screen in this process. The user asserts that Oregon is currently a US state.

Control then passes to 2214 where the start point for it being true is prompted for. (If the user had said it wasn't true now, the point when it ceased to be true would also have been requested).

The user enters "Feb. 14, 1859" and the process calls the select_timepoint process with the string which does the following query:

```
query tp
["Feb 14th 1859"] [can denote] tp
tp [is an instance of] [timepoint]
```

This query is answered successfully (utilising a smart generator to convert the string into the internal representation of a timepoint) and control passes to 2216 for confirmation.

The user confirms that the timepoint parsed was what they intended and control then passes to 2218

On screen 2218 the user is prompted to clarify whether the date they entered is actually the point when the relationship started or just the earliest point they know about. The user selects "no" indicating that this was the timepoint when membership began, enabling the process to assert the negative fact for the earlier timeperiod. Control then passes back to the add_object process.

The next screen in the add_object process is 2220. Here the user is prompted for a unique recognition string for Oregon. The user enters "the US state of Oregon". As there is only one US state called Oregon and as everyone wanting to denote Oregon would know it was a US state this is sufficient.

The user confirms their choice on 2302 and control passes to screen 2304

In 2304 the user is prompted to create a list of as many possible denotational strings as possible for Oregon. 2304 continues to go around in a loop adding strings added by the user to the list until the user indicates that that the list is complete by clicking another button (not shown for space reasons). If any of the denotational strings can denote any pre-existing object not in a distinct class, the unique recognition strings of these objects would be shown to the user for confirmation that this is not the object they were intending to add.

The list of denotational strings is presented for confirmation on screen 2306.

On screen 2308 the user is prompted for the id for the newly added object. The common translation string is checked for uniqueness and suggested as a possible id for selection by the user.

2310 asks for confirmation of the id.

2312 is the final confirmation screen. It presents all the facts gathered from the interaction with the user and by default sets the source as the user. If the user wants to communicate another source and/or document at this point they can do so by entering it in the add new source box. Doing so would repaint this screen with a drop-down list next to each fact allowing the user to change the source for one or more of the presented facts.

When the user clicks the "add these facts" button, all the displayed facts are added to the knowledge base, an initial user assessment by the user and source endorsing them is added to the endorsements table and a system assessment is done on each of these newly added facts. If any of the system assessments had resulted in the fact being contradicted, a report would have been displayed. In this case, all the facts were added without issue so the confirmation screen 2314 is displayed.

5.10.7.3 Process for Adding Classes (add_class)

One type of knowledge that a user may wish to assert is the existence of a new class that is not already present within the knowledge base.

The procedure in the preferred embodiment is very similar to the process for adding any other object.

Figure 24:
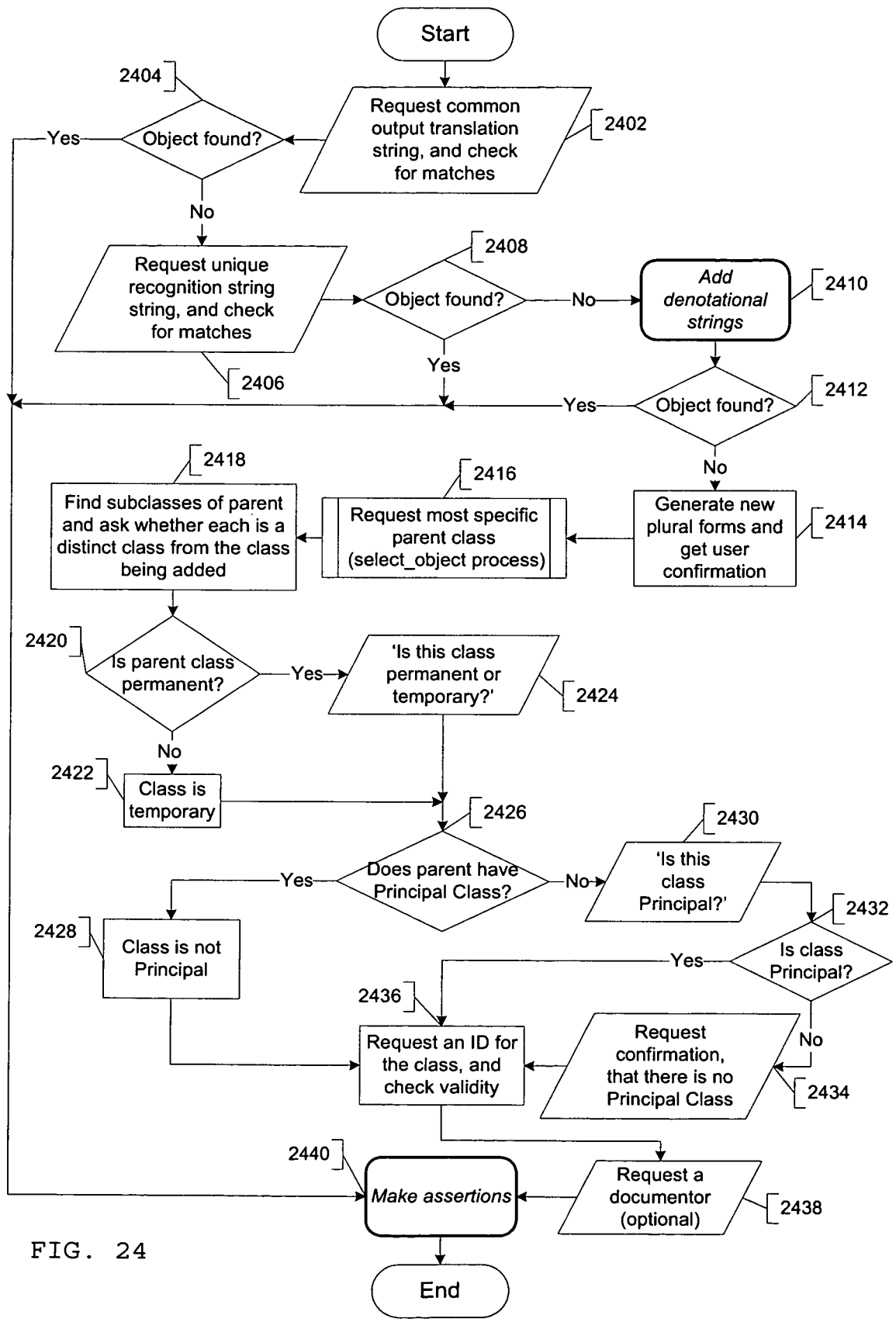
FIG. 24 shows a method of allowing a user to add a new class.

The process used in the preferred embodiment for adding a class object is illustrated in FIG. 24. The process begins with the user being asked for the most common term for the class to be added (step 2402)—this will be assigned as its common output translation string. The knowledge base is queried for other classes denoted by the same string, and if one (or more) is found, the user is presented with that class, and asked to confirm that it is not the one that he/she is in the process of adding. The user's response is tested (step 2404)—if one of the matching classes is the intended one, an assertion is made that the string is the common output translation of that class (step 2440), and the process terminates returning it.

The next step (2406) is to request a unique recognition string for the class. The knowledge base is queried for any other classes denoted by the entered string, and if one is found, the user is presented with its unique recognition string, and asked to confirm that it is not the one that he/she is in the process of adding. The user's response is tested (step 2408)—if the matching class is the intended one, all the knowledge gathered so far (the common output translation string and the unique recognition string) is asserted to be true of that class (step 2440), and the process terminates returning it. If the matching class is not the intended one, the user is returned to step 2406.

The common output translation string and unique recognition string already added can be regarded as denotational strings, and are set as such. The process then requests additional denotational strings for the class (step 2410), using the loop illustrated in FIG. 33 and described in section 5.10.9. The addition of denotational strings may be terminated if a match is found and the user confirms that it is the class that he/she was in the process of adding (step 3312). In this case all the knowledge gathered so far is asserted to be true of that class (step 2440), and the process terminates, returning the matching class. Otherwise the user continues adding strings until he/she can think of no more.

Plural forms are now generated for each of the denotational strings, and these are shown to the user for correction/confirmation (step 2414).

The next step is to establish the position of the class being added within the ontology of the knowledge base. The process initiates the "select_object" process and asks the user to identify and select the most specific parent class for the class being added (2416—described in section 5.10.6). If the parent class has any direct subclasses, the user is asked whether each is distinct from the class being added, or is a partial or full subset of it and this knowledge is recorded for later assertion (step 2418). Two classes are said to be distinct if they cannot have any members in common. For example, the class of conceptual objects is distinct from the class of physical objects and the class of leopards is distinct from the class of trees. If a subclass is a partial subset of the class being added, then that subclass's own direct subclasses are found, and the user is asked the same question of each of them. If a subclass is a full subset of the class being added, then it can be asserted that it is a subclass of the class being added.

Refinements to this step are possible in certain embodiments. To help the user choose the most appropriate parent class or classes, some embodiments take the user through the ontology from a particular starting class (for example, a parent class suggested by the user or even the root [object] class if the user was unable to identify a parent), find the direct subclasses of that class, and ask the user whether any of those classes is a parent of the class being added. The user would then be asked about the subclasses of each class to which he or she had answered 'yes', and this question and answer process would continue until he or she had said 'yes' or 'no' to all the possible classes.

Some embodiments usefully insist in the selection of just one parent class for the class being added, but others can permit the selection of multiple parent classes. For example, in an ontology containing the classes [mammal] and [sea-dwelling animal] a user could legitimately (and usefully) select both as parents when adding the class [whale]. Embodiments which permit the selection of multiple parents during the "add_class" process need to check that none of the selected parents are a distinct class from, or a subclass of, one of the others (it would be pointless to select [mammal] and [whale] as parents of [blue whale], and wrong to select [invertebrate] and [whale]).

The parent class is tested to see whether it is permanent or temporary (step 2420). If the parent class is temporary, then the class being added must also be temporary, so the process can add this fact to its array of assertions to be made (step 2422). If the parent class is permanent, then the user is asked whether or not the class being added is also permanent (step 2424). (In embodiments where there may be more than one parent class, having any temporary class as a parent is sufficient to say that the class to be added is temporary.)

The process next looks to see whether the parent class has a principal class, i.e. is itself labelled as Principal, or is below a class which is so labelled (step 2426). The principal class of a class's parent class will also be the principal class of the class itself. If the parent class has a principal class, then the fact that the class being added is not Principal can be added to the array of assertions to be made (step 2428). If a principal class could not be found for the parent, then the user is asked whether the class that he/she is adding can be asserted to be Principal (step 2430). The user's response is tested (step 2432), and if he/she has said that the class is not Principal, then a warning is given about the apparent inspecificity of the class, and confirmation is requested (step 2434).

The next step is to choose an identifier for the class. The system creates a valid identifier from the common output translation string. This identifier is presented to the user, who is given the choice of accepting it or creating a different one (step 2436). If the user chooses to create a different identifier, this is checked for validity before the process can continue.

Once a valid identifier has been chosen, the user is presented with a page (step 2438) requesting a documentor string (the user has the option to leave this empty).

Figure 32:
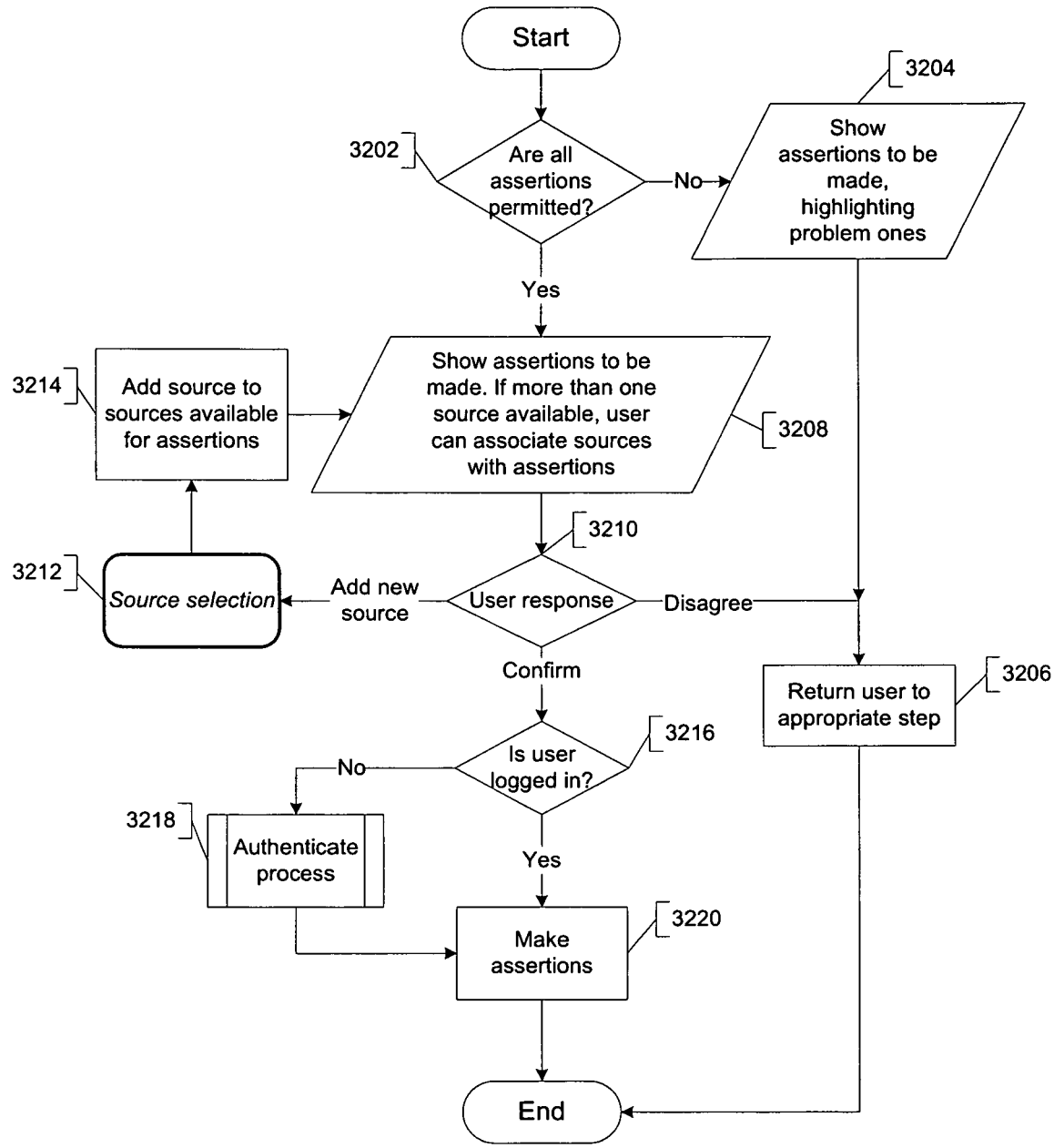
FIG. 32 shows a method of dealing with a sequence of facts collected for assertion by a process.

Finally the process is ready to make the assertions gathered from the user's responses and the system's own inferences (step 2440—illustrated in detail in FIG. 32 and described in section 5.10.8). The system then terminates, returning the identifier of the new class.

5.10.7.4 Add_Class Illustration

Figure 25:
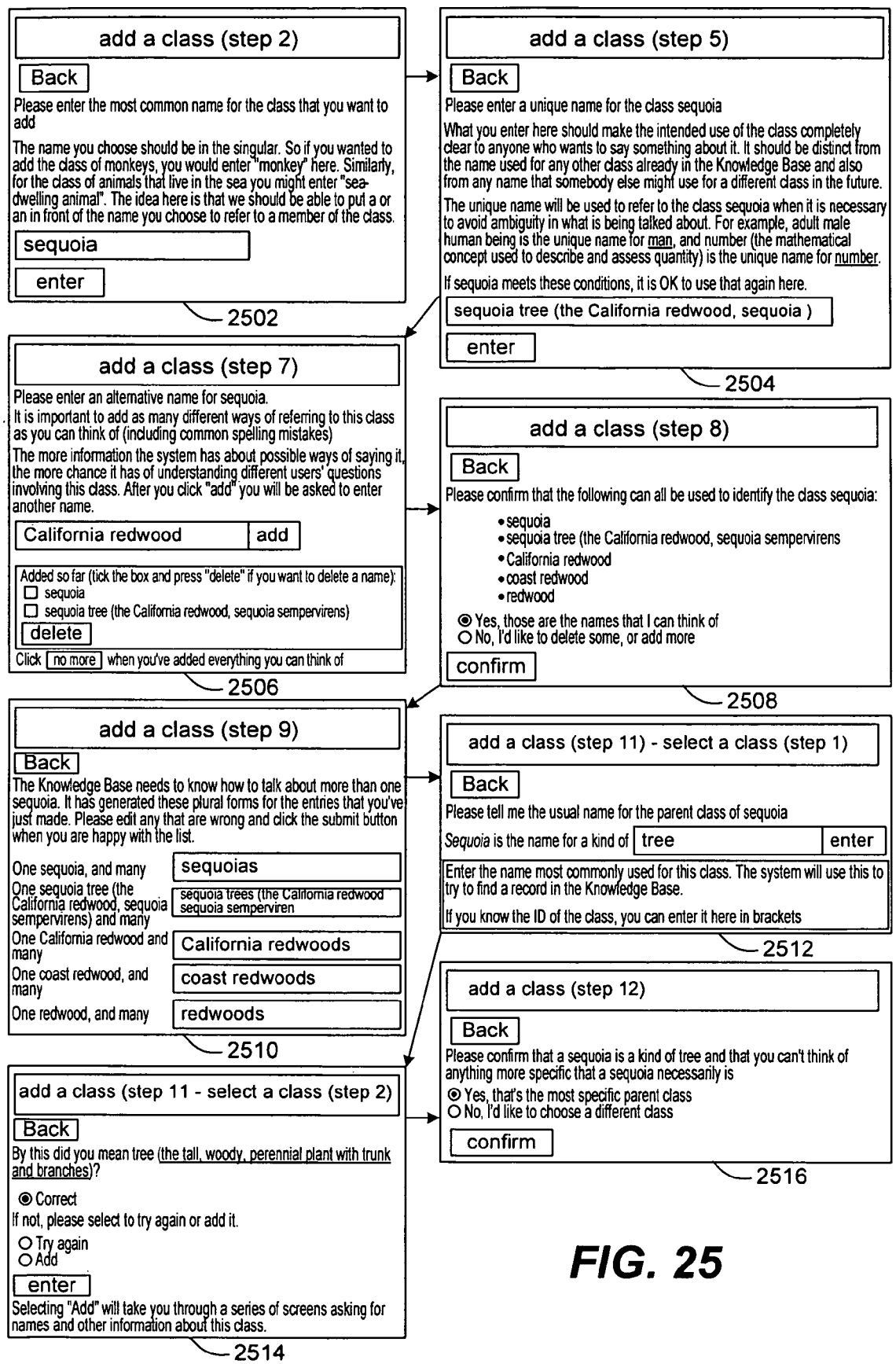
FIG. 25 illustrates an exemplary interaction with a user adding a new class.
Figure 26:
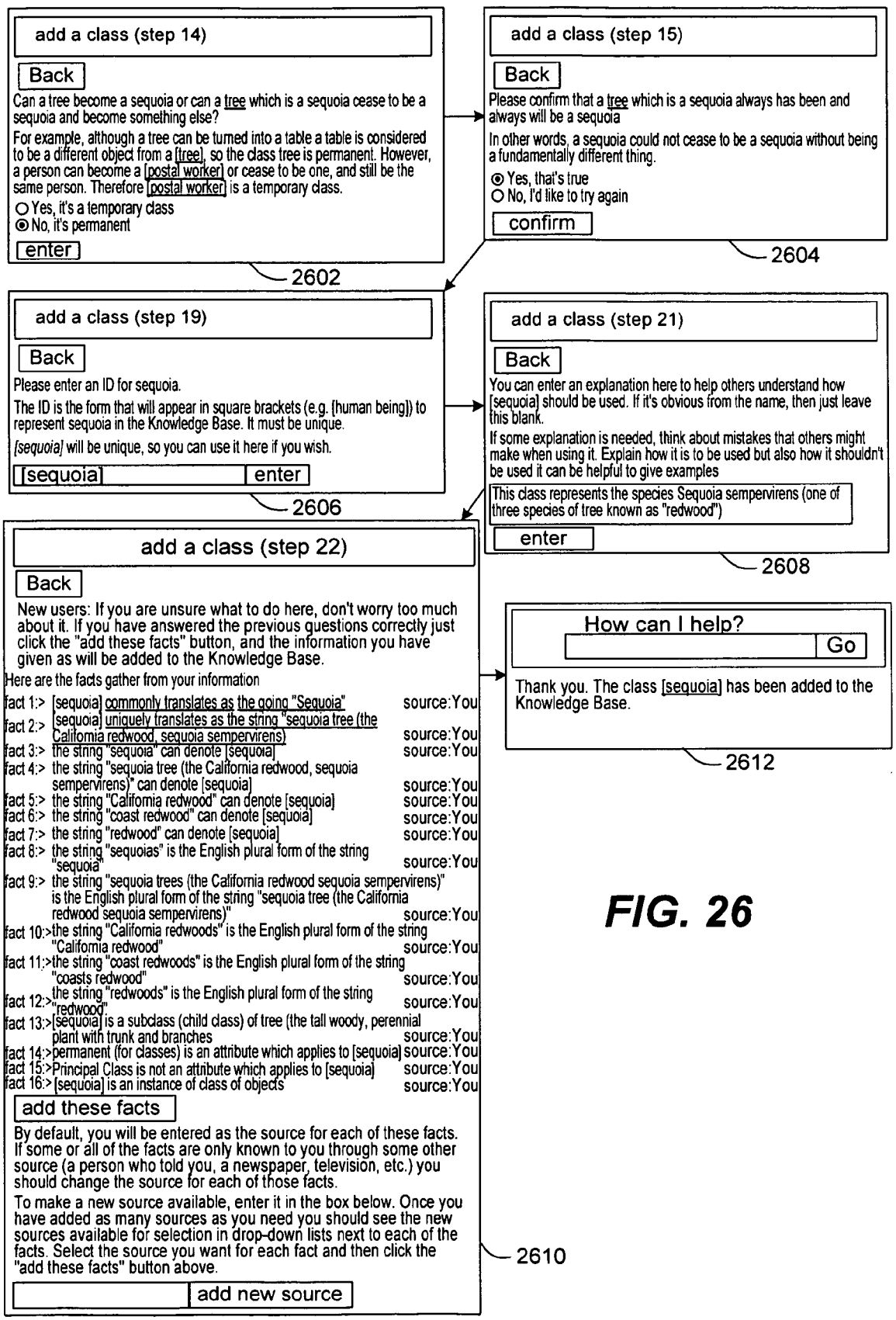
FIG. 26 is a continuation of FIG. 26.

An exemplary run of the add_class process is shown on FIG. 25 and FIG. 26. The user is attempting to add the class of California Redwood trees to the system.

In screen 2502 the user is prompted for the common translation of the class they wish to add. The user enters "sequoia".

After confirmation, control goes to screen 2504 where the user is prompted for the unique recognition string for the class. The user enters "sequoia tree (the California redwood, sequoia sempervirens)" here. As this combines both common names for the species, the word "tree" and the strict latin name for the species, it is sufficient.

As with add_object all possible denotational strings are prompted for on screen 2506. The user continues to add denotational strings and then clicks the "no more" button when the list is complete. Potential clashes would result in the unique recognition strings of the possible duplicate objects being presented for confirmation but there were no clashes in this example. Confirmation takes places on screen 2508.

Unlike with add_object, class denotational strings may need to be pluralised or recognised in their plural form. There is already a smart generator that can generate English plurals from one string to another but for confirmation the results for each denotational string are presented to the user and the user is allowed to correct any errors made by the smart generator (2510). Alternative embodiments could just prompt for the plurals. These plurals are then confirmed.

On screen 2512 the immediate parent class of the newly added class is prompted for. The user asserts that a sequoia is a kind of tree.

"tree" can only denote one class so the system now displays the unique recognition string for this class "tree (the tall woody, perennial plant with trunk and branches)" and asks the user for confirmation (2514).

2516 asks for confirmation of the parent class using different language from the initial screen. The user again confirms that everything is OK.

In various embodiments, additional prompts attempting to firmly place this new class within the current ontology would take place at this stage. The knowledge base can be consulted for subclasses of the selected parent class and asked if they are a more specific parent class to the one indicated. When the parent class is fixed, each immediate child class of the selected parent can be prompted for and the user asked whether it is possible for these classes to overlap or not. If the answer is "no", facts of the form class1 [is a distinct class from] class2 are generated. If "no" similar prompts are made for the immediate subclasses of the overlapping class. By including this procedure in the add_class process and having generators which can infer class membership or non membership using this information, an accurate yes or no answer can be provided for membership of any object in any class.

2602 shows the screen where the user is prompted about the [class is permanent] property of the class. As a sequoia tree cannot change species or be converted into any other object without being a fundamentally different thing, the class is clearly permanent and the user indicates this.

Confirmation takes places on screen 2604. Similarly to add_object 2606 prompts for an id.

On screen 2608 the user is given the chance to enter a documentor for the class (see 5.10.3).

Screen 2610 shows the final confirmation screen of the process listing all the facts gleaned from the interaction with the user. Similarly to add_object, the user has the chance to add sources to the facts listed.

When the user clicks "add these facts" all the facts are added to the knowledge base, a user assessment endorsement added, system assessment done and any problems reported in an identical manner to the add_object process described above.

The confirmation screen 2612 is then displayed when this has happened.

5.10.7.5 Process for Adding Relations (Add_Relation)

Desirable information requested about a relation includes the class of the objects that the relation can assert a relationship between (one for each side) and whether the relationship is permanent or not. The class of each side of the relation can be used to resolve ambiguity in questions. Permanence is important in knowing when the relationship holds. Other knowledge can also be collected.

Figure 27:
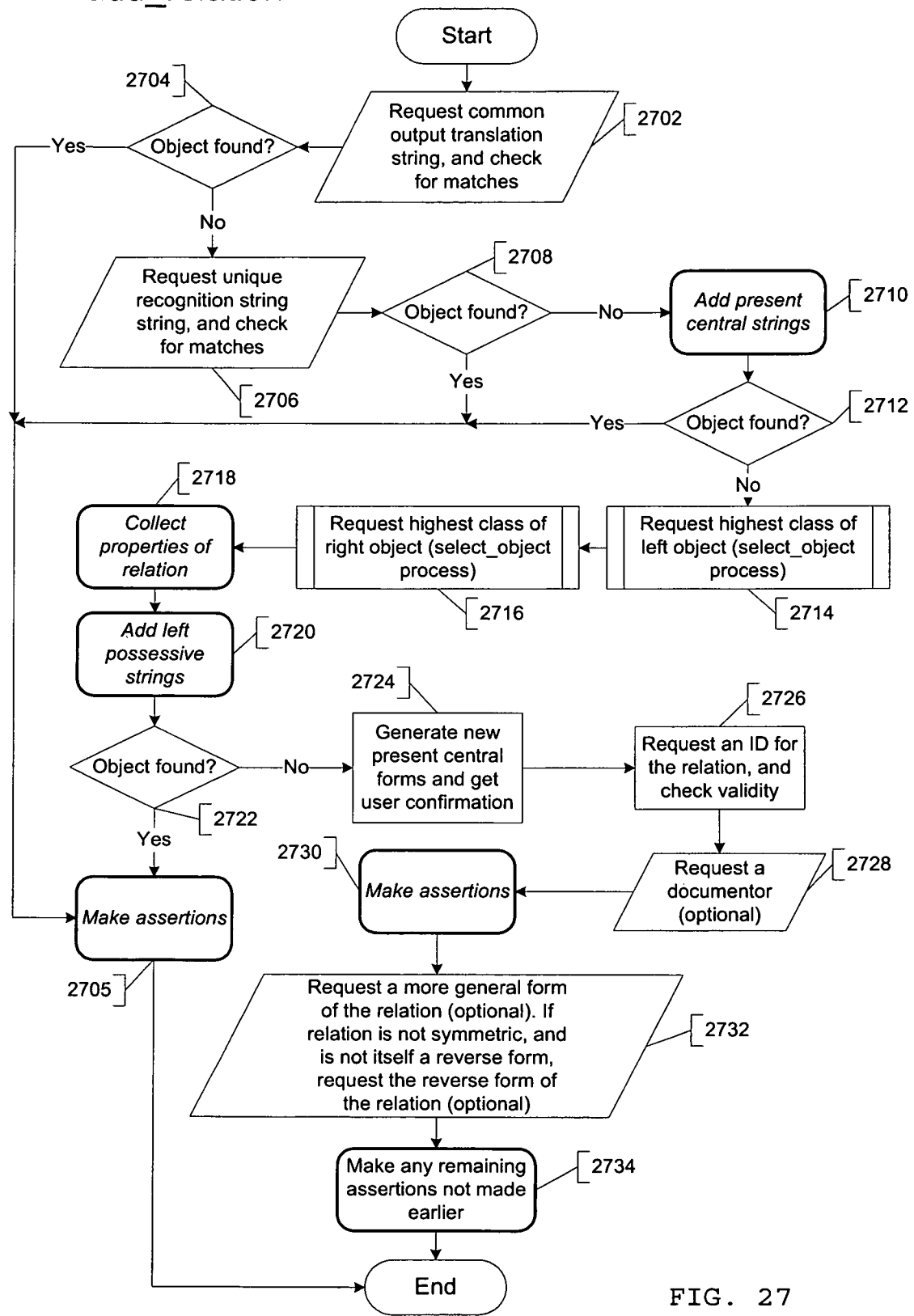
FIG. 27 shows a method of allowing a user to add a new relation.
Figure 28:
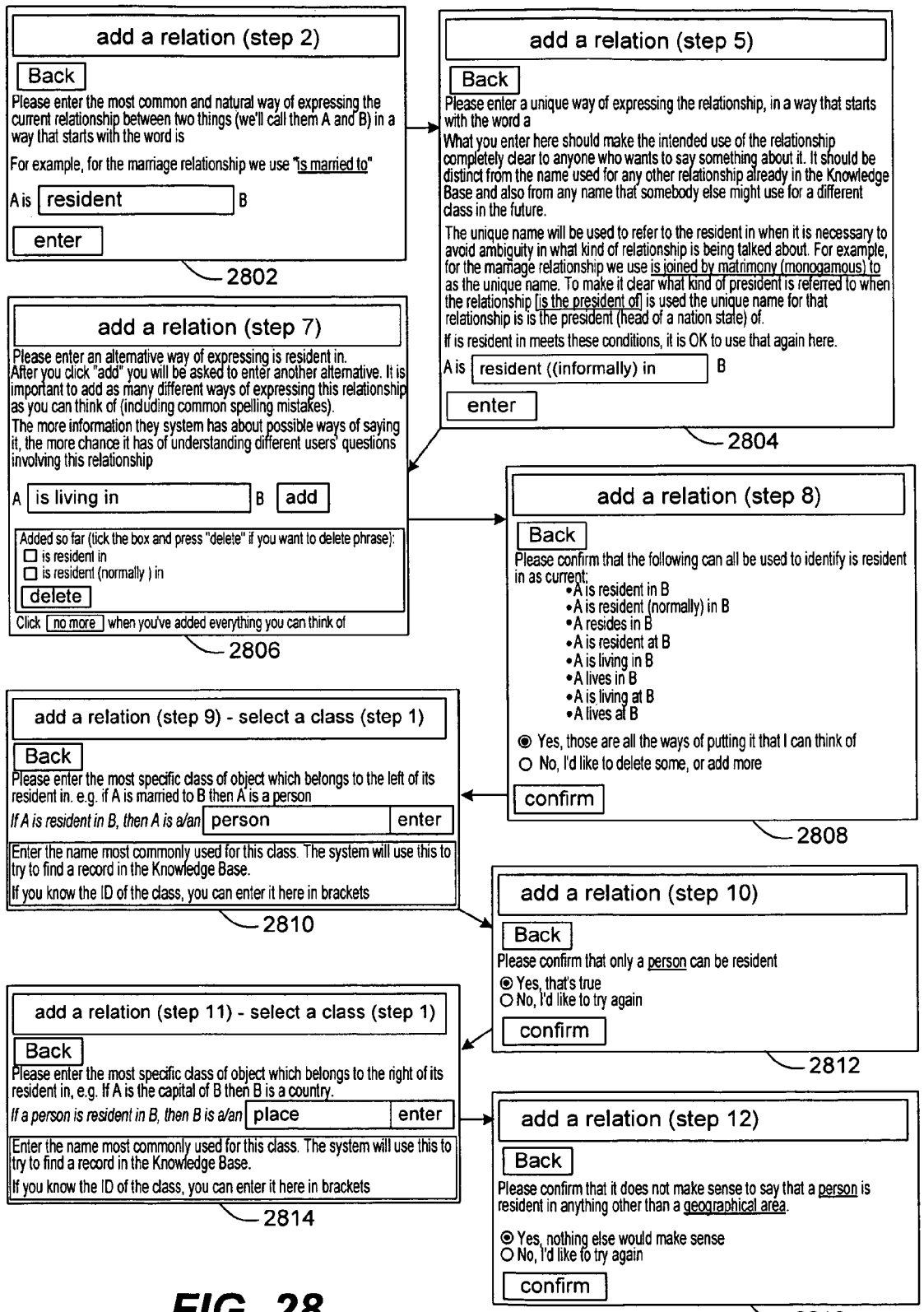
FIG. 28 illustrates an exemplary interaction with a user adding a new relation.
Figure 29:
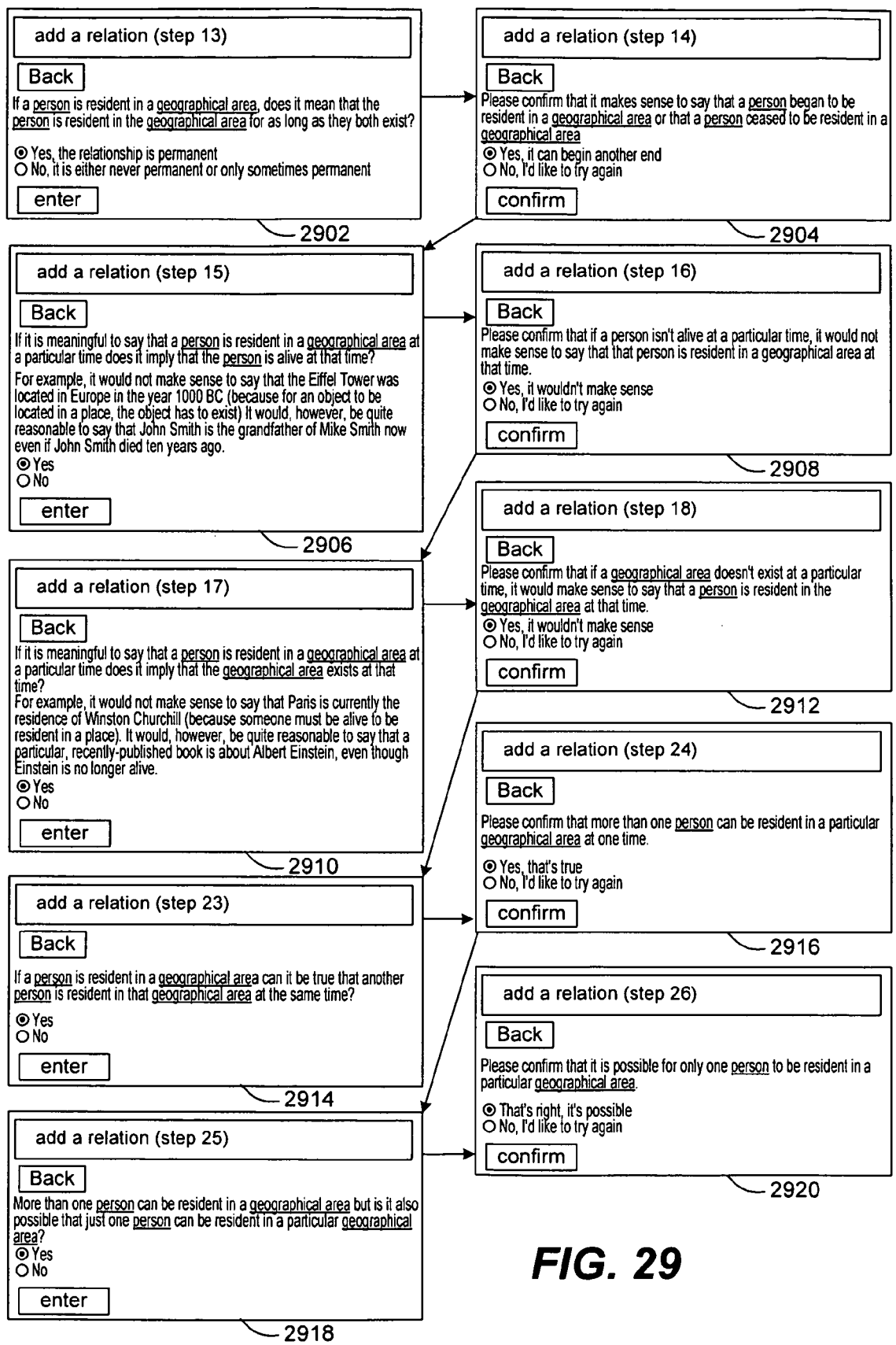
FIG. 29 is a continuation of FIG. 28.
Figure 30:
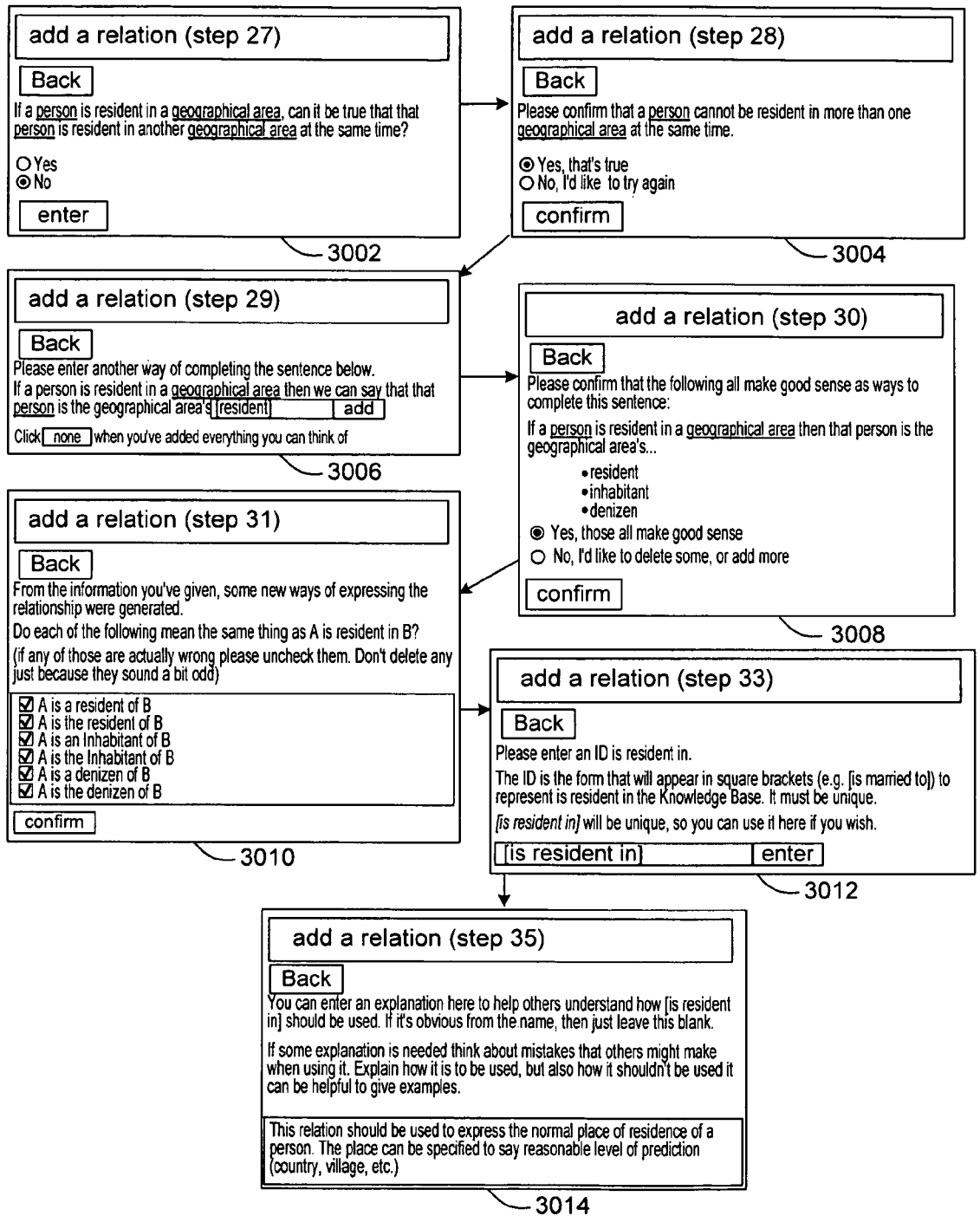
FIG. 30 is a continuation of FIG. 29.

The process used in the preferred embodiment for adding a relation object is illustrated in FIG. 27. The process begins with the user being asked for the most common term for the relation to be added (step 2702)—this will be assigned as its common output translation string. The knowledge base is queried for other relations denoted by the same string, and if one (or more) is found, the user is presented with that relation, and asked to confirm that it is not the one that he/she is in the process of adding. The user's response is tested (step 2704)—if one of the matching relations is the intended one, an assertion is made that the string is the common output translation of that relation (step 2705), and the process terminates returning it.

The next step (2706) is to request a unique recognition string for the relation. The knowledge base is queried for any other relations matching the entered string, and if one is found, the user is presented with it, and asked to confirm that it is the one that he/she is in the process of adding. The user's response is tested (step 2708)—if the matching relation is the intended one, all the knowledge gathered so far (the common output translation string and the unique recognition string) is asserted to be true of that relation (step 2705), and the process terminates returning it. If the matching relation is not the intended one, the user is returned to step 2706.

The common output translation string and unique recognition string already added can be regarded as present central strings, and are set as such. These are similar to denotational strings collected in add_object and add_class. The process then requests additional present central strings for the relation (step 2710), using the loop illustrated in FIG. 33 and described in section 5.10.9. The addition of present central strings may be terminated if a match is found and the user confirms that it is the relation that he/she was in the process of adding (step 3312) after seeing the unique recognition string of the match. In this case all the knowledge gathered so far is asserted to be true of that relation (step 2705), and the process terminates, returning the matching relation. Otherwise the user continues adding strings until he/she can think of no more.

The process then goes on to establish the left and right classes of the relation being added. First, the process initiates the "select_object" process with a message requesting the left class of the relation (step 2714—described in section 5.10.6). The object returned by "select_object" is stored as the left class. Then the process reinitiates "select_object" to request the right class (step 2716).

Step 2718 represents the collection of various core properties of the relation. First the user is asked whether the relation is permanent. If it isn't, a check is made to see whether the left and right classes contain objects which can have a creation date, and if this is the case for either, the user is asked whether the object on that side of the relation must exist for facts involving the relation to be meaningful. If the left and right classes are different (and neither is a subclass of the other), then it can be inferred that the relation is antisymmetric and antitransitive, otherwise the user must be asked whether it is symmetric and/or transitive. If the relation is transitive then it cannot be left unique, but if it isn't transitive the user must be asked about the left uniqueness. If the relation is not left unique, the present central strings are checked for the presence of the definite article, and if it is not found, the user is asked whether the relation is "anti left unique". (A relation such as [is a child of] is neither left unique nor anti left unique—"is the child of" is one of its present central strings; [is a citizen of], however, is anti left unique—it would not make sense to say that somebody is "the citizen" of a country.) The final core property collected in step 2718 is whether or not the relation is right unique. This involves one or two tests. If the relation is transitive, then it can be inferred that it is not right unique. If it isn't transitive, but is symmetric, then the right unique value will be the same as the left unique value. If it is neither transitive nor symmetric, then the user must be asked about the relation's right uniqueness.

Step 2720 is the collection of left possessive strings for the relation. Often some of these strings can be generated from the present central strings (e.g. "child" from "is a child of"). Left possessive strings are then requested from the user in the same way as the present central strings were collected, using the loop illustrated in FIG. 33 and described in section 5.10.9. The addition of these strings may be terminated if a match is found, the match's unique recognition string displayed (with a link to its profile) and the user confirms that it is the relation that he/she was in the process of adding (step 2722). In this case all the knowledge gathered so far is asserted to be true of that relation (step 2705), and the process terminates, returning the matching relation.

Just as left possessive strings can be generated from present central strings, so new present central strings may be created from the left possessive strings entered by the user. If any new present central forms are created, they are shown to the user, who is given the opportunity to reject any that are wrong (step 2724).

The next step is to choose an identifier for the relation. The system creates a valid identifier from the common output translation string if it is unique—adding a number to make a unique id if it is not. This identifier is presented to the user, who is given the choice of accepting it or creating a different one (step 2726). If the user chooses to create a different identifier, this is checked for validity before the process can continue.

Once a valid identifier has been chosen, the user is presented with a page (step 2728) requesting a documentor string (the user has the option to leave this empty).

The process is then ready to make the assertions gathered from the user's responses and the system's own inferences (step 2730—illustrated in detail in FIG. 32 and described in section 5.10.8).

Once the main batch of assertions has been made, one or two more pieces of information are requested (step 2732). The first is whether a more general form of the relation exists (e.g. [is married to] is a more general form of [is the wife of]). The second, which is only asked if the relation is not symmetric, is whether the relation has a natural-sounding reverse form (e.g. [is a parent of] is the reverse form of [is a child of]). (This second question is also omitted if the relation being added is the reverse form of an existing relation.) Both questions are optional—the user can choose not to answer them. If either is answered, the user's input is sent to the "select_object" process for identification (described in section 5.10.6). These additional assertions are then made (step 2734—illustrated in detail in FIG. 32 and described in section 5.10.8).

Finally, the system terminates, returning the identifier of the new relation.

5.10.7.6 Illustration of Add_Relation

An exemplary interaction between a user and the add_relation process is shown in FIG. 28, FIG. 29, FIG. 30 and FIG. 31.

The user is wishing to add the relation linking a person with the geographical area where they are normally resident so that facts asserting such information are supported by the system.

In screen 2802 the user is prompted the common translation of the relation they wish to add.

For both the common translation and generally appreciated unique recognition string various embodiments using English as the natural language prompt for a present-tense expression of the relation starting with the word "is". This simplifies translation into other tenses as in almost all cases, other tenses and forms can be generated just by substituting the "is" for other strings conforming to English grammar rules (e.g. "has been", "is not", "have not been"). Various embodiments allow the user to override the insistence on this requirement and express the relation in other ways, prompting the user for confirmation of the other forms later in the process.

In this example, a very natural form "is resident in" accurately expresses the common translation of the relation being added. The user fills this in and (after confirmation) proceeds to the next screen.

Screen 2804 shows the user being prompted for the generally appreciated unique recognition string of the relation. In this case the only extra clarification that is needed is to clarify that this relation refers to the general residence of the person so only a slightly augmented version of the common translation string is entered.

Like the add_object and add_class processes, screen 2806 is where the user provides as many alternative denotational strings for the relation as possible to maximise the chances of the relation being hit when other users attempt to denote it. For this screen central present forms not starting with "is" are permitted. As with add_object and add_class the translation strings are added automatically to this list.

2808 is the confirmation string for these forms. The user confirms the list and proceeds to entering the left and right classes of the relation.

The left and right classes of a relation are a consequence of the semantics of the relation. They provide the largest class of objects which can appear on the left of the relation and the largest class of objects which can appear on the right. Any object which is not in the left and right class cannot have the relation with any other object. One major use of this knowledge is to disambiguate ambiguous translations of questions (see section 5.6.7)

2810 and 2812 prompt for the left class of the relation. In this case it is the class of human beings.

2814 and 2816 prompt for the right class. In this case it is the class of geographical areas.

This information is also useful for steering and explaining the later stages of the process.

Many of the following screens ask about common properties of the relationship. Some of these prompts are skipped by logical deduction from the left and right classes so this illustration only shows some of the questions that may be asked. For example, the process controller can infer that the relationship is not symmetric (a r b=>b r a) as the left and right classes are different. It can also infer that the relationship is antisymmetric as it can do a query and find that [human being] [is a distinct class from] [geographic area].

2902 shows the screen asking whether the relationship is permanent or not. Some relations can change between two objects, such as this one (it is possible to cease to be resident in one place and to become resident in another place). Some relationships are permanent. The attribute being asked about is [relation is permanent]. 2904 is the confirmation screen for this step.

As [human being] is a subclass of the class [object with a creation date] the process then enquires whether the relationship can only hold when the left object is in existence (in this case alive). The semantics of some relationships require this and others do not. 2906 prompts for this property and 2908 confirms it. The user says that this property holds. Note that the page uses the word "alive" on this page as it can word intelligently according to what has been entered. As it knows that the left class is a subclass of [biological object] it uses the word "alive" in the prompt. Otherwise the word "exists" would have been used.

2910 and 2912 do the same for the right class (rewording with the word "exists" as it can do a query to show that [geographical area] is not a subclass of animal).

2914 and 2916 prompt and confirm for the [left unique] property of the relation. This property asks whether the semantics of the relation permit more than one entity to have the relationship with another fixed entity at the same time. As more than one person can be resident in a particular place at any one time the answer to this question is yes (implying that [left unique] does not apply).

2918 asks about whether about the property of whether it is possible for a single entity to have the relationship despite it not being required: [anti left unique]. This property would not have been asked if the relationship was [left unique] as it could then be inferred that it does not apply. This property is useful with the English language for determining whether the indefinite article "the" can be used in denoting the relationship. In embodiments where English is not used, this step might be skipped. As it is just possible for a person to be the only resident of a particular geographical area (a private island or small estate perhaps), the user answers this question yes and their answer is confirmed on 2920.

In 3002 the user is asked about the [right unique] property of the relationship. As the concept being captured is the primary residence of a person, this relationship is [right unique] and the answer to the question is "no". This is confirmed on 3004.

3006 and 3008 prompt for what in the preferred embodiment is called "left possessive forms" of a relation (using similar user interface methods to the prompting for denotational strings). This is an alternative way of conceptualising a relationship in English and other languages where the left object is thought of as being owned by the right object with a class to which the left object belongs being used to communicate the semantics of the relationship. For example, when we say "Paris is the capital city of France" we can also say "Paris is France's capital city".

In step 3010 the controller has used the left possessive forms given by the user to suggest some other present central forms possibly missed by the user. The articles "a/an" or "the" chosen are partly determined by the user's responses to [left unique] and [anti left unique] properties. As both do not apply both articles are used in generating the possible central present forms.

After the user confirms these forms control passes to screen 3012 where the user is prompted for an id in a similar manner to the add_object and add_class processes.

3014 is where the user is prompted for a documentor. Documentors are particularly important for relations.

3102 is where the collected facts are presented to the user and alternative sources can be specified. This is similar to the corresponding steps in add_object and add_class. When the user confirms these, the facts are written to the static knowledge base and system assessed as with the other add knowledge processes.

When this is completed without anything to report, control passes to 3104 where the user is asked about a more general form of the relation just added. This knowledge can be used to generate more general forms of a relation from a more specific fact stored in the static knowledge base.

The user says they cannot think of one at the moment and control passes to screen 3106.

In 3106 a reverse form is asked about. A reverse form is a semantically identical relationship where the left and right objects are reversed. In this case, the reverse form of the relation was already present in the knowledge base. If it was not, the add_relation process would have been repeated for the reverse form (and by passing the name of the reverse relation to the process it would be able to skip many steps where the answers could be logically inferred from the properties of the relation which were the reverse, i.e. the left and right classes and properties).

When a reverse relation is specified in add_relation, the preferred embodiment labels the more newly added relation with the property [reverse form preferred]. This property is used by add_fact and the query processing system to switch around relations which have this property by changing them for their reverse relation and swapping the left and right objects. For add_fact this keeps the static knowledge base "tidy" by not having semantically identical facts in two formats (e.g. having <attribute>[applies to]<object> facts as well as <object>[is]<attribute> facts). For query processing it also means that the generator which generates reverse forms can be ignored, gaining some efficiency. Alternative embodiments which have the generator active and allow static facts to be asserted both ways around are also believed practical though.

Screens 3108, 3110 and 3112 show the reverse form of the relation being selected and confirmed and the reverse relationship being confirmed. Finally the addition of the initial relation is confirmed (3114).

5.10.8 Assertions Process/Routine

At the end of each of the "add_object", "add_relation", and "add_class" processes the user is presented with a list of the assertions to be made, and given options to associate different assertions with different sources. These assertions must be confirmed before they can be made. The method by which this is done is illustrated in FIG. 32.

The first step (3202) is to loop through the array of assertions checking that each is permissible. If any are not permissible (for example, if one of the denotational strings supplied by the user to denote a particular person is suppressed for knowledge addition), then the list of assertions is shown to the user (step 3204) with the problem assertions highlighted. The user is asked to correct the problems. Continuing from this point will take the user back to the step associated with the problem assertion (step 3206)—if there is more than one problem assertion, then the user is taken back to the earliest one in the process.

If all the assertions are permissible, then the user is shown them as a list, together with the source for each (step 3208). By default the source is the user him/herself. This page gives the user options to add a new source to the available sources (by entering the name of the source in an input box), confirm the assertions as presented, or change a particular assertion. If more than one source is available, he/she can associate particular assertions with particular sources before confirming. The user's response is then tested (step 3210).

If the user chose to change an assertion ('disagree'), then he/she is taken back to the step associated with that assertion (step 3206).

If the user chose to add a new source, the string input must be identified as a source, and, if possible, an animate source identified (step 3212). The method for doing this is illustrated in detail in FIG. 38 (described in 5.10.13). Once the source has been identified, it is added to the list of sources available (step 3214). The user is returned to the assertions confirmation page (step 3208). Users can add as many sources as desired (one at a time) by looping through steps 3208 to 3214.

Once the user is ready to confirm the assertions (and has associated sources with them), a check is made on whether or not the user is logged in (step 3216). If the user is not logged in, he/she is required to do so (step 3218—the "authenticate" process illustrated in FIG. 19 and described in section 5.9. The assertions can now be made (step 3220).

5.10.9 Denotational Strings Collection

Figure 33:
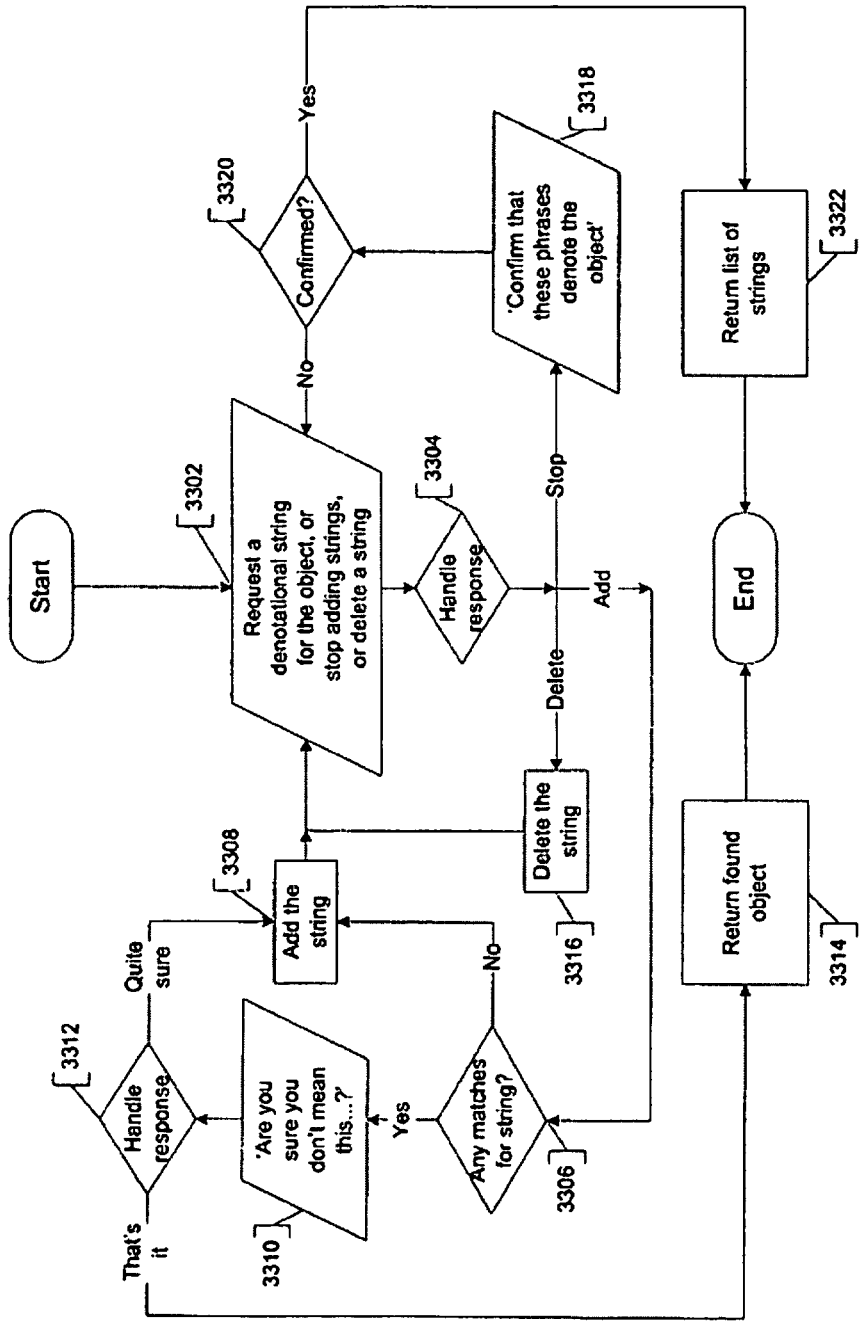
FIG. 33 shows a method of collecting denotational strings for a new object.

Denotational strings are related to their object by various relations, including [can denote], as shown in examples in section 5.6.1. They are names or phrases which may be used to denote the object, and are important in translating user queries and in avoiding the addition of duplicate objects to the knowledge base. In the preferred embodiment the same method for gathering these strings is used by the "add_object", "add_relation", and "add_class" processes. This method is illustrated in FIG. 33.

First, a page is presented to the user, requesting a name or phrase which could be used to denote the object being added (step 3302). The page also gives options to delete an already added string, or to stop adding strings. The user's response is checked at step 3304.

If the user chooses to add a new string, the knowledge base is queried for objects which can also be denoted with that string and which may be the object the user is intending to add, in some embodiments this check may involve verifying that the possible matching object is not a distinct class from any known class of the object being added (step 3306). If there are no matches, the string is added (step 3308), and the user is taken back to step 3302. If one (or more) matches is found, the user is presented with the unique recognition strings for the corresponding objects, and asked to confirm that it is not the one that he/she is in the process of adding (step 3310). The user's response is tested (step 3312)—if one of the matching objects is the intended one, the loop ends, and that object is returned (step 3314). If the user is sure that the matching object is not the one being added, the string is added (3308), and the user is taken back to step 3302.

If the user's response at step 3304 is to delete a string, the string is deleted (step 3316), and the user is taken back to step 3302.

If the response at step 3304 is to stop adding strings, the user is shown a list of the strings he/she has added, and asked to confirm that they can all be used to denote the object (step 3318). The response to this message is tested (step 3320). If the user won't confirm, then he/she is returned to step 3302 (where any problem strings can be deleted). When the user is happy with the list of strings to be associated with the object, the loop ends, and the list of strings is returned (step 3322).

In the preferred embodiment, a count is kept of how frequently each denotational string is used by users of the system to denote an object. These counts can be used to present denotational strings representing an object in order of popularity when displaying (say) a profile of the object. The preferred embodiment also keeps a count of how frequently each ambiguous denotational string is used to denote each of the possible objects it may refer to. In situations where one object is many times more common than another (e.g. a celebrity and a much less famous person with the same name), it can be used in some embodiments to assume that the more frequent choice is intended, thereby saving each user from having to choose every time. In the preferred embodiment it is also used to list ambiguous translations in order of likelihood.

5.10.10 Process for Adding Factual Knowledge (Add_Fact)

One of the desirable actions that a user can perform is to assert new factual knowledge. In the preferred embodiment this is that a named relationship exists between two named entities, and, in the case of a non-permanent relationship, when that relationship exists (i.e. they are also prompted for a timeperiod). In the preferred embodiment, negative relationships can also be asserted.

Again, this is achieved by a sequence of prompting screens presented to the user asking for the fact and (if necessary) the timeperiod. The entire assertion is translated into natural language using unique recognition translations for confirmation prior to being recorded in the knowledge base. If any object or relation is missing during this process the system will digress to prompt for the information necessary to add this entity to the knowledge base.

Figure 34:
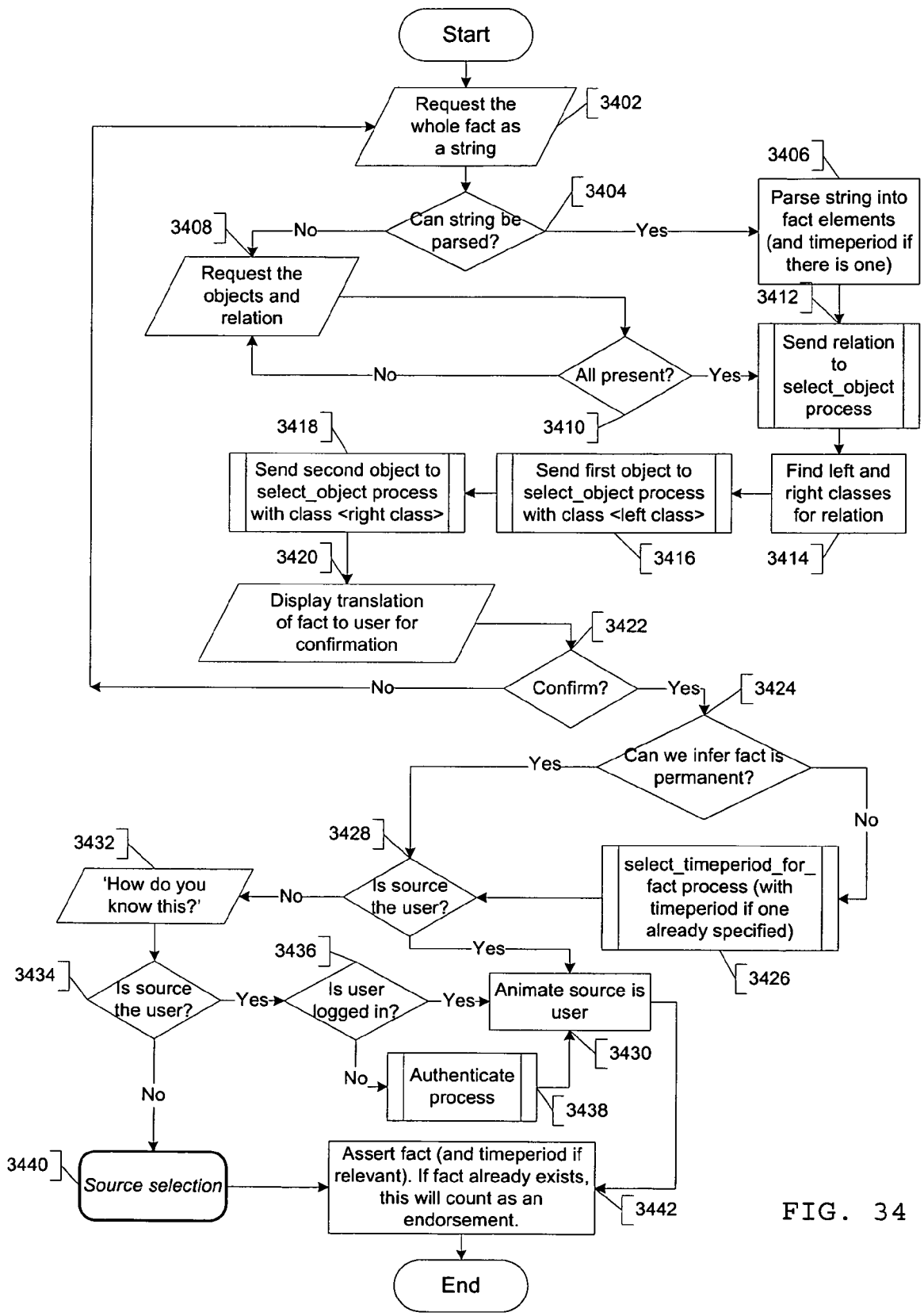
FIG. 34 shows a method of allowing a user to add a new fact to the static knowledge base.

The process by which relationships are asserted is illustrated in FIG. 34. The process begins (step 3402) by requesting the fact in natural language ("as you would tell it to another person"). The system attempts to parse the string entered by the user (step 3404). If it can be parsed, the elements of the fact (at least left object, relation, and right object, but possibly also negativity and temporal information) are extracted from the string (step 3406). Translation is described in section 5.6.10. If the user's string is not understood, then the user is presented with a page (step 3408) where the left object, relation, and right object are entered as separate elements along with detailed explanation and examples. A check is made that all three elements have been entered (step 3410)—once they have, the process can continue.

The next stage is to identify each of the three fact elements. First, the relation is sent for identification by the "select_object" process (step 3412—described in section 5.10.6). Once the intended relation has been established, the left and right classes of the relationship are found (step 3414).

The first object is then sent for identification by the "select_object" process (step 3416)—it is sent with the left class of the relationship as a parameter to ensure that "select_object" only looks for relevant objects. Next, the second object is sent to "select_object" with the right class as a parameter (step 3418).

A translation of the fact is created (using the unique recognition string of each element) and shown to the user for confirmation (step 3420). The user's reaction is tested (step 3422). If the user does not agree that the fact as stated is the fact that he/she is intending to add, then the process returns to the beginning.

If the user confirms the fact translation, the process continues by testing whether or not the fact is a permanent one, and acts accordingly (step 3424). If it is not inferred to be permanent, a timeperiod for the fact is requested using the "select_timeperiod_for_fact" process (step 3426—described in section 5.10.12).

Next it is necessary to establish the source (and preferably an 'animate' source) for the assertion that is about to be made. Under some circumstances (if the process is called when a user is adding him/herself to the knowledge base during authentication), the source for the assertion might already have been set as the user. The process tests to see whether the source is the user (step 3428). If the source is the user, then he/she can be attributed as the animate source for the assertion (step 3430). If the source is still unknown, the user is asked to specify a source (step 3432). The user can state that he/she is the source, or provide a different source perhaps a named individual or work of reference, or the URL of a web document. The user's response is examined (step 3434). If the user has stated that he/she is the source, a check is made to see whether he/she is logged in (step 3436). If not, he/she is required to log in (step 3438—the "authenticate" process illustrated in FIG. 19 and described in section 5.9). Once the user's identity has been established, he/she can be attributed as the animate source for the assertion (step 3430). If the user is not the source of the fact, then the specified source must be identified and an attempt made to establish an associated animate source (step 3440—illustrated in detail in FIG. 38 and described in section 5.10.13).

Finally (step 3442), the relationship, the source of the assertion, and (if relevant) any timeperiods are asserted. If the fact is already known to the knowledge base, then this assertion will count as an endorsement.

Facts can also be parsed from complete natural language assertions typed by the user into the main system prompt in some embodiments (e.g. "Paris is the capital of France"). If the translation system translates this into an assertion of a fact the add_fact process can be started at step 3406 exactly as if the initial assertion had been typed into the prompt corresponding to step 3402

See section 5.6.10 for more details on how these are translated. When this method cannot correctly parse the fact being asserted, the method described above can be used as a fallback.

5.10.10.1 Partially Pre-Specified Fact Addition

In the preferred embodiment, the add_fact process can be called with one or more of the three objects already filled in.

Figure 35:
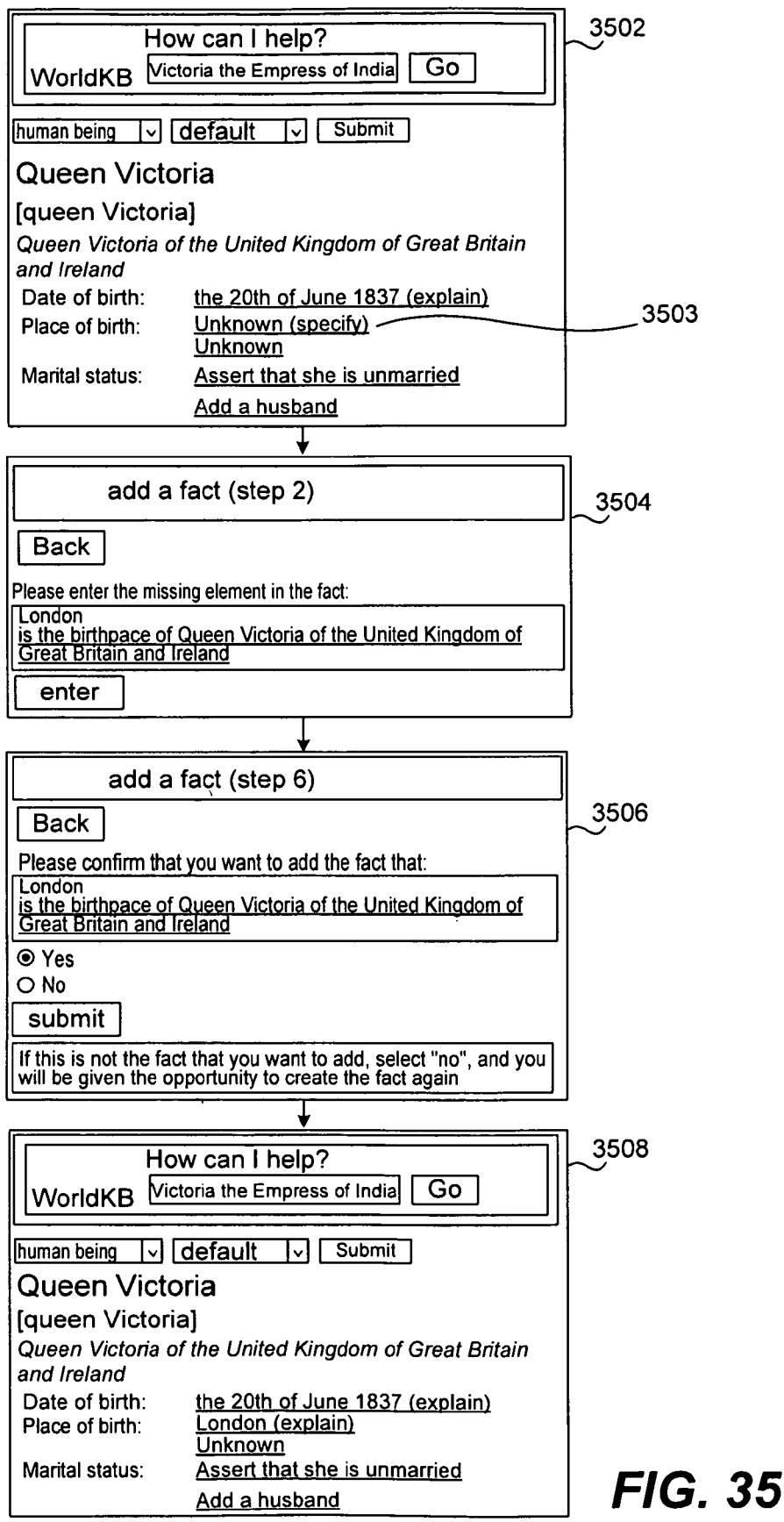
FIG. 35 illustrates a user adding a new fact where all but one element has been pre-specified.

An example of where this is useful is on profile screens where knowledge is unknown. For example, on a person profile there may be a slot for "place of residence". The profile was unable to get this knowledge from the knowledge base so instead creates a link with the person's id, the relation [is resident in] and a blank. A user visiting the profile who knows the place of residence can then simply click on the link to be taken An example of this is illustrated in FIG. 35.

A user has typed "Victoria the Empress of India" into the general prompt the system has translated this into a request for a profile screen for the historical figure [queen victoria] and displayed the default profile which is the default [human being] profile (3502).

One of the slots on this profile is for the subject's place of birth. The query that was designed to display this information returned "unknown" so the template created a link which would allow the user to specify it (3503). The link points to the add_fact controller script with parameters encoded specifying the two known elements of the fact to be added.

add_fact recognises these parameters and instead of prompting for all three elements, only prompts for the one that is missing (3504). (Other embodiments may use the left or right class of the known relationship to phrase the prompt better, e.g. "What geographical area is the birthplace of Queen Victoria of the United Kingdom of Great Britain and Ireland?".) The user enters "London".

add_fact uses select_object to locate the correct entity and asks for confirmation of the fact to be added (screen 3506). After source selection and confirmation of the fact being added the user opens the profile again (3508). This time the knowledge is in the knowledge base and the profile correctly shows her place of birth.

5.10.11 Core Facts

According to various embodiments with the principal class concept, each principal class has certain core facts associated with it. This is knowledge which varies between members of the class and which is considered important. When a new object is added to the knowledge base, the preferred embodiment will also prompt the user for the core facts associated with the principal class of the object. For example, with the principal class [human being], the preferred embodiment will prompt for the sex of the object (person) added and the date of birth.

In alternative embodiments, core facts are associated with any class and instead of prompting for the core facts associated with the principal class of the object, a search is made for the most specific class which has core fact information associated with it.

5.10.11.1 Process for Adding Core Facts (Add_Core_Facts)

FIG. 36 shows the steps involved in adding core facts about an object. First of all, it is necessary to establish whether or not any core facts are associated with the object's principal class (step 3602). If no core facts are so associated, the process ends. Otherwise, an array of the core facts is created (step 3604), and a loop is entered between step 3606 (which requests the answer to each core fact in turn) and step 3612 (which checks to see whether any core fact questions remain to be asked).

Once a core fact question has been asked (3606), the answer is sent for identification by the "select_object" process (step 3608—described in section 5.10.6). The user's answer can then be combined with the current object and the relation relevant to the core fact to make an assertion using the "add_fact" process (step 3610—described in section 5.10.10). When no more core fact questions remain to be asked (3612), the process terminates.

5.10.12 Selecting a Time Period (Select_Timeperiod_for_Fact)

Many relationships in the knowledge base require a temporal partner. Consequently, a user wishing to assert a temporary relationship must be provided with a mechanism to identify the relevant time period for that relationship. In the preferred embodiment the process of selecting a [timeperiod] object is called whenever the user directly asserts a relationship of a temporary nature (such as [is married to]), or whenever an object is added which is a member of a class defined as being temporary (such as [politician]).

Figure 37:
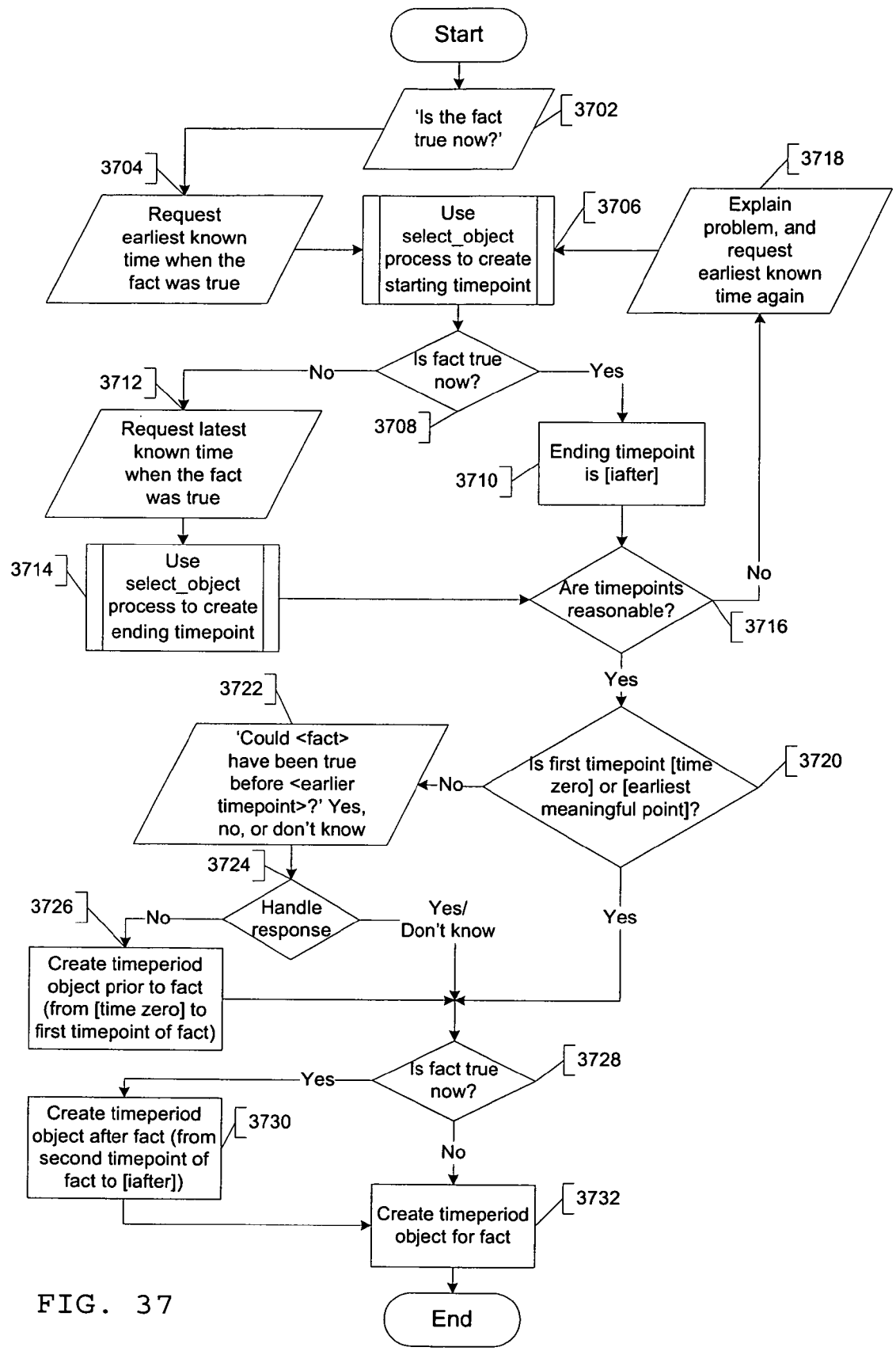
FIG. 37 shows a method for collecting temporal data from a user pertaining to a transient fact.

FIG. 37 illustrates the process in the preferred embodiment of selecting a time period. The user is first asked whether the fact is true now (step 3702), and is then asked for the earliest time when the fact was true (step 3704). The "select_object" process is initiated with the string entered by the user and the class [timepoint] as parameters (step 3706—"select_object" is described in 5.10.6). "select_object" returns a [timepoint] object.

If the user has said that the fact is true now (step 3708), the second timepoint will be [iafter] (step 3710), but if the fact is not true now, the user is asked for the latest time when the fact is true (step 3712). As before, the "select_object" process is initiated with the string entered by the user and the class [timepoint] as parameters (step 3714).

After the second [timepoint] object has been established, a check is made (step 3716) to see that the timepoints make a reasonable time period (the second must be later than the first). A problem encountered at step 3716 results in the user being shown an explanatory message and a request to enter the initial timepoint again (step 3718).

Once a reasonable time period has been established, it is useful to ascertain whether there is also a prior time period (when the fact is not true). For example, if a user wishes to assert that two individuals are married, and is able to give a date for the marriage (however accurately), then it is reasonable to assert at the same time that the couple were not married for all time before that starting timepoint. An alternative embodiment would omit this stage, and proceed straight to the creation of the [timeperiod] object at step 3732. In the preferred embodiment, however, a check is made on the starting timepoint (step 3720). If it is [time zero] or [earliest meaningful point], then clearly a prior time period is not possible, and the process can proceed straight to the check at step 3728.

If the starting timepoint is something other than [time zero] or [earliest meaningful point], then the user is asked whether the fact might have been true before the starting timepoint (step 3722). The user's response is tested (step 3724), and if he/she is confident that the fact is not true, the process creates a prior [timeperiod] object from [time zero] to the starting timepoint (step 3726) which can be used to assert the inverse of the fact.

In the preferred embodiment, just as a prior [timeperiod] object might be created, so a check is made to see whether the second timepoint is [iafter] (step 3728), and if it is not, a [timeperiod] object for the period after the fact ceased to be true—from the second timepoint to [iafter]—is created (step 3730). Finally the [timeperiod] object is created (step 3732) and the process terminates.

5.10.13 Source Selection

Figure 38:
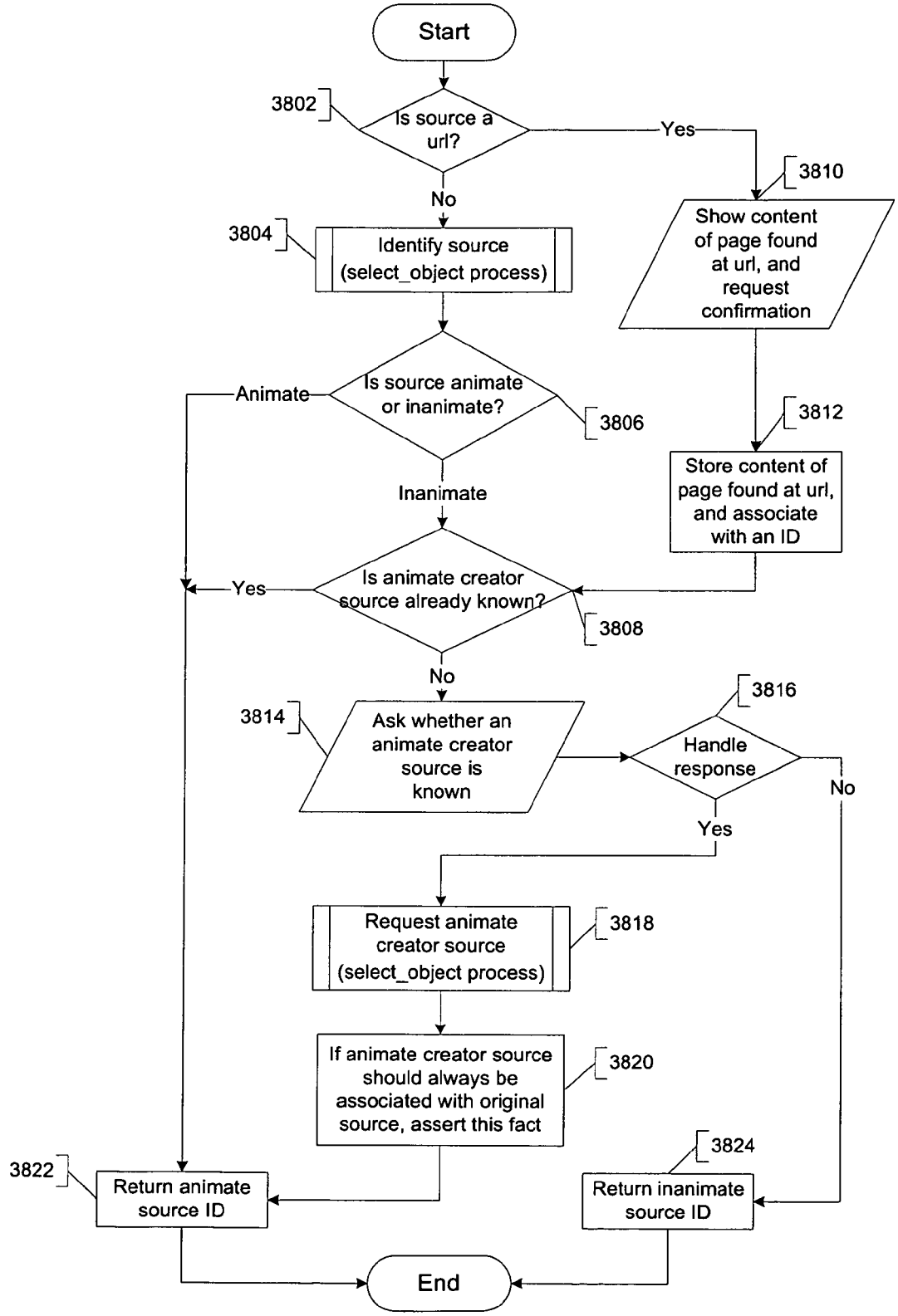
FIG. 38 shows a method for collecting source information about a fact from a user.

In the preferred embodiment all assessments are associated with a source. The same method for obtaining the source information is used by the "add_object", "add_relation", "add_class", and "add_fact" processes. This method is illustrated in FIG. 38.

The behaviour will depend on whether or not the user has supplied a URL as the source, so the user's input is tested initially (step 3802). If the source specified by the user is not a URL, the "select_object" process is initiated in order to identify, or, if necessary, add the source as an object (step 3804—described in section 5.10.6). A check is then made on the source (step 3806) to establish whether it is animate (a person or an organisation) or inanimate (e.g. a book).

If the source is inanimate, then an attempt is made to find an animate source behind the specified source (if, for example, the source is a single-author book, then this animate source would be the author). A check is made to see whether the knowledge base already knows the animate source associated with the source specified by the user (step 3808).

If the source specified by the user is a URL, the user is shown the content of the page at that URL and asked to confirm that that page is the intended source document (step 3810). If it is, a copy of the content is stored locally and associated with an ID, unless the same page is already held (step 3812), and a check is made to see whether an animate creator source—in most cases this will be the site's webmaster—is already known for the document (step 3808).

If the animate source is not already known, the user is asked whether he/she knows of an animate source, and, if so, whether this animate source is responsible for all knowledge obtained from the specified source or just this particular piece of knowledge (step 3814). The user's response is tested (step 3816). If the user does know of an animate source, the "select_object" process is initiated in order for the user to specify that animate source (step 3818—described in section 5.10.6). If the user has said that the animate source is responsible for all information in the original source, then this fact should be asserted (step 3820), so that steps 3814 to 3820 can be omitted by future users who give the same source.

Finally a source ID is returned: of the animate source if one has been established (step 3822), or, failing that, of the inanimate source (step 3824).

5.10.13.1 Section of Document Enhancement

When a user gives a URL or otherwise indicates a document as the source, some embodiments can prompt the user to additionally highlight the part of the document that is relevant for the fact at this stage and store sufficient information to identify this section (e.g. the position of the start and end characters of the highlighted section).

One advantage of this is that the part of the document could be highlighted in output produced by the front end. When a fact is used to answer a question, the section of a document from which this fact is sourced can also be displayed or highlighted in a document list. A shorter source of a fact can also enable faster verification by anyone reviewing the fact.

A change to the section of the document that has been highlighted can also be interpreted as possibly implying that the fact has changed for transient facts. For example, a corporate website listing the company's contact details might update the sentence with their phone number if their phone number changed. This change could be brought to the attention of a user or staff member and the fact updated accordingly. In some embodiments the change in the knowledge base would happen automatically.

An attribute applied to a website which implies that it is kept up-to-date ([current maintained step] perhaps) can be profitably used in embodiments which do this by asserting such facts about the site (or recording the information in an alternative form). The attribute means that incorrect facts are likely to be corrected so if the section of the document containing the fact is seen to be the same on a site with this attribute, the system can infer that the fact is likely to still be true. Examples of currently maintained websites might be the official corporate site of a business with staff keeping information up to date, or sites like Wikipedia which have a substantial user base correcting information.

5.10.14 Adding Generators

In the preferred embodiment dumb generators can be added to the system via a web-based editing page allowing the generator to be added to the list and tested by the user.

The user who has created the generator is associated with the generator and prior to editor approval the generator will be ignored by the query answering system for all users other than the user who has submitted the generator. In this way, any mistakes or errors with the generator will only affect the user who is testing it.

After editor approval the generator will be used by the query answering system for all queries.

For smart generators the system also needs to permit the addition and testing of tools.

The preferred embodiment achieves this by allowing users to add tools in an interpreted language which can run on the server but without having access to any sensitive files. The server would also terminate any script that was running for anything other than short timeout to prevent scripts which loop. Access to the network is also controlled.

The language Python (http://www.python.org/) is a suitable scripting language used by the preferred embodiment. The interpreter is widely available, freely licensed and information about how to incorporate it into a server is widely available.

The Python script that implements the tool can again be edited and tested by the user prior to approval by an editor. On approval the tool is then available to be used in generators. Prior to approval it will only be used in queries run by the user who submitted the tool so that it can be tested.

5.10.15 Adding Profile Templates

The ability for users to add profile templates works in a similar fashion to generators though as there is less security risk, various embodiments will optionally allow unapproved profiles to be seen and used by users. On approval the profile will become part of the system and used automatically in the case where it is the only profile for the most specific class of an object.

Creation of the profile can be achieved by a web-based editor or the template can be created offline and uploaded to the system.

5.10.16 Adding Translation Templates

The addition of translation templates can be achieved in a very similar manner to adding dumb generators.

The templates, pattern and generators, are added via a web-based editor and initially only used in response to translations by the user who added it to allow testing.

Once the user is happy, a web-based command allows the user to submit the template for editor approval. On editor approval the translation template is used for all translations by the complete user base extending the functionality of the system for everyone.

Various embodiments can draw attention to existing translation templates and thus educate users in adding them by producing an explanation of how questions were translated when a translation is successful (containing at least a link to the template used to do the translation). The fall-back strategy when a question was not understood can also provide a link to the add_translation process with instructions thus providing the user with a mechanism to correct and improve the problem for all users.

5.10.17 User Assessment

As used herein "user assessment" is the facility for users of an embodiment of the invention to provide information on the veracity of knowledge already present in the system. User assessment is an optional but desirable feature of various embodiments as it enables users to draw attention to facts which are incorrect and/or to increase the confidence in facts which are true.

In the preferred embodiment, users can both endorse and contradict facts. When doing so they use the same source of knowledge methodology as is used when asserting new facts. (See section 5.10.13.)

When a user adds a fact that is already in the static knowledge base, the preferred embodiment simply considers this a user endorsement of the fact and doesn't create a new fact in the static knowledge base. The initial assertion of the fact also counts as an endorsement of the fact by the asserting user.

The preferred embodiment also enables users who are contradicting a fact to label the original fact as probably asserted abusively. By distinguishing between facts which were asserted in good faith but are wrong in error and facts which were probably asserted to be mischievous and/or abusive, a number of options become available. These include taking sanctions against the user entity reporting the fact abusively, having a lower threshold for suppression of other facts asserted by this user and suppressing the abusively asserted fact faster than would otherwise have been the case.

The preferred embodiment also enables users of sufficiently high rank to label their assessment as final. Once done, the status of the fact (true or false) is locked down and cannot be changed by further assessments from users of lower rank. This facility enables a highly ranked user such as a staff member to resolve an issue with a fact immediately. For example, a staff member can make an obviously abusively asserted fact immediately invisible.

In the preferred embodiment user assessment is implemented by maintaining an assessments database table which records each endorsement and contradiction and includes the following information: the fact being user assessed; whether it is an endorsement or contradiction; the date and time of the action; the reporter (i.e. the id of the user who is performing the assessment); the source of the information (which may also be the user); optionally the id of the document which this assessment is based on (if there is one). (If a document is present, the source is the entity responsible for the document); whether the assessment has been labelled as abusive; whether the assessment has been labelled as final; any text explanation entered by the user at the same time (this can be used to explain the assessment further if the user wishes and appears on the fact profile).

The user assessments of a fact are combined together to get an overall picture of the veracity of the fact. In various embodiments, once a threshold has been reached the fact is also closed for further user assessment. This gives some stability to the system as facts for which there is an overwhelming certainty of them being true or false cannot be changed. This is especially important for certain core facts used frequently by the system in numerous situations such as properties of common relations.

Should a fact be locked down in an incorrect state, various embodiments would however, allow a user to draw this issue to the attention of staff for correction.

In one embodiment, user assessment information is combined together by attaching a positive score to each endorsement of a fact and a negative score to each contradiction and setting the truth and visibility of the fact based on the sum. The magnitude of the score for each endorsement and contradiction is determined by the track record of the user making the assessment. For example, a new user could be given a score of 10 while an experienced user who had been using the system for many months with a track record of accurate assessment could be given a score of 200. This embodiment does not allow repeated endorsements by the same user to increase the sum but users can be permitted to change their endorsement by contradicting a fact they have previously endorsed etc.

In the preferred embodiment, each fact is labelled as true/false and visible/invisible in the table in which they are stored. true/false is the veracity of the fact: whether the system believes it is true. visible/invisible is whether the fact is normally visible to the query answering system. untrue facts are always invisible. Other embodiments could remove untrue facts from the knowledge base.

Various embodiments also take into account fact exposure information in the assessment of the veracity of the fact from user assessments. Fact exposure information is information about the events when the fact was shown to users and the users were given an opportunity to apply a user assessment. For example, if a user has asked a question and the summary explanation has been displayed showing the fact and giving the user a chance to contradict it, that would be an exposure of the fact to the user. By combining exposure information with user assessments the system can obtain a superior understanding of the likely veracity of the fact. For example, a fact which has been exposed one thousand times and received five user contradictions is more likely to be true than a similar fact which has also received five contradictions but has been exposed far fewer times.

One example embodiment of how the system can incorporate fact exposure information into a scheme for assessing the fact is to consider each exposure of a fact without a user assessment action as a form of tacit endorsement of the fact and to count these in a similar way to actual endorsements by the user but with a much smaller weight.

Various embodiments have special handling for true-now assertions including taking into account the date that the endorsement or contradiction took place. The assertion of the negative version of the true-now fact suggests a point when the fact may have ceased to be true. By hypothesising each of these candidate points and summing subsequent user assessment data a similar technique to that described above can be used to assess true-now facts and determine that they should be suppressed or removed. In various embodiments true-now facts are thus always challengeable. When the true-now fact is a temporal partner closed with the [iafter] object the closing timepoint of overlapping similar facts provides candidate change points.

5.10.18 Process for Endorsing/Contradicting Knowledge

Figure 39:
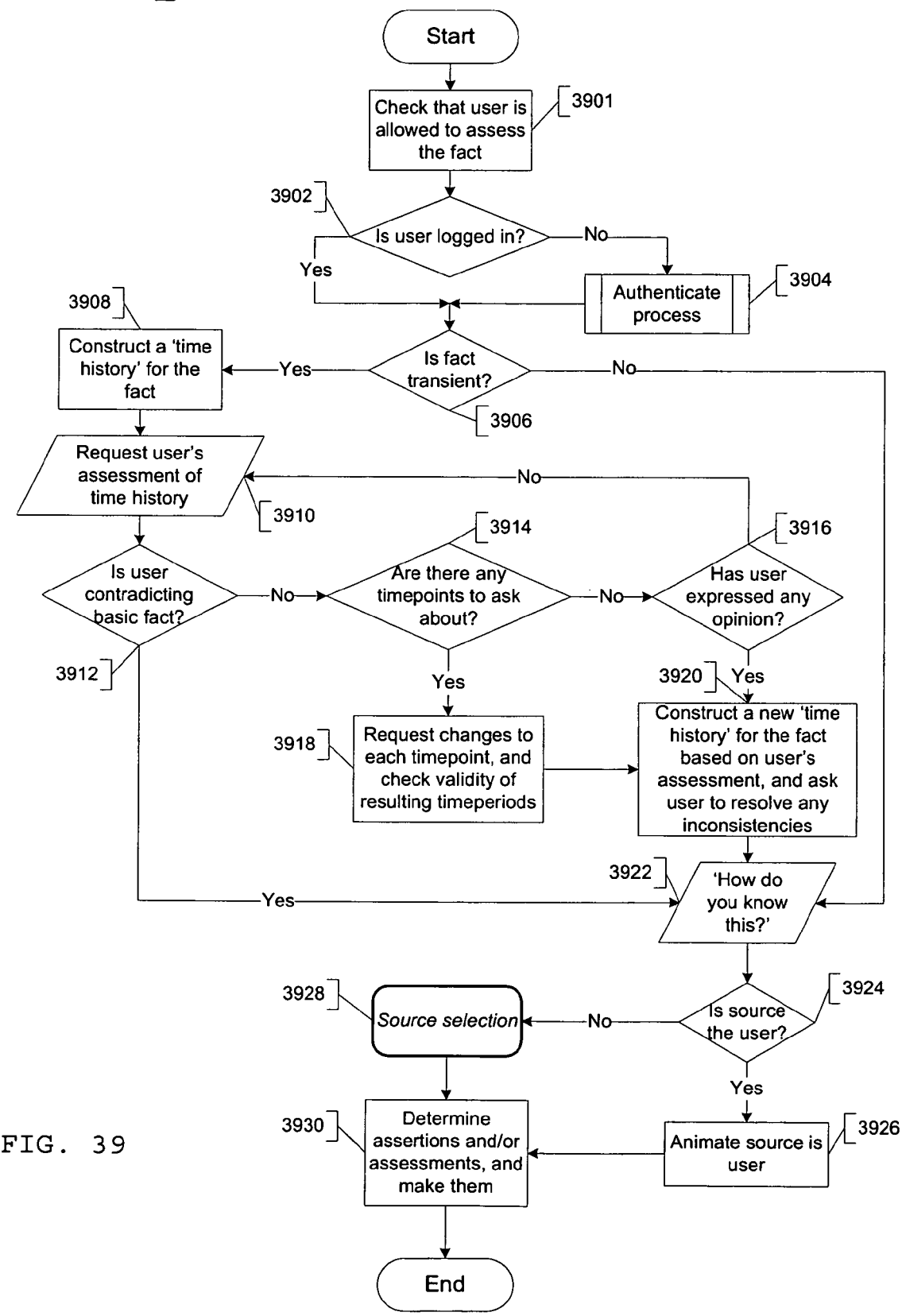
FIG. 39 shows a method usable in the user assessment subsystem for collecting endorsements or contradictions of a fact from a user.

FIG. 39 illustrates the preferred embodiment user assessment process of endorsing or contradicting a fact in the knowledge base. The process is always initiated with parameters for the fact to be assessed and the type of assessment (endorsement or contradiction). First, a check is made as to whether assessment of the fact is allowed (step 3901). Certain facts are marked as being unchallengeable, while others are suppressed for knowledge addition. If assessment is not possible the process terminates and the user is given an explanation.

Then it is necessary to check whether the user is currently logged in (step 3902), and if not, he/she is required to log in (step 3904—the "authenticate" process illustrated in FIG. 19 and described in section 5.9).

Next (step 3906) the system determines whether the fact is transient (or is itself a temporal partner to a transient fact). If it is not, the user can be taken directly to the step where a source is requested (3922). If the fact is transient (or a temporal partner), it will be necessary to show the user all the other facts associated with the fact, and find out exactly what it is that the user wishes to endorse or contradict (for example, if a user follows a link to contradict the fact that two people are married, it is not clear whether he/she is contradicting the fact that they are married now, or the fact that they have ever been married). The basic "subject" fact associated with the fact being assessed is found, and a "time history" for that fact is constructed (step 3908), indicating periods when it is true, when it is false, and when its veracity is unknown. The user is shown a schematic representation of this time history (step 3910), and given various options (to endorse or contradict particular periods, to contradict the basic fact in its entirety, or to make changes to the time history). If the user has chosen to contradict the basic fact (step 3912)—for example, saying that two people were never married, rather than just not married now—then he/she is taken straight to step 3922 (specifying a source). If the user is not contradicting the basic fact, the process continues by checking whether the user has asked to change any of the timepoints associated with the fact (step 3914). If there are no timepoints to change, the process checks that the user has endorsed or contradicted at least one of the periods (step 3916), and if not, he/she is taken back to the page at step 3910 with a message requesting at least one endorsement, contradiction, or alteration. If there are timepoints to change, the user is asked for them one by one (step 3918), and they are checked for validity. Next (step 3920), a new "time history" is constructed, based on what the user has said. If there are any inconsistencies (a fact appearing to be true and false at some point in time, for example) the user is asked to resolve them. (Some embodiments will now show a representation of this new time history to the user for confirmation. If the user rejects the new representation, he/she is taken back to step 3910.)

The user is then asked for the source of his/her knowledge about the fact(s) (step 3922), and a check is made on whether that source is the user him/herself or a secondary source (step 3924). If the user is the source, then he/she will be recorded as the animate source behind whatever assessments and assertions are made (step 3926). If the user is not the source of the fact, then the specified source must be identified and an attempt made to establish an associated animate source (step 3928—illustrated in detail in FIG. 38 and described in section 5.10.13).

Finally (step 3930), the information given by the user is examined, and all assessments and assertions that follow from it (whether directly or by inference) are made.

5.11 System Assessment

As used herein "system assessment" is the automated analysis of a fact to determine its veracity using at least whether the fact is semantically contradicted by other knowledge in (or known to) the system.

The preferred embodiment also determines whether a fact is superfluous: i.e. whether it can be generated by the system anyway.

As used herein "interactivity information" is data about how the fact interacts semantically with other facts in the system: whether a fact is contradicted or rendered superfluous by other facts in the knowledge base. A fact which is contradicted is in semantic conflict with one or more other believed-true facts in the system. A fact which is superfluous can already be produced by the system. A fact which is "uninfluenced" is neither contradicted nor superfluous and thus adds to the total knowledge of the system.

System assessment is a useful (but optional) component found in the preferred embodiment. It helps to keep the facts in the static knowledge base consistent with each other and is also another weapon to counter abusive or accidental assertion of untrue facts by users. Embodiments making use of user assessment data but not including system assessment will need an automated process to combine the user assessment data in determining the veracity of the fact (as described above). However, in the preferred embodiment user assessment data is used in combination with interactivity information in assessing a fact.

To generate interactivity information for a single fact in the preferred embodiment, the system assessment component creates a truth query in full mode corresponding to the fact.

If the fact being assessed is already in the static knowledge base it also tells the query answering system to ignore it when answering this query. Alternatively, the fact can be temporarily suppressed or removed from the static knowledge base while it is being system assessed.

The query is then executed. If the result is "no", the fact is contradicted. If the result is "yes" the fact is superfluous. If the result is "unknown" the fact is uninfluenced.

A variant of this is create an inverse query corresponding to the negative of the fact. If this query returns "yes", the fact is contradicted. This variant may be useful in embodiments where "no" answers to truth queries are not supported. (See section 5.5)

In embodiments producing summary explanation information, the static facts used in answering the query together are the ones which render the fact contradicted or superfluous and are termed "influencing facts" herein.

When the system assessment is done in the course of a user interaction and user assessment is part of the embodiment, these influencing facts are displayed to the user and an opportunity can be given for them to contradict any they disagree with.

Figure 40:
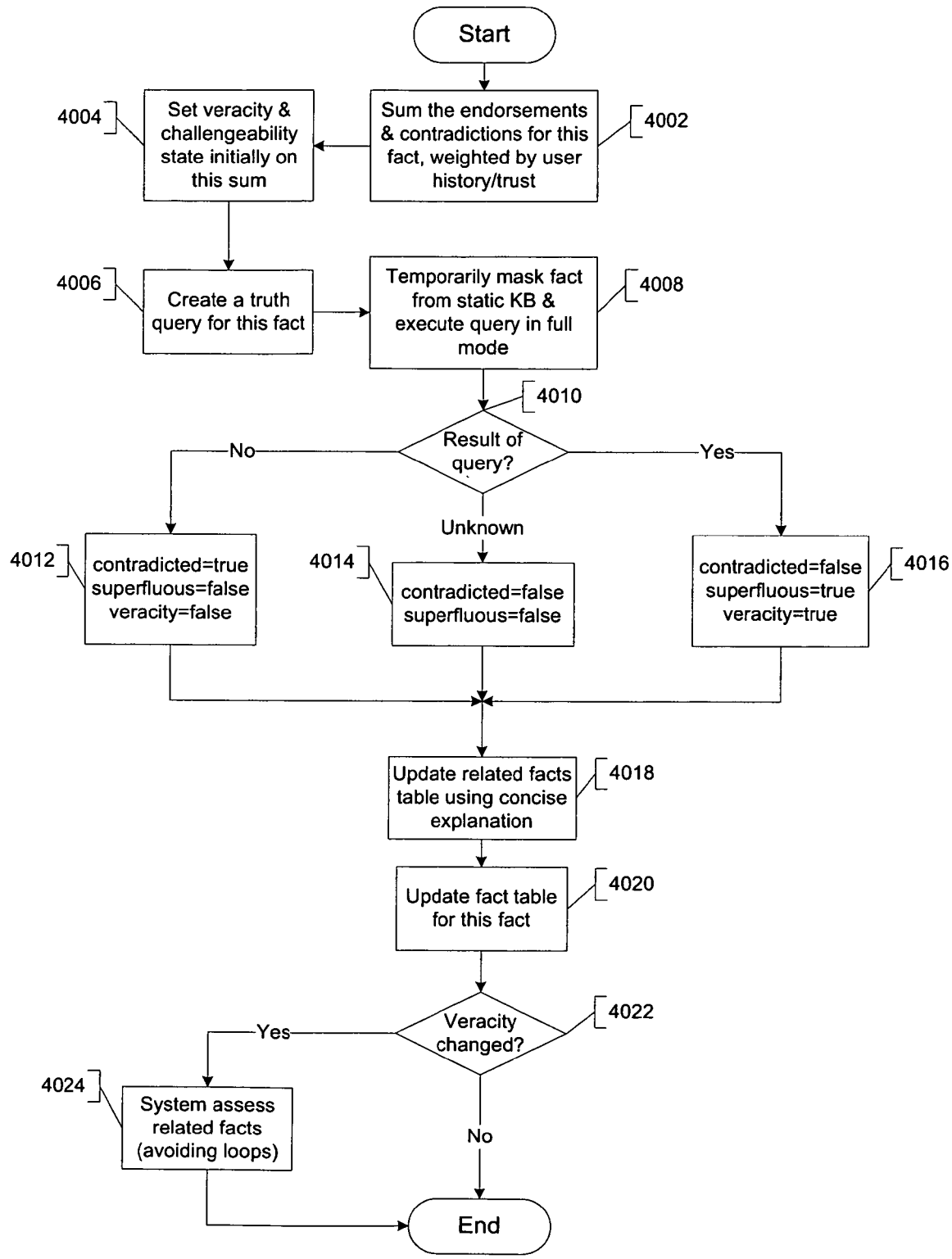
FIG. 40 shows a method usable in the system assessment subsystem for automatically calculating various types of state information about a fact.

FIG. 40 shows this.

The first thing done is to scan the record of user assessments for this fact (endorsements and contradictions) to create a weighted sum (step 4002). The sum initially starts at a small positive amount, endorsements add to this sum and contradictions subtract from it. The amount added or subtracted for each assessment is a pre-determined amount based on the track record of the user making the assessment. The initial assertion of the fact is considered as an endorsement. Multiple endorsements or contradictions by the same user are ignored.

The sum is then used to set provisional values for the veracity of the fact and its challengeability (step 4004). For example, a score above zero would set the veracity to true (i.e. the fact is believed true), and below zero to false (believed false). Challengeability is set based on the sum being above or below a much higher threshold. e.g. a sum less than −1000 or greater than +1000 would make the fact unchallengeable.

Step 4006 creates a simple truth query of just the fact itself (without fact id) and no query variables.

In step 4008 the query is executed in full mode with explanation. The fact itself is temporarily masked while the query is being run, e.g. by passing the fact id to the process_query routine and asking for the static search routine to ignore it. (Some embodiments may perform system assessment on a fact before it is added to the static knowledge base making this masking step unnecessary.)

The return result of the query is then examined (step 4010).

If the query returned "no" (i.e. the static fact is contradicted by what would be in the system without it), veracity is set to false (i.e. the fact is believed untrue) and the interactivity is set to "contradicted" (step 4012).

If the query returns "unknown", the veracity is left as set by the user assessments and the interactivity is set to "uninfluenced" (step 4014).

If the query returns "yes", the fact doesn't appear to add knowledge to the system that it wasn't able to generate so the interactivity is set to "superfluous" and the veracity is set to true (step 4016).

If the query returned yes or no, the concise explanation will be a list of other static facts which either implied or contradicted the static fact being assessed. The related_facts table showing this relationship is updated with these (step 4018).

Next, step 4020 is done to record the results of this system assessment in the static knowledge base including the values for veracity, challengeability, interactivity and visibility. The visibility is always set to false if the fact is believed untrue and in some embodiments it will be set to invisible if the fact is superfluous. The date and time when this system assessment was done is also recorded for use by the system selecting facts for periodic reassessment. Some embodiments may choose to remove untrue facts from the knowledge base rather than just making them invisible.

Next a check is made to see whether the veracity has changed as a result of this assessment (i.e. it is now believed true when it was previously believed false or vice versa) (Step 4022).

If the veracity is changed a scan of the related_facts table is made finding facts which are influenced by the one just assessed (whose veracity has changed) and each of these facts is recursively system assessed (step 4024). For example, if a true fact was being contradicted by the fact just reassessed and the fact is now false, this would resuscitate the wrongly suppressed fact immediately.

As there may be pairs of facts which influence each other, this recursive reassessment needs to take care to avoid creating an infinite loop. One way this can be achieved is to keep a log of all facts that have been reassessed and for the routine to return without further recursion if the current fact is in the log.

Figure 41:
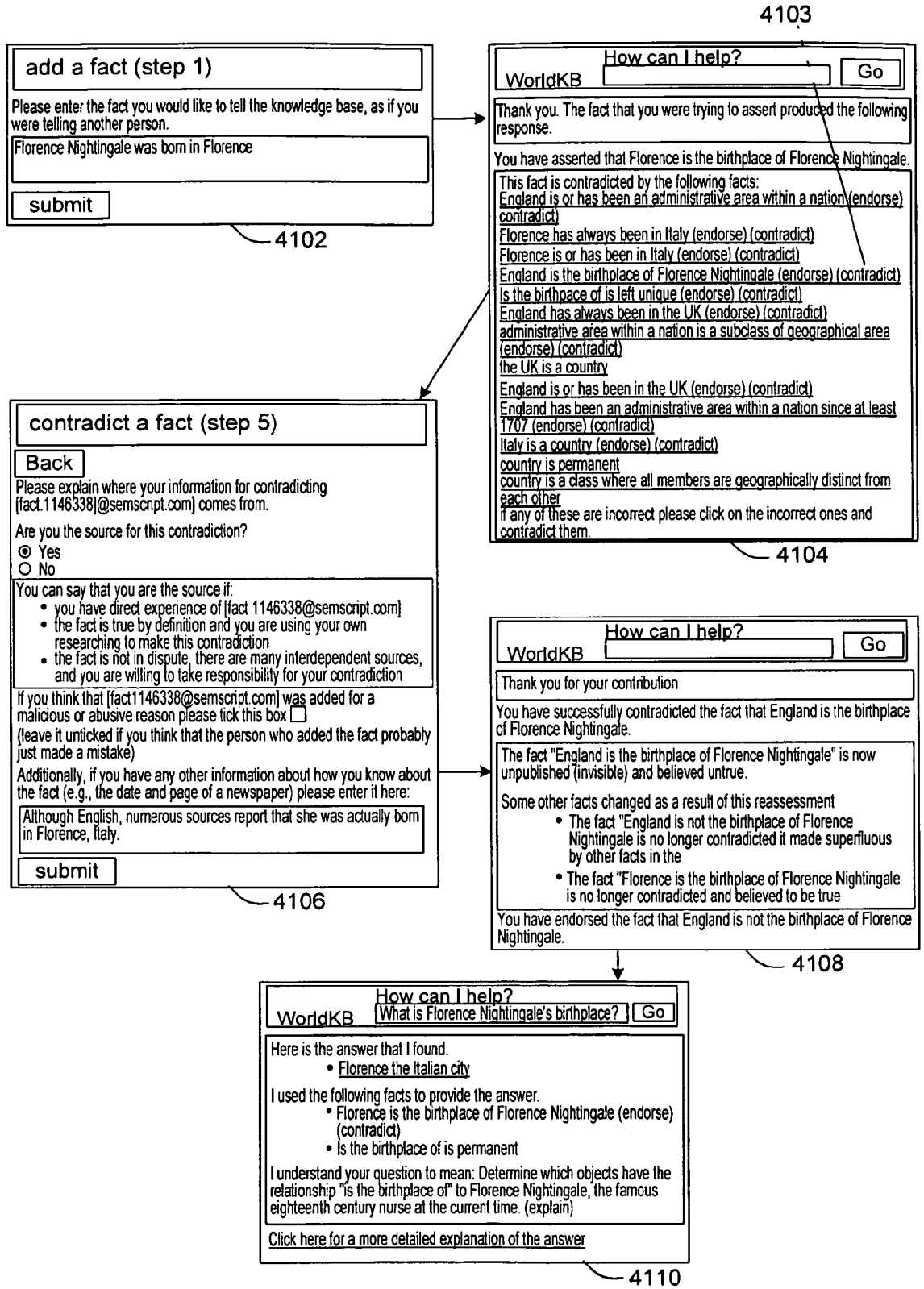
FIG. 41 illustrates an exemplary interaction with a user where user assessment and system assessment methods allow an incorrect fact to be removed from the static knowledge base and the correct version to be published.

An example of system assessment in operation is illustrated in FIG. 41

In screen 4102 a user has typed the fact "Florence Nightingale was born in Florence" into the first stage of the add_fact process (see section 5.10.10).

This natural language was correctly translated by the natural language translation system (see section 5.6) and after confirmation the fact is asserted.

As part of the fact assertion process a system assessment was done on the newly added fact. To the user's surprise, this system assessment resulted in the new fact being listed as contradicted. This status and the static facts used to contradict the fact (taken from the concise explanation of the system assessment query) are listed (screen 4104). (This embodiment has stored the newly added fact but as it is contradicted it has been labelled as invisible to stop it from being used in query responses. An alternative embodiment may have chosen not to accept the fact at all.)

The user examines the list and sees that one of the facts in the list is wrong. A previous user has incorrectly asserted that Florence Nightingale was born in England. However, as insufficient numbers of trusted users have confirmed this fact, it is possible to contradict it and a "contradict" link is available to the user (4103).

The user clicks the contradict link (4103) and is taken into the user assessment subsystem where the user asserts the fact is false. The user assessment posts a contradiction in the assessments table for the "England is the birthplace of Florence Nightingale" fact and for good measure asserts the fact that "England is not the birthplace of Florence Nightingale". The results of this activity is shown in screen 4108.

As it happens the user's contradiction of the incorrect fact has been enough for the system to change the veracity of the fact from true to false. This has automatically resulted in the originally asserted, invisible fact ("Florence is the birthplace of Florence Nightingale") being system assessed again and as the knowledge base no longer contradicts this fact, it has been reassessed as true, made visible and is no longer contradicted.

4110 shows the results of the question "Is Florence the birthplace of Florence Nightingale?" which is now correctly answered yes, showing that the original incorrect fact is now visible.

5.11.1 Periodic Reassessment of Facts

Various embodiments will periodically re system assess each static fact in the knowledge base. In the preferred embodiment, this is achieved by having a field in the database table containing the static facts which gives a date and time when the fact was last system assessed. Periodic reassessment is then achieved by calculating the timepoint corresponding to a threshold time period before the current time (e.g. one week) and doing a SQL SELECT statement which gathers the ids of all facts which have not been reassessed for this period ordered by last reassessment time (earliest first). The program then reassesses each fact in order timing out after a predetermined period (e.g. twenty minutes). A cron job is set up to periodically (e.g. every hour) call this function so facts are continuously reassessed. Some embodiments may prioritise certain types of fact for faster/higher priority reassessment.

This periodic reassessment of facts ensures that things are kept up to date.

5.11.2 Periodic Reassessment of Reporters and Sources

As users are continuously adding facts and citing sources and as a user's track record is useful in various embodiments for assessing confidence or promoting/demoting the user to various ranks, reporters and sources get periodically reassessed in the preferred embodiment.

This is achieved in a similar manner to the periodic reassessment of facts.

5.11.3 User Initiated System Assessment

In the preferred embodiment users can additionally reassess a fact at any time. This is accomplished by a "reassess this fact's properties" button on the fact profile (an example is 1409 on FIG. 14). Clicking this button immediately results in a system assessment being done on the fact and the results displayed to the user.

5.11.4 More Specific Dates/Timeperiods

An example of how system assessment is useful is with the accuracy of specified dates.

Sometimes new facts added are not in semantic conflict with facts that already exist in the knowledge base but rather are more accurate versions of them.

An example would be a wider timeperiod associated with a fact than was known previously (e.g. an earlier starting time) or a more specific date of birth for a person.

With knowledge generation and system assessment this is readily achieved by the use of generators which generate the less specific fact from the more specific, e.g. a temporal partner assertion that a fact is true for the timeperiod [timeperiod: [timepoint: ["1930"]]; [iafter]] can generate the same fact with the timeperiod [timeperiod: [timepoint: ["1990"]]; [iafter]]. This means that if someone were to initially assert the 1990-timeperiod and someone were to later assert the 1930 timeperiod, the earlier fact would become superfluous and invisible. It also means that overlapping timeperiods for opposite facts can result in facts being contradicted.

Similarly if someone were to assert a year as a date of birth and then someone were to later come along and provide the precise calendar date, the original less specific fact would become superfluous leaving the more specific one published.

The generators for these examples are here:

The following generator accesses the tool that calculates whether a timepoint or timeperiod is a more accurate version of another one and generates the fact if it is.

```
[tool.ismoreaccurate1@semscript.com]
generator
=> ismoreaccurate1@local
a$ [is a more accurate version of] b$ *
```

This generator would for example, generate a fact asserting a year as a birthdate from a fact asserting a date in that year.

```
[generator.ismoreaccurate2@semscript.com]
generator
r$ ~[equals] [is a more accurate version of]
[timepoint: ts2] r$ b$
[timepoint: ts2] [is a more accurate version of] [timepoint: ts$]
=>
[timepoint: ts$] r$ b$ *
```

Note that in the target line both dates need specifying. This generator has the effect of rendering less accurate dates superfluous when new more accurate dates are specified. If the new more accurate date were to ever become considered false (e.g. after user assessment) the less accurate date would then become visible again when reassessed. A similar generator does the same for the right object.

This generator implements the concept of timeperiods overlapping;

```
[tool.overlap1@semscript.com]
generator
! one timeperiod overlapping with another
=> overlap1@local
a$ [is overlapping with] b$ *
```

(a similar generator implements the negative relation)

This generator implements the concept of one timeperiod falling within another:

```
[tool.containedwithin1@semscript.com]
! one timeperiod contained within another.
generator
=> containedwithin1@local
a$ [is contained within] b$ *
```

(and again an almost identical one implements the negative relation)

This generator makes the smaller timeperiod for a temporal partner superfluous:

```
[generator.tperiodimplies1@semscript.com]
generator
f$ [applies for timeperiod] tp1
tp$ [is contained within] tp1
=>
f$ [applies for timeperiod] tp$ *
```

And this one generates contradictions to facts where the timeperiod overlaps the negative version of their subject fact:

```
[generator.tperiodimplies2@semscript.com]
generator
f$: a r b
f2: a ~r b
f2 [applies for timeperiod] tp1
tp1 [is overlapping with] tp$
=>
f$ ~[applies for timeperiod] tp$ *
```

5.11.5 Assessment of Veracity (Alternative Embodiment)

As discussed in section 5.11 above, the preferred embodiment assesses veracity for uninfluenced facts by summing up a score based on each endorsement and contradiction of the fact with the original assertion of the fact counting as an endorsement. Endorsements add a positive score, contradictions a negative score. If below a threshold the fact is considered false and is no longer used in query answering, otherwise it is considered true. If above a high threshold the fact is considered definitely true and user assessments are no longer accepted. The weight of each endorsement or contradiction is assigned by the track record of the user—users with a long track record of providing good knowledge having a high contribution.

The preferred embodiment only uses the reporter information, partly for simplicity and partly because frequently users have a choice of sources for a fact and are able to at least partially assess the reliability of a source themselves. By always penalising the reporter even if it is the source that is wrong, the reporter has an incentive to find reliable sources.

However, an alternative embodiment can attempt to rate reporters and sources by their track record and take an approach based on the calculated probability of a fact being true using this information. This is an alternative philosophy where a user is largely inoculated against the negative consequences of accurately citing inaccurate sources.

An embodiment using this approach is now described:

The method used to calculate confidence for a fact is designed to approximate and communicate the probability that the fact asserted is true. Every entity is given a probability that any fact asserted by it is true. This probability is estimated initially from experience for a new entity and then adjusted as that entity develops a track record of facts and a more accurate figure can be calculated. In various embodiments the initial probability may also be also be estimated from the class the entity is in. For example, a member of the class [tabloid newspaper] may have a lower initial confidence score than a publication in the [broadsheet newspaper] class. In other embodiments an editor may adjust or set the initial probability based on his/her personal assessment of the reliability of the source.

5.11.5.1 Single Direct Source

In the case of a fact being asserted directly by a single user entity, the confidence figure for the fact being true is determined with the formula $$p_{f1} = p_{u1}$$

where $p_{f1}$ is an estimate of the probability that fact f1 is true and $p_{u1}$ is an estimate of the probability of a fact asserted by user u1 being true. $p_{u1}$ is initially estimated from experience with other new users and then modified up or down as the user establishes a track record of asserting facts whose veracity or otherwise is later established. One method is to look at the number of past facts that have been shown to be true ($T_u$) for a particular user, the number that have been shown to be false ($F_u$) and use the ratio of the two to calculate $p_u$ with this formula:

$$p_u = (T_u + (r_u * b))/(T_u + F_u + b)$$

where $r_u$ is the initial assessment of the probability and b is a threshold number used to buffer the calculation from big changes in probability when the track record is small, e.g. b could equal 100.

This formula means that the initial estimate dominates until the point where the user establishes a track record, after which the initial estimate becomes less and less important.

For example, supposing $r_u$ was estimated at 0.6, b is set to 100, and the user has asserted 9 true facts and one that turned out to be false (the user is still relatively new to the system), so $T_u$ is 9 and $F_u$ is 1.

In this case $p_u$ will work out at (9+60)/(9+1+100) or 0.627, only slightly better than the initial estimate.

However, supposing the user continues his/her/its track record of beating the initial estimate and sometime later has 927 true facts and 3 false.

In this case $p_u$ will work out at (927+60)/(927+3+100) or 0.958, i.e. the user's track record has greatly improved the confidence the system now has in its assertions, and the initial estimate now only has a small effect.

5.11.5.2 Multiple Direct Sources

To assess the confidence for a fact when other users have asserted the same fact is done by estimating the probability of the fact being true. This is one minus the probability that it is false. If several independent sources assert a fact, the probability the fact is true is:

$$1-(1-p_1)(1-p_2)(1-p_3)\ldots(1-p_n)$$

Where $p_k$ is an estimate of the probability that a fact asserted by entity k is true.

5.11.5.3 Indirect sources

When an indirect fact is asserted, the probability that the fact is true when looked at by itself is $p_u*p_e$, i.e. to be true it has to be the case that the user is accurately asserting that entity e asserts the fact, and that entity e is asserting the fact correctly. The confidence figure for entity e is calculated using a similar method to that for a user entity.

Where user entities assert that another entity asserted a fact, the ultimate entity asserting the fact is considered for the purposes of calculating confidence in the same way as a user above. The difference is that the one or more users asserting this entity as the source of the fact are first assessed to estimate a probability that the assertion was actually made, and this is incorporated into the calculation.

To put it another way, the probability of two facts is calculated. First, that the entity did assert the fact (in other words, the magazine did actually say what the user says it did) and secondly that the fact asserted by the magazine (say) is true. The confidence of each of these being true is assessed using similar methods to the case when the facts are asserted directly by the user. These two confidences are combined using normal probability calculations and the methods described herein.

5.11.5.4 Independence of Sources

An enhanced version of the formula in some embodiments also considers the possibility that the sources are not independent. For example, the different users are collaborating for fraudulent reasons, or have incorrectly asserted the knowledge as coming directly from themselves when in reality there is a single source. An indirect version of this would occur when two newspapers both publish the same story and one newspaper is using the other as its only unacknowledged source.

In this situation an estimate of whether the users (or indirect entities) are independent is first used, estimated from experience similarly to the way described above. This probability is i. The probability of the users all being the same source is first calculated. In the preferred embodiment this is done by calculating the mean of all the probabilities which would have been the case if each user had asserted the fact in isolation. Alternative embodiments take the highest or lowest probability and use that. If a is the probability assuming all sources are independent and b is the probability assuming all sources are the same, an overall confidence figure can be calculated using the formula: $ia+(1-i)b$.

5.11.5.5 Assessing Veracity

Assessing whether a fact is true or false for the purposes of calculating a user confidence score can be done by looking solely at facts approved or rejected by an editor, or at facts that have been verified by other users subsequently asserting identical facts which together resulted in the assertion being considered true. In embodiments where a confidence figure is involved the count of true and false facts can be derived from summing their probabilities, e.g. 10 facts each of which has been calculated at 90% likely to be true from other sources would count as 9 true facts and 1 false fact.

Because user entities are rated partly by their track record of asserting true and false facts, some embodiments also provide an incentive for a user to both assert knowledge and to take great care that the facts asserted are accurate.

5.12 Pregeneration of Static Facts

In section 5.4 various methods were described to generate needed knowledge primarily in response to the execution of a query.

Some embodiments of the present invention additionally or instead, generate facts prior to the execution of a query and store these facts in the knowledge base.

Pregeneration enables faster responses to queries in some circumstances by preventing the need for the fact to be generated as part of the query processing. Additionally, in embodiments where the facts are stored in a relational database, it may enable some queries to be answered using a join of two or more lines where all the necessary facts have been pregenerated.

In the preferred embodiment, pregeneration is implemented as follows.

5.12.1 Pregeneration Rules

Pregeneration rules embody which facts are pregenerated and in what circumstances. These are like generators but are used to specify the creation of superfluous static facts as part of the pregeneration process rather than facts which are generated dynamically as part of query processing. Pregenerators comprise at least a trigger line, which is a pattern to be matched against static facts, a header query which tests and provides values and a footer which contains one more facts which can be pregenerated.

An example pregenerator is as follows:

```
trigger:
f: x [is an occupation of] y
header:
query tp
f [applies for timeperiod] tp
=>
f2: x [is an instance of] y
f2 [applies for timeperiod] tp
```

This example generates static [is an instance of] facts to sit alongside facts where an occupation is asserted. It could be used in embodiments where occupations are also subclasses of [human being]

The trigger line is part of the pregenerator that specifies when the rule should be used. In this case it is the existence of a static fact with [is an occupation of] as the relation.

The variables in the trigger line are substituted for the entities actually present in the static fact and the header query is then done. So if the static fact was:

[fact.2312348@semscript.com]: [singer] [is an occupation of] [jennifer lopez]

The header query would be

```
query tp
[fact.2312348@semscript.com] [applies for timeperiod] tp
```

This would return a value for tp of the 1 Jun. 1999 onwards so the pre-generated facts would then be:

```
f2: [jennifer lopez] [is an instance of] [singer]
f2 [applies for timeperiod] [timeperiod: [timepoint: ["1999/6/1"]]; [iafter]]
``` which would go into the static knowledge base (with a suitable ID substituted for f2).

Another example of a pregenerator is the following:

```
trigger:
    f: x [is geographically located within] y
    header:
        query z, tp
        f [applies for timeperiod] tp1
        f: y [is geographically located within] z
        f [applies for timeperiod] tp2
        tp [is the timeperiod intersection of] [group: tp1; tp2]
    =>
    f2: x [is geographically located within] z
    f2 [applies for timeperiod] tp
``` which pregenerates all the [is geographically located within] facts for an object with larger geographical areas enabling the system to respond more swiftly to queries where this knowledge is needed than if this had to be inferred during query processing.

5.12.2 Implemention of Pregeneration

Pregenerated static facts are labelled as such via a database flag and are treated differently from other static facts.

In the preferred embodiment pregeneration is an additional function of system assessment.

System assessment without pregeneration is described in 5.11. In embodiments which contain pregeneration it does additional steps to create pregenerated facts and manage them.

The first additional step is that after system assessing a fact as believed true, it is matched against all trigger lines of all the pregeneration rules and the resulting pregenerated facts (where they don't exist already) are added to the knowledge base, labelled as pregenerated. In the preferred embodiment this step is only done when system assessing static facts which are not pregenerated. However, embodiments where pregenerated facts can trigger pregeneration rules are also feasible. When pregenerated facts are created, the related_facts table should be updated to show what facts the pregenerated fact is inferred from. This can be achieved by simply system assessing each pregenerated fact immediately after creating it. In alternative embodiments, the fact that matched the trigger plus any static facts used to solve the header query can be used.

Secondly, when a pregenerated fact is system assessed as anything other than true and superfluous it is erased from the knowledge base. Pregenerated facts are by definition true and superfluous and this implementation relies on ensuring pregeneration rules match dynamic inference rules (generators) even if those rules, for efficiency, are only used during system assessment (system assessment only generators). In embodiments where pregenerated facts can trigger the creation of other pregenerated facts, the erasure of a pregenerated fact should immediately result in all facts that were generated by that pregenerated fact being immediately system assessed (removing them if necessary).

When a static fact on which one or more pregenerated facts relies changes state from believed true to believed false, the existing system assessment process of immediately system assessing facts that the related_facts table says are generated from this fact will thus result in these facts being immediately removed if they can no longer be supported.

Figure 47:
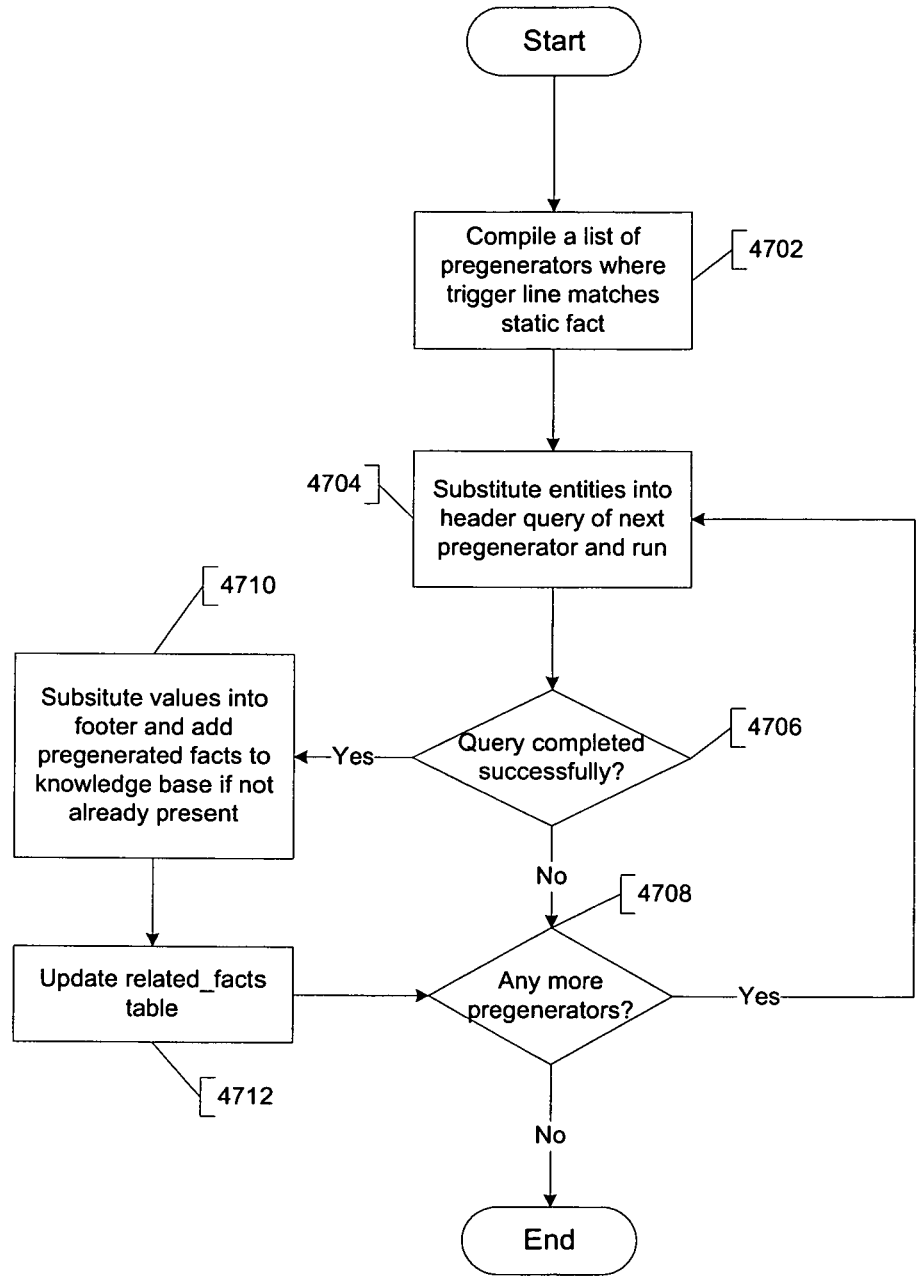
FIG. 47 shows a method for populating a knowledge base with additional true facts inferred from others.

A method for creating pregenerated facts after system assessment has assessed a non pregenerated fact as believed true is shown in FIG. 47.

The first step is to match the static fact against the trigger lines of the pregenerators and create a list (4702). This list is then looped through.

At the start of the loop, the next pregenerator header query is prepared by substituting in the values created by matching the static fact to the variables in the trigger line. This query is then executed. (4704)

A test is done to see if the query executed successfully (4706). If it didn't the loop continues ending if all the pregenerators have been tried (4708) otherwise any results of the query and any other variable substitutions from matching the static fact with the trigger line are substituted in to the footer facts to create the pregenerated facts which are then added (if not already present) to the knowledge base (4710).

Next the related_facts table is updated so that the static facts on which the pregenerated facts rely are recorded (4712). This can be achieved by system assessing the pregenerated facts.

5.12.3 Concise Explanation

Pregenerated facts and the facts which are used to generate them are stored within the related_facts table like any other fact.

As pregenerated facts may be less useful to display to the user, various embodiments including the preferred embodiment will substitute any pregenerated fact that might otherwise have occurred in the concise explanation with the non pregenerated static facts recorded in the related_facts table as being what can infer this knowledge. In embodiments where pregenerated facts can be used to infer other pregenerated facts, this process may need to be repeated a number of times until only non pregenerated facts appear.

In the preferred embodiment, the detailed explanation does still contain the pregenerated facts in the reasoning path but the fact profile of a pregenerated fact will show the facts that infer it so that a user can explore how the inference came about.

5.13 Vertical Support

Although embodiments of the present invention are fundamentally open domain and thus able to answer questions on any topic, the same systems and methods can be used for question answering in one or more verticals. As used herein, the term "vertical" refers to a defined knowledge domain within the entirety of human knowledge. Some examples are provided below.

Various advantages exist for supporting verticals including the ability to answer a higher percentage of questions than might be possible for open domain questions by comprehensively fleshing out a vertical in terms of factual knowledge. Additionally, by exposing a particular vertical though a website (say) a community of people who share an interest in the vertical can be developed which can result in stronger community dynamics and a larger quantity of user generated knowledge in that vertical area. Additionally third-party users of the system may only be interested in a vertical and the system knowing this can help with disambiguation and understanding the user's intent.

The simplest method for doing this would simply be to only populate the knowledge base with knowledge belonging to a particular vertical. However, various embodiments use methods described herein for automatically identifying one or more vertical areas within a wider knowledge base.

5.13.1 Specifying and Identifying a Vertical

A vertical can be specified by associating with it entities which belong to that vertical.

For example, the "movie" vertical could include (amongst others) the class [movie], the class [hollywoodactor] and the relations [is the film director of] and [starred in the movie].

This association can be done with facts in the knowledge base (e.g. [movie] [is a member of the vertical] [vertical: ["movie"]]) or by any non knowledge base method such a separate database table.

For classes this would identify both the class and all members of the class as belonging to the vertical. For relations it would identify both the relation and all facts using this relation as belonging to the vertical and for other entities it would identify them as belonging to the vertical.

A fact belongs to a named vertical if any entities within it belong to the vertical and a query additionally relates to the vertical if any named entity in it belongs to the vertical.

Embodiments which provide vertical support can answer questions through the lens of a named vertical by analysing the queries resulting from the translation of a user's question to see which (if any) of the translations are in the vertical. Consequently when asking about "James Dean" in the context of the movie vertical, the only interpretation that would survive the disambiguation process would be an interpretation about the Hollywood actor James Dean: all interpretations involving other people called "James Dean" would be ignored.

Figure 45:
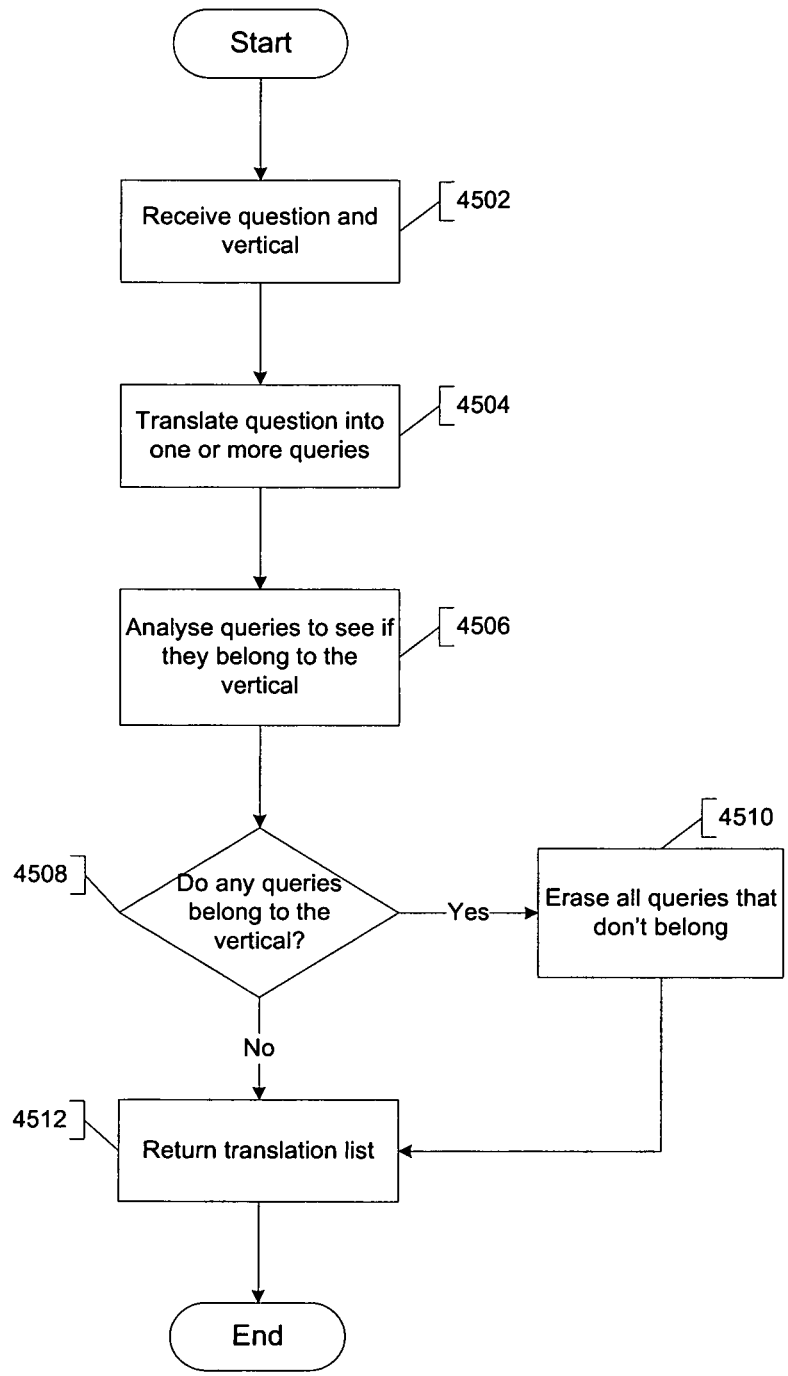
FIG. 45 shows a method of using knowledge about a vertical to help disambiguate a question.

This process is illustrated in FIG. 45.

The first step (4502) is to receive the natural language question and the vertical. The specified vertical could come as a parameter specified in an API call or it could be implicit (e.g. by the question coming via a website known to be in the named vertical).

Next the question is translated as described in section 5.6 resulting in one or more queries which are possible translations of the question (4504). This process might include discarding interpretations which are unlikely to have been intended as the answer (see section 5.6.7).

The various queries are then analysed to see whether they belong to the vertical by seeing if they contain any named entities which belong to the vertical (4506).

A test is then done to see whether any of the list contains an interpretation that belongs to the vertical (4508). If the answer is yes, all the interpretations that don't belong to the vertical are removed (4510) and the remaining one or more queries are returned (4512). If there is still more than one interpretation remaining these can be dealt with by prompting the user to disambiguate or by combining multiple answers using the methods described herein.

If there are no interpretations belonging to the vertical, they are all returned (so asking "who is the president of france" in the movie vertical would still get an answer). Alternative embodiments could alternatively decide not to answer questions outside the vertical and simply return an error or nothing in this situation.

5.13.2 User Creation of their Own Verticals

In various embodiments supporting verticals users can specify and automatically create their own vertical definitions by naming a vertical and identifying the entities (including possibly classes, relations and other entities) that belong to it.

In some web based embodiments this could result in the automatic creation (perhaps after approval) of a specific site for that vertical (perhaps accessible via a subdomain of the main site, e.g. movies.trueknowledge.com) where all questions asked were interpreted in the context of that vertical (using the methods described above) and where knowledge addition was similarly interpreted by disambiguating to facts and entities that belong to the vertical. These vertical sites could also filter any statistics or tools they calculate or display through the vertical. For example, a league table of top contributing users would only show facts that belong to the vertical associated with the site and the any recent knowledge addition reported would be facts that have entities belonging to the vertical.

Figure 46:
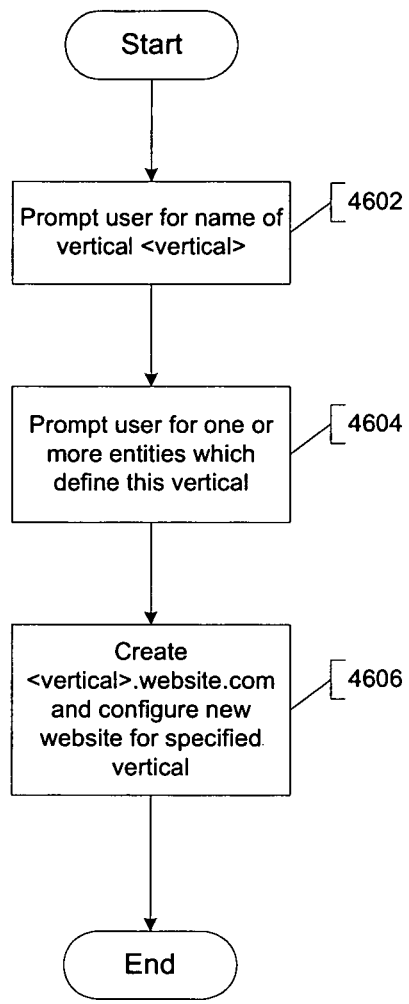
FIG. 46 shows a method for users to create vertical question answering sites of their own choosing.

This method is illustrated in FIG. 46.

The user is first prompted for the name of the vertical that they wish to establish (4602). They are then prompted to specify the vertical, for example, by being prompted for the names of entities which belong to the vertical (4604).

The system would then create a subdomain of the main website for the vertical and record the definition of the vertical (4606) enabling the subdomain to be a window into the main knowledge base with the knowledge constrained to only that which belongs to the vertical. Additional configuration steps can include listing the user as the owner (or having an alternative special status) of the new site. In alternative embodiments the website would exist as a subdirectory of the main site. e.g. website.com/verticalname/instead of verticalname.website.com.

5.14 Preventing Abuse

Various embodiments including the preferred embodiment include one or more abuse prevention mechanisms to prevent abusive assertions of knowledge (new facts or user assessments).

Examples of the abusive assertion of knowledge include deliberately asserting incorrect facts or making false user assessments, particularly ones designed to cause distress to other users or cause other problems.

System assessment and user assessment go part of the way to addressing these issues but other techniques have utility in certain embodiments.

A technique used in various embodiments is to label certain patterns of knowledge as prohibited. Once facts have been identified as prohibited they can either be refused before they are added or suppressed from use in answering queries once they are added. In the preferred embodiment this is achieved with facts in the knowledge base which specify such patterns. (Alternative embodiments could store these patterns in a different location.) For example:

[suppressed for knowledge addition] [applies to] [fact pattern: [object unspecified]; [is an instance of]; [objectionable human being]]
[suppressed for knowledge addition] [is an attribute of scope] [fact pattern].

[fact pattern] is a parametered class which describes facts in terms of patterns of known and unknown objects. In the above example, all facts of the form:
x [is an instance of] [objectionable human being]
are suppressed.

[objectionable human being] is a subclass of [human being] reserved for people who are disliked. In the preferred embodiment there are (naturally) no assertions of members—its reason for being in the ontology is so additions to it can be prohibited (if the user could add the class it would be harder to prohibit additions of members in advance).

Denotational strings for the class include all common abusive words, so someone asserting that their boss is a "jerk" (say) can be understood. (To prevent the user from attaching the word "jerk" to another new class, the pattern [fact pattern: ["jerk"]; [can denote]; [object unspecified]] can also be suppressed along with similar translation patterns [commonly translates as] etc.)

The preferred embodiment also provides an explanation for use when a user attempts to add a suppressed fact. This is done with facts of the form:

["too subjective to be allowable"] [is the reason for the suppression of] [fact pattern: [object unspecified]; [is an instance of]; [objectionable human being]]

Figure 42:
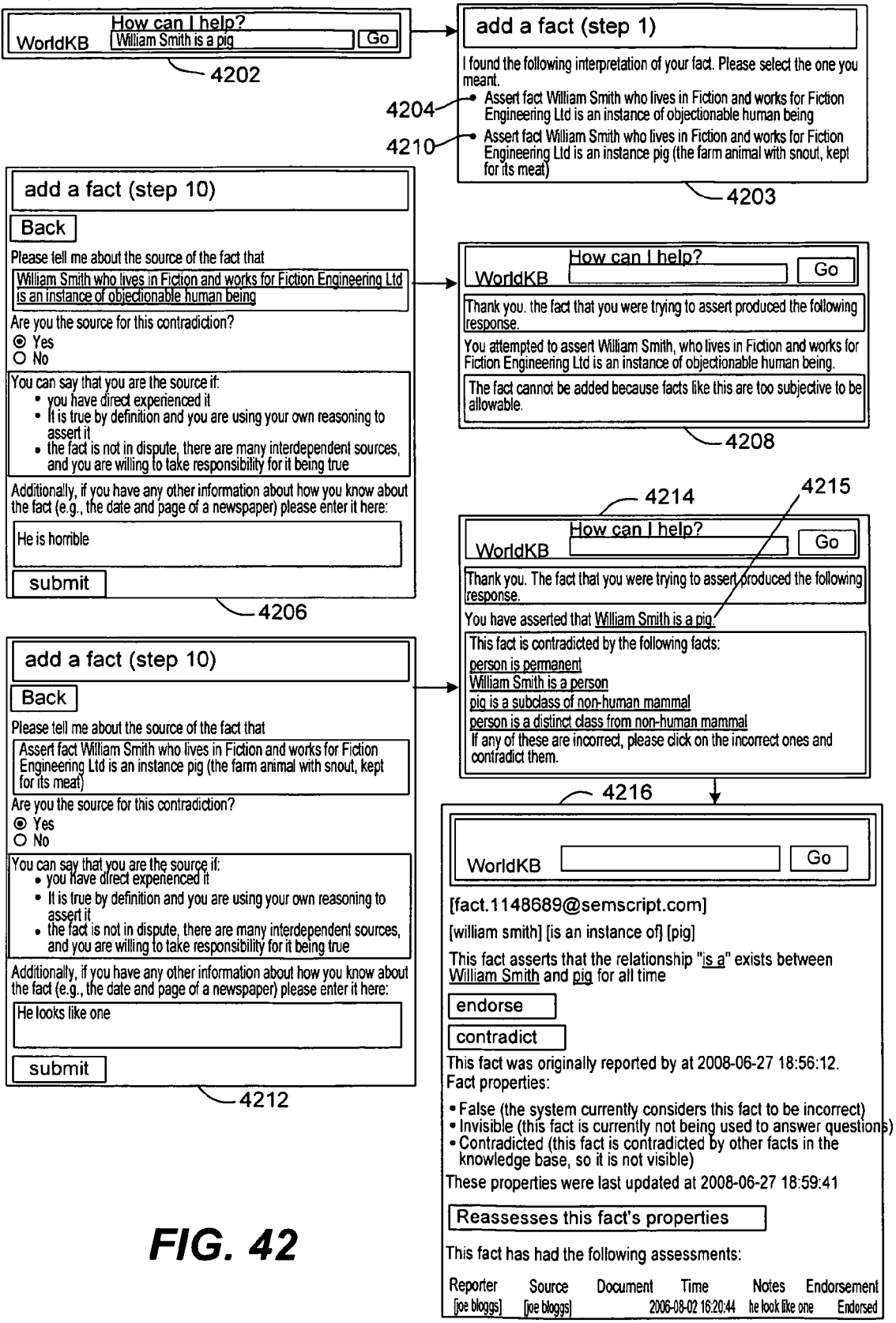
FIG. 42 illustrates an exemplary interaction with a user where the user's attempts to abusively assert knowledge are thwarted by two different abuse prevention techniques.

FIG. 42 shows an example of these abuse prevention measures in operation.

In screen 4202 the user has maliciously typed "William Smith is a pig" into the system's general prompt.

The translation system has correctly translated this into two possible interpretations (shown on screen 4203):
The assertion that William Smith is an objectionable person (4204)
The assertion that William Smith is a farm animal (4210)

(Embodiments containing a substantial number of people would probably need to do some ambiguity resolution on the person as well, as the name is fairly common. This is an example using a fictional person for illustrative reasons.)

Screen 4206 shows what happens if the user selects the first of these choices (link 4204)

After source selection the add_fact system matches the fact to a fact pattern that is [suppressed for knowledge addition] and thus refuses to add it to the static knowledge base at all, printing out the reason. This is shown in screen 4208. (An alternative embodiment could record it in the system but not use it for query responses.)

4212 shows what happens if the user selects the second link on screen 4203 (link 4210).

Again the system asks for a source, but this time the fact doesn't match any suppressed pattern and the fact is added to the static knowledge base and system assessed. However, the system assessment discovers that the fact is contradicted and the output of this contradiction including all the static facts which together are in semantic conflict with the new assertion are shown (screen 4214). As all these facts are unchallengeable there isn't actually anything the user can do. Even if they were, they would be unlikely to change the veracity of any of them by themselves unless they were a trusted user.

The user clicks on the fact they just asserted (link 4215) and this opens a profile of the newly added fact (4216).

Screen 4216 shows that the fact they just added is believed false, invisible and contradicted (i.e. it is not being used to answer queries and is not displayed) so again the user has been thwarted.

Furthermore, this incorrect fact can now be used to attach a lower level of trust to assertions and endorsement/contradictions made by this user in the future.

Various embodiments can also implement a "soft" form of this technique so that facts that match the pattern are allowed but are immediately flagged for rapid review by an editor.

Alternatively or additionally facts so matching can use deferred publication protocol (see section 5.10.2.2) instead of immediate publication protocol (section 5.10.2.1).

This soft suppression could be used for facts which have significant potential to be abusive but can nevertheless be true. Examples would include asserting that a new geographical area was a US State long after all 50 states had already been added or asserting a date of death for a prominent unpopular politician.

Another similar technique is the attribute [class is complete] which can be applied to certain classes, e.g.
[class is complete] [applies to] [boolean]

The add_object process will refuse to allow new objects to be added to any such class (or subclass of such a class).

This prevents someone from using add_object to add (say) a third Boolean value or a 13th calendar month. The add_fact process also needs a check for facts of the form x [is an instance of] y where this attribute applies to class y.

5.15 Knowledge Contribution Incentives

Various embodiments include one or more incentive mechanisms designed to motivate users to add knowledge to the system. Desirably this knowledge should be relevant, useful and accurate.

The various methods that can be included in such incentive mechanisms are now disclosed:

5.15.1 League Table

One incentive is to publish a ranking of entities who have contributed the most to the system. Various embodiments make this publication optional: users could exclude themselves from this list if they chose. Such a list can motivate some of the higher contributors by encouraging a competitive spirit and being a public display of gratitude. Being high ranked could give personal kudos and may lead (in some embodiments) to becoming an editor.

One's track record of adding facts can be displayed in a [human being] profile template focussing on statistics and contributions. An example is shown in screen 1414 in FIG. 14.

5.15.2 Payments

Other embodiments motivate users by promising and paying commission on earnings derived from the commercial exploitation of the knowledge that they contribute over a named time period.

These ideas require a measure of how much has been contributed. One embodiment simply counts facts added to the knowledge base by a user. Embodiments where facts are assessed as being true or false or given a confidence score use these to calculate a count of true facts.

In the preferred embodiment ranking is done by calculating how often facts contributed by a user are referenced when processing queries submitted by users of the system. This can be implemented simply by incrementing a count each time a particular fact is used in answering a query. A usage count method has the virtue of encouraging users to focus on knowledge that other users are interested in looking up. A pure count method may encourage users to add large quantities of knowledge that nobody is interested in. Various embodiments may additionally publish questions/queries that users have submitted where an answer wasn't found, in order to encourage users to contribute the knowledge missing in these cases.

Other embodiments combine both this usage count with a count of facts contributed using a weighted sum. Other embodiments further distinguish between routine facts used as part of the query-answering process (such as a common relationship being symmetric) and facts that are directly part of the knowledge the user was attempting to discover. Such critical facts are weighted more highly.

The preferred embodiment also has a mechanism where users can draw aspects of the published knowledge to the attention of an editor. In various embodiments this is accompanied either always or in certain circumstances by the payment of a fee for consideration. In embodiments where both types of contact are permitted, the ones accompanied by a fee are given a high priority. The petition could be one asking for an asserted fact to be rapidly widely published.

5.15.3 Focusing Users on Needed Knowledge

When users are incentivised to add knowledge that is of maximum use to other users (e.g. the financial, commission-based incentive above) another method used in various embodiments is to log all requests which cannot be answered from knowledge in the knowledge base. This log is also augmented with a record of whether the requests are independent (submitted from different computers/people) and the time of the request, and enables a count to be made of how often this request has been made. If knowledge is added that subsequently allows the query to be answered, the time will show which requests should still be considered not known (ones submitted before the earliest time the query was known to be answerable are no longer an issue). In another embodiment all identical requests can be updated with a Boolean flag or erased from the list when the system discovers a query can now be answered.

A user wishing to submit knowledge that is maximally useful can then ask the system to give them a high-frequency unfulfilled request so that they can research what knowledge is missing from the knowledge base in order to add it. The system would then give the user "ownership" of that query for a limited time to stop multiple people competing to add the same knowledge. Once their ownership ended, the system will run the query internally to see whether they had succeeded and either remove it from the list or maintain it for another user to consider in due course. Further embodiments of the system would prioritise the most needed queries to the most trusted (by track record) users.

In a further embodiment users could attach an amount of money to an unanswered query to financially incentivise someone else to add the knowledge. The user that got this query to add would get a percentage of the money when the appropriate knowledge was added. Furthermore, such queries would be offered first to the most trusted users in financial amount order giving users a financial incentive to build a good track record: they are then nearer the front of the queue for the larger payments. Queries where users attach money to get them answered could be queries that they have typed in and not got a response or they could be in the form of short messages describing what knowledge they want added to the knowledge base.

5.15.4 Usage Agreement

A further method the preferred embodiment uses to increase the accuracy of the knowledge asserted is to publish a usage agreement within the system, and to prompt each user to read and consent to it before using the system. The usage agreement contains terms that insist that only knowledge that the user believes to be true should be asserted, and provides negative consequences if these terms are broken. Warnings referring to the importance of accuracy and the user agreement are also included in the screens presenting the interaction with the system when the knowledge is asserted by the user.

5.16 Integrating with a Search Engine (Using Documents as a Fall-Back)

Figure 43:
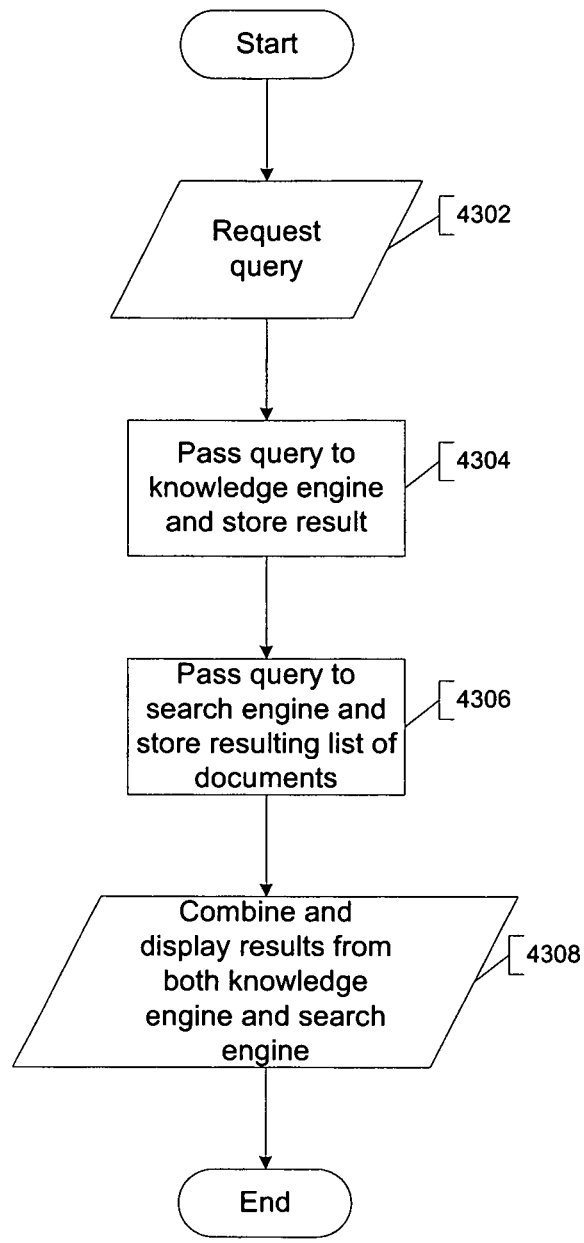
FIG. 43 shows a method of utilising a prior art search engine in combination with an embodiment of the current invention to process a user search query.
Figure 44:
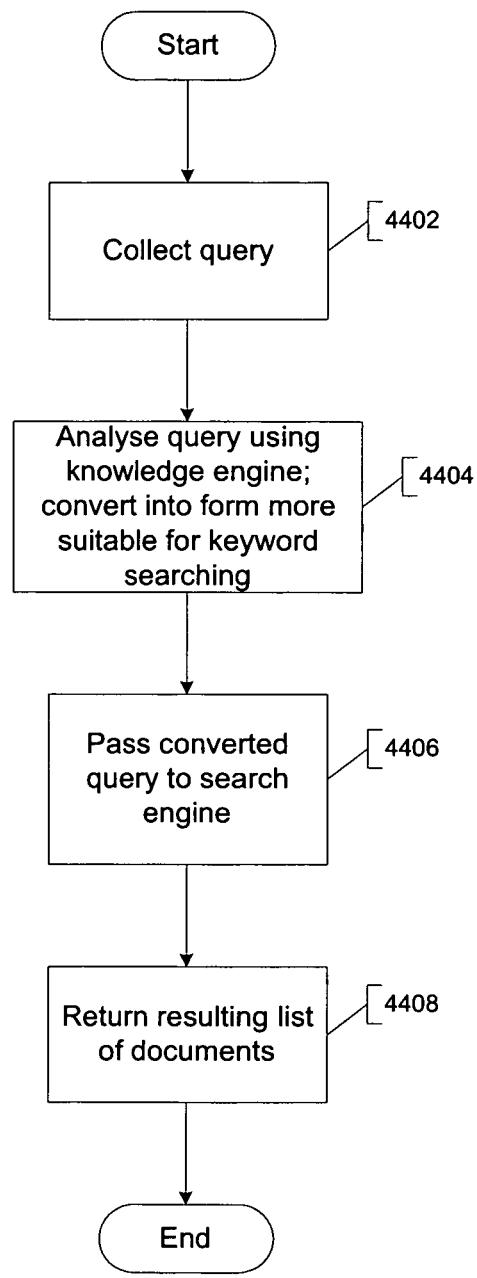
FIG. 44 shows a method of enhancing a user search query using knowledge obtainable from an embodiment of the present invention.

Some embodiments of the present invention work as part of, or together with, an internet search engine. FIG. 43 illustrates this. The search string entered by the user (step 4302) is processed as a question (step 4304) and the result (if any) is stored. The string is then passed on to a search engine (step 4306), possibly after refinement (as illustrated in FIG. 44, and discussed in more detail in section 5.16.1 below). The results from both processes (4304 and 4306) are then combined and displayed (step 4308).

The combination of search-engine and embodiment of the invention can be achieved in various ways.

In one embodiment, the search-engine is simply an additional component operable to take a query and produce an ordered list of documents. This component can be called as a fall-back when a question is not translated or when the question is translated but no responses are produced. i.e. The output can actually just be one result or the other.

In an alternative embodiment, the invention is implemented as a "plug-in" for a pre-existing search-engine. The primary system is a standard search-engine but the user query is additionally passed through this embodiment (possibly acting remotely). Any response from this embodiment is displayed above the search-engine results or instead of the search-engine results. If there is no useful response, the search-engine results are displayed. In this way the user is no worse off than they would have been using a standard search-engine but if their query can be answered using this embodiment, the user benefits from the advantages of a response based on structured knowledge. FIG. 2 shows an example of this.

Various embodiments handle the combination and display of results in various ways. If the results were recognised and the knowledge base produced useful answers, this output could be presented either instead of or in addition to the normal output from the search engine. The display of search engine results could depend on the user clicking a link. (In some embodiments step 4306 would be normally bypassed, and only initiated if the user chose to click on a button or link to show search engine results.) If all or some of the search string were recognised as denoting an object in the knowledge base, one or more profile screens for those objects could form all or part of the output. In other embodiments links to the profile screen(s) or knowledge base response could be output.

The functional combination of search-engine and present invention embodiment can be achieved in a variety of ways:

According to various embodiments, the combination of requests happens at the server end. The user query is transmitted over the internet to the web server which passes the request to both the search engine and this embodiment, combines the results and presents the resulting combined results to the user.

According to other embodiments, the combination happens at the client end. For example, a toolbar or web browser extension supplies the user query to both a search engine and independently to an online embodiment of this invention, receives the results independently from each system and acts accordingly. This action could be to display the structured knowledge results if successful and the search-engine results if not; to combine the two into a single page or to open two windows, one for each set of results.

5.16.1 Keyword Refinement

In other related embodiments the knowledge base is used to enhance the query prior to processing by the search engine. This refinement process is illustrated in FIG. 44. The query to be refined is first collected (step 4402), and then analysed and converted into a form more suitable for keyword searching (step 4404). The converted query is then passed to a search engine (step 4406), and the resulting list of documents returned (step 4408). For example, when a string is recognised as denoting an object in the knowledge base, other strings known to denote this object can be used to form part of the keyword search, especially when the present system knows that such alternative strings uniquely denote the object being searched for (or are used for this object in the majority of cases). For example, a web search involving the string "Bill Clinton" could be expanded to also search for pages including the string "William Jefferson Clinton" or "President Clinton" and (optionally) to treat the alternatives equally.

A further refinement to this embodiment working in conjunction with a search engine is some pre-processing of the query string when the query is in question form, to make it more likely to locate the information in a web-based document—specifically removing possible keywords that are part of the grammar of the question rather than words needed to be located within the documents searched for. For example, if the query starts "What is . . . " and the answer is not located in the structured knowledge base, the query is going to be used for keyword searching in the hope that the search engine will turn up a document that has the answer contained within it in natural language. As a consequence the word "what" is not a keyword that should be searched for and should be extracted from the query before passing it to the search-engine.

5.17 Remote Computer Interface

A desirable (but optional) feature present in various embodiments is to allow access by remote computers. As embodiments are able to produce knowledge in structured form, services provided, especially query answering, have the potential to be substantially more useful to a remote automated system than natural language documents returned by a search engine which are designed for (and only really useful for) human eyes.

The preferred embodiment is operable to provide several services to remote automated systems including:

Query answering. The remote automated system sends a query over the network and the embodiment processes the query and sends the results back.

Translation. The remote system sends a natural language question over the network and a translation into one or more queries is returned.

By providing a variety of services some components of various embodiments (such as the knowledge addition component) can be located on remote systems on the network and use the remote computer interface to interact with other components.

Computer communication over a network is a very established area of technology so a large variety of implementations will be obvious but an interaction with the remote computer interface will typically involve:

Transmission over the network of request data specifying the requested service by the client automated system.
Receipt of this request data by the embodiment.
Fulfilment of the service using the request data and generating return data (e.g. the results from processing the query).
Transmission by the embodiment of this return data over the network.
Receipt of the return data by the client automated system.

In many embodiments the request data will include authentication data enabling the embodiment to know the identity of the remote automated system and to (optionally) record and (optionally) seek consideration for the service (for example charging money).

Other embodiments use an interactive session where a single interaction is accomplished by more than two interactive transmissions of data. For example, the authentication step could be done first and once authentication had been acknowledged the client system could then send the query to be answered.

The preferred embodiment is operable to receive the request data via an HTTP (or HTTPS) request where the request data is encoded using HTTP request variables. The embodiment responds (again using HTTP) with an XML document matching a pre-determined XML schema.

5.17.1 Example Remote Computer Interaction

Here is a sample interaction with the preferred embodiment, disclosed to illustrate the principles involved and give a concrete example of an XML schema suitable for answering translation and query requests.

5.17.1.1 Translation Request

First the remote computer wants the question "Who are President Monroe's children?" translated. It sends the following HTTP request (essentially opening the following URL):

```
http://www.worldkb.com/remote_service?user=xxx1&pw=
testpassword&service=question&question=Who+are+President+
Monroe%27s+children%3F
```

The remote system responds with:

```
<semscript:response xmlns:semscript="http://www.semscript.com/
ns/remote_service" type="question">
<semscript:status>ok</semscript:status>
<semscript:num_results>1</semscript:num_results>
<semscript:result type="query">
<semscript:query>
query e|[current time] [applies to] now|f: e [is a child of] [president james
monroe]|f [applies at timepoint] now
</semscript:query>
<semscript:retranslation>
Determine which objects have the relationship 'is a child of' to President
James Monroe, the 5th President of the United States at the current time.
</semscript:retranslation>
</semscript:result>
</semscript:response>
``` i.e. The query returned is:

```
query e
  [current time] [applies to] now
  f: e [is a child of] [president james monroe]
  f [applies at timepoint] now
```

5.17.1.2 Query Response

The remote system then attempts to get an answer for the query with the following HTTP (or HTTPS) request:

```
http://www.worldkb.com/remote_service?
user=xxx1&pw=testpassword&service=query&xml=1&query=query+
e%0D%0A%5Bcurrent+time%5D+%5Bapplies+to%5D+
now%0D%0Af%3A+e+%5Bis+a+child+of%5D+
%5Bpresident+james+monroe%5D%0D%0Af+%5Bapplies+
at+timepoint%5D+now&mode=full&explanation=1
``` and gets the following response:

```
<semscript:response xmlns:semscript="http://www.semscript.com/ns/
kengine" type="query_execution">
<semscript:status>complete</semscript:status>
<semscript:num_results>3</semscript:num_results>
<semscript:result>
<semscript:variable name="e">
<semscript:id>[eliza kortright monroe]</semscript:id>
<semscript:unique_translation>Eliza Kortright Monroe, daughter of US
President Monroe, 1787-1840</semscript:unique_translation>
</semscript:variable>
</semscript:result>
<semscript:result>
<semscript:variable name="e">
<semscript:id>[james spence monroe]</semscript:id>
<semscript:unique_translation>James Spence Monroe, 1799-1800, son
of US President Monroe</semscript:unique_translation>
</semscript:variable>
</semscript:result>
<semscript:result>
<semscript:variable name="e">
<semscript:id>[maria hester monroe]</semscript:id>
<semscript:unique_translation>Maria Hester Monroe, 1803-1850,
daughter of US President James Monroe</semscript:unique_translation>
</semscript:variable>
</semscript:result>
<semscript:explanation type="short">
<a href="profile?id=[fact.1147791%40semscript.com]">Eliza Monroe is
a child of President James Monroe</a><br />
```

-continued

```
<a href="profile?id=[fact.1132264%40semscript.com]">'is a child of' is
permanent</a><br />
<a href="profile?id=[fact.1147792%40semscript.com]">James Monroe is
a child of President James Monroe</a><br />
<a href="profile?id=[fact.1147801%40semscript.com]">Maria Monroe is
a child of President James Monroe</a><br />
</semscript:explanation>
<semscript:explanation type="long">
[ . . . ]
</semscript:explanation>
<semscript:num_essential_facts>4</semscript:num_essential_facts>
<semscript:essential_fact>
<semscript:fact_id>fact.1147791@semscript.com</semscript:fact_id>
<semscript:fact_translation>Eliza Monroe is a child of President James
Monroe</semscript:fact_translation>
[ . . . ]
</semscript:response>
```

The long explanation and some other data has been removed for space reasons but the example should illustrate the principles involved.

5.17.2 Example Applications

The remote computer interface can be used any computer system wanting access to real world knowledge for any purpose. The number of applications is therefore extremely large.

However, to give some idea of the possibilities, some random example applications are now disclosed which embodiments of the current invention may enable via the remote computer interface. This is not intended to be a definitive list but to be illustrative of what can be achieved and to further expand upon the principles disclosed:

5.17.2.1 Enhanced Email Client #1

In current email clients one must either know the recipient's email address when sending an email, either directly or by having their details in a local address book. Furthermore, when email addresses change or become obsolete, the records in the local address book do not update.

Using the remote computer interface to an embodiment of the present invention containing substantial amounts of knowledge of people and their addresses, this would no longer be a problem. The user could simply type the name of the person or entity that they wish to email into the To: field and the email client could do a query to determine the correct email address. For example, for "William MacDonald" typed into the To: field, the query could be:

```
query urs,e
    ["William MacDonald"] [can denote] p
    p [uniquely translates as] urs
    [current time] [applies to] now
    f: e [is the main email address of] p
    f [applies at timepoint] now
```

Ambiguity (via unique translation) could also be overcome. In the above example, the unique recognition strings of all the people to which "William MacDonald" is a valid denotational string and who have an email address stored are returned. The unique recognition string or strings can be used to confirm the intended recipient or to enable user selection in the event of ambiguity.

In an alternative embodiment it can be done in two steps, with all the people listed and the email address retrieved It could also handle a miniature translation using embodiments where translation is a remote service. For example, the user could type "The CEO of Fiction Engineering Ltd" without knowing his name. The email client could then translate that into a query, do the query and look up their email address.

5.17.2.2 National Holiday Determination

Applications which need to determine whether a particular date is a national holiday in a particular jurisdiction (e.g. scheduling systems, diary applications, loan interest calculation systems) are likely (prior to access to an embodiment of the current invention) to have this information stored in a local database or some form of local system requiring quite complicated coding.

An embodiment with this knowledge supported could enable all such applications to retrieve this information via the remote computer interface without any of them needing any local coding beyond what is needed to support access.

There are a number of ways this knowledge can be represented in various embodiments. One exemplary method is to have a class of calendar dates which is a subclass of timepoint with the accuracy specified to a day/year only and to have a subclass of calendar dates for national holidays.

An example query could then be:

```
query
    [timepoint: ["2006/5/29"]] [is an instance of] [england and wales
    bank holiday]
```

Corresponding to the question "Is the 29th of May 2006 an English bank holiday?"

Separate classes can be added as more jurisdictions are added.

Alternatively the classes can use a parametered object with the administrative area at issue as the parameter, e.g. for national holidays in the United States the class could be [national holiday: [united states of america]].

5.17.2.3 Automatic Threading of Emails by Entity

Email clients can only distinguish between different email addresses. In practice people have several different email addresses and over years change their address regularly. Without express knowledge being given to the email client, the email client has no way of knowing that these different emails from different from-addresses came from the same person.

An embodiment keeping track of current and former email addresses of people and entities can provide this knowledge to an email client via the remote computer interface enabling all emails from the same entity to be grouped together regardless of the address they were sent from.

An example embodiment could implement this with the transient relation [is an email address of], left class [email address], right class [agreement making entity] (a parent class of human and organisation). The query need not specify any temporal constraints as the query is asking for all current and former email addresses of a person.

5.17.2.4 Polling for Events of Interest

By periodically doing a query an automated system can keep a user up-to-date with news about entities of interest.

For example, a program could periodically do a query to test and to discover the marital status, life/death status, children and employment status of friends, family members and acquaintances of the person wanting this service. This test could be done daily (e.g. with a cron job) and changes reported to the user (e.g. by email).

Such a service would automatically keep a person up-to-date with events of great personal (but not national) interest which might otherwise only be communicated late or not at all and certainly would not be communicated using the conventional media.

An automated system could use a similar technique to do certain actions once an event had taken place. For example, by using automated periodic polling of a query, it would be possible to arrange to send an email after one's own death—perhaps sending information to loved ones that one wanted suppressed during one's lifetime.

5.17.2.5 Enhanced Word Processor Features

Embodiments of the current invention can contain a substantial amount of natural language data linking natural language to real-world entities and additionally providing much useful knowledge about those entities.

By using the remote computer interface a word processing application could intelligently identify what was being described and offer additional services tailored to what is being typed. For example, when a person's name was being typed, an option to insert an identifying photograph of that person into the document could become available. When a geographic area was mentioned, maps and driving directions could be offered.

5.18 Advertising and Messaging Applications

5.18.1 Contextual Advertising

The knowledge systems described herein can be applied to improve contextual advertising systems.

With current contextual advertising systems attached to search engines or displayed on general web pages, advertisers bid on keywords. Keywords are often ambiguous. Furthermore, there may be many keywords that are relevant to the product or service being advertised.

In contextual advertising systems powered by embodiments of the present invention, the advertiser can specify the semantic concepts that they wish their adverts to be associated with (by ID) and the relevance can be determined from facts relating natural language words and phrases to the semantic concept(s) advertised. In some embodiments the keywords can be generated in advance from the semantic concepts. In other embodiments their semantic concepts can be used to determine which adverts to display in real time.

In the various human question answering embodiments described herein, the disambiguation process can be used to determine more accurately which adverts are appropriate.

For example, with the example "is Madonna single?" question, contextual adverts about music singles or adverts advertising businesses local to Madonna, Md. can be ignored as the disambiguation process has shown that neither of these concepts is related to the question. Compare this with a keyword based approach where the intended sense of "single" would not be apparent and where finding appropriate keywords for Madonna, Md. would be impossible.

An advertiser wanting to advertise a celebrity gossip magazine would be able to display their advert very appropriately against this query as a high degree of confidence could be established that both the celebrity and her marital status were being asked about.

5.18.2 More Intelligent Advertising

An additional way that more relevant advertising can be delivered on systems powered by embodiments of the present invention is via intelligent sponsorship based on knowledge generated by reference to the human being entity using the system.

For example, a user with a young child whose birthday was coming up in the next few days could be presented with a highly-tailored intelligent message directing him to a local bakery which sells birthday cakes. The advertiser might be the bakery attempting to identify local parents with children celebrating their birthdays.

A second example, would be a drug manufacturer trying to reach individuals who are members of a particular medical specialty.

Each of these examples can be implemented by the advertiser creating a query based on the user id of the user which can be used to trigger or generate the text for the message. e.g. For the second example:

```
query
[current time] [applies to] now
h [is the true identity of] [user: ["joesmith576"]]
f: a [is the occupation of] h
f [applies at timepoint] now
f [is strictly equal to] [cardiologist]
``` would return yes if the user is a cardiologist.

The first example would be similar but would generate family members and their birthdays for checking.

Other queries (such as could be used in the first example) could generate strings to be inserted into a template message—such as the child's name and the birthday date.

5.18.3 Intelligent Messages and Reminders

Similar to the intelligent advertising ideas above is the generation of intelligent messages that might be useful or enjoyable to the user.

For example:
Happy Birthday
Don't forget that tomorrow is your wedding anniversary.
Today is your business partner John's birthday The mechanism for the implementing these is similar to that described above with queries based on the user id (or human being id in embodiments where that is used directly) to generate the message or strings in the message.

6 Supporting Documentation

6.1 Additional Materials

6.1.1 Exemplary Embodiment Ontology

The root class is [object]

6.1.1.1 Immediate Subclasses of [Object]:

```
[conceptual object]
[group]
[thing with a creation date] (subclasses are [physical object] and others)
[object which can have a geographical location] (subclasses [geographical area] [physical object] and [organisation])
[source of knowledge]
[physical object] [is a distinct class from] [conceptual object]
```

6.1.1.2 Subclasses of [Physical Object]

```
[biological object] (subclasses [animal] [plant] [virus])
[agreement-making entity] (similar to a legal person, subclasses [human being] [organisation])
```

6.1.1.3 Subclasses of [Conceptual Object]

```
[boolean]
[animated visual medium]
[concept with variable precision] (subclasses include [geographical area] and [timepoint])
[linguistic concept]
[mass]
[number]
```

125
-continued

[worldkb object] (suclasses include [fact] [attribute] [relation] [class] etc.)
[string]
[timeperiod]
[timepoint]

6.1.2 Additional Generators

The following is a list of generators present in the preferred embodiment (and not mentioned elsewhere).

```
generator.ap@semscript.com
! Adds meaning to the [attribute is permanent] attribute
generator
f$: a [applies to] b
[attribute is permanent] [applies to] a /s
=>
f$ [applies for timeperiod] [timeperiod: [time zero]; [forever]] *
generator.dc1@semscript.com
generator
a$ [is a subclass of] e
b$ [is a subclass of] f
e [is a distinct class from] f /s
=>
a$ [is a distinct class from] b$ *
generator.dc2@semscript.com
generator
a$ [is a subclass of] e /s
e [is a distinct class from] b$ /s
=>
a$ [is a distinct class from] b$ *
generator.dc3@semscript.com
generator
b$ [is a subclass of] f /s
a$ [is a distinct class from] f /s
=>
a$ [is a distinct class from] b$ *
generator.distinct1@semscript.com
! Definition of a distinct class
generator t
v: a$ [is an instance of] c
v [applies for timeperiod] t
c [is a distinct class from] b$
=>
f: a$ ~[is an instance of] b$ *
f [applies for timeperiod] t
generator.opposite1@semscript.com
! Where an attribute has an opposite
! creates the opposite fact (neg to pos)
generator up
a$ [is the opposite of] b
f: b [applies to] x$
f [applies for timeperiod] tp
=>
t: a$ ~[applies to] x$ *
t [applies for timeperiod] tp
generator.geo1@semscript.com
generator tp
t: a$ [is geographically located within] c
t [applies for timeperiod] tp1
b$ ~[equals] c
t2: c ~[is geographically located within] b$
t2 [applies for timeperiod] tp2
t3: b$ ~[is geographically located within] c
t3 [applies for timeperiod] tp3
tp [is the timeperiod intersection of] [group: tp1; tp2; tp3]
=>
f: a$ ~[is geographically located within] b$ *
f [applies for timeperiod] tp
generator.trueofevery1@semscript.com
! being human has the same meaning as being a human
generator tp
a$ [is true of every] cl
f: p$ [is an instance of] cl
f [applies for timeperiod] tp
=>
n: a$ [applies to] p$ *
n [applies for timeperiod] tp
```

126
-continued

```
generator.leftunique1@semscript.com
generator tp
[left unique] [applies to] r$ /s
t: b r$ c$
t [applies for timeperiod] tp
b ~[equals] a$
b ~[is a more accurate version of] a$
a$ ~[is a more accurate version of] b
=>
g: a$ ~r$ c$ *
g [applies for timeperiod] tp
generator.left_coinc_att@semscript.com
! Links the left coincident attribute of a relation
! to any objects on the left side of that relation
generator tp
a$ [is the left coincident attribute of the relation] y /s
f: x$ y z
f [applies for timeperiod] tp
=>
t: a$ [applies to] x$ *
t [applies for timeperiod] tp
generator.neg1@semscript.com
! Inference from the golden rule
generator t%
x$: a r b
f: a ~r b
f [applies for timeperiod] t%
=>
x$ ~[applies for timeperiod] t% *
generator.perm5@semscript.com
generator
g$: a r b
[relation is permanent] [applies to] r /s
=>
g$ [applies for timeperiod] [timeperiod: [time zero]; [forever]] *
generator.permanent@semscript.com
! If a class is permanent membership and something is
! an instance of it at any point implies that it is for
! all time.
generator
f$: a [is an instance of] b
[class is permanent] [applies to] b
=>
f$ [applies for timeperiod] [timeperiod: [time zero]; [forever]] *
generator.permanent2@semscript.com
! You cannot have a permanent membership class which
! has a parent class which is not.
generator
b [is a subclass of] c$ /s
[class is permanent] [applies to] b /s
=>
[class is permanent] [applies to] c$ *
generator.trueofeverynotinstance@semscript.com
generator tp
a [is true of every] b$
f: a ~[applies to] a$
f [applies for timeperiod] tp
=>
f1: a$ ~[is an instance of] b$ *
f1 [applies for timeperiod] tp
generator.transitive1@semscript.com
! Embodies transitivity. Only true for the timeperiod when
! both relations hold.
generator c%,t3
[transitive] [applies to] r$ /s
f1: a$ r$ b /s
f1 [applies for timeperiod] t1
f2: b r$ c%
f2 [applies for timeperiod] t2
t3 [is the timeperiod intersection of] [group: t1; t2]
=>
t4: a$ r$ c% *
t4 [applies for timeperiod] t3
generator.transitive2@semscript.com
! Embodies transitivity. Only true for the timeperiod when
! both relations hold.
generator a,t3
[transitive] [applies to] r$ /s
f1: b r$ c$ /s
```

```
f1 [applies for timeperiod] t1
b ~[equals] c$
f2: a r$ b
f2 [applies for timeperiod] t2
b ~[equals] a
t3 [is the timeperiod intersection of] [group: t1; t2]
=>
t4: a r$ c$ *
t4 [applies for timeperiod] t3
tool.grouptranslate1@semscript.com
generator
x$ [is an instance of] [group]
=> grouptranslate1@local
x$ [commonly translates as] r *
tool.grouptranslate2@semscript.com
generator
x$ [is an instance of] [group]
=> grouptranslate2@local
x$ [uniquely translates as] r *
tool.pinstance@semscript.com
generator
! Generates facts like
! [timepoint: xxx] [is an instance of] [timepoint]
=> pinstance@local
g: a$ [is an instance of] r% *
g [applies for timeperiod] [timeperiod: [time zero]; [forever]]
tool.timeperiodtotimeperiod1@semscript.com
generator tr
a$ [applies for timeperiod] tr
=> timeperiod_to_timeperiod@local
a$ [applies for some of timeperiod] tp$ *
tool.timeperiodtranslate2@semscript.com
generator
tp$ [is an instance of] [timeperiod]
=> timeperiod_translate2@local
tp$ [uniquely translates as] s *
tool.tperiodtranslate1@semscript.com
generator
tp$ [is an instance of] [timeperiod]
=> timeperiod_translate1@local
tp$ [commonly translates as] s *
tool.tpintersect@semscript.com
generator
!b$ is a group containing timeperiods. Calculate
!a timeperiod common to all of them if one exists.
=> timeperiod_intersection@local
a [is the timeperiod intersection of] b$ *
tool.tptranslate1@semscript.com
generator
tp$ [is an instance of] [timepoint]
=> timepoint_translate1@local
tp$ [commonly translates as] s *
tool.tptranslate2@semscript.com
generator
tp$ [is an instance of] [timepoint]
=> timepoint_translate2@local
tp$ [uniquely translates as] s *
generator.geog_distinct1@semscript.com
generator t3
! Definition of not being located somewhere
f1: a$ [is geographically located within] c
f1 [applies for timeperiod] t1
f2: c [is geographically distinct from] b$
f2 [applies for timeperiod] t2
t3 [is the timeperiod intersection of] [group: t1; t2]
=>
f: a$ ~[is geographically located within] b$ *
f [applies for timeperiod] t3
generator.opposite2@semscript.com
! Where an attribute has an opposite
! creates the opposite fact (pos to neg)
generator tp
a$ [is the opposite of] b
f: b ~[applies to] x$
f [applies for timeperiod] tp
=>
t: a$ [applies to] x$ *
t [applies for timeperiod] tp
tool.candenote1@semscript.com
! tool checks some special strings
! e.g. strings, URLs etc.
generator
=> condenote@local
x$ [can denote] y% *
tool.candenoteapossessiveof1@semscript.com
generator
! checks for "'s" etc. does lookup
! on non-possessive
=> candenoteapossessiveof@local
x$ [can denote a possessive of] y% *
generator.subclassdistinct1@semscript.com
! distinct implies not a subclass
generator
a% [is a distinct class from] b%
=>
a% ~[is a subclass of] b% *
generator.antisymmetric1@semscript.com
generator a%,b%,tp
[antisymmetric] [applies to] r$ /s
t: b% r$ a%
t [applies for timeperiod] tp
=>
t2: a% ~r$ b% *
t2 [applies for timeperiod] tp
generator.moregeneral@semscript.com
generator a%,b%,tp
r$ [is a more general form of the relation] r2 /s
t1: a% r2 b% /s
t1 [applies for timeperiod] tp
=>
t: a% r$ b% *
t [applies for timeperiod] tp
tool.stringtranslate1@semscript.com
generator
! generates 'the string "<string>"'
=> stringtranslate1@local
x$ [uniquely translates as] r *
tool.stringtranslate2@semscript.com
generator
! generates "<string>"
=> stringtranslate2@local
x$ [commonly translates as] r *
generator.classiscomplete@semscript.com
generator
b$ [is a subclass of] c
[class is complete] [applies to] c/s
=>
[class is complete] [applies to] b$ *
generator.negativetime1@semscript.com
generator
a$: left relation right
f: left ~relation right
f [applies for all of timepoint] b$
=>
a$ ~[applies at timepoint] b$ *
generator.negativetime2@semscript.com
generator
a$: left relation right
f: left ~relation right
f [applies at timepoint] b$
=>
a$ ~[applies for all of timepoint] b$ *
tool.englishplural1@semscript.com
generator
! smart generator to pluralise strings
=> englishplural1@local
a% [is the plural form of] b% *
generator.negativetime3@semscript.com
generator
a$: left ~relation right
f: left relation right
f [applies for all of timepoint] b$
=>
a$ ~[applies at timepoint] b$ *
generator.geog_distinct4@semscript.com
generator t5
! If Cambridge University is in the UK
! and California is in the US
```

```
! and the US is geographically distinct from the UK
! Cambridge University is not in California.
f1: a$ [is geographically located within] c
f1 [applies for timeperiod] t1
f2: b$ [is geographically located within] d
f2 [applies for timeperiod] t2
t3 [is the timeperiod intersection of] [group: t1; t2]
f3: c [is geographically distinct from] d
f3 [applies for timeperiod] t4
t5 [is the timeperiod intersection of] [group: t3; t4]
=>
f: a$ ~[is geographically located within] b$ *
f [applies for timeperiod] t5
generator.notdistinctclass1@semscript.com
generator
a% [is a subclass of] b%
=>
a% ~[is a distinct class from] b% *
generator.perm6@semscript.com
generator
g$: a ~r b
[relation is permanent] [applies to] r /s
=>
g$ [applies for timeperiod] [timeperiod: [time zero]; [forever]] *
generator.classiscomplete1@semscript.com
! Something can't be in a subclass of a
! [class is complete] class unless it is
! known to be in that class.
generator
b$ [is a subclass of] c
[class is complete] [applies to] c /s
a$ ~[is an instance of] c
=>
a$ ~[is an instance of] b$ *
tool.classiscomplete2@semscript.com
generator
[class is complete] [applies to] class$ /s
=> classiscomplete2@local
a$ ~[is an instance of] class$ *
generator.permanent3@semscript.com
generator
f$: a ~[is an instance of] b
[class is permanent] [applies to] b
=>
f$ [applies for timeperiod] [timeperiod:[time zero]; [forever]] *
generator.truenow1@semscript.com
generator
f$: a r b
[relation is true now] [applies to] r /s
[current time] [applies to] tp$
=>
f$ [applies at timepoint] tp$ *
generator.truenow2@semscript.com
generator
f$: a ~r b
[relation is true now] [applies to] r /s
[current time] [applies to] tp$
=>
f$ [applies at timepoint] tp$ *
generator.can_denote@semscript.com
generator b
! present central forms count as denotational strings
a$ [is a present central form of] b /s
=>
a$ [can denote] b *
tool.geographicaccuracy1@semscript.com
generator
a$ [is an instance of] [geographical area]
b$ [is an instance of] [geographical area]
a$ [is geographically located within] b$
=>
a$ [is a more accurate version of] b$ *
generator.geog_distinct5@semscript.com
generator tp
f1: a$ [is geographically located within] b
f1 [applies for timeperiod] t1
f2: b [is geographically distinct from] c$
f2 [applies for timeperiod] t2
tp [is the timeperiod intersection of] [group: t1; t2]
=>
f: a$ [is geographically distinct from] c$ *
f [applies for timeperiod] tp
generator.geog_subdivision@semscript.com
generator b%, tp
f: a$ [is an instance of] c
f [applies for timeperiod] tp
c [is a geographical subdivision of] b%
=>
g: a$ [is geographically located within] b% *
g [applies for timeperiod] tp
```

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A knowledge representation system, comprising:
a data store having a knowledge base stored therein comprising knowledge represented in a structured, machine-readable format which encodes meaning and is distinct from natural language, the structured, machine-readable format including entity objects, each of at least some of the entity objects being explicitly associated in the knowledge base with at least one of a plurality of knowledge domains; and
at least one computing device configured to:
translate a natural language question to a plurality of queries, the natural language question being associated with a first knowledge domain of the plurality of knowledge domains, each of the plurality of queries being a machine-readable representation of a possible translation of the natural language question that is compatible with the structured, machine-readable format of the knowledge base;
determine whether any of the queries relate to the first knowledge domain by determining if there are any named entities in the queries that correspond to entity objects that are associated with the first knowledge domain in the knowledge base, thereby identifying a first subset of the queries;
determine whether any of the first subset of the queries represents a corresponding interpretation of the natural language question that belongs to the first knowledge domain, thereby identifying a second subset of the queries; and
respond to the natural language question using a portion of the knowledge within the first knowledge domain by processing the second subset of the queries that relate to the first knowledge domain with reference to the knowledge base.

2. The system of claim 1 wherein the at least one computing device is further configured to facilitate disambiguation of the plurality of queries.

3. The system of claim 1 wherein the at least one computing device is further configured to generate a plurality of answers corresponding to the plurality of queries.

4. The system of claim 1 wherein the at least one computing device is further configured to exclude another portion of the knowledge not within the first knowledge domain from generation of one or more answers to the second subset of the queries.

5. The system of claim 1 wherein the first knowledge domain is defined by an end user, and wherein the at least one computing device is further configured to create a sub-domain of the knowledge base corresponding to the first knowledge domain, and to respond to all subsequent queries corresponding to the sub-domain using the portion of the knowledge within the first knowledge domain.

6. A knowledge representation system, comprising:
a data store having a knowledge base stored therein comprising knowledge represented in a structured, machine-readable format which encodes meaning and is distinct from natural language, the knowledge base including a plurality of existing facts each of which is represented in the machine-readable format, and a plurality of generators configured to generate new facts not present in the knowledge base, the knowledge base also including a plurality of explanations each of which is identified as corresponding to one or more of the facts or one or more of the generators, the explanations including human-readable explanatory text relating to the corresponding facts or generators; and
at least one computing device configured to:
identify one or more of the existing facts from the knowledge base corresponding to a query;
identify one or more of the generators from the knowledge base corresponding to the query;
generate one or more new facts using the one or more generators;
identify one or more of the explanations from the knowledge base corresponding to the one or more existing facts;
identify one or more of the explanations from the knowledge base corresponding to the one or more generators by which the one or more new facts were generated;
construct a linked list of the explanations corresponding to the one or more existing facts and the one or more generators by which the one or more new facts were generated;
remove a redundant explanation from the linked list of explanations resulting in a modified linked list of explanations;
respond to the query using the explanatory text corresponding to the modified linked list of explanations to explain how the response was derived.

7. The system of claim 6 wherein the at least one computing device is further configured to translate a natural language question to the query, the natural language question comprising one of a how question, a why question, or a request for a definition of a term.

8. The system of claim 6 wherein some of the explanations comprise language translations of others of the explanations, each of the explanations having one or more corresponding translations identifying the others of the explanations to which it corresponds.

9. The system of claim 6 wherein the at least one computing device is further configured to:
generate a modified version of a particular one of the explanations;
associate the modified version of the particular explanation with the particular explanation and infer that the one or more facts corresponding to the particular explanation also correspond to the modified version of the particular explanation where the modified version of the particular explanation represents a first class of modification; and
associate the one or more facts corresponding to the particular explanation with the modified version of the particular explanation where the modified version of the particular explanation represents a second class of modification.

10. The system of claim 9 where the at least one computing device is further operable to generate the modified version of the particular explanation in response to modifications entered by a user, the modifications including modification class information entered by the user indicating whether the modified version of the particular explanation represents the first or second class of modification.

11. A computer-implemented method for use with a knowledge representation system, the knowledge representation system including a data store having a knowledge base stored therein comprising knowledge represented in a structured, machine-readable format which encodes meaning and is distinct from natural language, the structured, machine-readable format including entity objects, each of at least some of the entity objects being explicitly associated in the knowledge base with at least one of a plurality of knowledge domains, the method comprising:
translating a natural language question to a plurality of queries, the natural language question being associated with a first knowledge domain of the plurality of knowledge domains, each of the plurality of queries being a machine-readable representation of a possible translation of the natural language question that is compatible with the structured, machine-readable format of the knowledge base;
determining whether any of the queries relate to the first knowledge domain by determining if there are any named entities in the queries that correspond to entity objects that are associated with the first knowledge domain in the knowledge base, thereby identifying a first subset of the queries;
determining whether any of the first subset of the queries represents a corresponding interpretation of the natural language question that belongs to the first knowledge domain, thereby identifying a second subset of the queries; and
responding to the natural language question using a portion of the knowledge within the first knowledge domain by processing the second subset of the queries that relate to the first knowledge domain with reference to the knowledge base.

12. The method of claim 11 further comprising facilitating disambiguation of the plurality of queries.

13. The method of claim 11 further comprising generating a plurality of answers corresponding to the plurality of queries.

14. The method of claim 11 further comprising excluding another portion of the knowledge not within the first knowledge domain from generation of one or more answers to the second subset of the queries.

15. The method of claim 11 wherein the first knowledge domain is defined by an end user, and wherein the method further comprises creating a sub-domain of the knowledge base corresponding to the first knowledge domain, and responding to all subsequent queries corresponding to the sub-domain using the portion of the knowledge within the first knowledge domain.

16. A computer-implemented method for use with a knowledge representation system, the knowledge representation system including a data store having a knowledge base stored therein comprising knowledge represented in a structured, machine-readable format which encodes meaning and is distinct from natural language, the knowledge base including a plurality of existing facts each of which is represented in the machine-readable format, and a plurality of generators configured to generate new facts not present in the knowledge base, the knowledge base also including a plurality of explanations each of which is identified as corresponding to one or more of the facts or one or more of the generators, the explanations including human-readable explanatory text relating to the corresponding facts or generators, the method comprising:

identifying one or more of the existing facts from the knowledge base corresponding to a query;

identifying one or more of the generators from the knowledge base corresponding to the query;

generating one or more new facts using the one or more generators;

identifying one or more of the explanations from the knowledge base corresponding to the one or more existing facts;

identifying one or more of the explanations from the knowledge base corresponding to the one or more generators by which the one or more new facts were generated;

constructing a linked list of the explanations corresponding to the one or more existing facts and the one or more generators by which the one or more new facts were generated;

removing a redundant explanation from the linked list of explanations resulting in a modified linked list of explanations; and responding to the query using the explanatory text corresponding to the modified linked list of explanations to explain how the response was derived.

17. The method of claim 16 further comprising translating a natural language question to the query, the natural language question comprising one of a how question, a why question, or a request for a definition of a term.

18. The method of claim 16 wherein some of the explanations comprise language translations of others of the explanations, each of the explanations having one or more corresponding translations identifying the others of the explanations to which it corresponds.

19. The method of claim 16 further comprising:

generating a modified version of a particular one of the explanations;

associating the modified version of the particular explanation with the particular explanation;

inferring that the one or more facts corresponding to the particular explanation also correspond to the modified version of the particular explanation where the modified version of the particular explanation represents a first class of modification; and associating the one or more facts corresponding to the particular explanation with the modified version of the particular explanation where the modified version of the particular explanation represents a second class of modification.

20. The method of claim 19 further comprising generating the modified version of the particular explanation in response to modifications entered by a user, the modifications including modification class information entered by the user indicating whether the modified version of the particular explanation represents the first or second class of modification.

\* \* \* \* \*